(12) United States Patent
Miller et al.

(10) Patent No.: US 11,568,423 B2
(45) Date of Patent: Jan. 31, 2023

(54) MULTI-DIMENSIONAL PRODUCT INFORMATION ANALYSIS, MANAGEMENT, AND APPLICATION SYSTEMS AND METHODS

(71) Applicant: ASSENT INC, Ottawa (CA)

(72) Inventors: Travis J. Miller, Mesa, AZ (US); Corey Peters, On (CA)

(73) Assignee: Assent Inc., Ottawa (CA)

( * ) Notice: Subject to any disclaimer, the term of this patent is extended or adjusted under 35 U.S.C. 154(b) by 0 days.

(21) Appl. No.: 17/731,257

(22) Filed: Apr. 27, 2022

(65) Prior Publication Data

US 2022/0253871 A1    Aug. 11, 2022

Related U.S. Application Data

(63) Continuation-in-part of application No. PCT/US2021/056365, filed on Oct. 22, 2021.
(Continued)

(30) Foreign Application Priority Data

Mar. 24, 2021 (EP) .................................... 21164704

(51) Int. Cl.
*G06F 17/00*    (2019.01)
*G06Q 30/00*    (2012.01)
(Continued)

(52) U.S. Cl.
CPC ......... *G06Q 30/018* (2013.01); *G06F 40/284* (2020.01); *G06F 40/30* (2020.01)

(58) Field of Classification Search
CPC ...... G06Q 30/018; G06F 40/284; G06F 40/30
See application file for complete search history.

(56) References Cited

U.S. PATENT DOCUMENTS 8,032,516 B2    10/2011    Kim et al.
8,249,954 B2    8/2012    Dolan et al.
(Continued)

OTHER PUBLICATIONS

International Search Report dated Jan. 21, 2022 based on PCT/US 21/56365.
European Search Report dated Sep. 6, 2021 based on EP21164704.5.

*Primary Examiner* — Mohammed H Zuberi
(74) *Attorney, Agent, or Firm* — Transformative Legal LLC; Len S. Smith; Denise M. Brown

(57) ABSTRACT

Disclosed here are methods of analyzing product-related datasets using a computer system including a product data collection; receiving a product-related data submission; identifying system-identified terms in the submission; generating a query dataset comprising search elements, such as lexical vector(s), semantic vector(s), or both; querying the product data collection and identifying datasets that sufficiently match aspect(s) of the query dataset; comparing the content of the submission and matching datasets to provide an output such as a determination of an error or omission in the submission, identifying a relationship between the submission product and a product associated with an identified dataset; or assessing one or more product status characteristics; and optionally performing additional applications, such as generating a regulatory authority submission based on the determination that the submission product is subject a regulatory requirements based on the comparison of the submission with the identified datasets.

20 Claims, 40 Drawing Sheets

Related U.S. Application Data

(60) Provisional application No. 63/149,113, filed on Feb. 12, 2021, provisional application No. 63/104,505, filed on Oct. 22, 2020.

(51) Int. Cl.
  *G06F 40/284* (2020.01)
  *G06F 40/30* (2020.01)

(56) References Cited

U.S. PATENT DOCUMENTS

| | | | |
|---|---|---|---|
| 8,290,925 B1 | 10/2012 | Anandan et al. | |
| 9,489,654 B2 | 11/2016 | Martinez-Ablanedo | |
| 10,067,965 B2 | 9/2018 | Lev et al. | |
| 10,303,999 B2 | 5/2019 | Hertz et al. | |
| 10,558,759 B1 * | 2/2020 | Arfa | G06N 7/005 |
| 10,593,346 B2 * | 3/2020 | Van Gysel | G10L 15/16 |
| 10,685,183 B1 * | 6/2020 | Arfa | G06F 40/284 |
| 10,685,184 B1 * | 6/2020 | Arfa | G06F 16/34 |
| 10,803,248 B1 * | 10/2020 | Arfa | G06N 20/00 |
| 11,030,539 B1 * | 6/2021 | Arfa | G06F 40/295 |
| 11,182,806 B1 * | 11/2021 | Arfa | G06Q 30/0201 |
| 2005/0108001 A1 | 5/2005 | Aarskog | |
| 2006/0101000 A1 | 5/2006 | Hacigumus et al. | |
| 2009/0063404 A1 | 3/2009 | Hacigumus et al. | |
| 2013/0198094 A1 | 8/2013 | Arazy | |
| 2018/0032855 A1 | 2/2018 | Wang et al. | |
| 2018/0330445 A1 | 11/2018 | Levering et al. | |
| 2018/0341955 A1 | 11/2018 | Amarthaluri et al. | |
| 2018/0373844 A1 * | 12/2018 | Ferrandez-Escamez | G16H 50/20 |
| 2018/0374047 A1 | 12/2018 | Sarkar et al. | |
| 2019/0079913 A1 | 3/2019 | Levine et al. | |
| 2019/0236126 A1 | 8/2019 | Guzman et al. | |
| 2020/0026759 A1 * | 1/2020 | Schwarm | G06K 9/6267 |
| 2020/0111023 A1 | 4/2020 | Pondicherry Murugappan et al. | |
| 2020/0143277 A1 | 5/2020 | Levine et al. | |
| 2020/0242305 A1 * | 7/2020 | Wu | G06N 5/04 |
| 2021/0174016 A1 * | 6/2021 | Fox | G06N 3/0454 |
| 2021/0232768 A1 * | 7/2021 | Ling | G06F 40/295 |
| 2021/0353218 A1 * | 11/2021 | Edwards | A61B 5/7264 |
| 2022/0084095 A1 * | 3/2022 | Shan | G06F 17/18 |

* cited by examiner

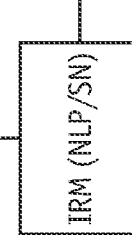
FIG. 4

600 ⇘

| INITIATION | |
|---|---|
| USER DIRECT INPUT (DII) | DOCUMENT UPLOAD (DOCI) |
| Entity | Component I, amount A |
| User | Component II, amount B |
| Deliverable | *Component III*, amount C |
| Product Description | |
| Component I, amount A | |
| Component II, amount B | |
| HARMONIZATION | |
| Product Description | Component I |
| Deliverable | Component II |
| User | Component III |
| Entity | |
| NSD | |
| #-SUBMISSION REFERENCE ID applied to Harmonized Data | |
| SYNONYM GENERATION | |
| SYNONYMS | AMT EQUIVALENTS |
| BPA | 1 mg |
| 4,4'- isopropylidenediphenol | 1,000 ug |
| Bisphenol A | 1,000,000 ng, nanogram |
| CAS Registry No. 80-05-7 | 0.001 kg, kilogram |
| | 3.5274e-5 oz, ounce |

| RESULTS FROM DATABASE (QM) | | | |
|---|---|---|---|
| RECORD I *DBREF1* | RECORD II *DBREF2* | RECORD III *DBREF3* | RECORD IV *DBREF4* |
| Product Desc. | Product Desc. | Product Desc. | Product Desc. |
| Comp. I, amt A | Comp. I, amt A | *Comp. I, amt D* | Comp. I, amt A |
| | Comp. II amt B | Comp. III, amt C | Comp. II, amt B |
| | *NO COMP III | *Comp. IV, amt E* | Comp. III, amt C |
| | | | *Sub. Comp. IIIa* |
| | | | *Sub. Comp. IIIb* |
| | | | *Ingred.1* |
| | | | *Ingred.2* |

| UPDATED NSD | |
|---|---|
| Product Description | Component IV, amt E |
| Deliverable | Component III, amt C |
| User |   Sub. Component IIIa |
| Entity |   Sub. Component IIIb |
| Component I, amt A |     Ingredient 1 |
| Component II, amt B |     Ingredient 2 |

*FIG. 6*

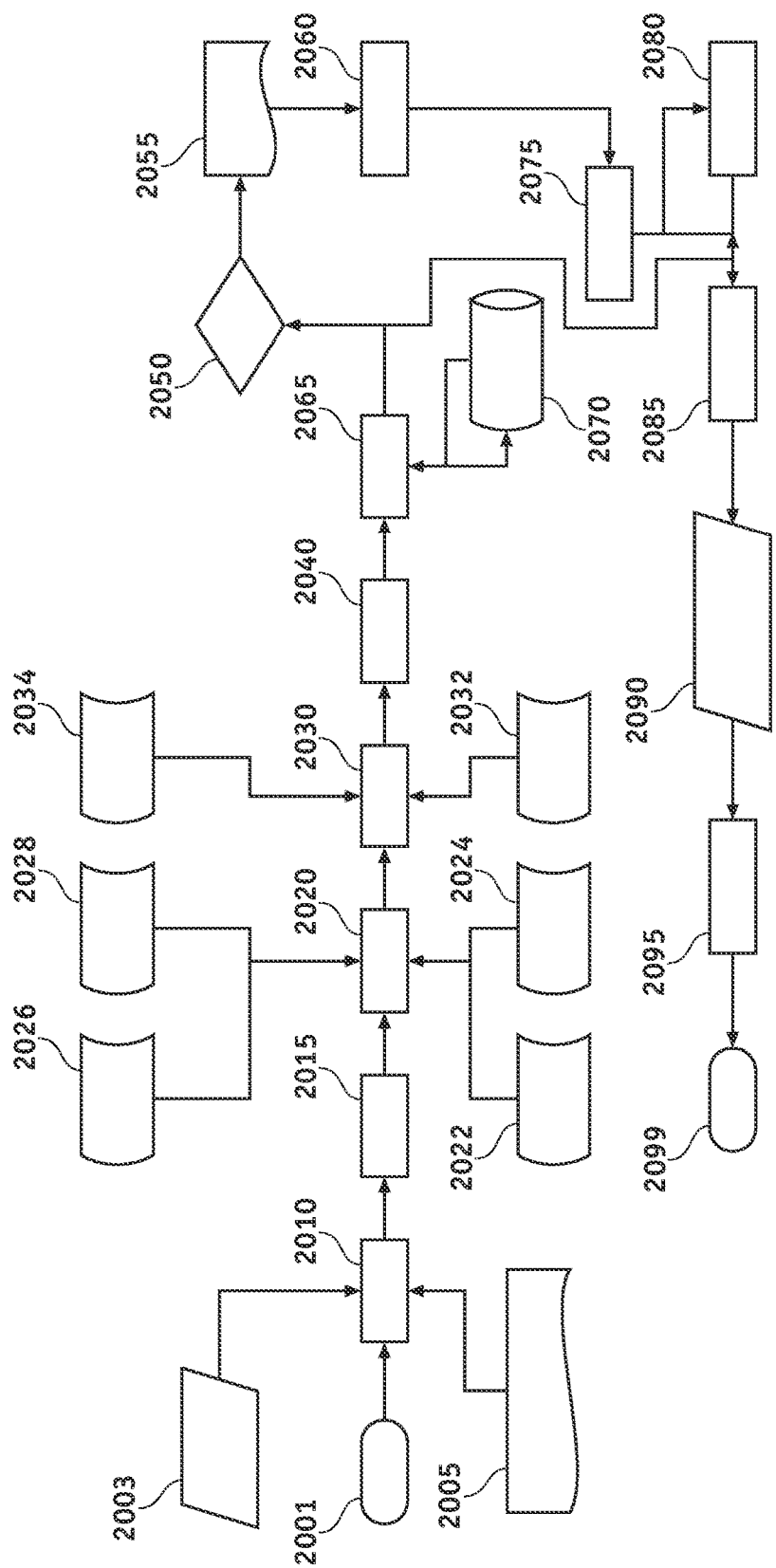
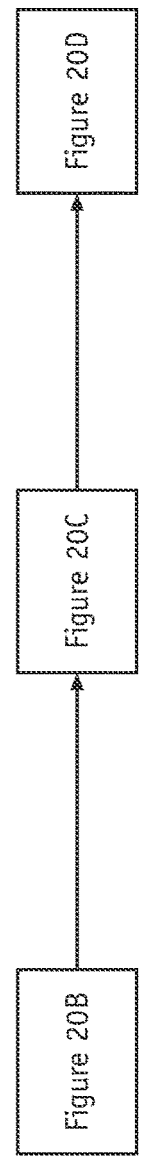
FIG. 20
FIG. 20A

MULTI-DIMENSIONAL PRODUCT INFORMATION ANALYSIS, MANAGEMENT, AND APPLICATION SYSTEMS AND METHODS

CROSS REFERENCE TO RELATED APPLICATIONS

This patent application is a continuation-in-part of PCT/US21/56365, filed Oct. 22, 2021, and claims priority to U.S. Provisional Patent Application No. 63/104,505, filed on Oct. 22, 2020, U.S. Provisional Patent Application No. 63/149,113, filed on Feb. 12, 2021, and European Patent Application No. 21164704.5, filed Mar. 24, 2021. This application incorporates by reference the entirety of these priority applications.

FIELD OF THE INVENTION

This invention relates to computer-facilitated methods and computer systems for performing automated analysis of product information data records with improved speed and accuracy and the use of such analysis in the performance of other computer-facilitated automated tasks such as generating regulatory submissions, assessing supply chain risk, and the like.

BACKGROUND OF THE INVENTION

Meeting regulatory requirements has been identified as "an increasingly difficult issue for manufacturers." Joachim Ebert, Industry Week (Mar. 10, 2011). Nearly 80% of companies indicate that they struggle with knowledge management, which is critical for regulatory compliance. Id. For example, in automotive manufacturing, regulatory relevant information can be in no less than 30 different systems and locations. The number of applicable regulations and the diffusion of pertinent information makes it "difficult to keep track of" regulatory relevant information. Id. The complexity of regulations, however, has only increased since 2011. See Id. See also Travis Miller, Georgetown Intl. Environmental Law Rev. (2015).

Material goods suppliers, for example, face a massive data-gathering exercise ahead of the near-term launch of a new European Union (EU)-wide database of products containing harmful substances. The "Substances of Concern in Products" ("SCIP") database, established European Chemicals Agency (ECHA), will require companies supplying products into the EU to submit "sufficient information" to the ECHA to allow for the safe use of those products by Jan. 5, 2021. The SCIP database will consist of information about 'articles' supplied in the EU which contain substances in a concentration of above 0.1% w/w (weight for weight) which are on the candidate list of substances of very high concern ("SVHCs") under the Registration, Evaluation, Authorization, and Restriction of Chemicals ("REACH") regime. For EU chemicals law, 'articles' covers both individual items and more complex items made up of numerous different individual items. Suppliers, who will be required to submit the information to customers to enable their customers to submit dossiers to ECHA by filings into the SCIP database, include EU producers and assemblers, importers, and distributors. Thus, lack of coordination between such entities in terms of reporting creates compliance risks. The detailed information document published by the ECHA envisages the submission of a variety of mandatory and optional information about each article. The mandatory information includes information that allows the identification of the supplier; the article; the name of the product; the concentration range and location of the potentially harmful SVHCs present in that article; and information to allow for its safe use and proper management once it becomes waste. Industry representatives have indicated that SCIP requirements are "overwhelming, especially in the case of complex objects" and require organizations to perform a "colossal data-gathering exercise." Out-Law News, Oct. 15, 2019, at pinsentmasons.com.

The SCIP/ECHA requirements may, however, represent merely one example of a continuously growing regime of complicated regulatory reporting and compliance requirements impacting business and industrial activities, such as the production and supply of manufactured goods, the analysis of which is simultaneously also becoming more complicated due to the forces of part specialization/ingredient sourcing of organizations and organizational units, globalization of supply chains, rise of business reputation factors, such as environmental, social, and governance (ESG) factors, technological advances, and growing worldwide markets, each subject to different/evolving regulatory regimes.

The non-regulated and complicated nature of product information poses a unique challenge for compliance programs focused on product-related laws and regulations, such as SCIP requirements. In most cases, product information in organizations is associated with at least one, typically several, "bill of materials" ("BOMs"). A BOM typically will include one or more of a listing of suppliers, raw materials, sub-assemblies, intermediate assemblies, sub-components, parts, and the quantities of each needed to be made, purchased, or both, to manufacture an end product. BOMs can be confined to a single company, site, or function within a company or site, or can be designed for use in a supply chain. There are numerous types of documents classified as BOMs, each type having different contents and formats. For example, BOMs can define products as they are designed/engineered (usually called engineering bill of materials or EBOMs), as they are ordered (sales bill of materials or SBOMs), as they are built (manufacturing bill of materials or MBOMs), or as they are maintained (service bill of materials). The different types of BOMs depend on the business need and use for which they are intended. Different domains and departments of a company, such as Engineering, Manufacturing, Customer Services, and the like, independently manage different BOMs or parts of BOMs (e.g., Engineering will typically manage or generate EBOMs). These BOMs are typically stored in different, dissimilar databases in various locations of a single company. Across a supply chain, BOMs can be managed/used by several separate groups.

BOMs (or BOM-like documents) are not even consistently referred to as "BOMs" in all organizations or industries. In process industries/functions, for example, a BOM is also or alternatively known as the formula, recipe, or ingredients list. BOMs also are often also referred to as "product structures" or "associated lists." Moreover, variations of BOMs exist, such as "pseudo-BOMs," which are described as more flexible/simplified product-related records than traditional BOMs. However, many BOMs, particularly for complex products, actually are multilevel documents that provide product-related data for both main assemblies and their associated sub-assemblies (i.e., components within components). The complexity of such BOMs can mean that errors (often costly errors) arise in such documents.

Furthermore, BOMs also can be associated with other product-relevant documents such as production orders, assembly instructions, and disassembly instructions, which also can contain product information relevant to regulatory classification of the product. BOM are reference files, such as part specifications, Computer Aided Design (CAD) files, schematics, component datasheets, mechanical drawings, other reference items, such as tooling or agency certifications that are not included in the product itself, but which are required for manufacture.

With the increase in supply chains and product manufacturing complexity, individuals and organizations have proposed computer-based systems for aiding users in managing complex product-relevant information. E.g., U.S. Pat. No. 8,249,954 describes a computerized system by which claims of various types (origin, certifications, etc.) can be validated by linking items, including the histories or make-ups of components and associated supply chain information, such that interested parties can determine if a product claim is accurately justified. U.S. Pat. No. 8,032,516 describes an a posteriori approach to harmonizing different types of BOM information in an organization or network to generate a unified bill of materials based on taxonomy and semantic ontology. U.S. Pat. No. 9,489,654 describes an artificial intelligence (AI) system for managing BOM information of different domains within an organization (e.g., EBOMs, SBOMs, and MBOMs) a priori. The AI system of the '654 patent includes a file server having a plurality of databases for storing specific product information relating to associated assemblies and sub-assemblies and a processor coupled to databases and programmed to perform tasks and display product BOM information for different functional domains of an organization via a network. U.S. Pat. No. 10,303,999 describes systems for determining the relationship between organization within a supply chain based on unstructured text corpora using machine learning methods. U.S. Pat. No. 10,067,965 describes systems for interpretation of product-related data, including finding elements of product information and determining hierarchic relationships between elements.

Given the concurrent growth in complexity of regulations, organizations also have proposed various technological approaches to control costs and improve on human management of such information. Many proposed automated or partially automated systems for managing compliance in the art relate at least primarily to financial matter-related regulatory compliance. For example, each of US20190236126, US20180032855, and US20180374047 broadly describe automated and semi-automated systems for facilitating financial matter compliance. Although these disclosures differ somewhat, each describes computer-based systems, including user data, regulatory requirements, and related regulatory submission data; module(s)/means for checking correctness or completeness of data; module(s)/means for reporting issues; preparation of regulatory submissions; and updating of related databases, as do other patent disclosures. For example, US20130198094 describes an electronic regulatory compliance tool, focused on FDA regulation of medical devices, which comprises a regulation database, a database of compliance documents, and a database of experts, which facilitates the expert review of documents, guides the completion of regulatory submissions, and possibly even facilitates regulatory submissions.

US20190079913 (Levine et al, Xerox Corp.) describes electronic systems for coordinating collection of regulatory information and coordinating regulatory information itself, including information about toxic substances, among vendors in a supply chain, and coordinating such information with information relating to a variety of regulatory authority (RA) requirements. The described system determines requirements and assists in populating regulatory forms. Another aspect of the described method includes selectively redacting confidential information from compliance reports relayed to other vendors in the supply chain. US20200143277, which has the same applicant and at least several of the same inventors as the above-referenced '913 publication, discloses methods and systems for automatically predicting the probability of regulatory compliance approval based on data contained in a data structure which includes data collated and collected from one or more regulators and one or more value chain participants providing for a prediction as to the probability that an application for regulatory approval by a value chain participant will be approved by a regulator and for predicting what is missing for a regulatory approval application. Among possibly other limitations, the limitation of the methods of the '277 publication to related value chain participants may limit the overall applicability of the proposed system/method.

US20200111023 generally describes methods of applying artificial intelligence (AI) systems to regulatory materials. The proposed AI system described in this patent application is trained through machine learning processes to extract topics, identify entries, classify portions of regulatory text documents into sections to facilitate execution of downstream processes related to the regulations. US2018330445 describes a method and system to create personalized investor information packages, based on investor information, to be delivered to the investor to satisfy both compliance regulations and investor preferences. US20200143277 describes methods and systems for automatically predicting the probability of regulatory compliance approval based on data contained in a data structure that can include data collated and collected from one or more regulators (e.g., regulatory agencies) and one or more supply/value chain participants. The described approach allegedly predicts the probability that an application for regulatory approval by a value chain participant will be approved.

None of the several above-described systems or other systems described in patent literature or otherwise known in the art provide a solution for efficiently and adequately handling complex product-related datasets (alone or in combination with other factors, such as regulatory requirements), which can factor many real-world aspects of product supply information/relationships including multiple levels of information obtained from various independent sources (typically in different formats), so as to effectively simplify and improve product related data management and product related reporting and compliance in complex regimens, such as SCIP/REACH compliance. Furthermore, most of these references fail to provide any specific disclosure for efficiently processing the large amounts of data associated with a worldwide collection of product-related records associated with numerous different and independent entities. Addressing such problems efficiently, effectively, and quickly, will require new and inventive approaches and technology that are different-in-kind from any disclosure provided in any of the above-cited references.

Construction, Terms, and Acronyms

This section offers guidelines for reading this disclosure. The intended audience for this disclosure ("readers") are persons having ordinary skill in the practice of technologies discussed or used herein. Readers may also be called "skilled persons," and such technologies called "the art." Terms such as "understood," "known," and "ordinary meaning," refer to the general knowledge of skilled persons.

The term "uncontradicted" means not contradicted by this disclosure, logic, or plausibility based on knowledge of skilled persons.

Disclosed here are several different but related exemplary aspects of the invention ("aspects") (alternatively called "cases," "facets," or "embodiments"). The invention encompasses all aspects, as described individually and as can be arrived at by any combination of such individual aspects. Any reference to "aspects" (as in "according to aspects" or "in aspects") means according to any and all other suitable aspects described herein. The breadth and scope of the invention should not be limited by any exemplary embodiment(s). No language in this disclosure should be construed as indicating any element/step is essential to the practice of the invention unless such a requirement is explicitly stated. Uncontradicted, any aspect(s) can be combined with any other aspect(s).

Uncontradicted, all technical/scientific terms used here generally have the same meanings as commonly understood by skilled persons, regardless of any narrower examples or descriptions provided here (including any term introduced initially in quotations). However, aspects characterized by the inclusion of elements, steps, etc., associated with specific descriptions provided here are distinct embodiments of the invention. Uncontradicted, disclosure of any aspect using known terms, which terms are narrowed by example or otherwise in this disclosure, implicitly discloses related aspects in which such terms are alternatively interpreted using the broadest reasonable interpretation of skilled persons.

Uncontradicted, "or" means "and/or" here, regardless of any occasional inclusion of "and/or" (e.g., phrases such as "A, B, or C" and "A, B, and/or C" simultaneously disclose aspects including (1) all of A, B, and C; (2) A and C; (3) A and B; (4) B and C; (5) only A; (6) only B; and (7) only C (and also support sub-groupings, such as "A or B," "A or C," etc.)).

Uncontradicted, "also" means "also or alternatively." Uncontradicted, "here" and "herein" mean "in this disclosure". The term "i.a." means "inter glia" or "among other things." "Also known as" is abbreviated "aka" or "AKA" and means both otherwise known in the art or otherwise referred to as here. Uncontradicted, "elsewhere" means "elsewhere herein."

For conciseness, symbols are used where appropriate. E.g., "~" for "about." Symbols such as < and > are given their ordinary meaning (e.g., "≤" means "less than or equal to" and "≥" means "greater than or equal to"). A slash "/" can represent "or" ("A/B" means "A or B") or identify synonyms of an element, as will be clear from context.

The inclusion of "(s)" after an element or a step indicates that ≥1 of such an element is present, step performed, and the like. E.g., "element(s)" means both 1 element or ≥2 elements, with the understanding that each thereof is an independent aspect of the invention.

Use of the abbreviation "etc." (or "et cetera") in association with a list of elements/steps means any or all suitable combinations of the recited elements/steps or any known equivalents of such recited elements/steps for achieving the function(s) of such elements/steps. Terms such as "and combinations," or "or combinations" regarding listed elements/steps means combinations of any or all such elements/steps.

Uncontradicted, terms such as "suitable" and "suitability" mean acceptable or appropriate for performing a particular function/achieving particular state(s)/outcome(s), and typically means effective and practical in the context the term is used. E.g., uncontradicted, the term "suitable" means appropriate, acceptable, or in contexts sufficient, or providing at least generally or substantially all of an intended or expected result or function or exhibiting an at least intended or expected property or degree/level of performance/state.

Uncontradicted, heading(s) (e.g., "Construction, Terms . . . ") and subheadings are included for convenience and do not limit the scope of any aspect(s). Uncontradicted, aspect(s), step(s), or element(s) described under one heading can apply to other aspect(s) or step(s)/element(s) here.

Ranges of values are used to represent each value falling within such range that are within an order of magnitude of the smallest endpoint of the range without having to explicitly write each value of the range. E.g., a recited range of 1-2 implicitly discloses each of 1.0, 1.1, 1.2, . . . 1.9, and 2.0 and 10-100 implicitly discloses each of 10, 11, 12, . . . 98, 99, and 100). Uncontradicted, all ranges include the range's endpoints, regardless of how a range is described. E.g., "between 1-5" includes 1 and 5 in addition to 2, 3, and 4 (and all numbers between such numbers within an order of magnitude of such endpoints, e.g., 1.0, 1.1, . . . 4.9, and 5.0). For the avoidance of doubt, any number within a range, regardless of the order of magnitude of the number, is covered by the range (e.g., a range of 2-20 covers 18.593).

Terms of approximation (e.g., "about," "~," or "approximately") are used (1) to refer to a set of related values or (2) where a precise value is difficult to define (e.g., due to limits of measurement). Uncontradicted, all exact values provided here simultaneously/implicitly disclose corresponding approximate values and vice versa (e.g., disclosure of "about 10" provides explicit support for the use of 10 exactly in such aspect/description). Ranges described with approximate value(s) include all values encompassed by each approximate endpoint, regardless of presentation (e.g., "about 10-20" has the same meaning as "about 10-about 20"). The scope of value(s) encompassed by an approximate term typically depends on the context of the disclosure, criticality or operability, statistical significance, understanding in the art, etc. In the absence of guidance here or in the art, terms such as "about" should be interpreted as +/−10% of the indicated value(s).

Lists of aspects, elements, steps, and features are sometimes employed for conciseness. Unless indicated, each member of each list should be viewed as an independent aspect. Each aspect defined by any individual member of a list can have, and often will have, nonobvious properties vis-a-vis aspects characterized by other members of the list.

Uncontradicted, the terms "a" and "an" and "the" and similar referents encompass both the singular and the plural form of the referenced element, step, or aspect. Uncontradicted, terms in the singular implicitly convey the plural and vice versa herein (in other words, disclosure of an element/step implicitly discloses corresponding use of such/similar elements/steps and vice versa). Hence, e.g., a passage regarding an aspect including X step supports a corresponding aspect including several X steps. Uncontradicted, any mixed use of a referent such as "a" in respect of one element/step or characteristic and "one or more of" with respect to another element/step or characteristic in a paragraph, sentence, aspect, or claim, does not change the meaning of such referents. Thus, for example, if a paragraph describes a composition comprising "an X" and "one or more Ys," the paragraph should be understood as providing disclosure of "one or more Xs" and "one or more Ys."

"Significant" and "significantly" mean results/characteristics that are statistically significant using ≥1 appropriate test(s)/trial(s) in the given context (e.g., p≤0.05/0.01). "Detectable" means measurably present/different using known detection tools/techniques. The acronym "DOS" (or "DoS") means "detectable(ly) or significant(ly)."

Uncontradicted, for any value here that is not accompanied by a unit of measurement (e.g., a weight of 50 or a length of 20), any previously provided unit for the same element/step or the same type of element/step will apply, or, in cases where no such disclosure exists, the unit most commonly used in association with such an element/step in the art applies.

Uncontradicted, the terms "including," "containing," "comprising," and "having" mean "including, but not limited to" or "including, without limitation." Uncontradicted, use of terms such as comprising and including regarding elements/steps means including any detectable number or amount of an element or including any detectable performance of a step/number of steps (with or without other elements/steps).

For conciseness, description of an aspect "comprising" or "including" an element, with respect to a collection/whole (e.g., a system, device, or composition), implicitly provides support for any detectable amount/number or ≥~1%, ≥~5%, ≥~10%, ≥~20%, ≥~25%, ≥~33%, ≥~50%, ≥~51%, ≥~66%, ≥~75%, ≥~90%, ≥~95%, ≥~99%, or ~100%, or essentially all of the whole/collection being made up of the element (i.e., that the collection consists essentially of the referenced element). Similarly, a method described as including a step with respect to an effect/outcome implicitly provides support for the referenced step providing ≥~1%, ≥~5%, ≥~10%, ≥~20%, ≥~25%, ≥~33%, ≥~50%, ≥~51%, ≥~66%, ≥~75%, ≥~90%, ≥~95%, ≥~99%, or ~100% of the effect/outcome, representing ≥~1%, ≥~5%, ≥~10%, ≥~20%, ≥~25%, ≥~33%, ≥~50%, ≥~51%, ≥~66%, ≥~75%, ≥~90%, ≥~95%, ≥~99%, or ~100% of the steps/effort performed, or both. Explicit listing of percentages of elements/steps in connection with aspects does not limit or contradict such implicit disclosure.

Uncontradicted, terms such as "comprising" when used in connection with a step of a method provide implicit support for performing the step once, ≥2 times, or until an associated function/effect is achieved.

Uncontradicted, the term "one" means a single type, single iteration/copy/thing, of a recited element or step, or both, which will be clear from context. For example, the referent "one" used with a component of a device or composition can refer to one type of element (which may be present in numerous copies, as in the case of an ingredient in a composition), one unit of the element, or both. Similarly, "one" component, a "single" component, or the "only component" of a system typically means 1 type of element (which may be present in numerous copies), 1 instance/unit of the element, or both. Further, "one" step of a method typically means performing one type of action (step), one iteration of a step, or both. Uncontradicted, a disclosure of "one" element provides support for both, but uncontradicted, any claim to any "one" element means one type of such an element (e.g., a component of a composition/system).

The term "some" means ≥2 copies/instances or ≥5% of a listed collection/whole is, or is made up of, an element. Regarding methods, some means ≥5% of an effect, effort, or both, is made up of or is attributable to a step (e.g., as in "some of the method is performed by step Y") or indicates a step is performed ≥2 times (e.g., as in "step X is repeated some number of times"). "Predominately," "most," or "mostly," means detectably ≥50% (e.g., mostly comprises, predominately includes, etc., mean ≥50%) (e.g., a system that mostly includes element X is composed of ≥50% of element X). The term "generally" means ≥75% (e.g., generally consists of, generally associated with, generally comprises, etc., means ≥75%) (e.g., a method that generally consists of step X means that 75% of the effort or effect of the method is attributable to step X). "Substantially" or "nearly" means ≥95% (e.g., nearly all, substantially consists of, etc., mean ≥95%) (e.g., a collection that nearly entirely is made up of element X means that at least 95% of the elements in the collection are element X). "Generally free," "generally none" and the like mean ≤25%. Substantially free" and "substantially none" mean ≤5%. Uncontradicted, "sometimes" means ≥5% of the time, often means ≥25% of the time, usually means ≥50% of the time, terms such as "generally" and "generally always" mean ≥75% of the time, and terms such as "substantially" or "substantially always" mean ≥95% of the time.

Uncontradicted, any aspect described with respect to an optionally present element(s)/step(s) also provides implicit support for corresponding aspect(s) in which one, some, most, generally all, nearly all, essentially all, or all of such element(s) are lacking/step(s) not performed, in respect of the relevant aspect. E.g., disclosure of a system comprising element X implicitly also supports a system lacking element X.

Uncontradicted, changes to tense or presentation of terms (e.g., using "comprises predominantly" in place of "predominantly comprises") do not change the meaning of the corresponding term/phrase. Uncontradicted, "exemplary" means "serving as an example, instance, or illustration." E.g., the detailed description section is exemplary in nature and is not intended to limit application and uses. Any embodiment described herein as "exemplary" is not necessarily to be construed as preferred or advantageous over other embodiments.

Uncontradicted, all methods disclosed here can be performed in any suitable order regardless of presentation (e.g., a method comprising steps A, B, and C, can be performed in the order C, B, and A; B and A and C simultaneously, etc.). Uncontradicted, elements of a device or system can be assembled, applied, or arranged in any suitable manner by any suitable method. In general, any methods and materials similar or equivalent to those described here can be used in the practice of embodiments. Uncontradicted, the use of ordinal numbers or indicators such as "first," "second," "third," "1," "2," "3," "(a)," "(b,") and so on is to distinguish respective elements rather than to limit the disclosure to that particular order of those elements.

Uncontradicted, any elements, steps, components, or features of aspects and all variations thereof, etc., are within the scope of the invention. Uncontradicted, elements associated with a function can be described as "means for" performing a function in a composition/device/system or a "step for" performing a part of a method, and parts of this disclosure refer to "equivalents," which means equivalents known in the art for achieving a referenced function that can be associated with disclosed mean(s)/step(s). However, no element of this disclosure or claim should be interpreted as limited to a "means-plus-function" construction unless such intent is clearly indicated by the use of the terms "means for" or "step for." Terms such as "configured to" or "adapted to" do not indicate "means-plus-function" interpretation, but, rather, describe element(s)/step(s) configured to, designed to, selected to, or adapted to achieve a certain performance, property, etc. using teachings herein or in the art.

Uncontradicted, terms like "improved" herein mean measurably "increased" or "decreased" in one or more respects as will be clear from context (good properties increased and bad ones decreased). Uncontradicted, terms like "enhanced," "improved," etc. are synonymous.

All references (e.g., publications, patent applications, and patents) cited herein are hereby incorporated by reference as if each reference were individually and specifically indicated to be incorporated by reference and set forth in its entirety herein. Uncontradicted, any suitable principles, methods, or elements of such references (collectively "teachings") can be combined with or adapted to aspects. However, citation/incorporation of patent documents is limited to the technical disclosure thereof and does not reflect any view regarding the validity, patentability, etc., thereof. In the event of any conflict between this disclosure and the teachings of such documents, the content of this disclosure controls regarding aspects of the invention. Numerous references are cited here to concisely incorporate known information and aid skilled persons in putting aspects into practice. While efforts have been made to include the most relevant references for such purposes, readers will understand that not every aspect of every cited reference will apply to every aspect of the invention.

The inventors do not intend for any part of this section of the disclosure to limit the scope of any terms ordinarily understood in the art (i.e., are "known"). Uncontradicted, a description of known terms is intended only to exemplify typical meaning of the referenced term or to disclose specific embodiments, rather than to limit the meaning of the team as known in the art. Efforts have been made to capitalize such terms in this disclosure (sometimes abbreviated TD), but non-capitalized forms may be used with the same meaning, as will typically be clear from context and should be presumed in the absence of contradicting statement or context herein.

Additional Terms, Concepts, and Acronyms

The following description of certain terms and acronyms is provided to assist readers in understanding the invention. Additional acronyms may be only provided in other parts of this disclosure and acronyms that are well known in the art may not be provided here.

A "Function" or a "function" is an action performed by one or more computers, a system/System, or a component thereof, such as an engine. "Engines" are components of computerized devices/systems, having a structure that comprises computer readable/executable media (CRM) (e.g., encoded in PTRCRM covered elsewhere) that carry out function(s) when acted on by associated processor(s). The structure of an engine (AKA an "Engine") is usually provided primarily through computer-readable instructions (code). As such, uncontradicted terms such as "program," "code," "module," etc. can be used in place of "engine" and vice versa. The term "module" is often used here to refer to one or more engines that perform a function. For example, a Query Module (QM) can comprise input recognition engine(s), text expansion (e.g., synonym generating) engine(s), and a search engine (or components thereof or similar thereto such as an RCM, RRM, etc.). The structure/encoding of an engine will vary depend on the features of the computer/system that executes an engine, as can human readable instructions that are provided to the system/computer. Typically, an engine processes input(s) and generates output(s). In aspects, multiple components of an engine are installed and running on one or more computer(s) in a system; multiple instances of an engine are installed and running one or more computers of a system; or both. The operation of an engine typically performs function(s), which can represent step(s) in methods of the invention. Such corresponding aspects are implicitly described by any explicit description of an engine or a function (e.g., description of a system/component comprising an engine that performs function(s) implicitly discloses a method including performance of such functions as step(s) and vice versa). An engine that receives user input and provides output, i.a., to end user(s) can be called an "application." Engines/programs typically can encoded/written in any form of programming language (code), including compiled or interpreted languages, or declarative or procedural languages; and it can be deployed in any form, including as a standalone program or as a module, component, subroutine, or other unit suitable for use in a computing environment (e.g., Python, Java, C++, Ruby, C#, Go, JavaScript, R, Swift, and the like, which are known in the art). A program may, but need not, correspond to a file in a file system. A program/engine can be stored in a portion of a file that holds other programs or data, e.g., one or more scripts stored in a markup language document, in a single file dedicated to the program in question, or in multiple coordinated files, e.g., files that store one or more modules, sub programs, or portions of code. An engine can be deployed to be executed on one computer or on multiple computers that are located at one site or distributed across multiple sites and interconnected by a data communication network. Programs/engines also can be described as "instructions" or "computer-implemented instructions," "processor-implemented instructions", "computer-readable instructions," "computer implemented data engines," etc. Features/characteristics of engines are further described below. Functions can also be performed by more advanced systems/components in the context of methods/systems, such as neural network(s). Uncontradicted, any description of an engine can be performed by a neural network, other artificial intelligence (AI) component (e.g., a Random Forest machine learning element), or a non-AI/non-neural network engine (e.g., a typical program that carries out algorithm(s)). Typically, an "engine" also is recognized as a type of electronic/computerized component/device comprising physical media comprising instructions in computer readable media (CRM) executed (read and carried out) by processor(s) to perform function(s). The term "protocol" is sometimes used to refer to an engine (e.g., engines that perform multi-step operations). The term protocol also can refer to a series of steps performed by engine(s). Engines also often can use/implement algorithm(s), which also are understood as, in cases, being similar to the latter type of protocol.

The term "system" (sometimes "System") (uncontradicted meaning a "system of the invention") is a system comprising multiple interrelated computer devices/components, comprising a memory system/component (sometimes simply called "memory") comprising code encoding engines and analytical data (which may include input, output, or both), a processor system/component (sometimes simply called a "processor")) that executes such engine(s), and components for facilitating human interaction (input/output devices). Terms such as "computing unit," "computer," and the like, typically mean a device comprising physical computer-readable media and a processor that processes ("reads") information in such media. Computer readable media (CRM) can comprise informative data and also functional information (modifiable/programmable computer executable instructions (CEI)). Memory can comprise, mostly comprise, physical, transferrable, and reproducible computer-readable media (PTRCRM) containing stored instructions (engine(s)) and non-functional data (input, analytical data, in-process data, stored record data, output, etc.). Examples of memory systems are described elsewhere. Given the nature of the invention, systems described herein can be considered special purpose computing systems as such systems typically require specialized engine(s) as exemplified below. In aspects, devices that make up Systems also are further characterized by possessing certain device characteristics, such as massively parallel processing capabilities. Alternative processor components are described elsewhere. Although a system/network can comprise any suitable number/type of computer(s), systems can comprise/ have memory and processing capabilities that far exceed those of typical general-purpose laptops, mobile phones, etc., as well as comprising specialized instructions/systems for performing the particular processes described herein. Devices that can access a network with a system, or otherwise access a system, can, however, comprise laptops, mobile smart phones, etc.

Terms such as "machine learning" (ML) and "artificial intelligence" (AI) mean any suitable method/system in which one or more functions applies one or more machine learning models to information, typically resulting in computer modification of the function by the operation of the machine learning model(s). ML/AI methods can involve Administrators, either in terms of training, supervision, or both. In aspects, ML is carried out by neural networks. In other aspects, ML is carried out by other, non-neural network AI models.

Computerized devices in communication with each other over distance, and the data connections between such devices, can be said to form a "network." In aspects, some, most, or all of a system can also be considered a network. Network components typically interact/communicate a recurring basis (typically a regular or continuous basis), usually using common communication protocols over digital interconnections for the purpose of sharing data, functions, or other resources. Networks can comprise other physical components, e.g., routers, switches, and the like, described elsewhere or known in the art, or suitable virtual counterparts thereof. Some computer device components of networks are sometimes described as "clients" and "servers." E.g., in embodiments, a server transmits data, e.g., an HTML page, to a user device, e.g., for purposes of displaying data to and receiving user input from a user interacting with the device, which acts as a client. Data generated in a user device, e.g., a result of user interaction, can likewise be relayed to a server. Elements of network systems provided herein that can be alternatively described as clients and servers will be clear to readers. The presence of other network elements described herein is understood as implicitly described in aspects relating to network systems. Additional network elements can include firewalls, authentication protocols, virtual private network elements, etc.

Generally, any "method" (uncontradicted, meaning a "method of the invention") described here can be adapted to provide a corresponding system and vice versa. Thus, disclosure of any method including steps simultaneously implicitly discloses a corresponding system comprising components (e.g., engines) that can perform corresponding functions and any disclosure of a system that comprises certain engine(s) or other components (e.g., certain trained NN(s)) implicitly discloses a corresponding method that comprises the steps for performing the functions performed by such engine(s), NN(s), or other component(s).

Although aspects of embodiments may be described with reference to flow charts or block diagrams, functions, operations, decisions, and the like, any portion or combination of each block, combination of blocks, functions, etc., can be combined, separated into separate operations, or performed in other orders, as would be suitable in the context of a System or method of the invention. References to "modules," "steps," and the like here typically are made for convenience of the reader and are not intended to limit implementation of any method or system. Any portion or combination of any block, module, and the like can be implemented as computer executable (program) instructions (e.g., software), hardware (e.g., combinatorial logic, Application Specific Integrated Circuits (ASICs), Field-Programmable Gate Arrays (FPGAs), processor(s), or other hardware), firmware, etc.

Systems and methods relate to the use of data/information relating to products, producers/suppliers or purchaser/users of products, regulations impacting products, etc. Accordingly, the characteristics of such non-functional data can represent important characteristics of methods and functions of system engine(s). Terms such as "data" and "information" are used interchangeably herein and are only limited to a specific form when so indicated by explicit definition/ statement or clear context. Nonfunctional data in systems/ methods is typically stored in records (AKA "Records," "data sets," "datasets," or "Data Sets" (abbreviated "DS")). A "Record" or DS means an electronically stored, computer-readable record containing non-functional data that is received by, generated by, received by, or stored in a system and is used in the performance of function(s). Records typically comprise attribute(s) and value(s) related to one or more items (e.g., products), entities, or events. An "attribute" typically means data reflecting the identity or characteristic of a process, event, device, part, system, composition, etc. that the Record relates to/describes. A "value" typically refers to data associated with an attribute and that characterizes an attribute (e.g., an attribute might be "vehicle" and an associated value "electric car", or an attribute can be "tires" and an associated value be the number "4"). Records, attributes and values here typically include information relating to, concerning, or relevant to a Product, a Customer, or a Supplier (e.g., a Record can relate to a Regulatory Requirement relevant to Product(s) (all such terms defined elsewhere)).

Terms like "Quality," "Characteristic," or "Property" (e.g., a "Product Property" or "Product Quality") are used in aspects to refer to information concerning a facet of a Finished Good (FG), Component, Ingredient, Profile, Customer, Supplier, or Regulation. Typically, the term(s) Qualities and Characteristics are used to describe attributes and values that relate to physical or functional properties of Products, whereas Properties relate to other information (e.g., pricing information). Thus, Properties often can be considered more contextual than characteristic with respect to the item, entity, regulation, etc., to which they most relate. Elements of records/DSs alternatively are sometimes referred to as "features" or "elements." Features/elements can include any type of system-identifiable information that is relevant to Products (including to a Client/Customer, Supplier, Regulation, etc.), examples of which include pricing information, parts information, subassemblies, assembly information, use information, expected lifetime of product, replacement and repair information, country-of-origin information, social responsibility status information, regulatory status information, Supplier information, and information about the PRR itself such as date of last update, access level, etc. The term "Feature" also is used herein (and in the art) in connection with (artificial intelligence (AI)/MLM (machine learning module) methods/models, wherein a MLM learns to identify, characterize, sort, and refine Feature(s) of a data model. In many cases here, the terms overlap in scope (features in a ML model of the invention often are also features that would be recognized by non-ML engines).

In aspects, a DS can include hierarchy information that relate to other attributes/records (e.g., a DS can include (1) information about a Finished Good (a top-level attribute in the hierarchy) which includes (2) Parts/Components (2nd level attributes), in quantity(ies) ($2^{nd}$ level values) some/all of which being in turn made up of (3) Ingredients ($3^{rd}$ level attribute) present at a particular concentration Part(s) (a $3^{rd}$ level value). The term "Level" used in connection with a DS refers to a system-recognized grouping/characterization of feature(s)/element(s) in a hierarchical relationship to other grouping(s) of other features/elements in the DS. For example, information concerning Components of a Product often might be recognized as existing/operating at a "lower" (more detailed) Level than information that identifies an associated Finished Good and information concerning Ingredients of such Components might be considered a still a further lower Level than information concerning such Components. A DS containing information/Features at multiple levels may be characterized as a "Multi-Level Record" (MLR). The ability of Systems/Methods of the Invention to effectively process MLR(s) in Customer Input and to query numerous Supplier MLR(s) and apply results therefrom in the methods/Systems of the invention is a surprising aspect. A single Level of information can in aspects further comprise multiple data det features ("DSF(s)") of different types of data (e.g., a Component level can comprise multiple Component attributes (e.g., types) and related values (e.g., amounts, weights, price, etc.)). Hierarchy information can be determined by, e.g., comparison against models in the system, by rules-based analysis performed by protocols/engines, or by application of ML components, such as neural networks (e.g., neural network determination of hierarchy as described in or similar to the methods described in U.S. Pat. Nos. 10,824,808, 10,067,965, US20210312134, U.S. Pat. No. 8,725,732, US20200401877, US20210319173, US20140046877, US20060026203, US20180150753, U.S. Pat. No. 6,697,801, US20080120310, U.S. Pat. No. 6,684,221, and EP0979465.

Terms such as "documents" typically means electronic copies of hard copy documents or electronically generated documents generated outside of a system. Customer "Input" can include and typically includes "direct input" and Customer-submitted "documents" that are read (and typically interpreted) by Modules of a System. "Unstructured" records (e.g., inputs, documents, etc.) mean records in which most, generally all, substantially all, or all information contained in the records is not presented in a uniform manner (e.g., web pages on the internet are unstructured records). Customer documents, e.g., may be unstructured or structured, depending on Customer practices. Data/records identified by executing queries according to standards or operation of engines/protocols are characterized as "hits" (and excluded records/data "misses"). A "schema" means structural element(s) of a DS or data repository (DR), e.g., a pattern, format, or model applicable to a category of a DS.

Methods can include processing of data having various characteristics including unstructured data, semi-unstructured data, structured data, etc. "Structured data" typically means organized data, e.g., data mapped to pre-defined fields in a structured arrangement, e.g., data organized in columns/rows or fields/records. Structured data will typically include ≥ about 5, ≥6, or ≥ about 7 data relationships, and often include ≥~2, ≥3, or ≥~4 levels of data or types of data or data transformations or specialized data (e.g., several columns (attributes), rows (values), and tabs; tables with records, fields, primary keys, and queries; etc.). Structured data typically comprises relational data. Structured data is typically rigid/fixed given its structure. "Unstructured" data typically means data that cannot be contained in such a highly structured or organized format (e.g., row-column database), does not have an associated data model, or both. Examples of unstructured data records include web pages, text messages, images, social media content, documents, recordings, etc. "Semi-Structured" data is data having a limited amount of defining or consistent characteristics/relationships, but that does not comprise as complex a structure or conform to a structure as rigid as is expected with structured data. Semi-structured data can be characterized by simplicity of relationships, heterogeneity of data content, or both. An example of a semi-structured data record is an email, which has a limited number of structure (value/attribute) elements (sender name, recipient name, transmission date, and subject), but which typically mostly is unstructured (in the primary content of the message). Other examples can include XML, EDI, CSV, ORC, Parquet, TSV, HTML, and OEM documents/objects (noting, however, that some CSV/TSV delimited structures may be classified/classifiable as structured data). In aspects, unstructured data can be transformed to semi-structured data by application of metadata (e.g., in the case of video or image data, which may include metadata e.g., date taken, location taken, photographer, etc., but which primarily is unstructured data). Semi-structured data attributes are often not ordered consistently. In steps/methods input comprises, primarily comprises, or generally consists of semi-unstructured data (e.g., semi-unstructured inputs such as emails, JSON files, Avro files, or semi-structured document/e-document inputs such as chemical database entries, regulation database entries, customer CRM information records, BOMs, etc.). In aspects, a system is capable of recognizing ≥2, ≥3, ≥5, ≥10, ≥20, ≥30, or ≥50, or ≥100 types of semi-unstructured inputs. In aspects, methods include the use of a known data processing system that is adapted to process unstructured and semi-structured data, e.g., MongoDB or Aparavi. In aspects, methods comprise employing a system that can process unstructured, structured, and semi-unstructured data concurrently, e.g., the Aster Centerprise or Microsoft Azure data management systems. In aspects, queried data in DRs comprises both unstructured and structured/semi-structured data and queries include queries based on, i.a., DS structure (e.g., field-limited searches) and non-structure elements (e.g., keywords). In aspects, some, most, or at least generally all unstructured data received in systems, at least through customer input, is converted to semi-structured or structured data in the performance of methods. E.g., methods can comprise application of metadata to data as part of data transformation steps. Metadata generally is data about data or data that provide information about a file, record, data set, chunk, stream, packet, or other data structure. Metadata can include source information (e.g., Customer information, user information, product information, or a/any combination thereof (ACT)). Metadata also can comprise structural metadata (e.g., data types, data relationships, attributes, hierarchies, expected ranges/types/units, Levels, etc.), administrative metadata (e.g., permissions, creation date, update date, update instructions, Administrator contact information, etc.), or reference metadata (e.g., how data was obtained—e.g., through DOCI, direct CI, etc.)). An "Index" is a collection of terms/concepts, usually in a particular field/domain (e.g., a Dictionary/Thesaurus). Indexes here typically mostly comprise, consist essentially of, or consist of Product-related terms/concepts, Regulatory Requirement-related terms/concepts, or Manufacture-related terms/concepts. A "Corpus" can be construed similarly, though sometimes the term Corpus is used to refer to a collection of Indices. A Semantic Network (SN) (discussed infra) typically can be used as an alternative to a Corpus and references to SN herein implicitly support corresponding aspects comprising Indices or Corpus/Corpora and vice versa. In other aspects, artificial intelligence systems, such as neural networks are used to provide the function that can be performed by engine(s) that implement a Semantic Network or reference a Corpus.

The contents of non-functional data also are relevant to the operation of systems/steps of methods. Data about particular items, events, concepts, or entities can have specific types of attributes and features and can be used in the performance of specific methods.

A "Product" (or an "Item") is a composition, device, system, which is manufactured, isolated, sourced, or modified (e.g., improved) by an Entity. Products include finished goods (FGs) (Products that are available for sale and that may include one or more Components, one or more Ingredients, or both), Components of Finished Goods ("FGs"), and Ingredients that can be incorporated in FGs Components. Product records, datasets, data collections, and the like, also can include information about any such type of Product. "Components" (sometimes called "Parts") are manufactured components of Products. "Ingredients" mean any identifiable compound or composition that forms part of a Component/Part or Product. Uncontradicted, terms such as "Type", "Class", or "Classification" refer to art-recognized classification of Products. A Product can be associated with several Classes/Classifications (e.g., a Product can be associated with transportation devices, wheeled vehicles, bicycles, and mountain bikes). A "Profile" is a description of a planned/designed or hypothetical Product or Type inputted into a system along with or as an alternative to Customer Products. The term CSPI (customer-sought product information) has the same meaning. A "Submission" is a collection of information (e.g., DS(s)) provided by a Customer to a System in connection with performance of function(s). A "Regulation" means a law, treaty, regulation, rule, guidance, code of conduct, standard, ruling, or similar directive. A "deal" is a binding contract/agreement between Entities.

Data regarding certain persons or organizations also can characterize components of systems or steps of methods. Accordingly, the understanding of terms relating to such entities is discussed here. A "Customer" ("customer") is an Entity that obtains information from a System of the invention and typically uses such information to perform transactions, such as business or regulatory transactions. The term "Client" is used similarly herein. Readers will be able from context to separate a "client" that is a customer and a client device in a network. An "Entity" ("entity") is a person or organization having legal rights and obligations with respect to sale/purchase of products or ingredients under the laws of one or more nations. An "Independent Entity" ("IE") is an Entity other than the Customer, the Customer's Affiliates, and, in aspects, also excludes any Suppliers in a current or previous supply/value chain relationship with the Customer. An "Owner" or "System Operator" is an Entity that owns or operates a System (otherwise referred to as/AKA a "Broker"). An "Affiliate" is an Entity that is under the control of a Customer/Client with respect to the disclosure of Product-Related Information due to ownership, contractual obligation, or otherwise. A "Supplier" is an Entity that sells Items associated with Data Records accessible by a System of the invention. In most aspects, most, generally all, or all Suppliers also will be Independent Entities. An "Administrator" is an individual or team associated with an Owner. An Administrator typically provides manual input to, review of, training of, management or supervision of, or other manual assistance with respect to the performance of one or more Functions by a System. A "Stakeholder" is an Entity that receives an output from the performance of a method of the invention. Stakeholders can include Regulatory Authorities, the Customer, Customer Affiliates, or other Entities. A "Manufacturer" typically means an Entity that manufactures an FG, Ingredient, Component/Part, etc. The term Manufacturer and Supplier are typically synonymously used here. Most, generally all, or substantially all Manufacturers associated with System Product Datasets/Records typically are IEs. A "Submitter" (or "User" or "End User") is an individual that makes a submission to a system as or on behalf of a Customer/Client. A "Regulatory Authority" (RA) is an entity that promulgates, oversees, or enforces Regulations (e.g., whether a Product is in compliance with requirements to sell in a country).

As shown above, certain specifically described terms are sometimes presented with capitalization to aid the reader in recognizing that specific aspects associated with such terms are provided herein, whereas other terms associated with specific descriptions are not capitalized. Any presentation of such terms in other casing does not change the applicability of such descriptions to such terms.

The following table lists acronyms that are frequently used in TD and provides a description of the meanings/scope thereof; less frequently utilized definitions are described within the text of the disclosure:

Select Acronyms

| Acronym | Full Term | Brief Description |
| --- | --- | --- |
| AEE | Action Evaluation Module | Engine(s) that evaluate data and provides a recommendation, decision/analysis, or decides and initiates downstream action(s) based on the data. |
| AM | Authentication Module | Same meaning as UAM (see below). |
| ARM | Analysis Reporting Module | Engine(s) that delivers/reports output to User(s) or other Entities (e.g., delivering graphical data output to a user accessing the system). |
| CANPDQPP | Customer-Associated Non-PDQ Product Properties | Non-PDQ Product Properties associated with Customer Products or a CPIS (e.g., a Profile). |
| CDQ | Customer-Defined Qualities | System-recognized data regarding a Customer's business practices, policies, requirements, etc. |
| CEI | Computer-Executable Instruction(s) | Instructions (e.g., code) stored in a PTRCRM and executed by a processor/computer |

| Acronym | Full Term | Brief Description |
|---|---|---|
| CI | Customer Input | Input provided by/for a Customer. When enhanced, may be referred to as enhanced customer input ("ECI"). |
| CI DS | CI Dataset | A record containing CI (e.g., a CPIS). |
| CII | Customer Identifying Information | Information that identifies a customer, such as Entity name, address, reference numbers, etc.. |
| CIM | Confidential Information Module | An engine that identifies and selectively redacts, omits, restricts/secures, or otherwise modifies or handles confidential information. |
| CPIS | Customer Product Information Submission | A Customer's Submission of Customer Product-related data typically for Products. With respect to a new product CPIS may be called a New Product Record Information Submission (NPRIS). |
| CSP and CSPI | Customer-Sought Product (Information) | A Product or Type sought by a Customer in querying a system of the invention (typically synonymous with a Profile). |
| DCM | Data Cleaning Module | An engine that performs data cleaning function(s). A DCM can be part of DIOM, DFAM, or other functional module/module (FM) (implicitly/explicitly). |
| DFAM | Data Formatting and Amendment Module | An engine that analyzes CI (usually cleaned CI (CCI)); identifies and tags, categorizes, or otherwise modifies data set features (DSF(s)). A DFAM can be an aspect of a DIOM or can be applied post input (e.g., on an ECPIS). |
| DSF | Dataset Feature(s) | Recognizable features of a dataset such as, e.g., presence of an image, types of numerical data, types of string data, etc. Attributes and values for classes of data are typical DSFs. |
| DIOM | Data Integrity and Optimization Module | An engine that detectably modifies data from input(s), record(s), or both, to improve the form or content of such data with respect to other system functions. |
| DOCI or DOCII | Document Input or DOCI Information | Information at least initially submitted via/contained in documents (e.g., documents submitted as part of a Submission/CI). |
| DII | Direct Input Information | Information inputted directly to a system in digital form (e.g., as opposed to data in DOCI). |
| DR | Data Repository | A component of memory containing nonfunctional data, such as a database (DB), data lake, data warehouse, and the like. |
| DS | Dataset (data set), data structure, or Record | A collection of data/ information including elements/features (e.g., attributes and values) about items (e.g., Products), entities (e.g., Customers), Regulations, etc., stored in and used by a system. |
| DSAM | Dataset Amendment Module | An engine that, i.a., amends/modifies DSs (comprises one or more "write" function(s)), |
| DSF | A DS Feature | A feature of a DS; any system-identifiable attribute, value, or other feature in/of a DS. |
| ECM | Electronic Contracting Module | An engine for presenting, negotiating, and optionally entering legally binding agreement(s) between Entities (e.g., Owner and Customers). |
| ECPIS | Enriched or Enhanced CPIS | CPIS enriched/enhanced by system components. New records that are enriched can be called an enriched NPRIS ("ENPRIS"). |
| ECIDS | Enriched customer information data set | A system enriched dataset which can comprise system enriched CPIS. |
| EMM | Event Monitoring Module | An engine that performs regular/conditional checks for event(s) relating to system DSs that in aspects cause the system to perform function(s) such as Record updates, queries, etc. |
| FG | Finished Good | A Product that is deemed to be in ready form for final end consumer use/ consumption. Typically, FGs are Products comprising multiple Ingredients, Components, or both. |
| FM | Functional Module | An engine that performs function(s) (e.g., a QM, RCM, LM, CIM, MLM, AM, ECM, or RASM). |
| IE | Independent Entity | A person or organization that is not an Affiliate of a Customer. |
| IECI | Independent Entity Confidential Information | Confidential information about an IE or that is confidentially held/controlled by an IE. |
| IESPIDR | IE Supplied Product Information DR | A system DR comprising PRRs associated with Products sold by IEs. Records of an IESPIDR can be referred to as IESPIDR records (IESPIDRRs). A type of PIDC (defined below). |
| TM and IRM | Input Module Input Recognition Module | and An IM is an engine that receives Customer Input (CI). AN IRM is an engine that recognizes CI (e.g., by OCR, text recognition through NLP, etc.). An IRM can be an implicit part of an IM. An IRM can also comprise, e.g., image recognition or text/image translation functions. |
| IR, IRF | Image Recognition, Image recognition function (IRF) | Refers to function(s) of recognizing image-based information in DOCI (e.g., such images as chemical formulas, product designs, symbols, codes, etc.); a specific type of input recognition or |

-continued

| Acronym | Full Term | Brief Description |
|---|---|---|
| LM or TM or LM/TM or LTM | Linking Module or Tagging Module | engine(s) that carry out such function(s). An engine that adds/associates one or more computer-readable links, tags, or other metadata to/with DSs. |
| LTM | Language Translation Module | An engine that translates types of natural language to other natural language(s). |
| MAD | Minimum Actionable Dataset | A DS that a system or Administrator determines is sufficient to use in performing further function(s). |
| MDSI | Mandatory DSF Inputs | DSF inputs required by an IM, such as, e.g., PDQs such as Product (article) name, Product identifier(s), CII requirements, Ingredients, amounts/quantities, etc. |
| ML/AI | Machine learning/Artificial intelligence | Terms known in the art and exemplified herein. |
| MLIF | ML-implemented functions | Functions implemented due to machine learning or by ML module(s) (e.g., neural network(s)). |
| MLF | A ML Feature | An AI/ML-identified Feature in data |
| MLM | Multi-level record | Record containing info/Features at multiple levels. |
| MLM | Machine Learning Module | An engine that applies ML processes/instructions or analysis to System Function(s). |
| MRCDS | Matched Record Collection DS | A DS that is identified t through a query of a targe DR (e.g., an IESPIDR) or generated based on matching DSs identified through queries. |
| NLP | Natural Language Processor (Processing) | A known term, which typically means a function/method that interprets or otherwise acts on natural language data rather than, e.g., data adapted for directing computer functions (e.g., a programming language such as Python or Java). |
| NN | Neural Network | A term known in the art. |
| NPDQPP | Non-PDQ Product Property | Data associated with a Product or product profile (Profile)/Type. When associated with a customer, can be referred to as a customer associated non-PDQ product property (CANPDQPP). |
| NPRIS | New Product-record information submission | Submission of new Product-related data/information. A type of Customer Product Information Submission/Customer Product-related inputs (CPIS). |
| NPSD or CPSD | New Product Submission DS | A DS/CPIS comprising identified PIERs. Also called Customer PSD (or CPSD); The term UNPSD refers to an updated NPSD. |
| NTCRM | Non-Transitory Computer Readable Medium | Computer-readable media that is mostly, generally, or entirely not transient in nature ("transient" meaning so short termed as to not be reusable, transferrable, or both). Examples of NTCRM include register memory, processor cache, and non-power-dependent memory media such as ROM, hard drive(s), etc. |
| PAS, PAD, PADD, and PASI | Publicly Accessible (PA) Source, PA data, PA-derived data, and PA source information, respectively, | Information accessible from publicly accessible sources ("PASs"), including both unstructured publicly accessible information (e.g., internet information at large) and enriched publicly accessible data ("EPAD") including, in aspects, information in proprietary sites/DRs. |
| PAIQM | Publicly Accessible Information Query Module | Engine(s) similar to a QM that query/queries publicly accessible information (PASI(s)/PAD), such as a search engine. |
| PDQ (PDC) | Product Defining Quality (or Characteristic) | Data corresponding to one or more physical qualities/characteristics of a product or product profile. |
| PIDC | Product information data collection | A collection of data comprising product-related information (e.g., PRRs) or manufacturer/supply-related information associated with product(s), and typically comprising related semantic term vectors and lexical term vectors. |
| PIER | Product Information Element Record | A system-recognized data element in a DS/Record (e.g., a product-related attribute, value, etc.). |
| PMI | Product Market Information | Information concerning the markets in which a Supplier sells Product (an example of a NPDQPP). |
| POC | Point(s) of Concern | Regulatory/RA Requirements, e.g., requirements associated with Ingredients, amounts, or Ingredients and amounts. |
| PPs | Product Properties | Information that defines the physical or functional properties of a product (sizes, weights, amounts, hardness, viscosity, shelf-life, intended use) |
| PQ | Product Qualities | Information that defines qualities of a product other than Product Properties. E.g., site of manufacture, quality conditions, warranty information, adherence to standards, price, etc. |
| PRRs | Product-Related Records | Records in systems comprising related data elements containing system-recognized information about Products. The related acronym "SPRRs" means Supplier Product Related Records. |
| PRRNPDQPP | PRR Non-PDQ Product Property | A term that exemplifies the possible combination of other acronyms (an NDPQQ stored in a PRR). |

-continued

| Acronym | Full Term | Brief Description |
|---|---|---|
| PTRCRM | Physical, Transferrable, and Reproducible Computer Readable Medium | Computer-readable media that is physical, transferrable, and reproducible. Includes transferable and reproducible signals with physical effects and NTCRM, e.g., flash memory and RAM. Excludes non-physical and non-reproducible/transferable signals. |
| QM | Query Module | Engine(s) that, i.a., perform search(es) of DR(s) for matches based on criteria (e.g., using a search engine). A QM can include or associatively operate with, i.a., a Synonym-Generating Module ("SGM"), a Record Comparison Module ("RCM"), a Record Ranking Module ("RRM"), etc. |
| QRD or QRDS | Query-Ready Dataset | DS/element(s) determined by a system to be ready for query function(s). |
| RA | Regulatory authority | A governmental body or other entity evaluating/overseeing compliance with Regulations. |
| RASM | Regulatory Authority Submission Module | An engine that executes functions relating to RA submission(s) (e.g., a Regulatory Authority Submission Preparation Module (RASPM), which prepares an RA submission based on Customer Input and IESPIDR data). |
| REM | Record Enrichment Module | Engine(s) that add data to DS(s) based on execution of preprogrammed instructions or operation of other system components, such as neural networks. |
| RIDR | Regulatory Information Data Repository | A data repository comprising Regulation-related information, such as Regulatory requirements applicable to Products, Types, or Entities. |
| RR or PRRR | Regulatory Requirement or Product-Related RR | Synonymous with Regulation (i.e., rules in a system of Regulation(s) applicable to Products). |
| RSI | Regulatory Status Information | Information about the regulatory status of a Product (e.g., approved uses or compliance with required submissions). |
| SCPIR (SCPIDS) | Stored Customer Product Information Record (or Dataset) | A DR stored in a system containing, i.a., Customer Product(s)/Profile(s), subject to later evaluation. SCPIDs for new submissions are called SNPSDs (Stored New Product Submission Datasets). |
| SDQs | Supplier Defining Qualities | Qualities that uniquely identify a Supplier, e.g., registration number(s), tag(s), and names(s). |
| SDR | Supplier Data Repository | A DR containing Records with information concerning Suppliers, Products, or both. |

-continued

| Acronym | Full Term | Brief Description |
|---|---|---|
| SI | Secret Information | Confidential information, e.g., of a Supplier, typically requiring authorization to access. |
| SLI | Supplier Location Information | Information concerning the location of a Suppler or its activities, e.g., country of origin of a Product. |
| SN | Semantic Network | A known term typically referring to data structures/models used to relate natural language terms, used/run by engine(s) to facilitate functions (e.g., identifying related terms for queries). |
| SPIDR | Supplier Product Information Data Repository | Data repository comprising CPIS/DSs and PRRs, typically comprising numerous Supplier Product Related Records (SPRRs). |
| SRI (AKA CSRI or CSR) | Social Responsibility Information (Corporate Responsibility Information) | Data regarding societal responsibility activities or qualities associated with Products, Customers, Suppliers, etc. (e.g., supplier social responsibility information, "SSRI") (e.g., whether a Product contains conflict minerals, e.g., coltan, tin, etc.). |
| TIDI and NTIDI | Textual Information (TI) Document Input and Non-TI Document Input, respectively | Text data in DOCI (TIDIs) and non-textual information in DOCI (NTIDIs), respectively (e.g., chemical formulas, hazard symbols, designs, schematics, and other recognizable and informative non-text informative characters or images). |
| UAM | User Authorization Module | Engine(s) that evaluate User authorization to access/use a system or a system component (e.g., an ECM). AKA, an "AM" (authorization module). |

In some cases, these acronyms are repeated one or more times in the following portions of the disclosure to aid in readability. Other acronyms are defined elsewhere. As exemplified above, in some cases acronyms are combined to form larger acronyms.

SUMMARY OF THE INVENTION

In aspects, the invention provides a method carried out by a computer system, wherein the computer system comprises a process component and a memory component. In aspects, the memory component of the computer system used in the method comprises a product information data collection ("PIDC"). In aspects, the PIDC comprises stored product-related records/datasets (PRRs) or other product-relevant DSs (e.g., product manufacturer-related DS s), each stored product-related dataset comprising PIDC alphanumeric records contained in or derived from PIDC source data, a collection of PIDC semantic term vectors, and a collection of PIDC lexical term vectors. In aspects, each PIDC alphanumeric record relates to a manufactured product, a manufacturer of a manufactured product, or both. In aspects, each PIDC semantic term vector is generated from and corresponds to an electronic token. In aspects, each electronic semantic term token comprises one or more system-identified semantic terms identified as corresponding to one or more product attributes, manufacturer attributes, or both, contained in the PIDC source data. In aspects, each electronic semantic term token is generated by a semantic token generation protocol. In aspects, each PIDC lexical term vector is generated from and corresponds to an electronic token. In aspects, each electronic PIDC lexical term token comprises a collection of PIDC lexical N-grams (or "ngrams"). In aspects, each PIDC lexical N-gram corresponds to one or more PIDC term fragment N-grams, a collection of PIDC assembled character N-grams, or a combination of one or more PIDC term fragment N-grams and one or more PIDC assembled character N-grams. In aspects, each one or more PIDC term fragment N-grams comprises a string contained in a PIDC lexical term, wherein a PIDC lexical term is a system identified term contained in the PIDC source data not associated with a system-recognized attribute. In aspects, each PIDC assembled character N-gram comprises combinations of one or more spatially related extraneous alphanumeric characters not associated with any system-identified term, combinations of extraneous alphanumeric characters and characters in term fragment N-grams, or both. In aspects, each system-identified term and extraneous character used to generate PIDC lexical tokens and each PIDC semantic term used to generate electronic semantic term tokens conforms with system data harmonization standards prior to tokenization. In aspects, system data harmonization standards comprise standards for consistent treatment of symbols, punctuation, case, and spacing of digits in data.

According to certain embodiments, the invention provides a method carried out by a computer system comprising providing a computer system comprising a processor component (sometimes referred to herein simply as a processor) and a memory component. In aspects, the memory component comprises a product information data collection ("PIDC"). In aspects, the PIDC comprises PIDC product-related datasets (stored product-related datasets). In aspects, each PIDC product-related dataset comprises PIDC alphanumeric records contained in or derived from PIDC source data, and one or more PIDC lexical term vectors. In aspects, each PIDC dataset relates to a manufactured product, a manufacturer of a manufactured product, or both. In aspects, a PIDC lexical term vector corresponds to an electronic PIDC lexical term token also contained in or associated with the PIDC dataset. In aspects, each electronic PIDC lexical term token comprises a collection of PIDC lexical N-grams. In aspects, each PIDC lexical N-gram has the same N-gram size and represents a fragment of (string within) a PIDC lexical term. In aspects, a PIDC lexical term token corresponding to a PIDC lexical term that is longer than the N-gram size comprises a series of overlapping lexical N-grams. In aspects, the first overlapping lexical N-gram comprises the first alphanumeric character of the PIDC lexical term and all adjacent alphanumeric characters up to the N-gram size. In aspects, each other overlapping lexical N-gram corresponds to the lexical term beginning at the next successive character in a direction from the first alphanumeric character in the PIDC lexical term and containing at least one additional alphanumeric character in the PIDC lexical term. In aspects, each PIDC lexical term used to generate PIDC lexical tokens conforms with system data harmonization standards prior to tokenization. In aspects, such system data harmonization standards comprise standards for consistent treatment of symbols, punctuation, case, and spacing of digits in data.

In aspects, the invention provides a method carried out by a computer system comprising providing a computer system comprising a processor and a memory component. In aspects, the memory component comprises a product information data collection ("PIDC") comprising PIDC product-related datasets (stored product-related datasets). In aspects, each PIDC product-related dataset comprises PIDC alphanumeric records contained in or derived from PIDC source data, and one or more PIDC lexical term vectors. In aspects, each PIDC dataset relates to a manufactured product, a manufacturer of a manufactured product, or both. In aspects, a lexical term vector corresponds to an electronic PIDC lexical term token also contained in or associated with the PIDC dataset. In aspects, each electronic PIDC lexical term token comprises one or more PIDC lexical N-grams. In aspects, each PIDC lexical N-gram has the same N-gram size. In aspects, one or more PIDC lexical N-grams in PIDC lexical N-gram tokens comprise one or more PIDC assembled lexical N-grams. In aspects, a PIDC assembled lexical N-gram comprises a number of concatenated and spatially-related extraneous alphanumeric characters occurring in a PIDC dataset that meet or exceed the N-gram size; a collection of two or more extraneous and spatially-related alphanumeric characters that are less than the N-gram size in combination with one or more space filling characters; a combination of one or more extraneous alphanumeric characters and one or more characters contained in a spatially related lexical term; or, e.g., a combination of any or all of thereof. In aspects, each PIDC lexical term used to generate PIDC lexical tokens conforms with system data harmonization standards prior to tokenization. In aspects, the system data harmonization standards comprise standards for consistent treatment of symbols, punctuation, case, and spacing of digits in data.

According to certain embodiments, the invention provides a method carried out by a computer system, such a computer system having the characteristics described in the above summary paragraphs, wherein the method comprises, upon the computer system receiving an evaluation submission from an end user (e.g., a CI DS such as a CPIS), first, automatically, by operation of the processor, (a) determining if any part of the evaluation submission can include unharmonized data; (b) applying a term identification protocol to the data harmonized dataset to generate a term-identified evaluation dataset; and (c) characterizing (transforming) system-identified terms (AKA, elements/features or element records) in a term-identified evaluation submission dataset as (into) evaluation submission lexical terms or evaluation submission semantic terms. In aspects, the method then further comprises, second, automatically, by operation of the processor, evaluating one or more system-identified terms by application of a preprogrammed element priority assessment protocol. In aspect, the method then further comprises, third, automatically, by operation of the processor, performing one or more queries of PIDC datasets. In aspects, the method then further comprises, fourth, automatically, by automatic operation of the processor, comparing recognized terms, alphanumeric characters, records, or a combination thereof, contained in a PIDC dataset associated with a search element similar term identified by the query of step (3) to corresponding system-identified terms, extraneous alphanumeric characters, records, or a combination thereof in the evaluation submission. In aspects, unharmonized data in the method is data comprising data that does not comply with the system data harmonization standards. In aspects, a data harmonization protocol is applied to any such data to generate a data harmonized dataset containing data that is consistent with data in the PIDC with respect to the data harmonization standards in terms of treatment of symbols, punctuation, case, and spacing of digits. In aspects, the term identification protocol identifies system-identified terms. In aspects, each system-identified term comprises a collection of linked alphanumeric characters of a minimum size set off by term boundaries identified by reference to preprogrammed term boundary standards. In aspects, the term identification protocol further identifies any present extraneous alphanumeric characters that are not part of any system-identified term. In aspects, the characterization of system-identified terms as lexical terms or semantic terms is performed by applying an attribute identification protocol. In aspects, the protocol comprises comparing uncharacterized system-identified terms against one or more specialized preprogrammed attribute indexes. In aspects, each specialized preprogrammed attribute index comprises a plurality of curated manufactured product-related terms, product-manufacturer-related terms, or both, to characterize previously uncharacterized system-identified terms that correspond to system-recognized attributes as evaluation submission semantic terms and to otherwise characterize system-identified terms that do not correspond to system-recognized attributes as evaluation submission lexical terms. In aspects, such a process thereby generates a term-identified evaluation submission dataset. In aspects, the element priority assessment protocol associates each evaluated system-identified term with a priority score. In aspects, the performance of one or more queries of PIDC datasets comprises a first query of the PIDC dataset performed using a search element comprising or derived from a system-identified term associated with a priority score. In aspect, the priority score is (a) higher than a preprogrammed priority score threshold or (b) has the highest priority score calculated. In aspect, the method further comprises identifying PIDC datasets comprising one or more search element similar terms identified by the processor as having sufficient similarity as the search element according to one or more preprogrammed element similarity assessment standards. In aspects, the comparison of recognized terms, etc. (contained in a PIDC dataset) to corresponding system-identified terms, etc. (a) yields an assessment of whether there is an error or omission in the one or more evaluation submission terms or records; (b) identifies a relationship or potential relationship between the evaluation submission and one or more PIDC datasets identified in the query of step (3), identifies one or more product-related or manufacturer-related terms that are related to the system identified term in or used to generate the search element, or (d) accomplishes any combination of steps (a)-(c).

In aspects, the invention provides a method carried out by a computer system, such a computer system having the characteristics described in the above summary paragraphs, wherein the method comprises, upon the computer system receiving an evaluation submission from an end user, automatically, by operation of the processor, determining if any part of the evaluation submission can include unharmonized data, unharmonized data being data comprising data that does not comply with the system data harmonization standards. In aspects, a data harmonization protocol is applied to any such data. In aspects a data harmonized dataset is generated therefrom, containing data that is consistent with data in the PIDC in respect of the data harmonization standards (e.g., in terms of treatment of symbols, punctuation, case, and spacing of digits). In aspects, the method further comprises applying a term identification protocol to the data harmonized dataset to generate a term-identified evaluation dataset. In aspects, the term identification protocol identifies system-identified terms. In aspects, each system-identified term comprises a collection of linked alphanumeric characters of a minimum size set off by term boundaries identified by reference to preprogrammed term boundary standards. In aspects, the term identification protocol further identifies any present extraneous alphanumeric characters that are not part of any system-identified term. In aspects, the method further comprises characterizing system-identified terms in a term-identified evaluation submission dataset as evaluation submission lexical terms or evaluation submission semantic terms. In aspects, this characterization is accomplished by applying an attribute identification protocol. In aspects, the attribute identification protocol comprises comparing uncharacterized system-identified terms against one or more specialized preprogrammed attribute indexes, each specialized preprogrammed attribute index comprising a plurality of curated manufactured product-related terms, product-manufacturer-related terms, or both. In aspects, this results in the characterization of previously uncharacterized system-identified terms that correspond to system-recognized attributes as evaluation submission semantic terms and otherwise characterizes system-identified terms that do not correspond to system-recognized attributes as evaluation submission lexical terms. In aspects, such aspects of such a method result generating a term-identified evaluation submission dataset. In aspects, the method further comprises, e.g., by automatic operation of the processor, recognizing if there is an association or expected association between an evaluation submission semantic term and another system-identified term or extraneous alphanumeric character. In aspects, this step identifies one or more evaluation submission element sets in the evaluation submission. In aspects, the method further comprises, e.g., by automatic operation of the processor, performing one or more queries of PIDC datasets, wherein the first query of the PIDC dataset is performed using a search element comprising or derived from one or more evaluation submission element sets. In aspects, such step(s) result in the identification of PIDC datasets associated with a similar element set or search element. In aspects, the method further comprises, e.g., by automatic operation of the processor, comparing recognized terms, alphanumeric characters, records, or a combination thereof, contained in a PIDC dataset associated with a combination of elements identified by the query of step (3) to corresponding system-identified terms, extraneous alphanumeric characters, records, or a combination thereof in the evaluation submission. In aspects, such a step is performed to (a) assess whether there is an error or omission in the one or more evaluation submission terms or records, (b) identify a relationship or potential relationship between evaluation submission and one or more PIDC datasets identified in the query of step (3), (c) identify one or more product-related or manufacturer-related terms that are related to the system identified term in or used to generate the search element, or (d) perform any combination of steps (a)-(c).

In aspects, the invention provides a method carried out by a computer system, such a computer system having the characteristics described in the above summary paragraphs, wherein the method comprises, upon the computer system receiving an evaluation submission from an end user, automatically by operation of the processor, determining if any part of the evaluation submission can include unharmonized data. In aspects, unharmonized data is data comprising data that does not comply with system data harmonization standards. In aspects, a data harmonization protocol is applied to any such data to generate a data harmonized dataset containing data that is consistent with data in the PIDC (e.g., with respect to the data harmonization standards in terms of treatment of symbols, punctuation, case, and spacing of digits.) In aspects, the method further comprises applying a term identification protocol to the data harmonized dataset to generate a term-identified evaluation dataset. In aspects, the term identification protocol identifies system-identified terms, each system-identified term comprising a collection of linked alphanumeric characters of a minimum size set off by term boundaries identified by reference to preprogrammed term boundary standards. In aspects, the term identification protocol identifies any present extraneous alphanumeric characters that are not part of any system-identified term. In aspects, the method further comprises characterizing system-identified terms in a term-identified evaluation submission dataset as evaluation submission lexical terms or evaluation submission semantic terms. In aspects, this is accomplished by applying an attribute identification protocol. In aspects, the attribute identification protocol comprises comparing uncharacterized system-identified terms against one or more specialized preprogrammed attribute indexes. In aspects, each specialized preprogrammed attribute index comprises a plurality of curated manufactured product-related terms, product-manufacturer-related terms, or both. In aspects, this results in the characterization of previously uncharacterized system-identified terms that correspond to system-recognized attributes as evaluation submission semantic terms and otherwise characterizes system-identified terms that do not correspond to system-recognized attributes as evaluation submission lexical terms. Accordingly, in aspects, such method steps result in the generation of a term-identified evaluation submission dataset. In aspects, the method further comprises e.g., by automatic operation of the processor, selecting one or more search elements in or derived from the evaluation submission and performing one or more queries of a PIDC to identify one or more PIDC datasets comprising dataset elements that the processor determines are sufficiently similar to the one or more search elements to be identified as related PIDC datasets. In aspects, the method further comprises, e.g., by automatic operation of the processor, generating a modified evaluation dataset from the evaluation dataset by (a) generating one or more putative hierarchical element relationships by generating a combination of an evaluation submission semantic term and one or more other system-identified terms, one or more extraneous alphanumeric characters, or both, which are spatially related or otherwise associated with the evaluation submission semantic term; (b) comparing the putative element set against one or more system dataset schemas contained in the memory component to determine if the similarity of the putative and the one hierarchical element relationship and or more system dataset schemas meets or exceeds a preprogrammed similarity threshold; and (c) identifying a putative hierarchical element relationships that meet or exceed the preprogrammed similar threshold as an evaluation submission hierarchical element relationship. In aspects, the method further comprises, e.g., by automatic operation of the processor, performing one or more queries of PIDC datasets, wherein the first query of the PIDC dataset is performed using a search element comprising or derived from one or more evaluation submission element sets to identify PIDC datasets associated with a similar element set or search element. In aspects, the method further comprises, e.g., by automatic operation of the processor, comparing one or more system recognized PIDC hierarchical relationships between elements of a related PIDC dataset to an evaluation submission hierarchical element relationship to determine if the PIDC hierarchical element relationship and the evaluation submission hierarchical element relationship meet or exceed a similar threshold. In aspects, this results in the identification of one or more similar hierarchy PIDC datasets. In aspects, the method further comprises, e.g., by automatic operation of the processor, comparing records of any similar hierarchy PIDC datasets to the elements of the evaluation submission to (a) assess whether there is an error or omission in the one or more evaluation submission terms or records, (b) identify a relationship or potential relationship between evaluation submission and one or more similar hierarchy PIDC datasets, (c) identify one or more product-related or manufacturer-related terms that are related to a system identified term associated with an evaluation submission hierarchical relationship, or (d) perform any combination of steps (a)-(c).

In aspects, the invention provides a method carried out by a computer system, wherein the method comprises, providing a computer system. In aspects, the computer system comprises a processor and a memory component. In aspects, the memory component comprises a product information data collection ("PIDC"). In aspects, the PIDC comprises stored product-related datasets. In aspects, each stored product-related dataset comprises PIDC alphanumeric records contained in or derived from PIDC source data. In aspects, each PIDC alphanumeric record relates to a manufactured product, a manufacturer of a manufactured product, or both. In aspects, such a record further comprises product status/risk information, manufacturer status/risk information, or both. In aspects, each stored product-related dataset further comprises a collection of PIDC semantic term vectors. In aspects, a PIDC semantic term vector comprises vectors having been generated from and corresponding to an electronic semantic term token. In aspects, each electronic semantic term token comprises one or more system-identified semantic terms identified as corresponding to one or more product attributes, manufacturer attributes, product status/risk information, manufacture status/risk information, or a combination thereof, contained in the PIDC source data. In aspects, each electronic semantic term token is generated by a semantic token generation protocol. In aspects, the method further comprises, e.g., automatically, by operation of the processor, upon the computer system receiving an evaluation submission from an end user determining if any part of the evaluation submission can include unharmonized data, unharmonized data being data comprising data that does not comply with the system data harmonization standards. In aspects, a data harmonization protocol is applied to any such data to generate a data harmonized dataset containing data that is consistent with data in the PIDC (e.g., with respect to the data harmonization standards, such as in terms of treatment of symbols, punctuation, case, and spacing of digits.) In aspects, upon the computer system receiving an evaluation submission from an end user, the method further comprises applying a term identification protocol to the data harmonized dataset to generate a term-identified evaluation dataset. In aspects, the term identification protocol identifies system-identified terms. In aspects, each system-identified term comprises a collection of linked alphanumeric characters of a minimum size set off by term boundaries identified by reference to preprogrammed term boundary standards. In aspects, the term identification protocol further identifies any present extraneous alphanumeric characters that are not part of any system-identified term. In aspects, upon the computer system receiving an evaluation submission from an end user, the method further comprises characterizing system-identified terms in a term-identified evaluation submission dataset as evaluation submission lexical terms or evaluation submission semantic terms. In aspects, this is accomplished by applying an attribute identification protocol that comprises comparing uncharacterized system-identified terms against one or more specialized preprogrammed attribute indexes. In aspects, each specialized preprogrammed attribute index comprises a plurality of curated manufactured product-related terms, product-manufacturer-related terms, or both, to characterize previously uncharacterized system-identified terms corresponding to system-recognized attributes as evaluation submission semantic terms and to otherwise characterize system-identified terms that do not correspond to system-recognized attributes as evaluation submission lexical terms. In aspects, the result of such steps is the generation of a term-identified evaluation submission dataset. In aspects, the method further comprises, e.g., by automatic operation of the processor, performing a query of PIDC semantic vectors comprising. In aspects, the query comprises selecting an evaluation submission semantic vector and measuring the cosine distance between the evaluation submission semantic vector and each PIDC semantic vector. In aspects, the query further comprises identifying any PIDC semantic vectors having a cosine distance that meets or exceeds a preprogrammed semantic vector similarity threshold as similar semantic vectors. In aspects, the query comprises repeating the aforementioned two steps with a plurality of evaluation submission semantic vectors to generate a collection of similar semantic vectors. In aspects, the method further comprises, e.g., by automatic operation of the processor, evaluating any records, terms, or other elements contained in one or more PIDC datasets identified previously, and, e.g., that the computer system identifies as being associated with product risk/status information, manufacturer risk/status information, or both, to assess whether the risk associated with the product reflected in the evaluation submission meets a preprogrammed risk threshold. In aspects, the query comprises assessing whether the submission meets or exceeds the risk threshold and, further, reporting the risk to the end user or automatically performing action(s) to reduce or eliminate identified risk.

This summary is not intended to be all-inclusive, and the scope of the invention is not limited to or by the aspects, features, elements, or embodiments provided in this Summary, which is included for illustrative purposes only and not restriction. Readers will understand that any of the aspects described under this section can be combined with any other aspect described in this section or with any other aspect of this disclosure.

BRIEF DESCRIPTION OF THE DRAWINGS/FIGURES

FIG. 4 depicts an exemplary document input (a scanned BOM) with highlighted system-recognizable data elements/features.

FIG. 6 is a table that exemplifies aspects for processing of different types of customer input (CI), generation of an initial CI DS, synonym generation, and SPRR matching.

Figure 9:
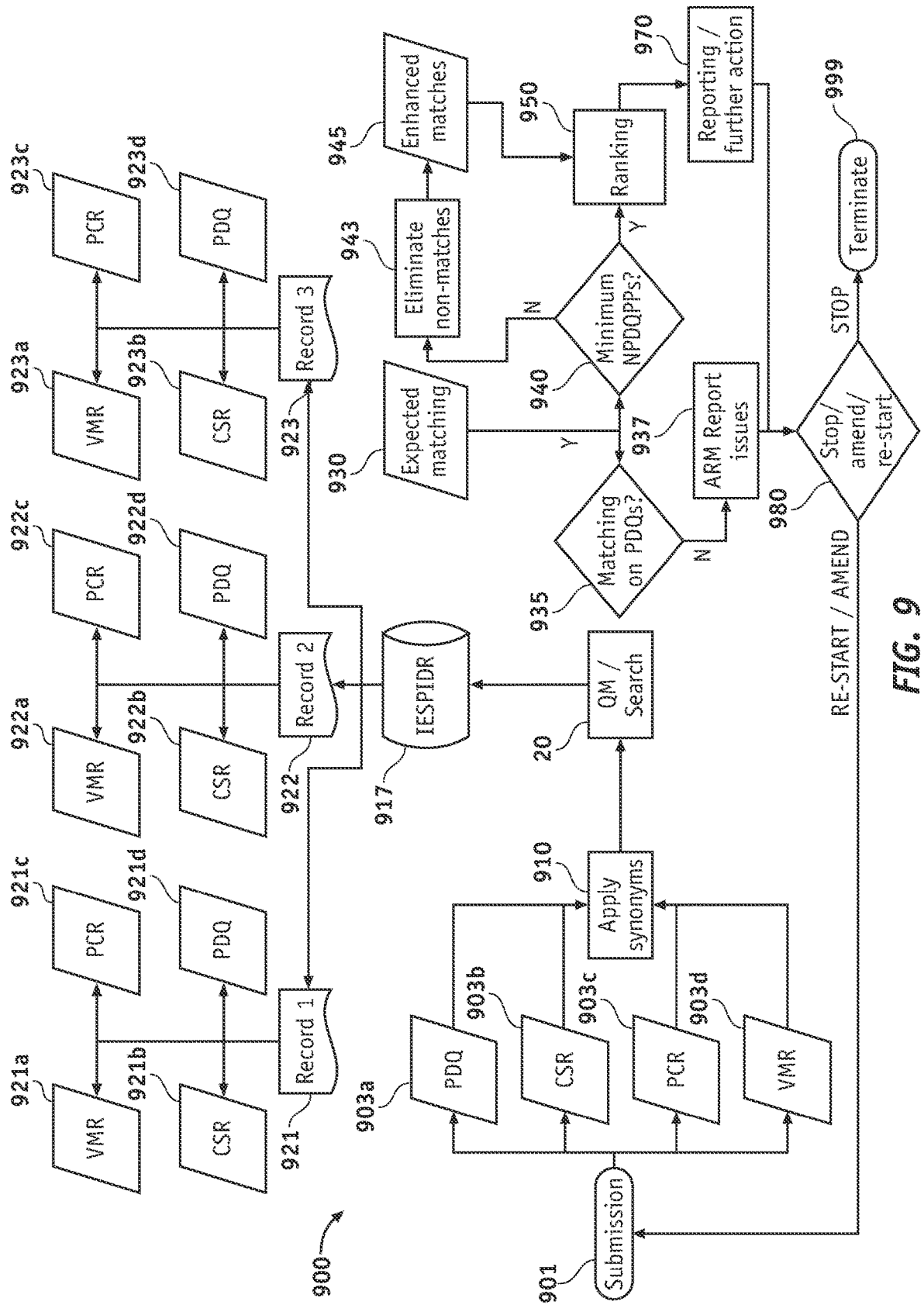

FIG. 9 exemplifies an exemplary process of querying an IESPIDR based on CI.

Figure 10:
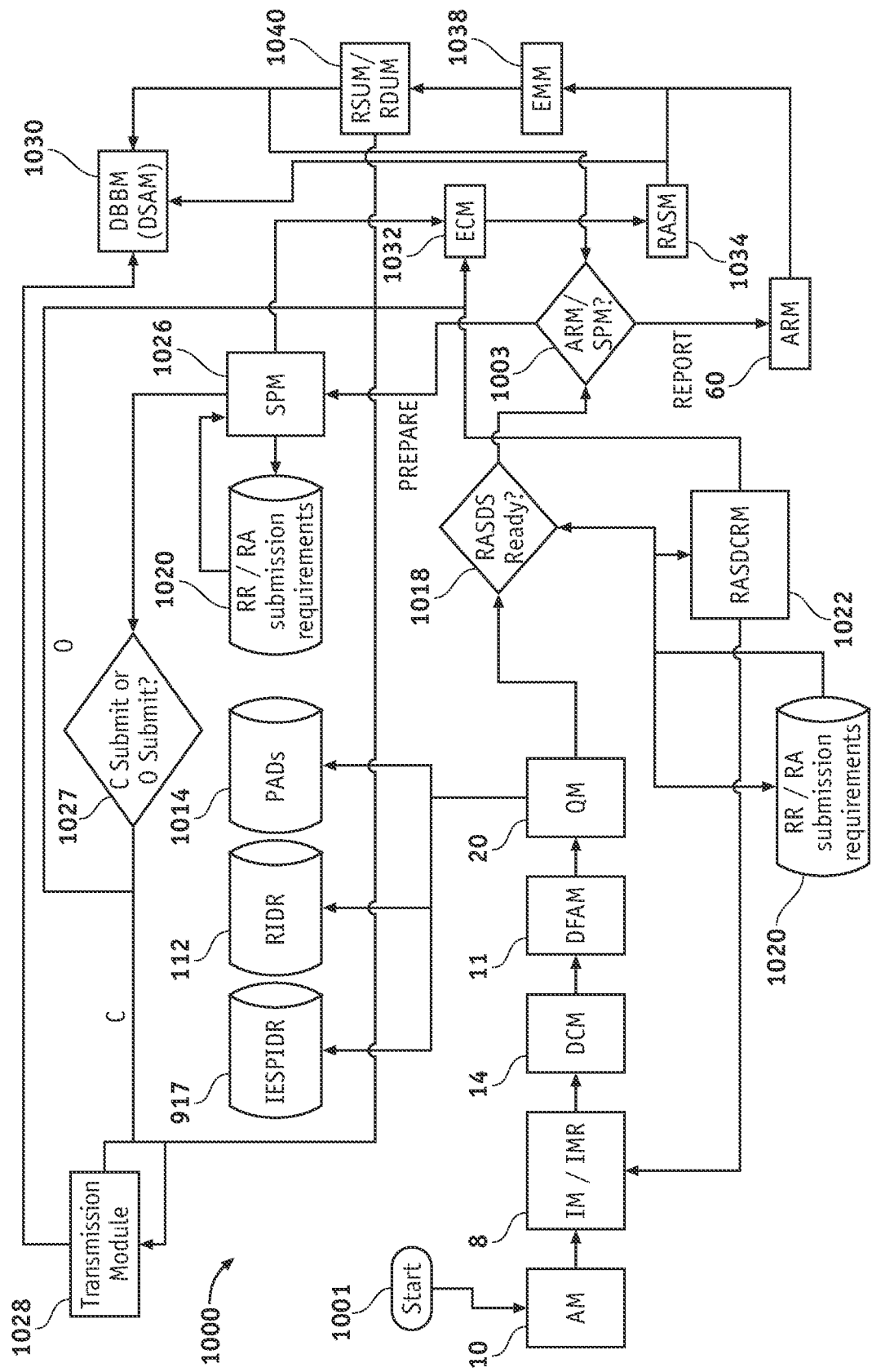

FIG. 10 is a flow chart of exemplary method steps leading to an RA submission.

Figure 11:
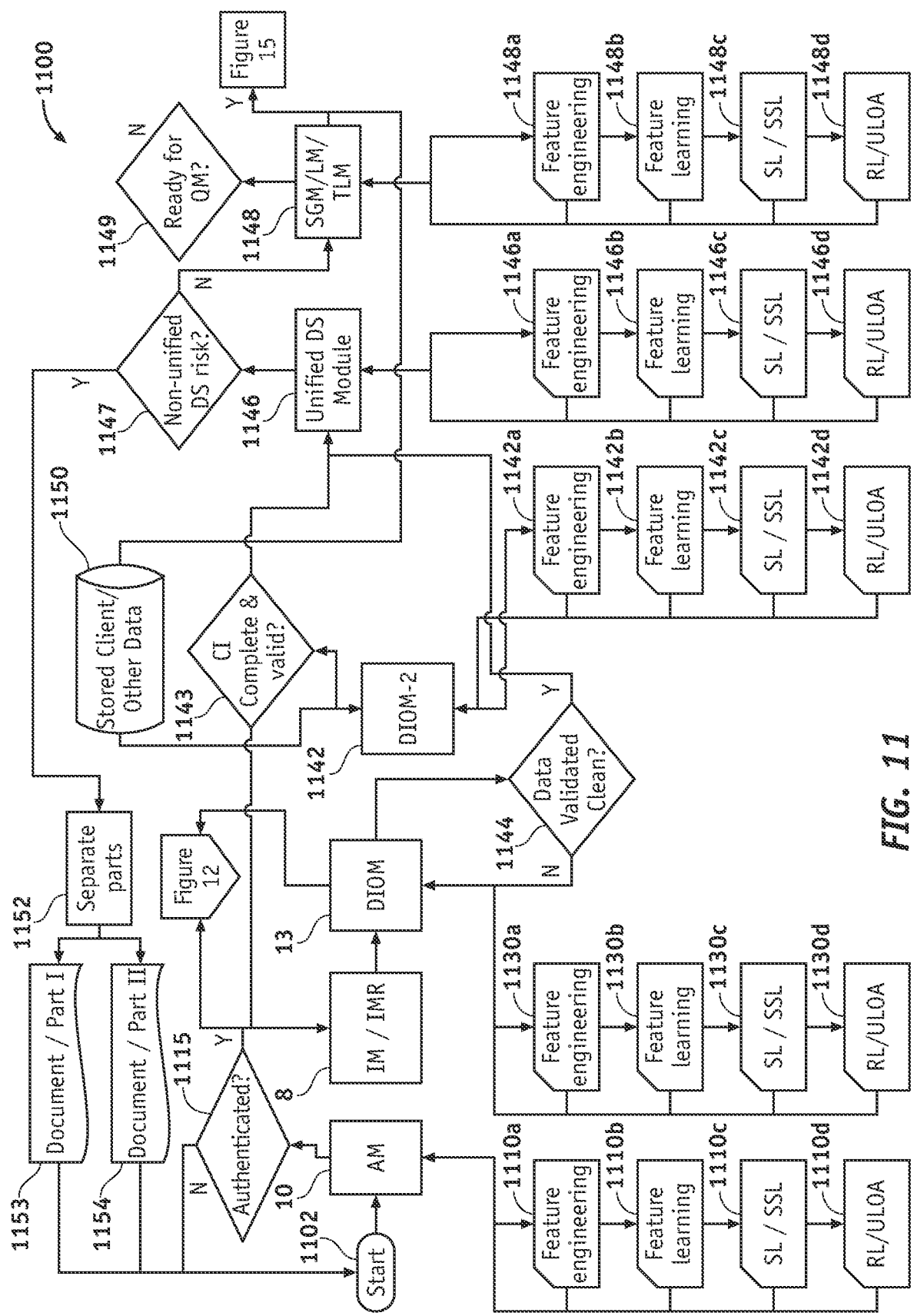

FIG. 11 is a flow chart of a process of building a CI dataset for SPIDR query while also developing a ML system, wherein machine ML/AI is applied at several method steps.

Figure 12:
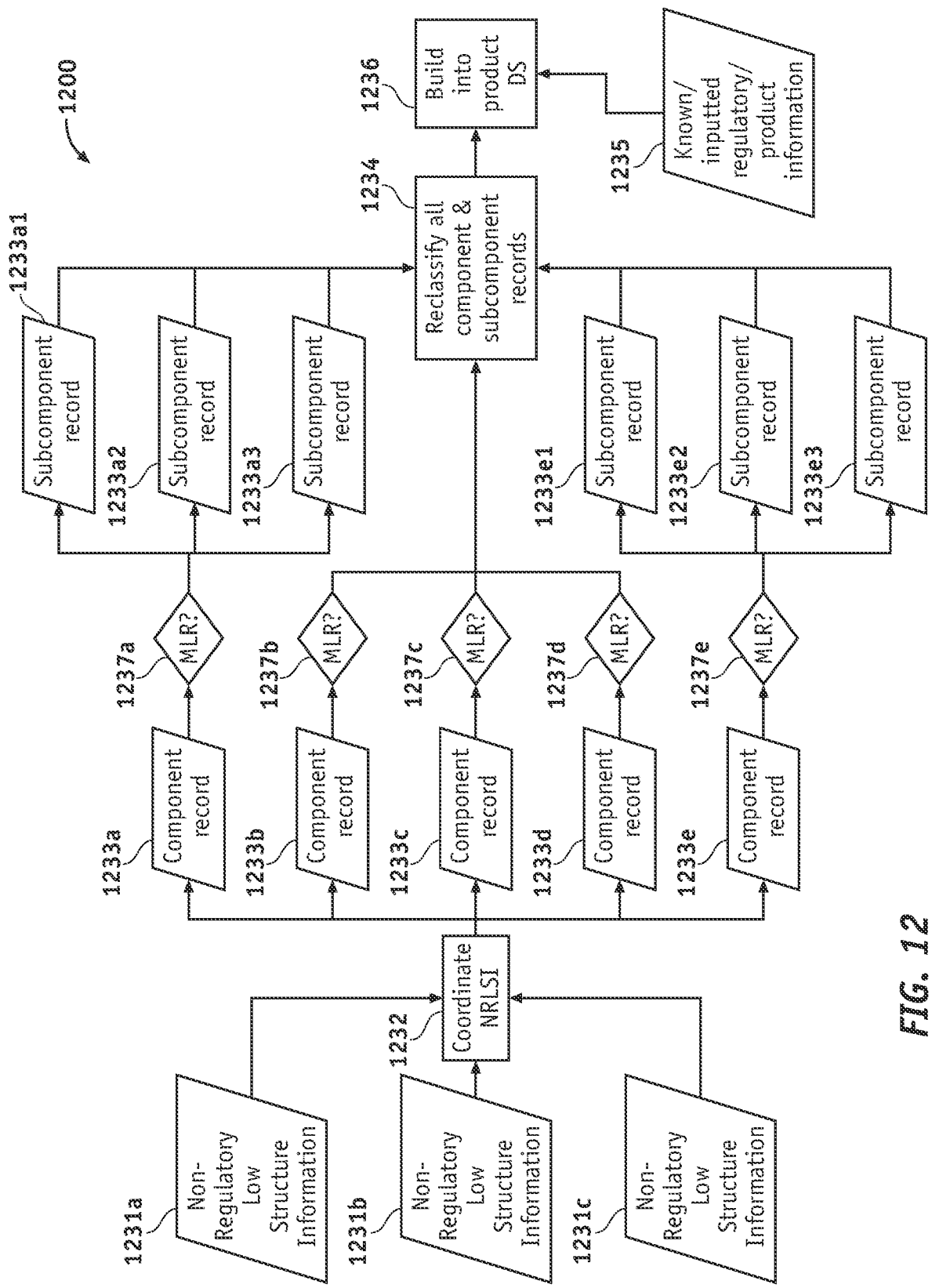

FIG. 12 is a flow chart of exemplary method steps including processing MLRs.

Figure 13:
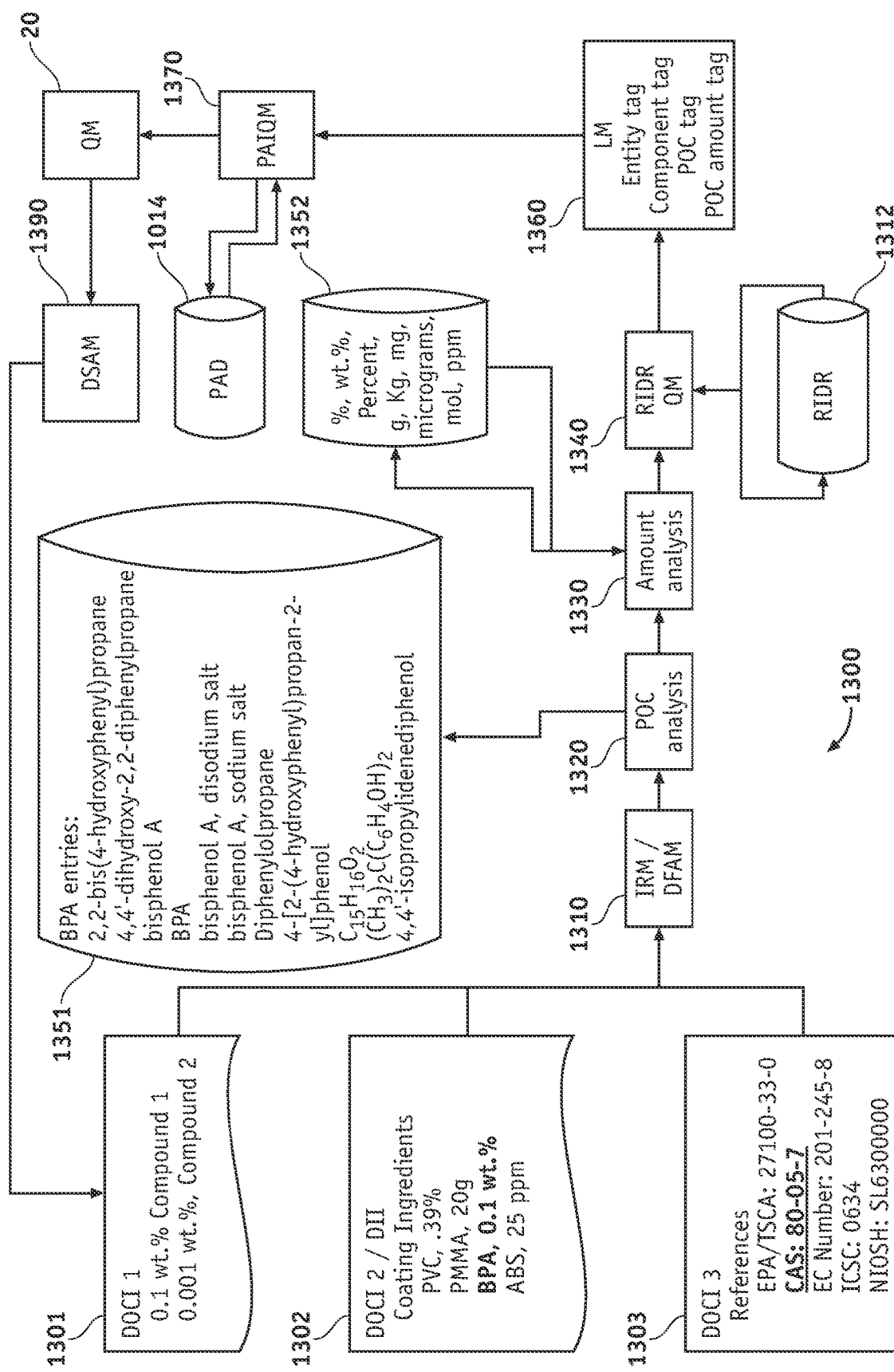

FIG. 13 is a flow chart exemplifying the application of a system to different types of data, including TIDI and NTIDI.

Figure 14A:
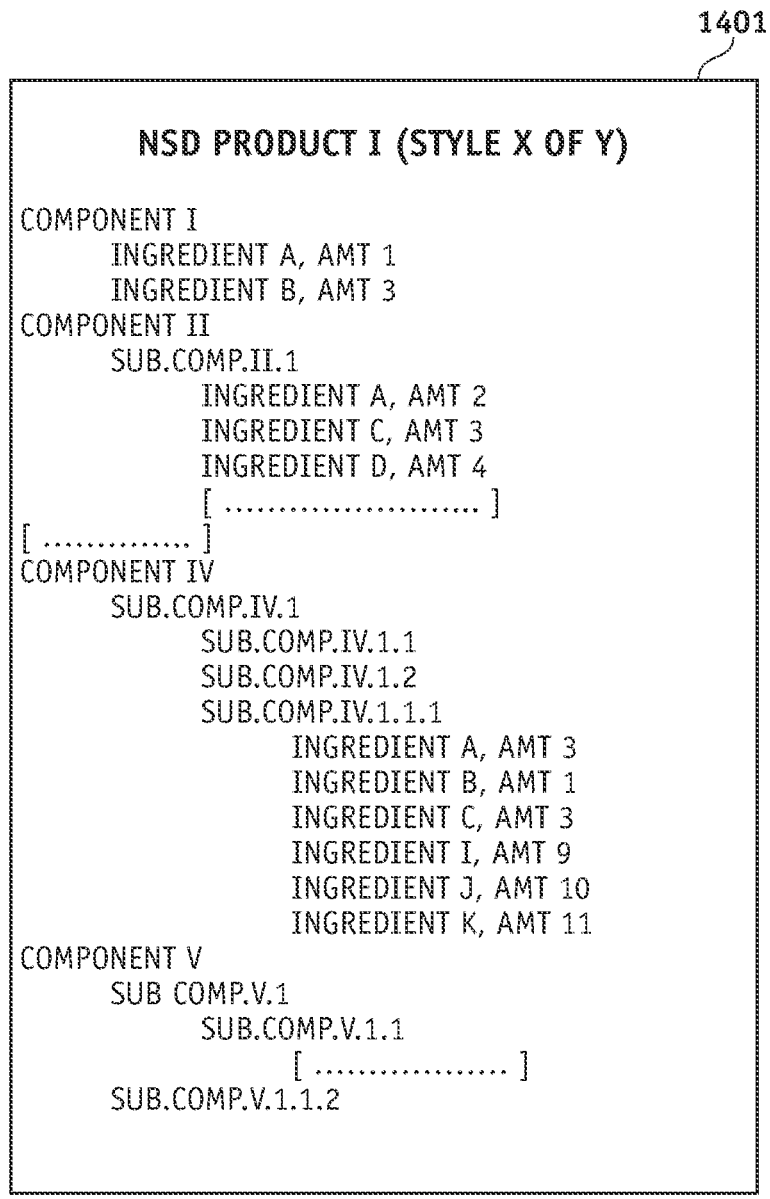

FIG. 14A is an exemplary CPIS/NPSD MLR-type Input.

Figure 14B:
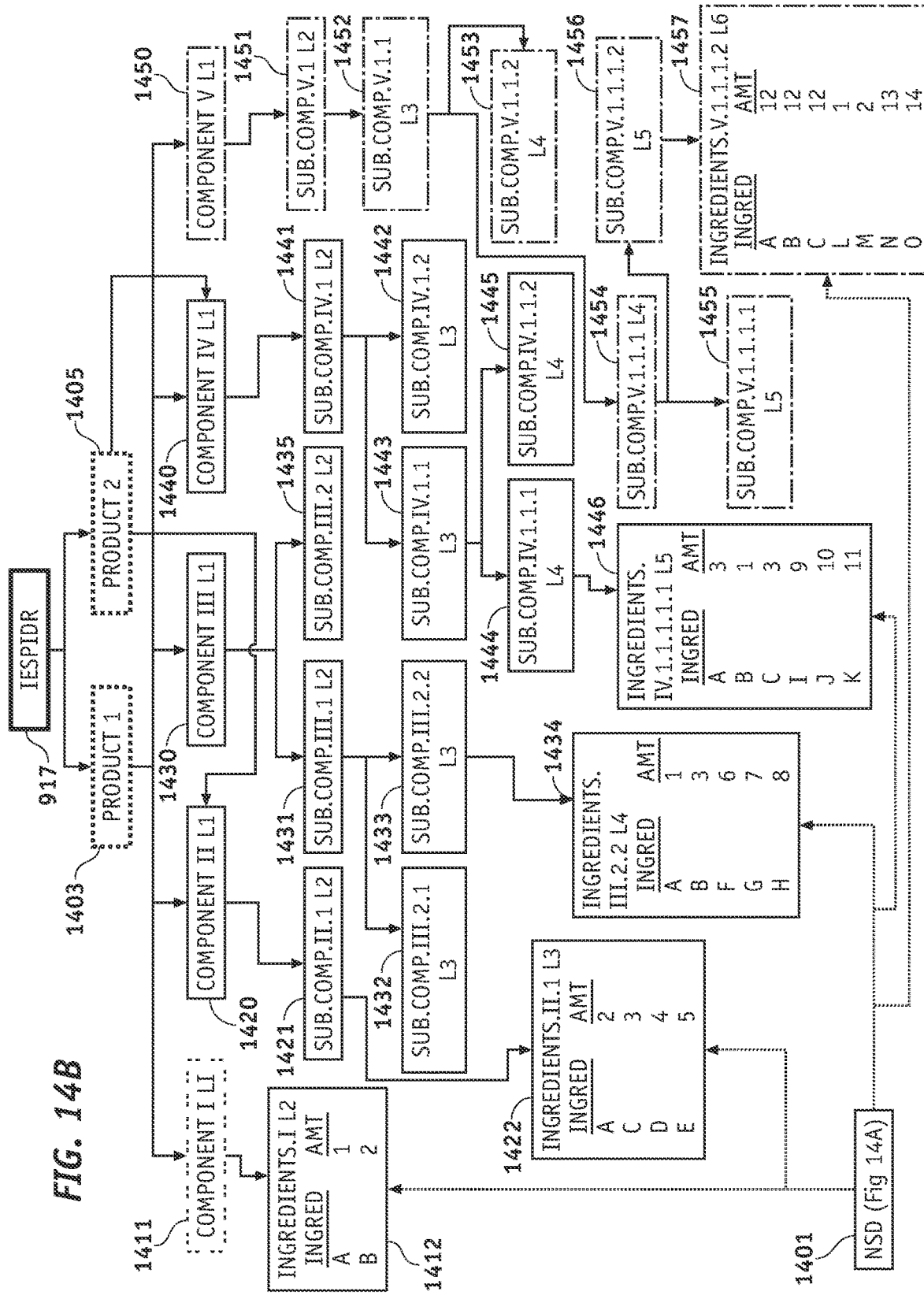

FIG. 14B illustrates how a system matches data set features (DSFs) of multi-level IESPIDR SPRRs to an input such as that illustrated in FIG. 14A.

Figure 15:
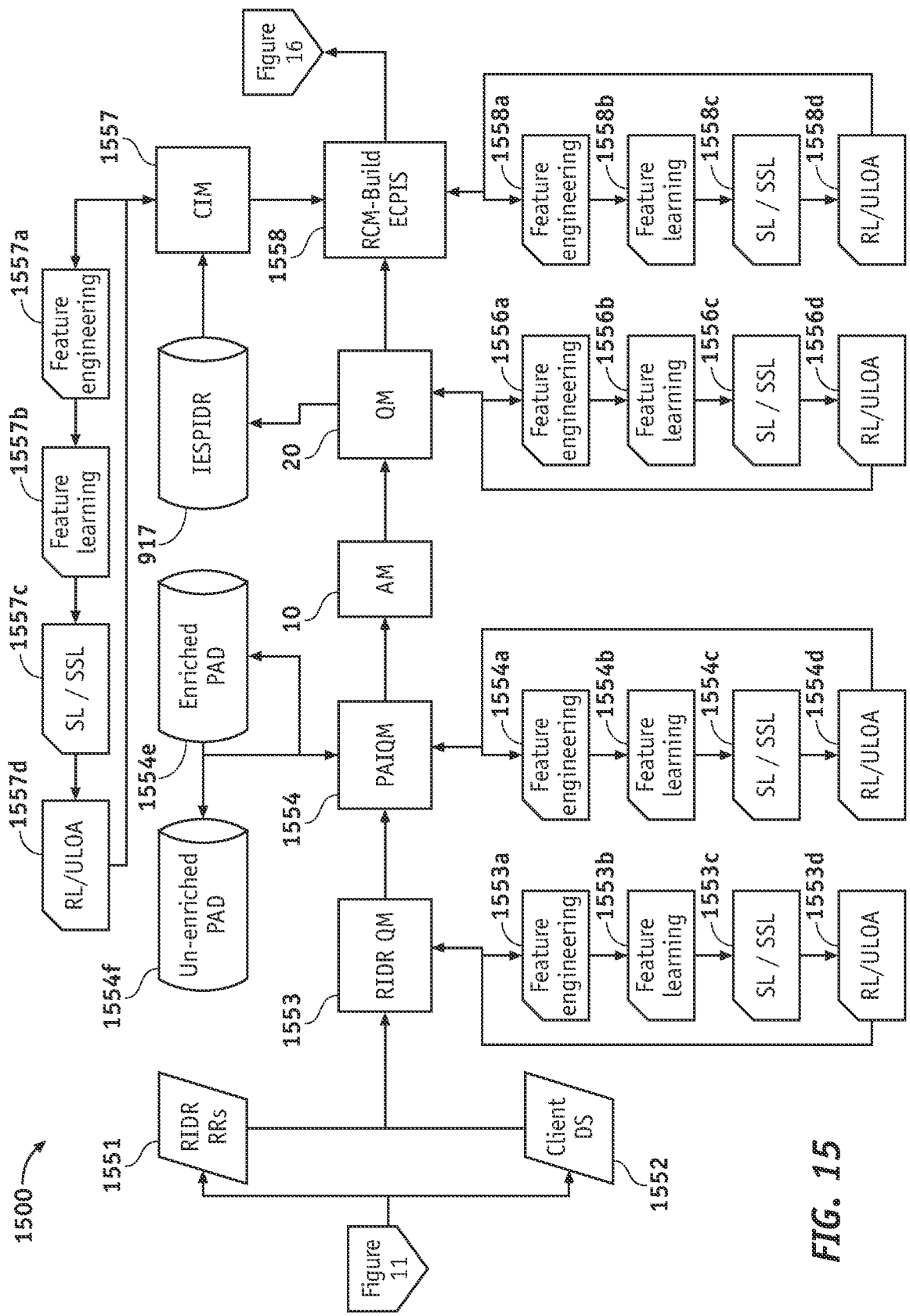

FIG. 15 is a flow chart of an exemplary process for querying DRs and using query results to generate enhanced customer input (ECI).

Figure 16:
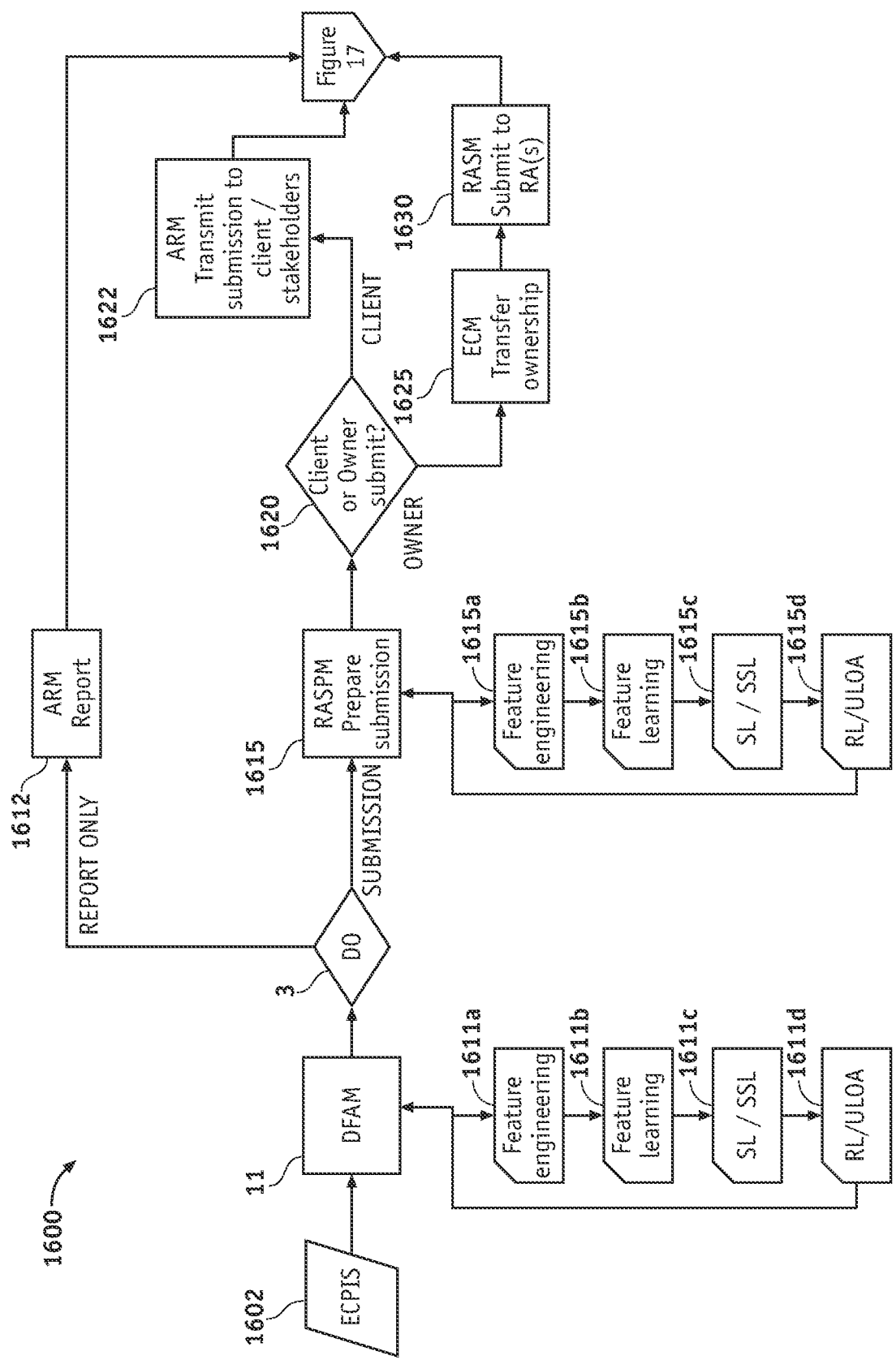

FIG. 16 is a flow chart of Regulatory Authority Submission-related Functions (e.g., preparation of a RA Submission based on an IESPIDR-query enriched Client Input DS).

Figure 17:
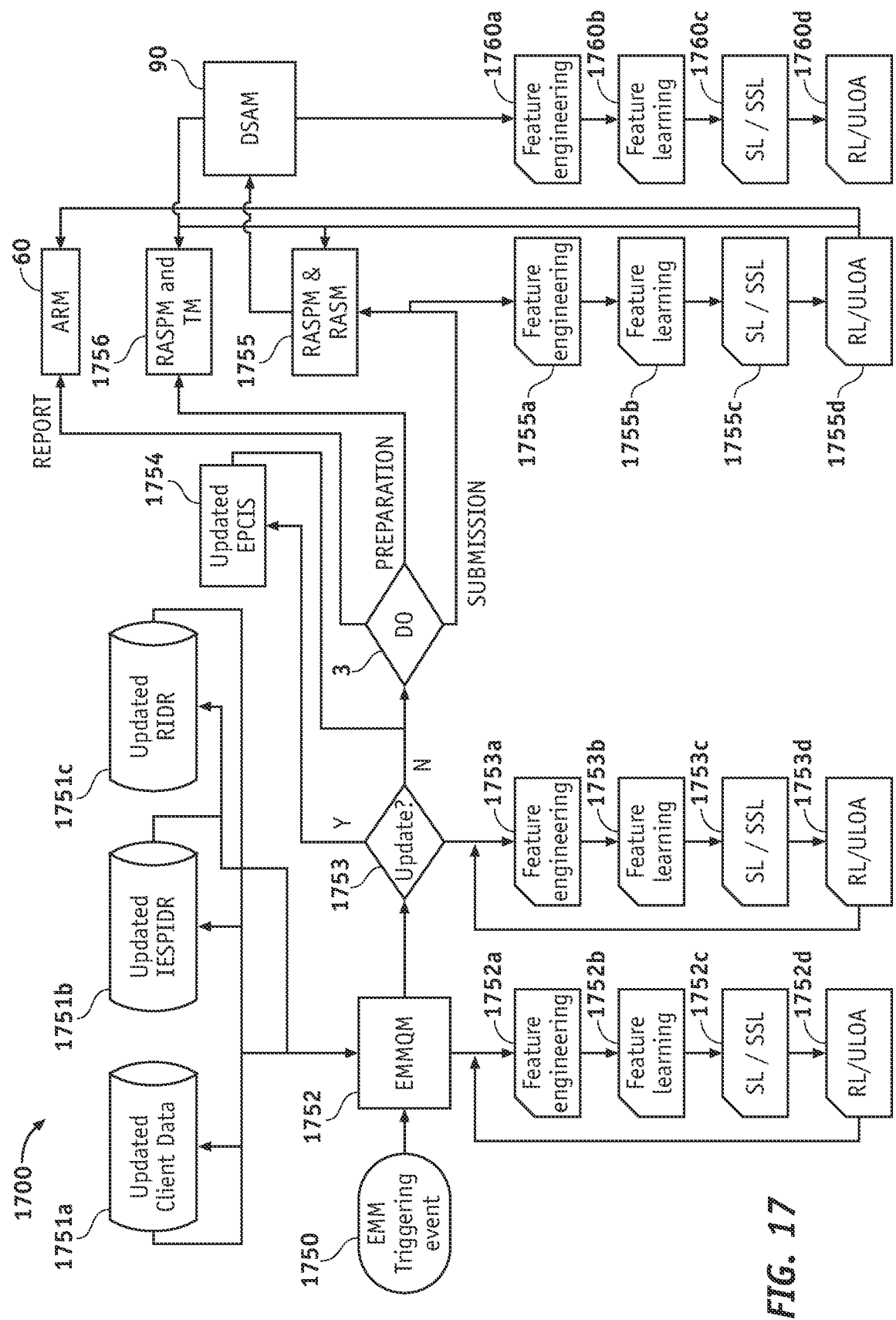

FIG. 17 is a flow chart depicting an exemplary Event Monitoring Module-mediated process for updating Relevant System DSs upon event occurrence.

Figure 18:
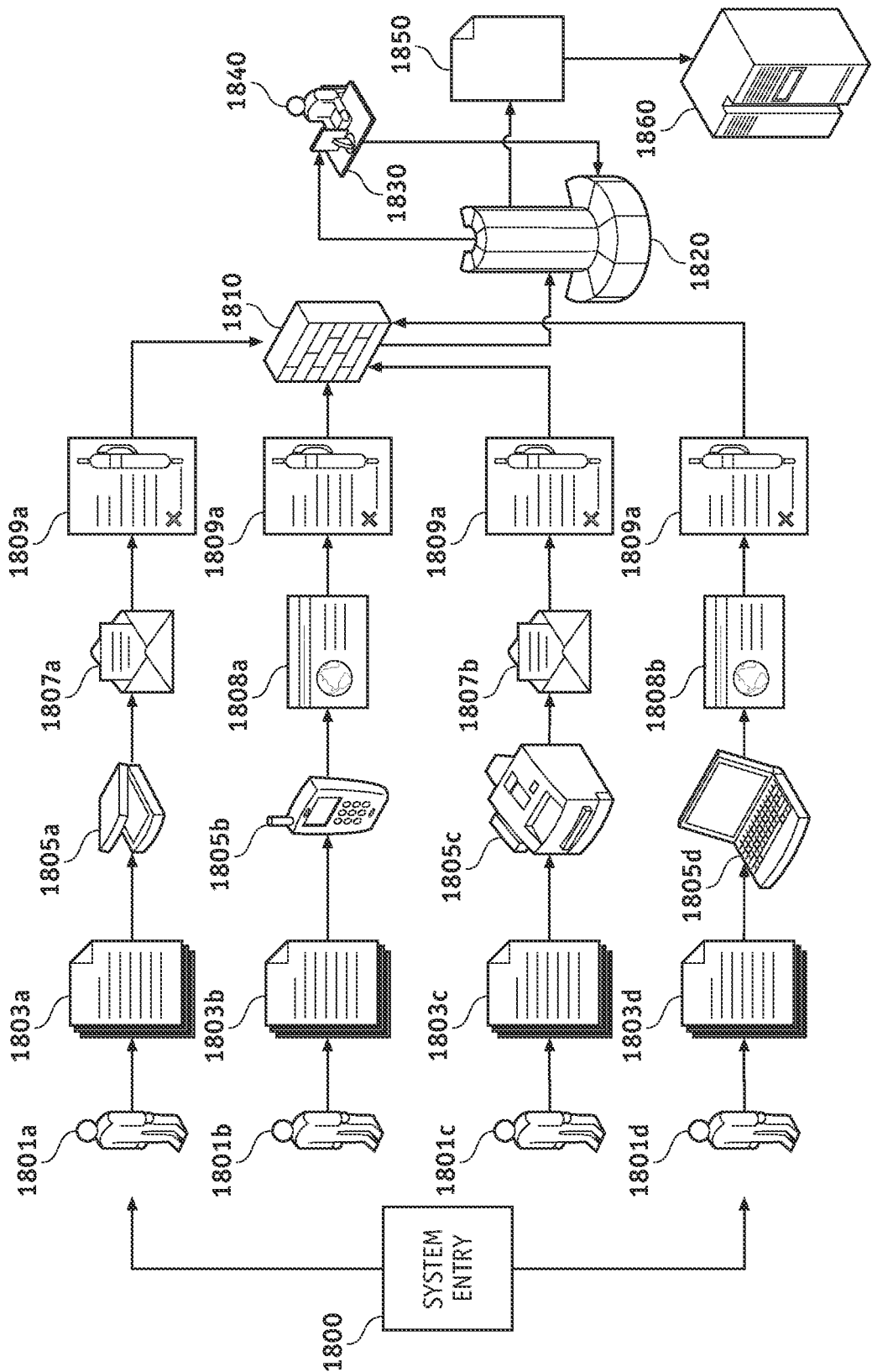

FIG. 18 is a process diagram referencing physical components of networks and methods of the invention (and the interaction of users with a system).

Figure 19:
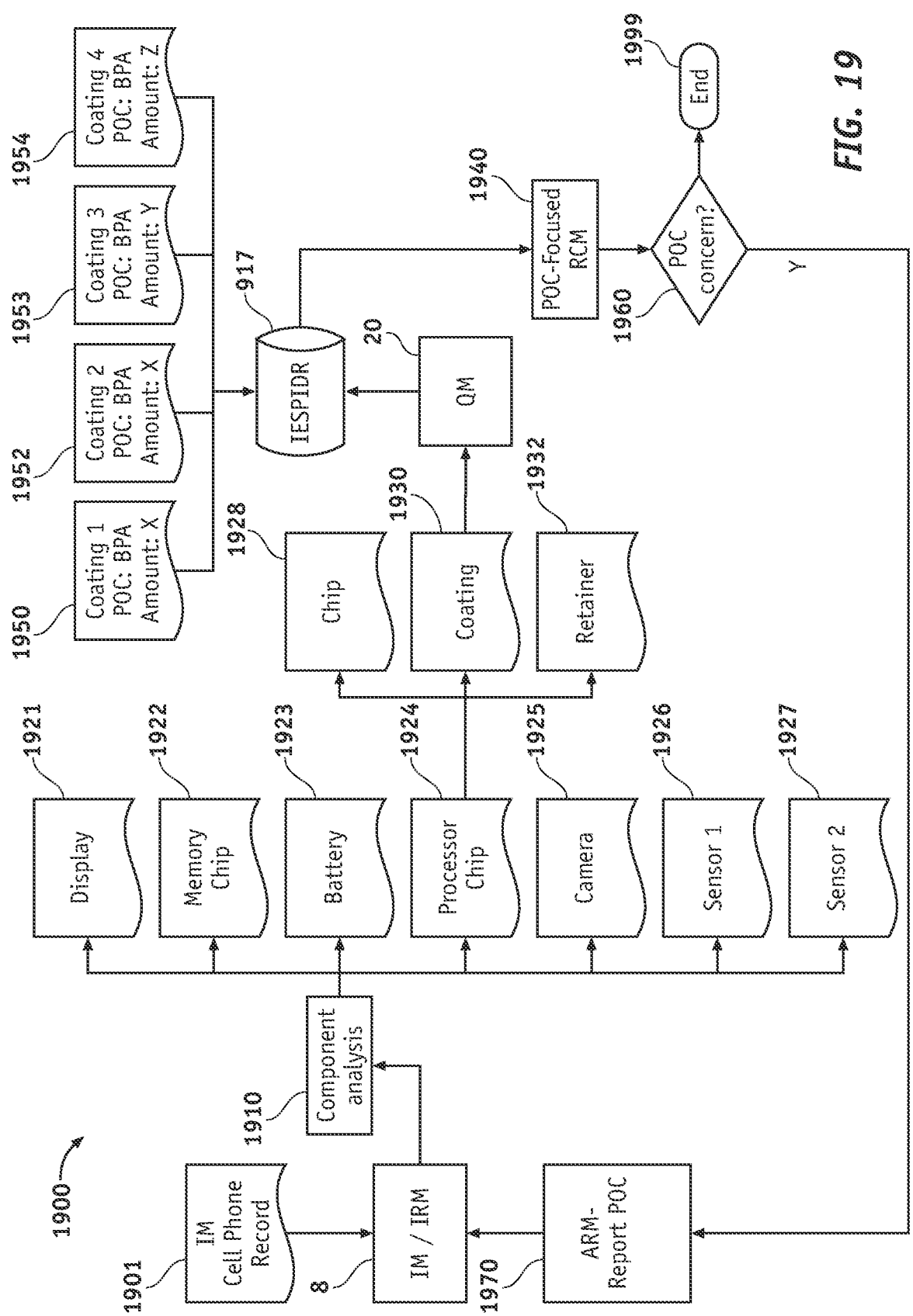

FIG. 19 is a flow chart further exemplifying the application of processes for analyzing CI comprising MLR input and querying an IESPIDR including related MLR SPRRs.

Figure 20B:
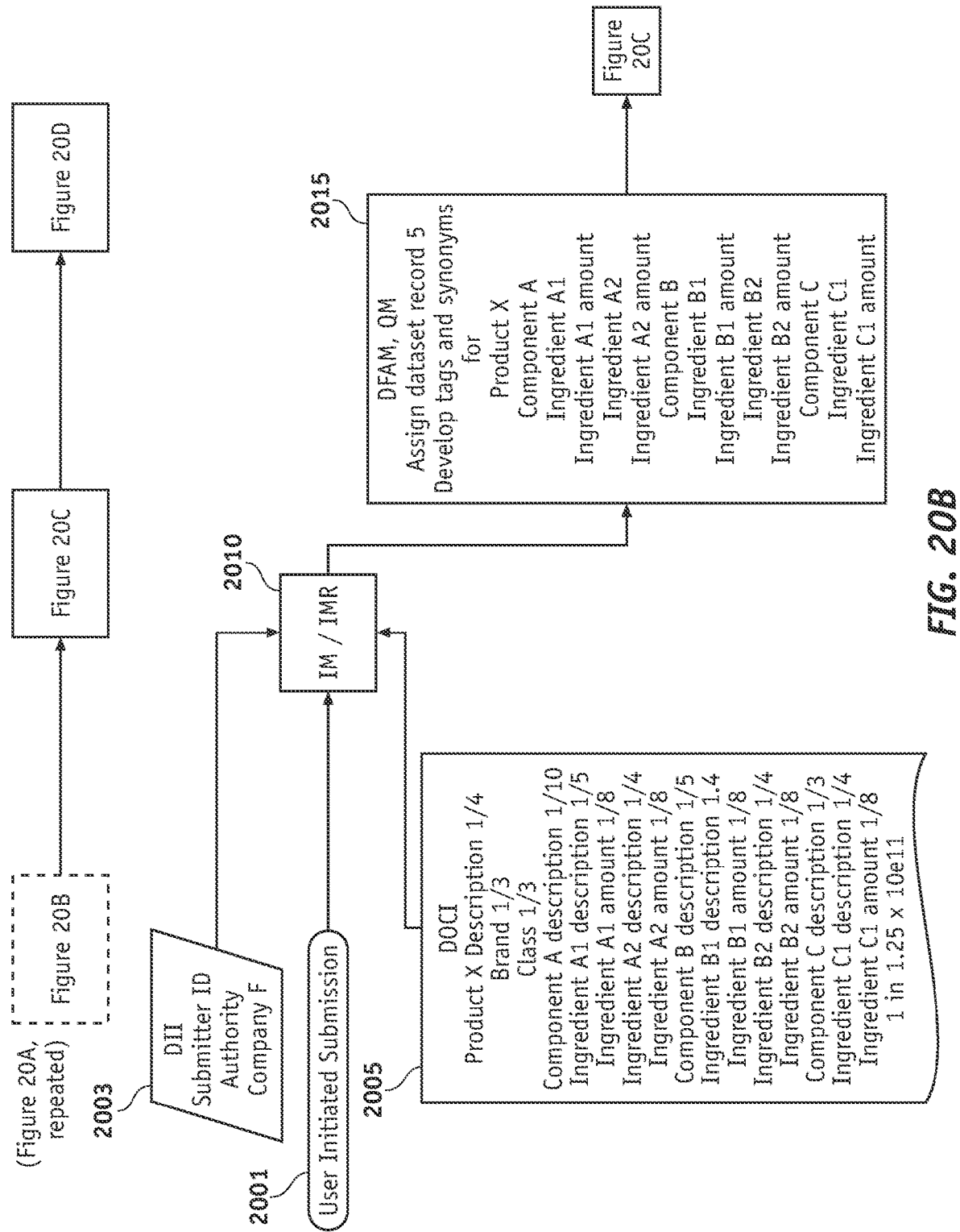
Figure 20C:
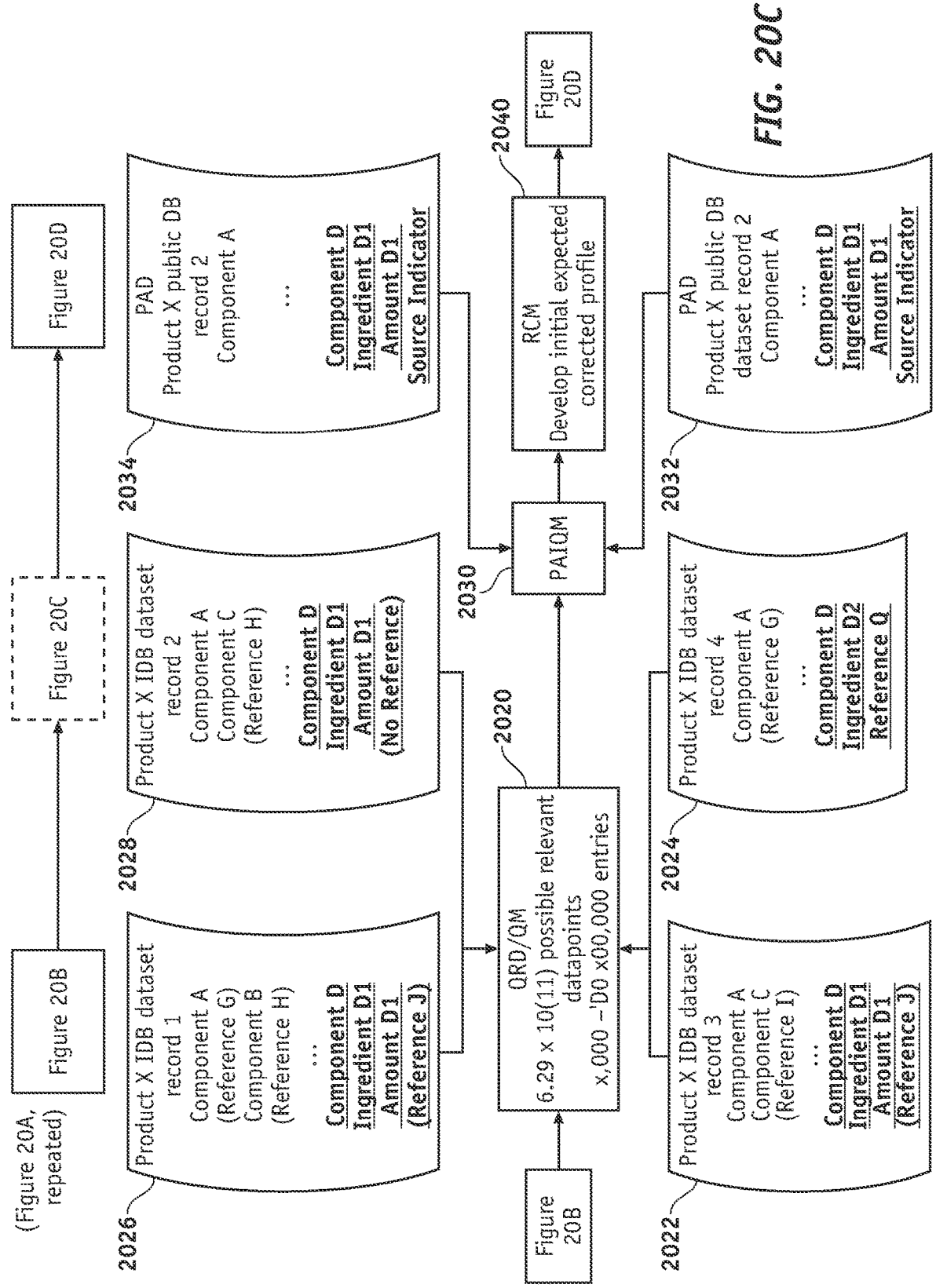
Figure 20D:
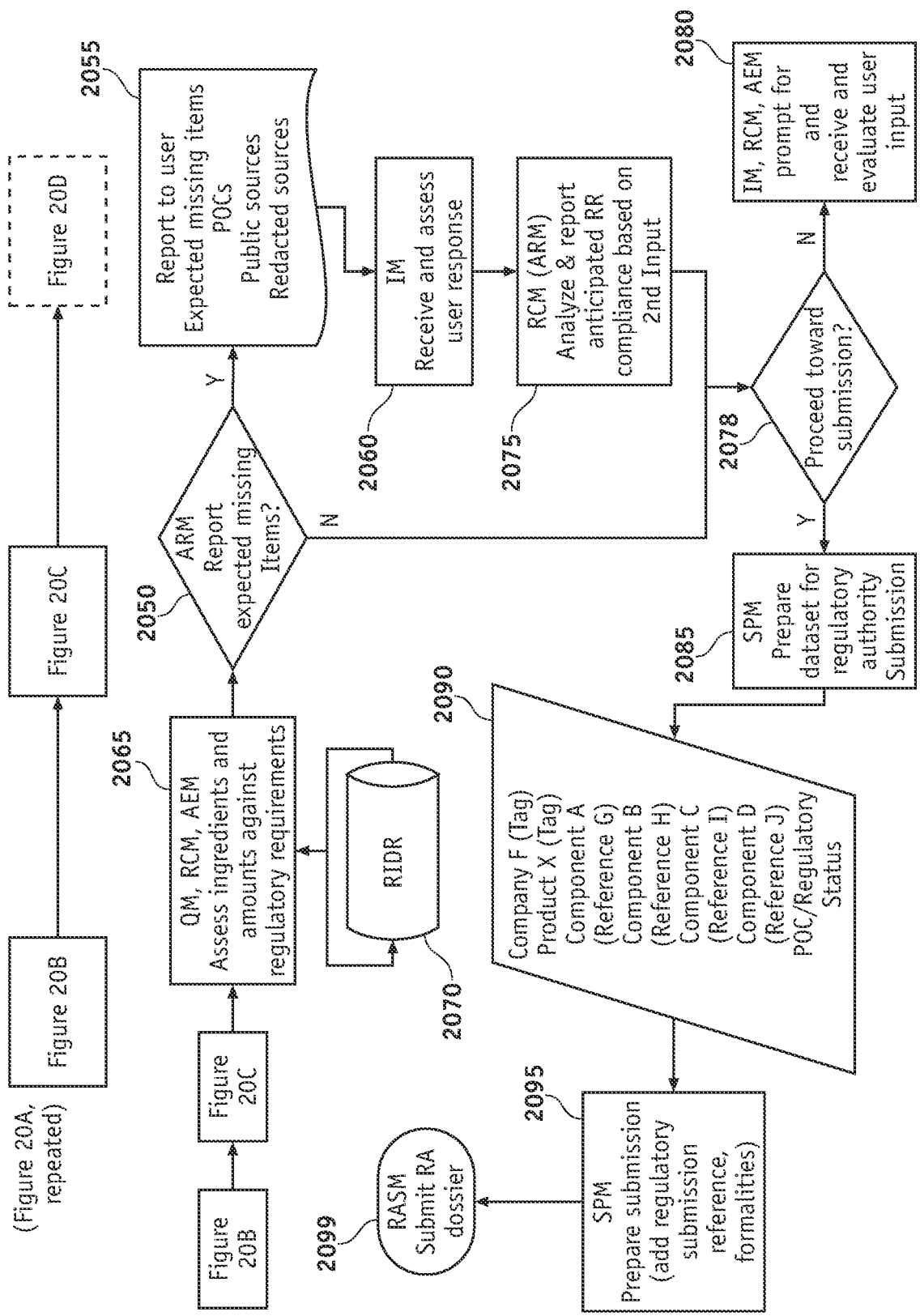

FIG. 20 is a flow chart exemplifying use of a system to prepare and submit a RA submission by use of MLR inputs. The workflow of FIG. 20 is broken into three parts as shown in FIG. 20A (corresponding to FIGS. 20B-D), and each part of the workflow are exemplified with illustrative data entries and analysis in FIGS. 20B, 20C, and 20D, respectively.

Figure 21:
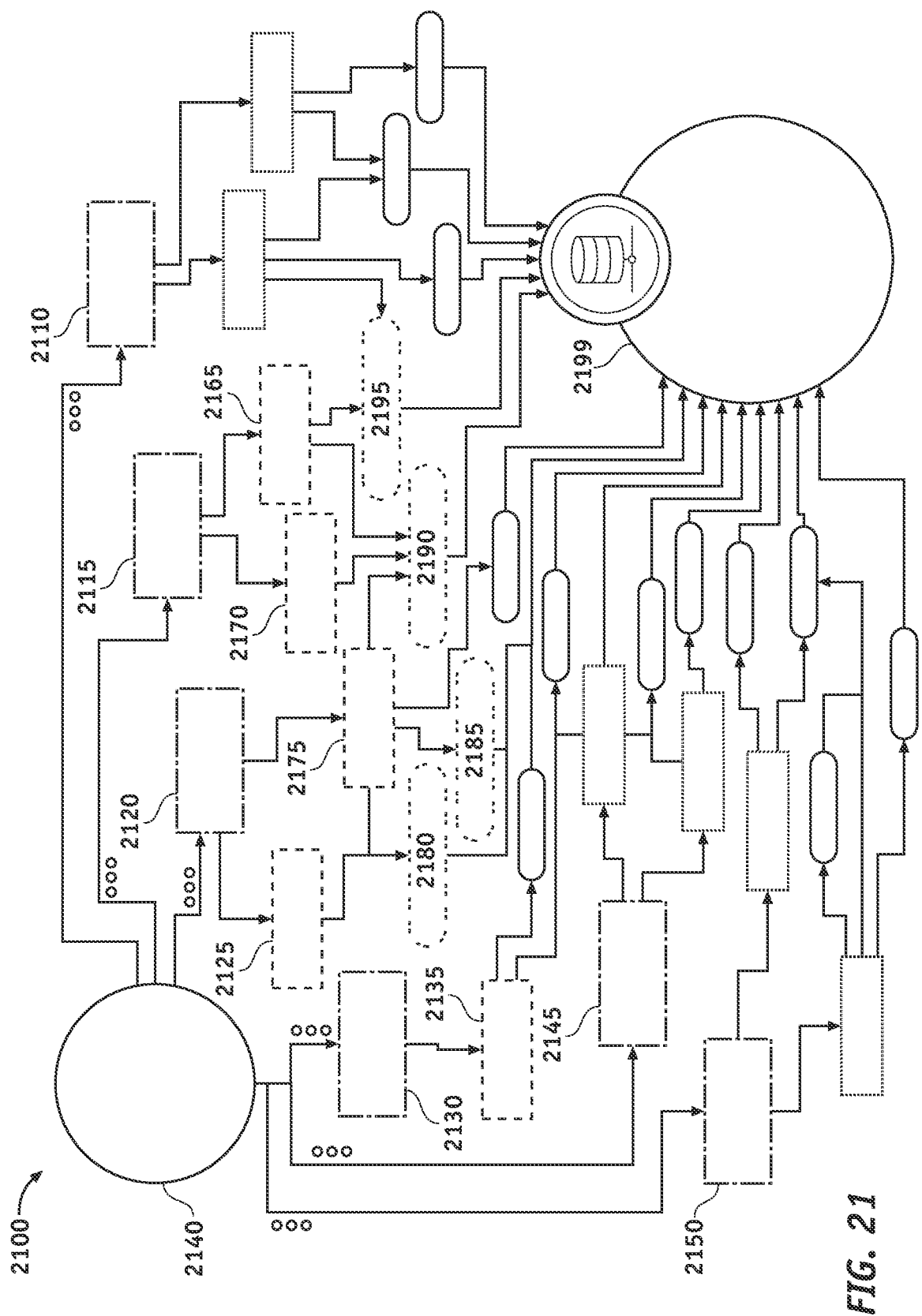

FIG. 21 illustrates a SCIP registration model comprising disparate legal entities.

Figure 22:
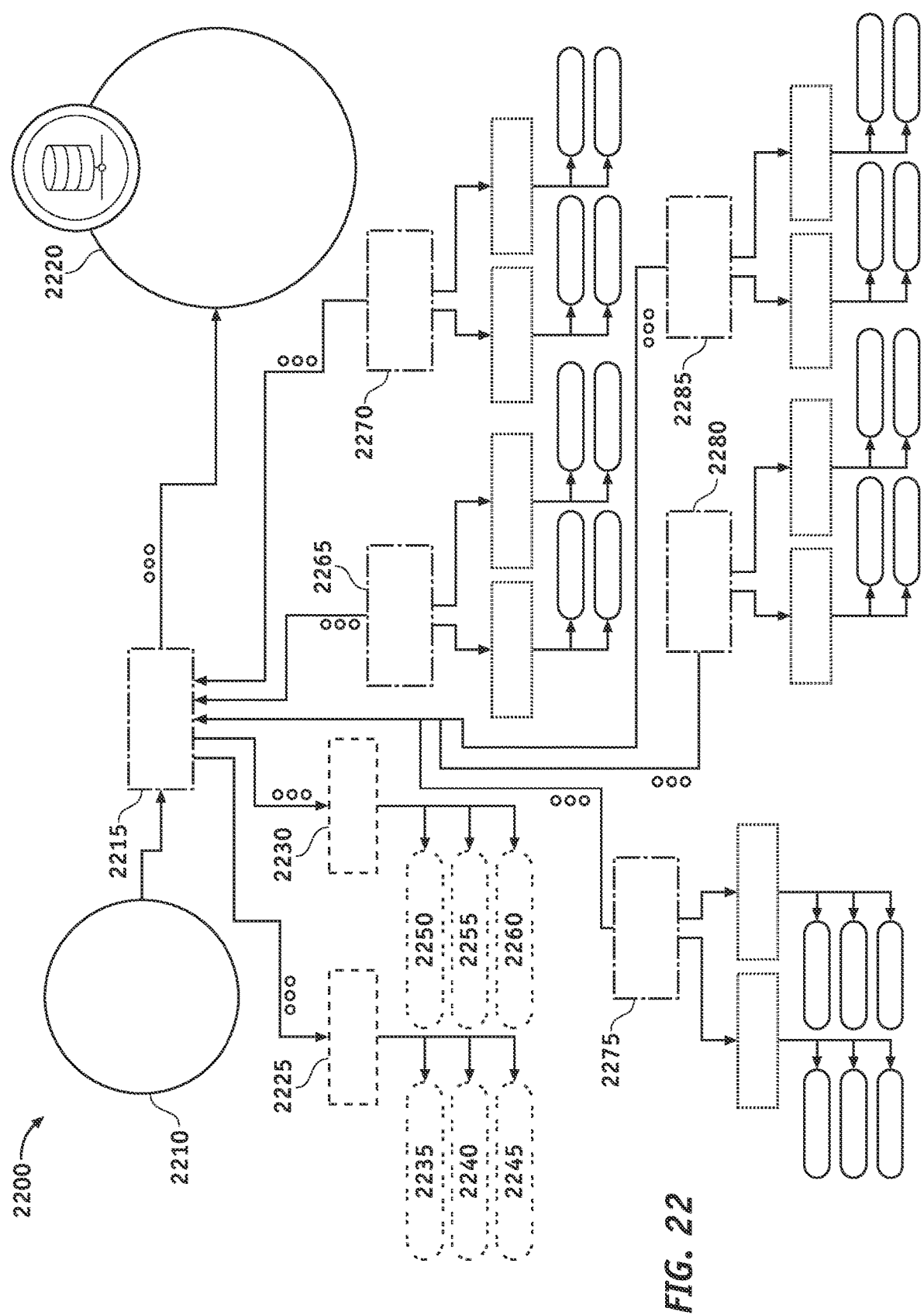

FIG. 22 illustrates a SCIP registration model comprising a single master legal entity, characterizable as a "hub and spoke" model.

Figure 23:
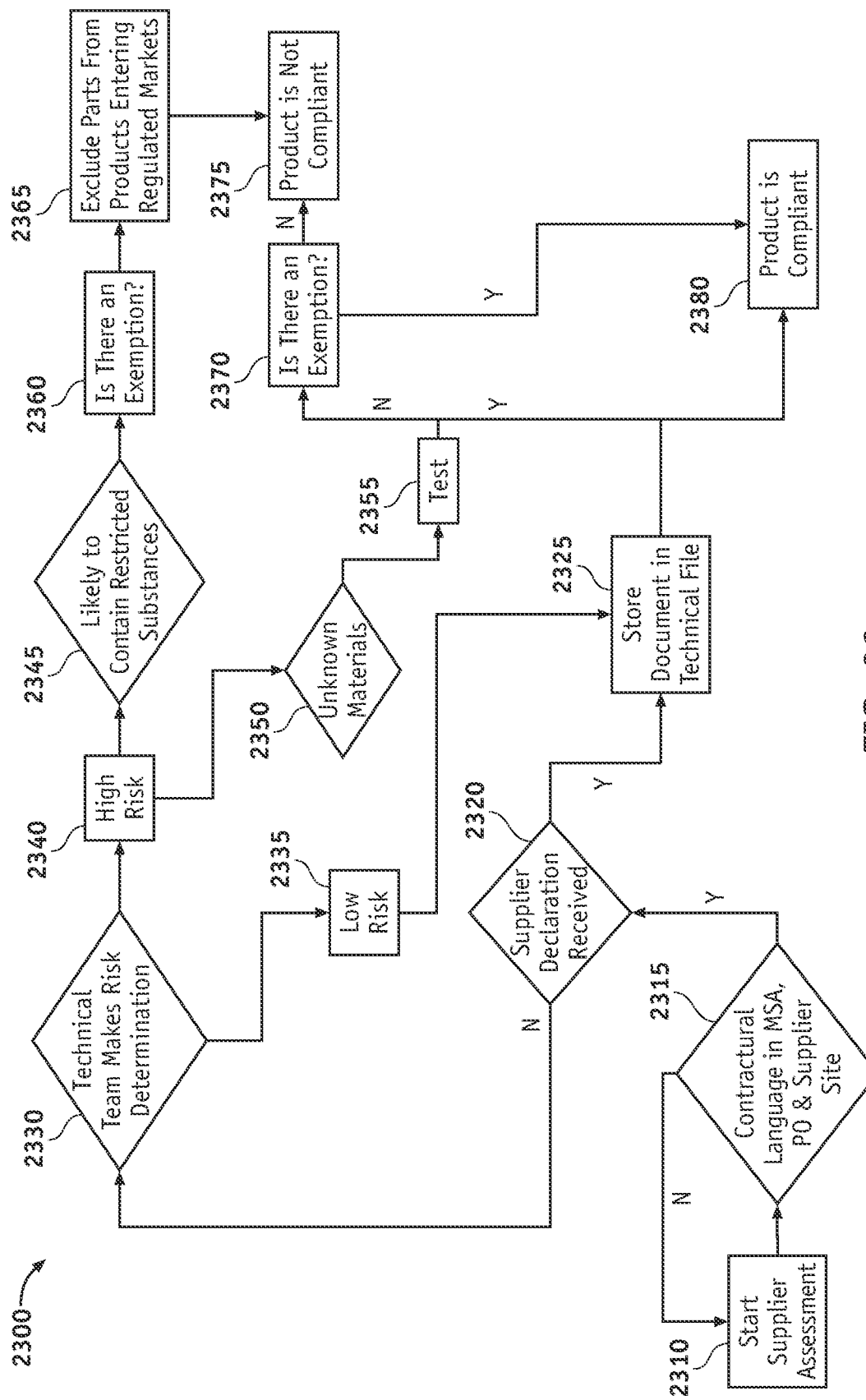

FIG. 23 illustrates a decision tree for aiding in compliance with the International Electrotechnical Commission (IEC) 63000 standard, exemplifying aspects of the invention.

Figure 24:
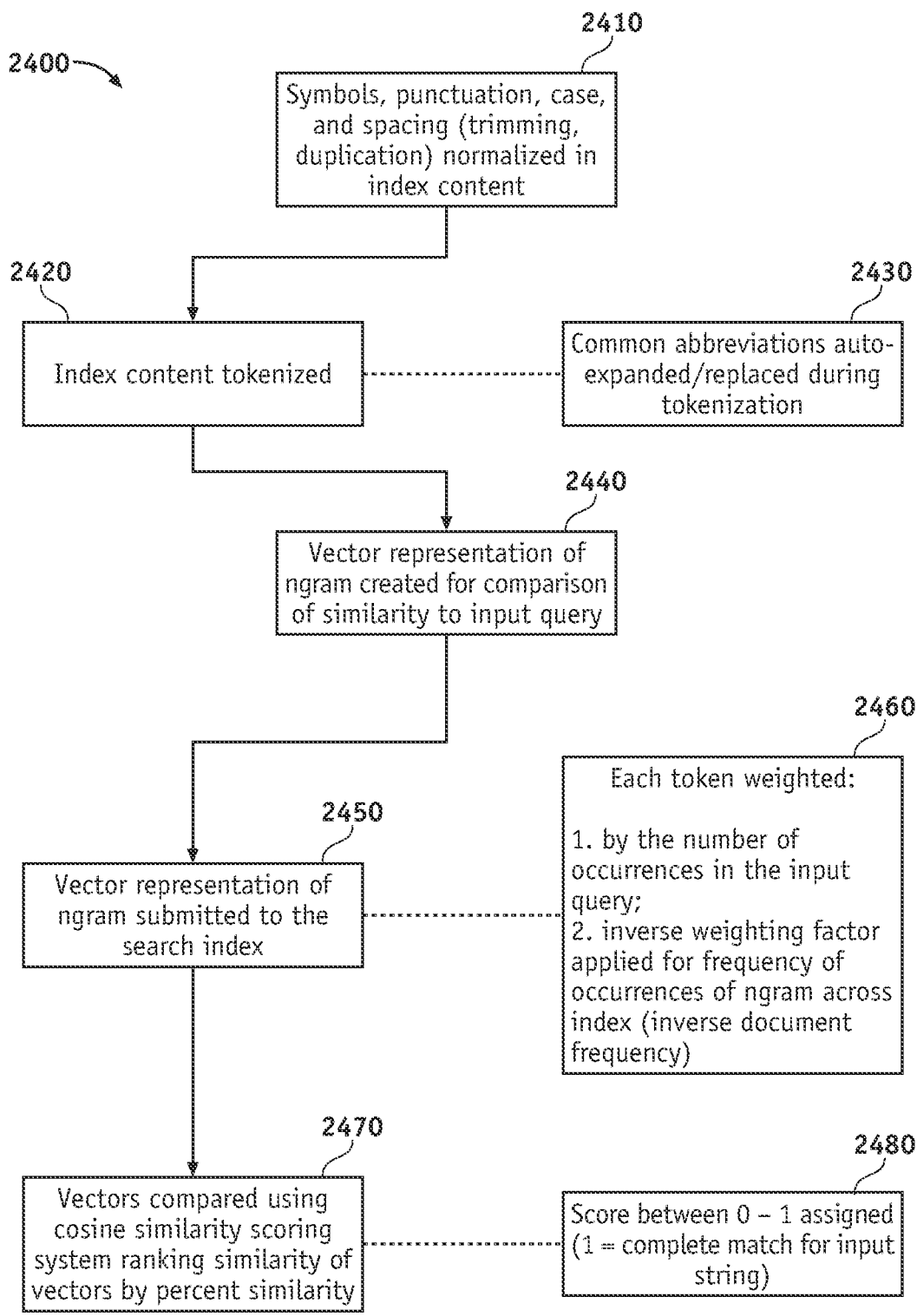

FIG. 24 is a flow chart exemplifying methods comprising the establishment of ngram vectors from tokenized index content and comparison thereof to a search index.

Figure 25:
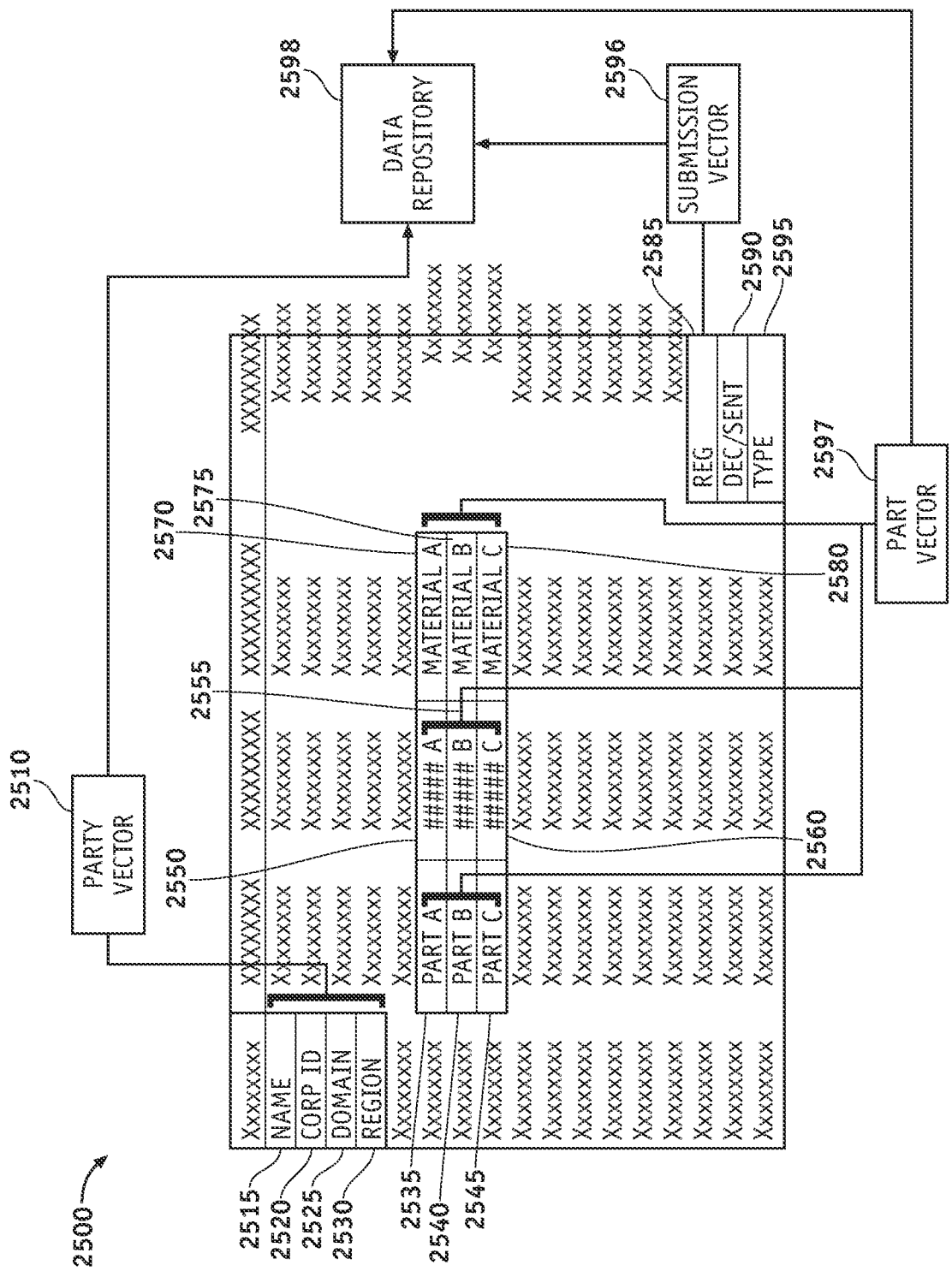

FIG. 25 illustrates the extraction of attributes from a single document into separate vectors which are then compared to data in an ISPIDR.

Figure 26:
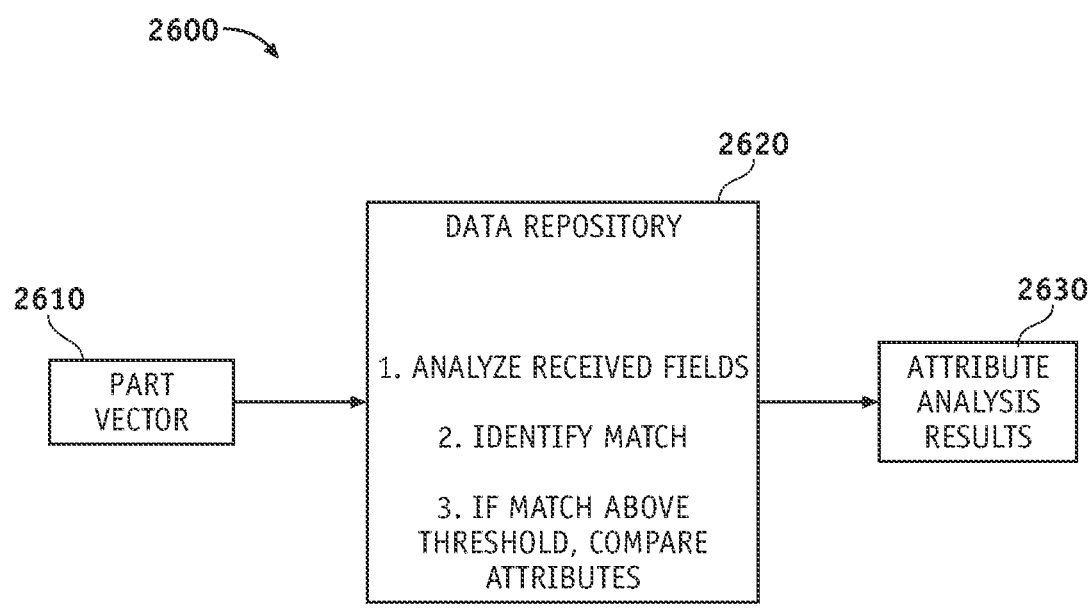

FIG. 26 illustrates the database analysis performed on individual attributes of the vectors illustrated in FIG. 25.

Figure 27:
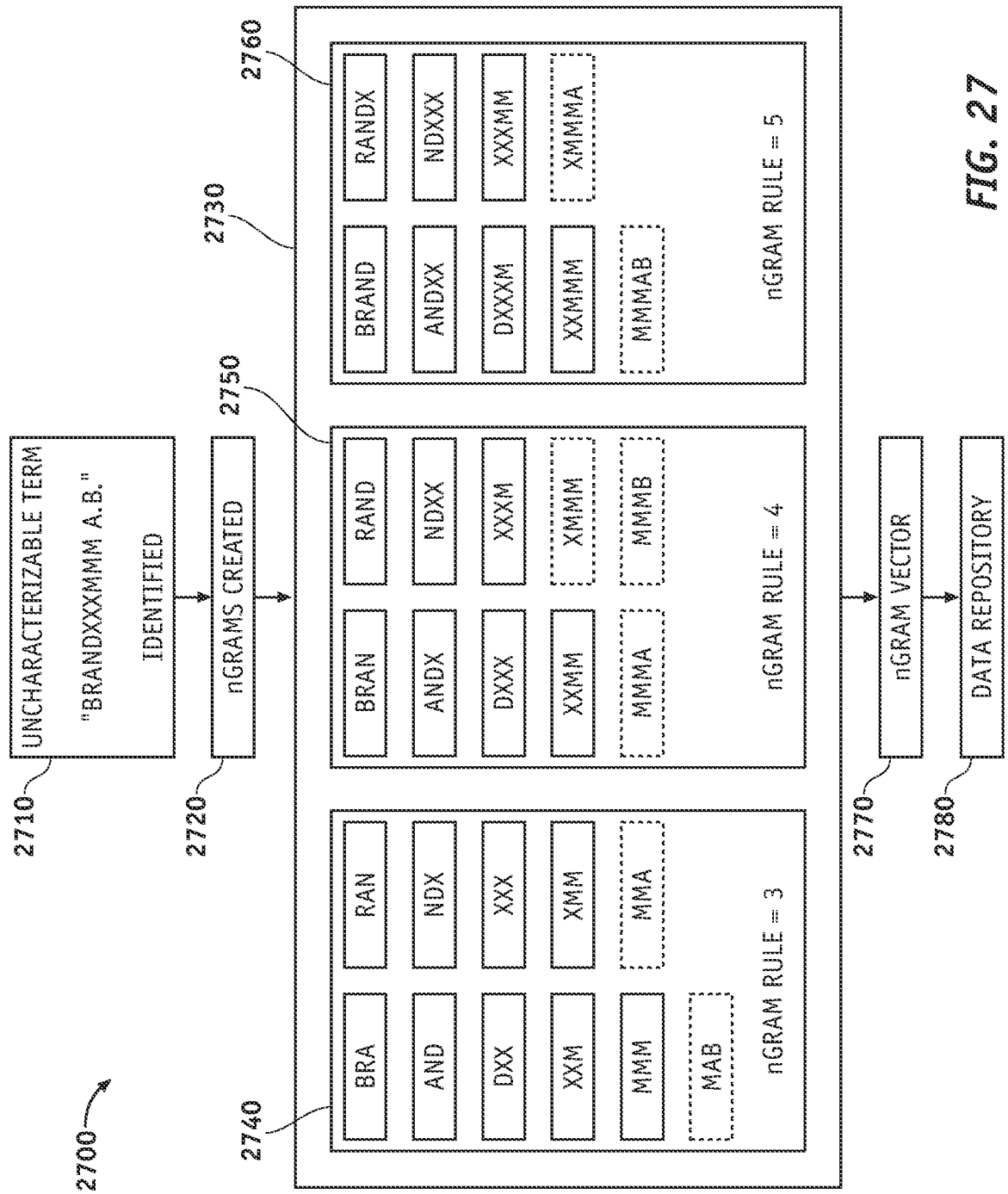

FIG. 27 illustrates the establishment of ngrams from uncharacterizable terms and the establishment of a vector therefrom.

Figure 28:
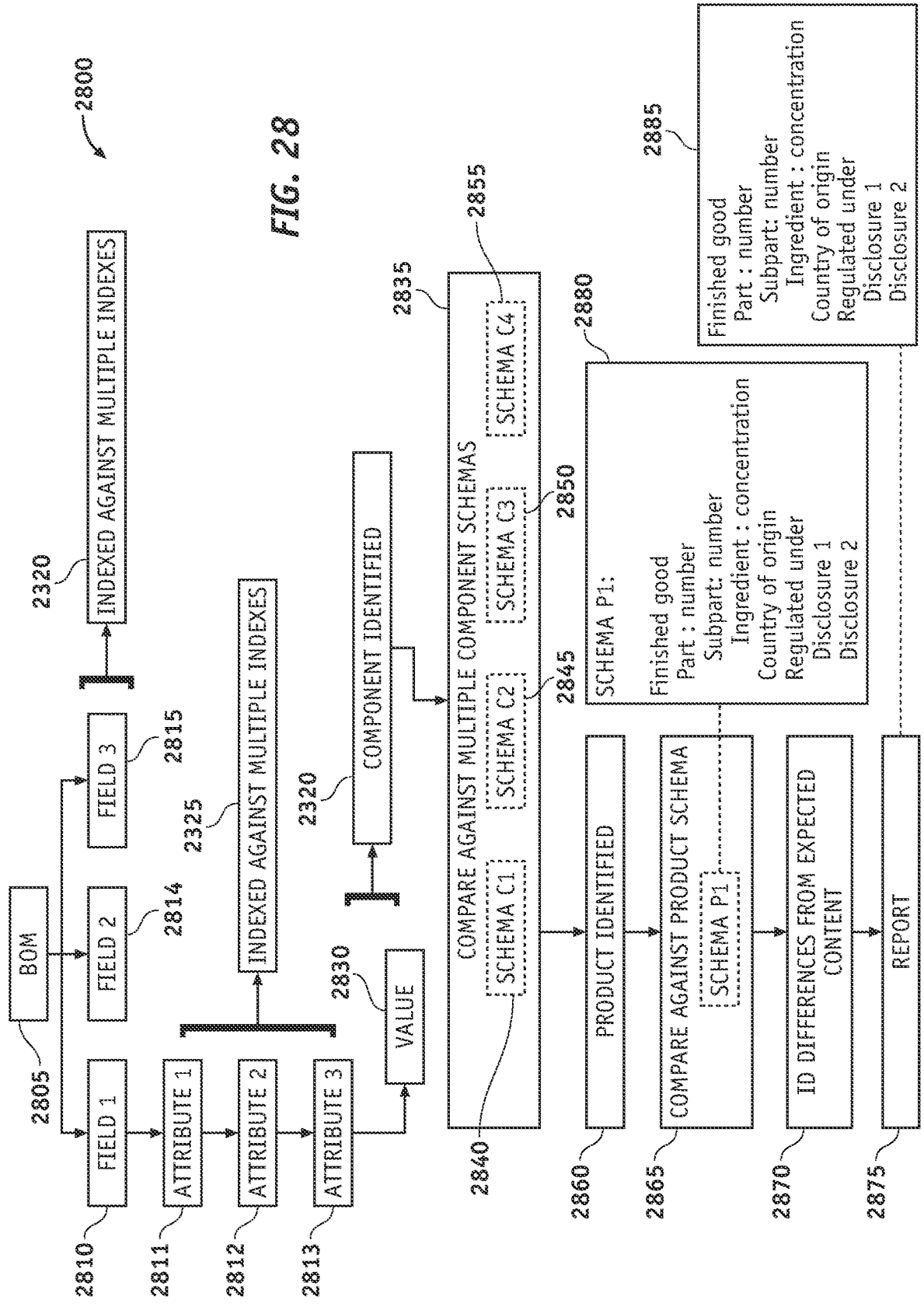

FIG. 28 illustrates a process for generating a final finished good report from a Bill of Materials (BOM) submission.

Figure 29:
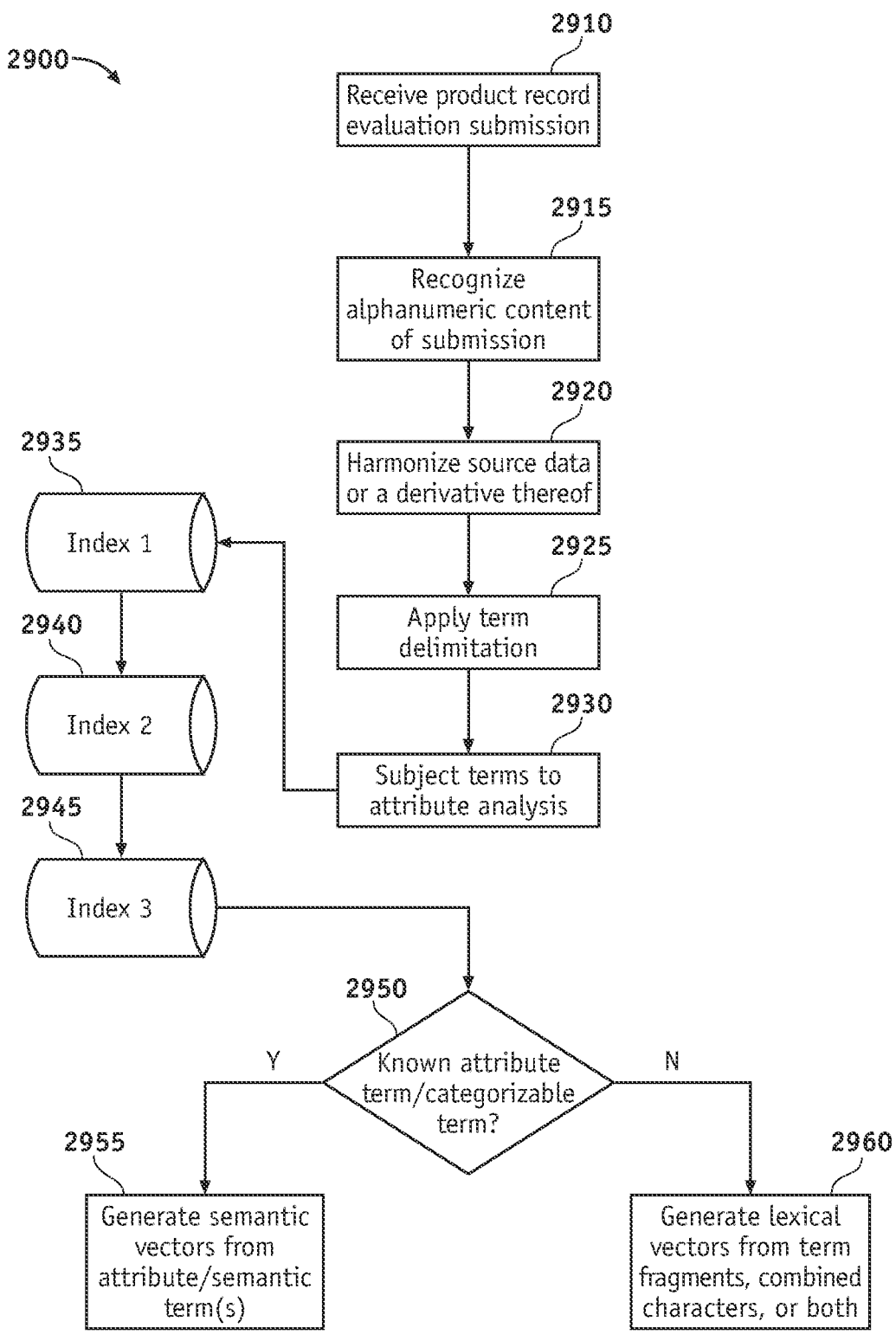

FIG. 29 exemplifies the evaluation of terms from a submission and the vectors which may be generated therefrom.

Figure 30:
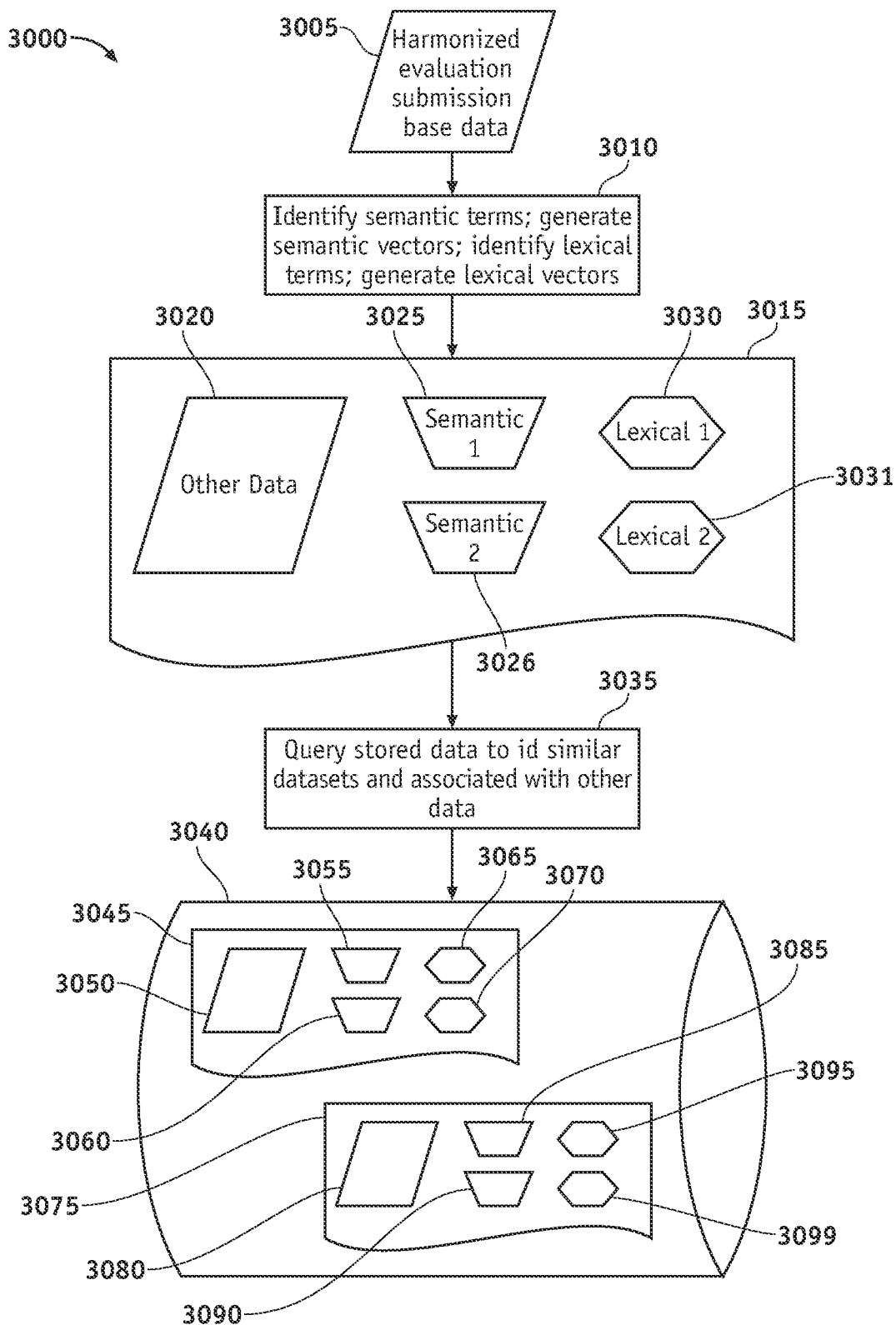

FIG. 30 illustrates an embodiment of a vector query.

Figure 31:
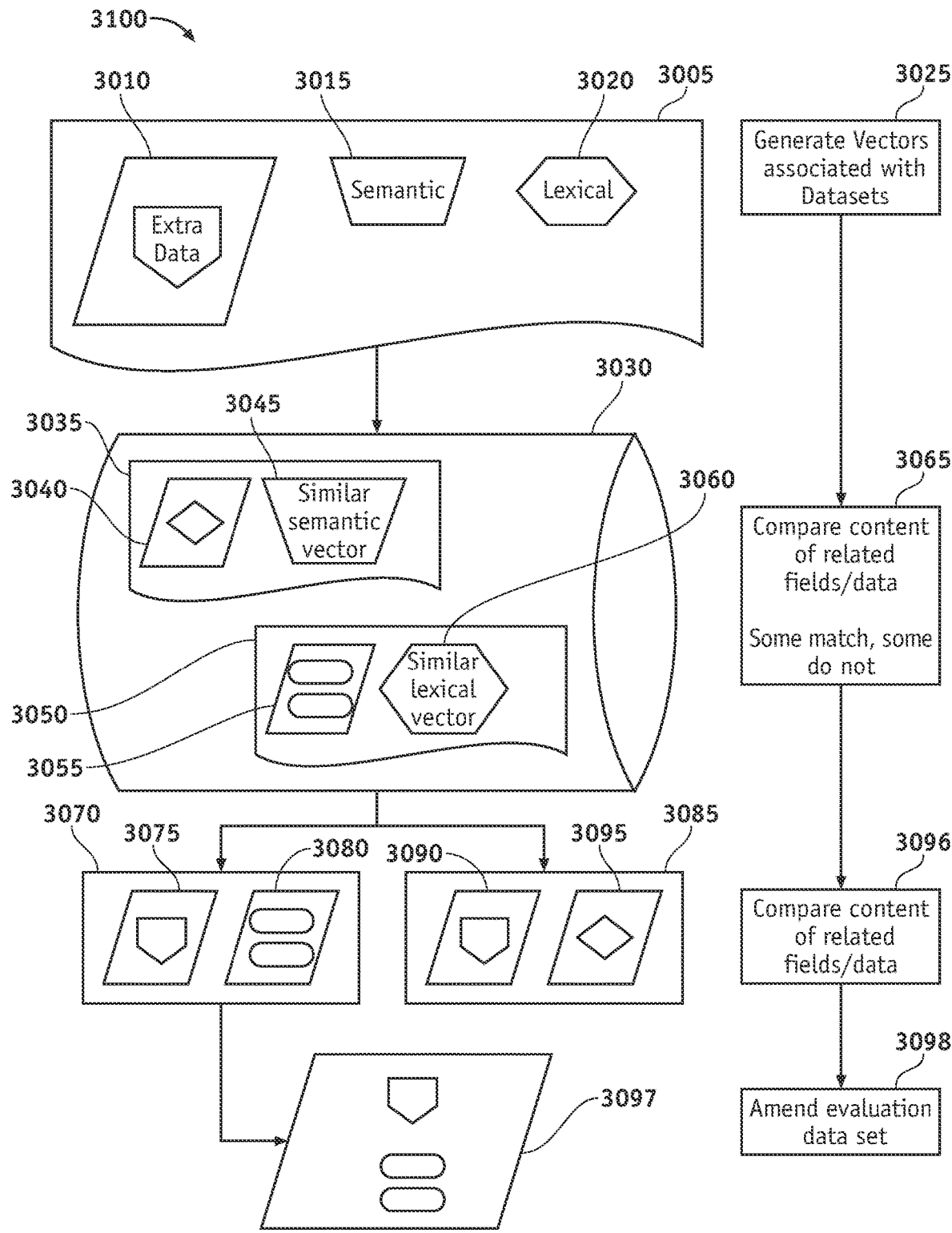

FIG. 31 illustrates application of selective querying with semantic and lexical vectors to improve system efficiency or effectiveness according to aspects of the invention.

Figure 32:
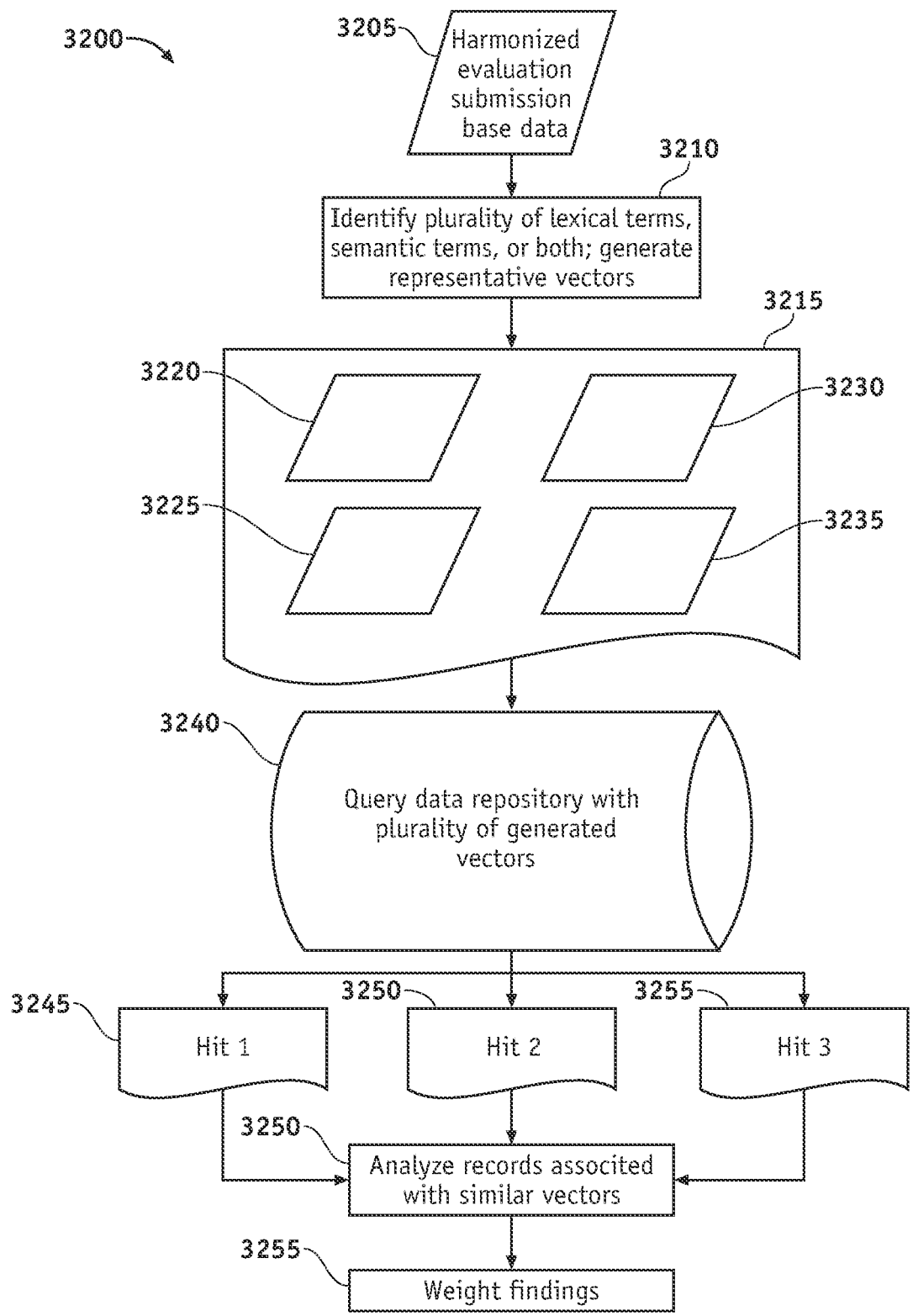

FIG. 32 illustrates the application of a plurality of searches comprising use of particular (e.g., the same) type of vector according to aspects.

Figure 33:
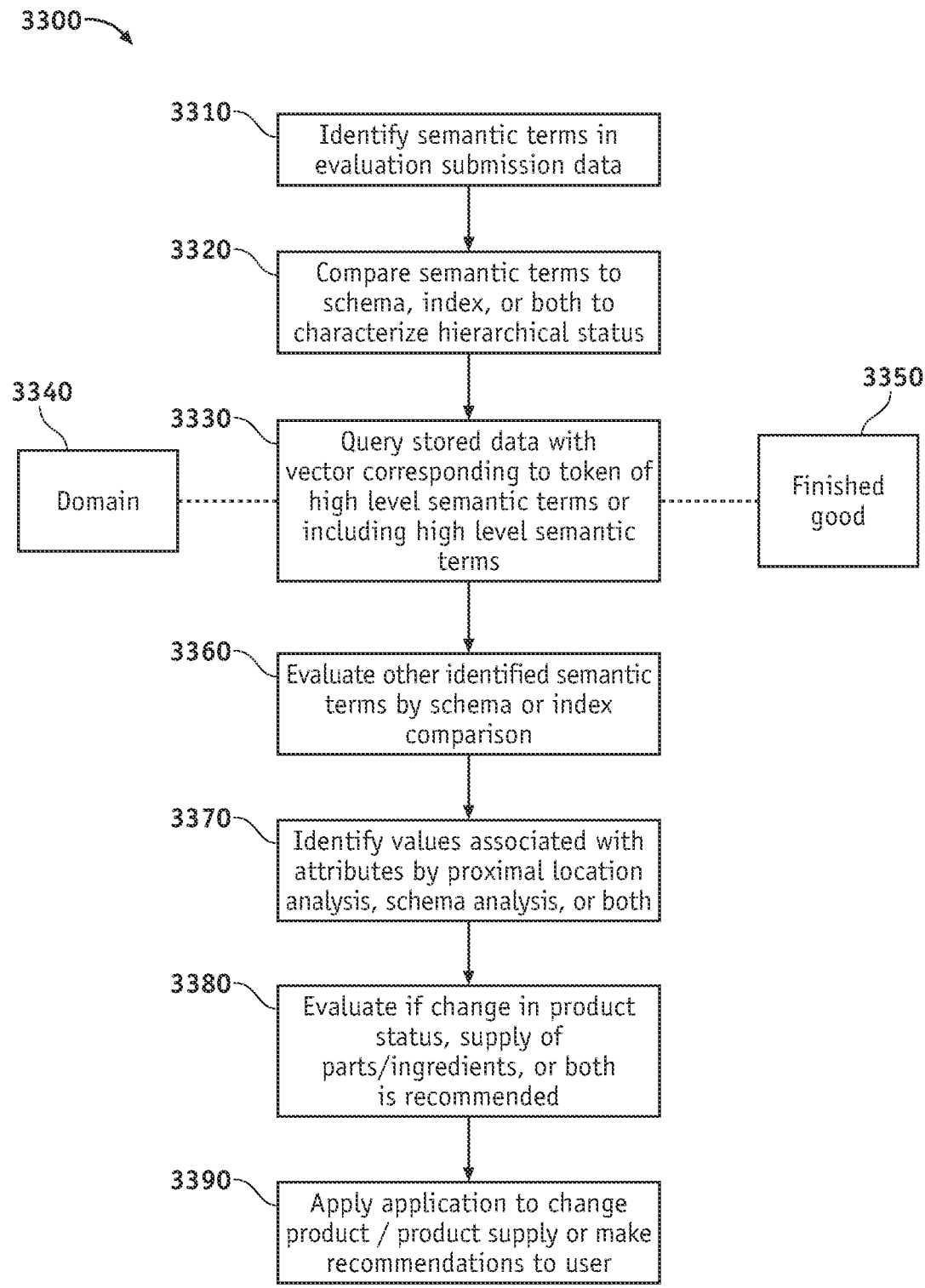

FIG. 33 illustrates the application of prioritization of data types used in system analysis to improve upon system efficiency according to aspects.

Figure 34:
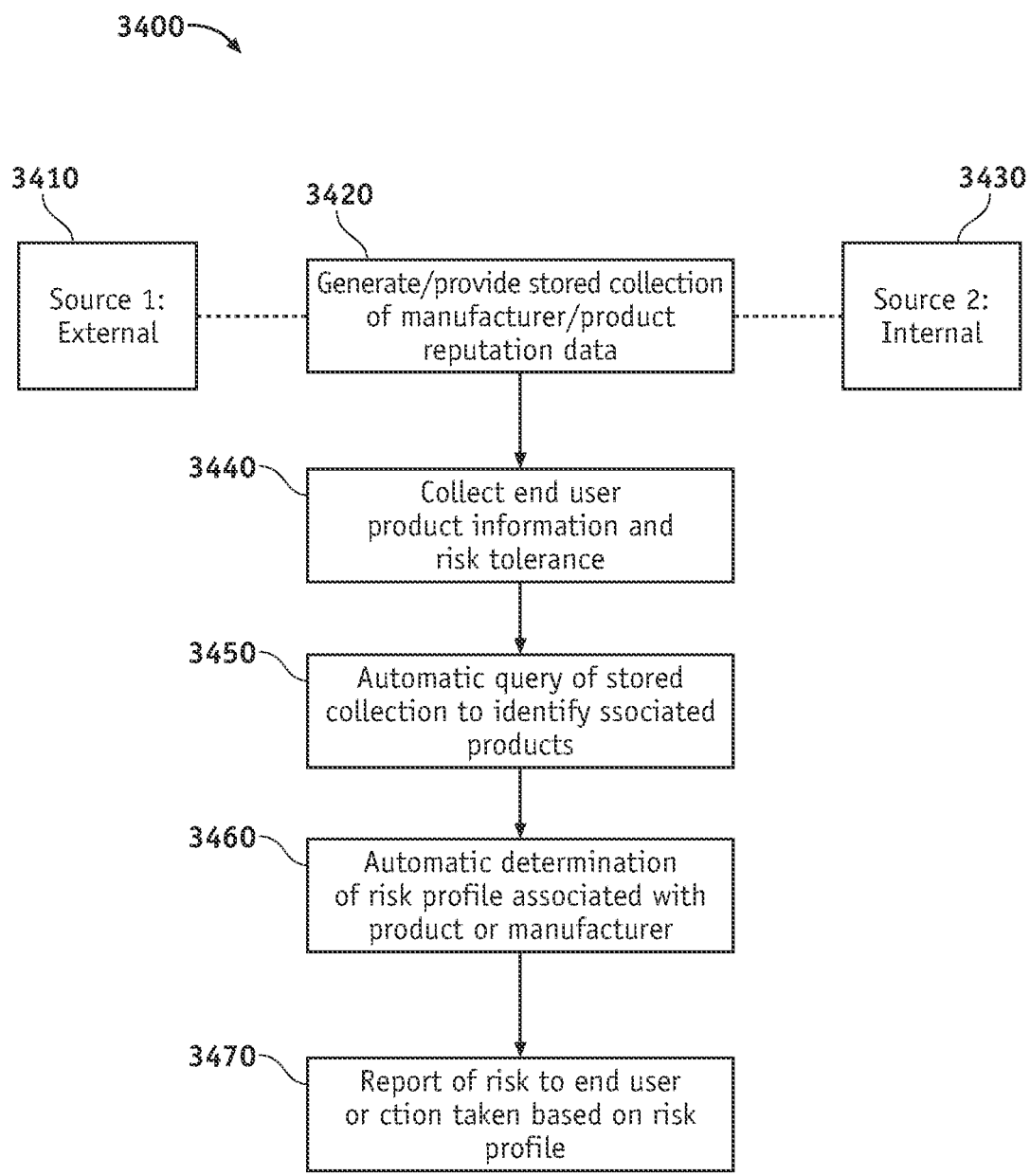

FIG. 34 illustrates the inclusion of reputation data in an evaluation process.

Figure 35:
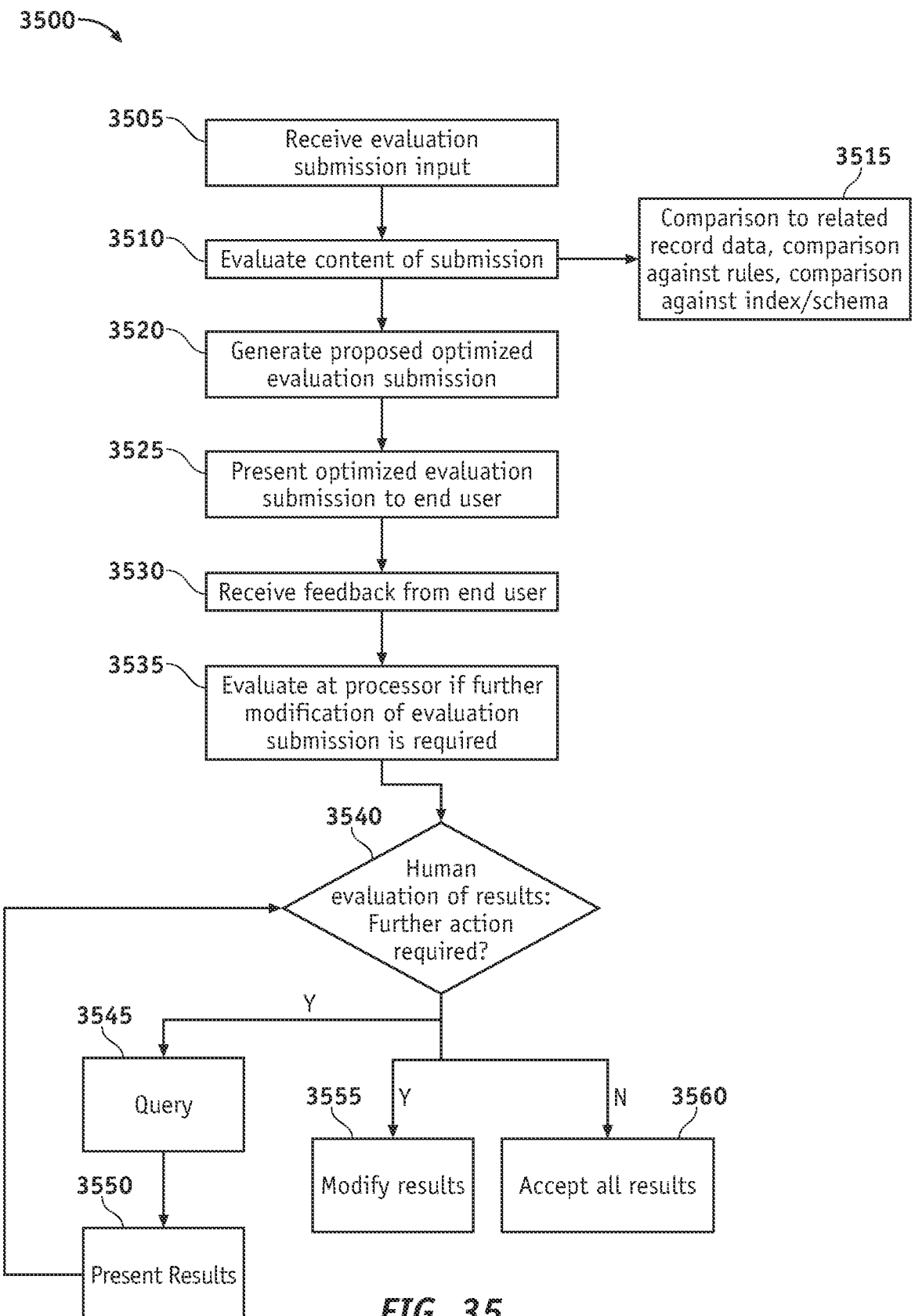

FIG. 35 is a flow chart reflecting the inclusion of, and role of, human input to system/method process(es) in accordance with aspects.

Figure 36:
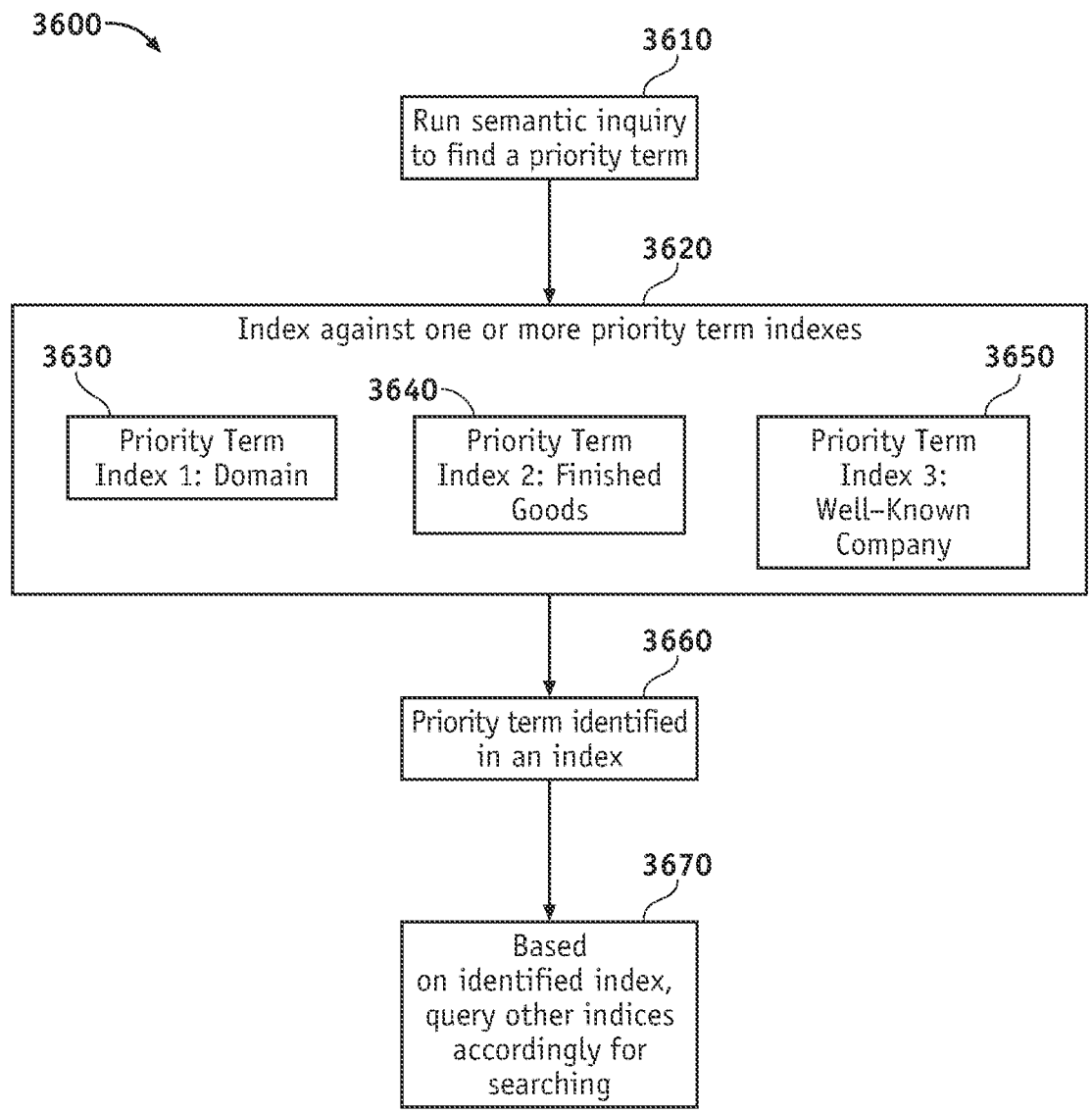

FIG. 36 illustrates the use of system-recognized priority terms to efficiently utilize system resources related to the generation and performance of queries.

DETAILED DESCRIPTION OF THE INVENTION

The invention provided herein provides new computer systems that are particularly adapted to analyze Product-related information to afford people with new ability to be able to identify Product-related risks, Product-related opportunities, and to speed up and to improve upon Product-related activities, such as submission of Regulatory Requirement-related documents to Regulatory Authorities. The invention also provides related methods of using such systems to provide such benefits and to perform other tasks as described herein.

In one aspect, the invention provides a method of evaluating or utilizing a product-related submission/evaluation submission submitted to the computer system by an end user representing a client (Client) (AKA, a Customer/customer), based on one or more comparisons to a product data collection/product information data collection (PIDC).

In aspects, a PIDC comprises, mostly comprises, consists essentially of, or consists of a Supplied Product Information Data Repository (SPIDR) such as an Independent Entity SPIDR (an IESPIDR). In general, aspects described herein in relation to a PIDC are applicable to aspects described herein in connection with a SPIDR/IESPIDR, and vice versa.

Methods of the invention can include the identification of system-identified terms (elements, features), characterization of such terms as lexical submission terms, semantic submission terms, or both (and optionally transforming such terms into or using such terms or parts of such terms to form one or both types of such factors as exemplified herein), and the use of such terms, or search elements generated from such terms, such as electronic tokens or vectors generated from fragments of such terms, extensions of such terms, or collections of such terms, to identify matching datasets in the PIDC. Methods typically further include the evaluation of the evaluation submission against such one or more matching datasets, to, i.a., analyze aspects of the evaluation submission, such as the relationship or potential relationship between the evaluation submission product/submission product and a product associated with a PIDC dataset, the identification of possible/likely errors or omissions in the evaluation submission, the identification of a risk or product status characteristic that should be attributed to the evaluation submission, such as a regulatory requirement or a reputation risk associated with some part of the evaluation, and, optionally, conducting further applications based on such analysis, outputs, or both, such as generating a regulatory authority submission for the evaluation submission product and even submitting such a submission on behalf of a Client. Various related and other aspects of the invention are described in the preceding Summary of the Invention.

In aspects, the invention provides methods of analyzing an evaluation submission (aka, Input, Customer Input, or simply a submission) comprising identifying/recognizing terms or other elements in or associated with the submission (other elements comprising, e.g. and i.a., metadata, extraneous alphanumeric characters in the submission data not contained in a system-identified term, fragments of terms, combinations of extraneous characters, combinations of extraneous characters and term characters, and the like), querying a product information data collection (PIDC) (e.g., an IESPIDR or a DR comprising an IESPIDR) with one or more of such terms/elements or constructs derived from the identified terms, such as one or more electronic tokens comprising combination(s) of such search elements, or vectors derived therefrom, identifying datasets comprising elements that match the search element(s) according to a matching/comparison standard, and comparing or associating identified PIDC datasets with/to the evaluation submission, and optionally performing other functions, such as generating or modifying a proposed regulatory authority submission, e.g., based on the determination of errors/omissions in the evaluation submission based on the comparison with the content of the identified PIDC dataset(s).

In another particular exemplary aspect, the invention provides a method carried out by a computer system comprising providing a computer system comprising (a) a processor component and (b) a memory component, the memory component comprising (I) a product information data collection ("PIDC") comprising PIDC product-related datasets (stored product-related datasets). In aspects, PIDC product-related dataset comprise (A) PIDC alphanumeric records contained in or derived from PIDC source data (the source data coming from one or more sources, as is discussed below), each PIDC dataset relating to a manufactured product, a manufacturer of a manufactured product, or both, typically most relating to Independent Entity (IE) products. In aspects, PIDC dataset(s) comprise one or more PIDC lexical term vectors, a PIDC lexical term vector corresponding to an electronic PIDC lexical term token also contained in or associated with the PIDC dataset. In aspects, each electronic PIDC lexical term token includes a collection of PIDC lexical N-grams. In aspects, PIDC lexical N-gram have the same N-gram size and represent a fragment of (string within) a PIDC lexical term. In aspects, a PIDC lexical term token corresponding to a PIDC lexical term that is longer than the N-gram size the PIDC lexical term token comprises a series of overlapping lexical N-grams, the first overlapping lexical N-gram comprising the first alphanumeric character of the PIDC lexical term and all adjacent alphanumeric characters up to the N-gram size, and each other overlapping lexical N-gram corresponding to the lexical term beginning at the next successive character in a direction from the first alphanumeric character in the PIDC lexical term and containing at least one additional alphanumeric character in the PIDC lexical term, each PIDC lexical term used to generate PIDC lexical tokens being in conformity with system data harmonization standards prior to tokenization, the system data harmonization standards comprising standards for consistent treatment of symbols, punctuation, case, and spacing of digits in data. In particular aspects, wherein the PIDC lexical N-gram size is between 2-5 alphanumeric characters.

For example, if a submission contains the term "A.B. Systems Co.," the processor can recognize the lexical term "Systems" in the submission and two extraneous characters that are spatially related in the submission to "Systems" ("A" and "B") (in this example both spaces and periods are identified by the system as term-boundary-identifiers/delimiters. The lexical token generation protocol/engine then generates lexical N-grams, such as the following lexical N-grams: "ab", "sys", "yst", "ste", "tem", and "ems". In aspects this protocol/engine adds an additional space-filing character ("ab_") to make the first N-gram match the others or protocol requirements (a single N-gram size). In aspects, N-grams are formed from N-grams within lexical terms (e.g., "sy" in "systems") and spatially related extraneous characters (e.g., "b") so as to form an assembled lexical term vector ("bsy"). Combined spatially related extraneous characters also can be referred to as assembled lexical N-grams. It is worth noting that in the context of semantic tokens, semantic N-grams typically correspond to system-identified terms, rather than fragments. However, in other aspects, semantic N-grams comprise a combination of semantic term fragment N-grams (similar to "sys", "yst", and "ste" as described above), assembled semantic term fragment N-grams (similar to "bsy" as described above), and whole-term semantic N-grams (e.g., "system"). In aspects, semantic N-grams comprise extensions of system identified terms, e.g., by adding spatially-related extraneous characters, or by extensions obtained from, e.g., thesaurus index comparison, application of stemming methods that extend a system-identified term (or root thereof), or equivalent method (e.g., in a various of the above-example wherein "system" is recognized as a semantic term (e.g., by comparison of the term to attribute index(es), rather than not being recognized, and, thus, classified as a lexical term, semantic term N-grams associated with the system-recognized term could include "system," "absystem," "systemsco", and "absystemsco."

In aspects, methods of the invention comprise, typically upon the computer system receiving an evaluation submission (e.g., a CPIS) from an end user, (1) automatically, by operation of the processor component, (a) determining if any part of the evaluation submission can include unharmonized data. Unharmonized data is data comprising data that does not comply with preprogrammed system data harmonization standards. In aspects, methods include applying a data harmonization protocol to data that can comprise unharmonized data to generate a data harmonized dataset, typically containing data that is consistent with data in the PIDC in respect of the data harmonization standards. Data harmonization standards can include standards for the consistent treatment of symbols, punctuation, case, and spacing of digits. In aspects, harmonization can be determined by, e.g., application of a neural network that is trained to analyze harmonization of records and to provide recommendations to users, output to engine(s), or both, which leads to harmonization of the data.

In aspects, method comprise applying a term identification protocol to the data harmonized dataset to generate a term-identified evaluation dataset, the term identification protocol identifying (I) system-identified terms, each system-identified term comprising a collection of linked alphanumeric characters of a minimum size set off by term boundaries (delimiters—e.g., periods, spaces, the like) identified by reference to preprogrammed term boundary standards and (II) any present extraneous alphanumeric characters that are not part of any system-identified term. As with other aspects, a variation of this aspect is one performed by neural network(s) that are trained to recognize terms to perform a term recognition step.

In aspects, as suggested above, methods include characterizing system-identified terms in a term-identified evaluation submission dataset as evaluation submission lexical terms or evaluation submission semantic terms by applying an attribute identification protocol (applied by related engine(s)) that comprises comparing uncharacterized system-identified terms against one or more specialized preprogrammed attribute indexes, each specialized preprogrammed attribute index comprising a plurality of curated manufactured product-related terms, product-manufacturer-related terms, or both, to characterize previously uncharacterized system-identified terms that correspond to system-recognized attributes as evaluation submission semantic terms and to otherwise characterize system-identified terms that do not correspond to system-recognized attributes as evaluation submission lexical terms, thereby generating a term-identified evaluation submission dataset. In aspects, multiple indexes are compared against each analyzed system-identified term. In aspects, indexes are linked to a particular type of Record, such as Product type, Product name/identifier, Manufacturer/Supplier identifier, and the like. In aspects, indexes are limited in terms of term content to, e.g., <10,000, <5,000, <2,000, <1,000, <500, <250, <200, <100, or <50 terms. The restriction on sizes of indexes can detectably or significantly ("DOS") enhance the speed of analyzing a term against an index. Accordingly, indexes often are highly curated and validated by human review, machine learning, or a combination thereof. In aspects, such steps are also or alternatively performed by application of neural networks that are trained to recognize terms. Numerous examples of neural network and other AI/ML systems/methods that may be useful in or adaptable to use in this and related aspects of the invention (e.g., character recognition) are known in the art. See, e.g., U.S. Pat. Nos. 11,170,249; 11,017,777; 10,269,120; 10,902,292; 11,295,083; 11,232,299; 10,984,279; 1,078,387; 10,339,440; 10,902,292; 10,373,022; 11,087,163; 11,074,442; 10,565,443; 11,003,862; and 10,817,741.

In aspects, methods comprise applying a lexical term token generation protocol to evaluation submission lexical terms in the term-identified evaluation submission dataset to generate evaluation submission lexical term electronic tokens, each evaluation submission lexical electronic term token comprising a collection of N-grams of a selected size corresponding to (I) term fragment N-grams which consist of fragments of (strings within) evaluation submission lexical terms, (II) combinations of extraneous alphanumeric characters, (III) combinations of one or more extraneous alphanumeric characters and characters contained in evaluation submission lexical terms, or (IV) any combination of (I)-(III) (e.g., as exemplified above). In aspects, methods comprise applying a lexical term vector generation protocol on each corresponding evaluation submission lexical term electronic token to generate a corresponding evaluation submission lexical vector. Vector generation methods are known in the art as are various suitable inputs for vector generation (e.g., terms in a dataset, such as the PIDC, terms in a NL, frequency of occurrence of the term in the submission, PIDC datasets, indices, or a combination thereof, etc.). For example, semantic vector generation methods and principles, and related methods and concepts, such as conversion of unstructured data elements into semantic vectors, useful in or that may be adaptable to aspects of the invention are described in, e.g., US20200125804, U.S. Pat. Nos. 11,113,234, 7,421,433, 10,997,228, 10,599,774, 10,430,446, 10,637,826, 10,635,727, US20200387806, US20210192372, US20210042474, US20220121824, U.S. Pat. Nos. 11,227,004, 7,039,634, 8,868,405, 9,317,609, US20210064820, US20210064820, CN110263323, U.S. Pat. Nos. 11,195,099, 8,606,778, and Semantic Vectors: a Scalable Open Source Package and Online Technology Management Application (Widdows & Ferraro, LREC 2008); D. Widdows and T. Cohen, 2010 IEEE Fourth International Conference on Semantic Computing, 2010, pp. 9-15, doi: 10.1109/ICSC.2010.94; Polajnar and Clark (2014) DOI:10.3115/v1/E14-1025; Widdows and Cohen. Real, Complex, and Binary Semantic Vectors. Quantum Interaction, 2012, Volume 7620. ISBN: 978-3-642-35658-2; Faruqui et al. (2015) arXiv:1411.4166; Ho et al. WWW '16 Companion: Proceedings of the 25th International Conference Companion on World Wide Web. April 2016 Pages 45-46. doi.org/10.1145/2872518.2889392; Vuurens, J. The Hague University Thesis: Proximity of Terms, Texts and Semantic Vectors in Information Retrieval. DOI: 10.4233/uuid:2dcad546-6cbd-45ca-abe7-ffcf613b1376; Wu et al. IWCS '11: Proceedings of the Ninth International Conference on Computational Semantics. January 2011 Pages 295-304; Maas, Andrew L. and A. Ng. "A Probabilistic Model for Semantic Word Vectors." (2010); Shen Wan and R. A. Angryk, "Measuring semantic similarity using wordnet-based context vectors," 2007 IEEE International Conference on Systems, Man and Cybernetics, 2007, pp. 908-913, doi: 10.1109/ICSMC.2007.4413585; Paradi et al. Procedia Computer Science, Volume 20, 2013, Pages 454-459, ISSN 1877-0509, doi.org/10.1016/j.procs.2013.09.302; and Basile et al. Conference: IIR 2010—Proceedings of the First Italian Information Retrieval Workshop, Padua, Italy, Jan. 27-28, 2010. Semantic vectors used in methods/systems (here or elsewhere in this disclosure) can be of any suitable type. E.g., in aspects, a semantic vector can be a trainable semantic vector (see, e.g., U.S. Pat. No. 8,024,331). Semantic vectors can represent a single word or semantic element or, in aspects, can represent larger semantic elements, such as word combinations, sets, clauses, and the like (e.g., using techniques such as those described in Summers-Stay et al. Biologically Inspired Cognitive Architectures, Volume 25, 2018, Pages 113-118, ISSN 2212-683X. doi.org/10.1016/j.bica.2018.07.002 or otherwise known in the art). Methods for comparison of semantic vectors including, e.g., semantic vector cosine similarity, also are known in the art (see, e.g., Sitikhu et al. (2019). arXiv:1910.09129 and Rahutomo et al. October 2012. Conference: The 7th International Student Conference on Advanced Science and Technology ICAST 2012At: Seoul, South Korea). Vectors, such as semantic vectors, can have any suitable degree of dimensionality. In aspects, some, most, generally all, or all vectors, e.g., semantic vectors comprise ≥2 dimensions (e.g., ≥10, ≥12, ≥24, ≥30, ≥50, or ≥100 (e.g., ≥128 dimensions, such as ≥150 dimensions, ≥200 dimensions, or ≥250 dimensions, such as 256 dimensions, ≥500 dimensions, ≥1000 dimensions, ≥5000 dimensions, ≥10,000 dimensions, ≥25,000 dimensions, ≥50,000 dimensions or even, in aspects, ≥100,000 dimensions etc., or any known and suitable type of high dimensional vector). In aspects, some, most, generally all, or all vectors of a type (or of all types), employed in methods/by systems are associated with ≤10,000 dimensions, such as 2-5,000, 2-2,000, 2-1,000, or 2-600 dimensions. In aspects, some, most, generally all, or all semantic vectors are produced by one or more neural networks of the system or associated with the system. In aspects, neural networks/models such as word2vec, Glove, BERT, ALBERTa, GPT-2, GPT-3, and the like are used in the generation of such semantic vectors. In aspects, a similarity model, e.g., performed by an NN, is used to generate semantic vectors, using known suitable methods, such as triplet loss method(s) (using anchors, distances, and back propagation methods to build a semantic vector space as known in the art). In aspects, such NNs are trained using a specialized training set corresponding to, e.g., the type of specialized corpora described herein for product-related/relevant information. Methods can further comprise creating a vector index for the PIDC or elements of the PIDC using known methods and generation of query vectors for querying such a vector index to identify vectors with similarity meeting a standard or otherwise determined by system element(s) to be sufficiently similar to provide a meaningful "hit" in the methods described herein. In aspects, NNs also can be used to optimize queries and to generate alternative queries from queries (e.g., by training an NN to perform such tasks).

In aspects, methods also comprise, by automatic operation of the processor component, performing a query of PIDC lexical vectors comprising (a) selecting an evaluation submission lexical vector and measuring the cosine distance between the evaluation submission lexical vector and each PIDC lexical vector, (b) identifying PIDC lexical vectors having a cosine distance that meets or exceeds a preprogrammed lexical vector similarity threshold as similar lexical vectors, and (c) repeating steps (a) and (b) with a plurality of evaluation submission lexical vectors to generate a collection of similar lexical vectors and by automatic operation of the processor component, comparing recognized terms, alphanumeric characters, records, or a combination thereof, contained in a PIDC dataset associated with a similar lexical vector identified by the query to one or more evaluation submission lexical terms or evaluation submission extraneous alphanumeric characters associated with the evaluation submission lexical vector used to identify a similar lexical vector according to a lexical term comparison protocol and thereby perform one or more analyses and provide one or more outputs, which can be data, alerts, reports, modification of records, or operation of other applications (e.g., the automatic generation of a regulatory authority submission). In aspects, the analysis/output comprises (a) assessing whether there is an error or omission in the one or more evaluation submission lexical terms (e.g., by the number of terms contained in the similar/related identified PIDC datasets not found in the evaluation submission), (b) identify a relationship or potential relationship between the one or more evaluation submission lexical terms and such similar lexical vector-associated datasets (e.g., recognizing that a Component in the evaluation submission and a Component reflected in a PIDC dataset are the same and thereby applying a metadata linkage between the records with respect to the Component or associated FG/Ingredient, etc.), (c) identifying one or more product-related or manufacturer-related terms that are related to the one or more evaluation submission lexical terms (e.g., determining that "A.B. Systems" is also known as "Alpha Beta Systems"), or (d) performing any combination of steps (a)-(c). In aspects, methods further comprise, by automatic operation of the processor component, generating an updated evaluation submission by (a) correcting identified errors, correcting identified omissions, or both; (b) associating the updated evaluation submission with one or more PIDC datasets; (c) making a change in one or more aspects of the status of the product or supply of product parts or ingredients or recommending one or both thereof to the end user; or (d) performing any combination of steps (a)-(c).

In aspects, an analysis step of a method such as described above or elsewhere is mostly, generally, or only performed using lexical vectors/search elements. In aspects, an analysis step of a method is performed using 2, 3, 4, 5, or more lexical vectors/search elements. In aspects, lexical search elements/vectors are mostly or entirely prioritized, and used first in queries, accorded greater weight with respect to query results, or both.

In aspects, methods also comprise, automatically, by operation of the processor component, evaluate one or more system-identified terms by application of a preprogrammed element priority assessment protocol/engine, wherein, e.g., the element priority assessment protocol associates each evaluated system-identified term with a priority score.

In aspects, the element priority assessment protocol/engine also comprises applying a positive priority score factor to evaluation submission lexical terms that increases the priority score of lexical search terms. In aspects, a first query of the PIDC dataset is performed using a search element comprising or derived from a system-identified term associated with a priority score that is (a) higher than a preprogrammed priority score threshold or (b) has the highest priority score calculated; and identifying PIDC datasets comprising one or more search element similar terms identified by the processor as having sufficient similarity as the search element according to one or more preprogrammed element similarity assessment standards. In aspects, the element priority assessment protocol comprises applying a positive priority score factor to evaluation submission lexical terms that (a) are above a preprogrammed size, (b) occur only once or at a frequency below a preprogrammed level in the evaluation submission or a discrete part of the evaluation submission (e.g., a dataset, a dataset generated from a particular document, and the like), (c) are spatially located at the start of a dataset or document in the evaluation submission source data, or (d) any combination of (a)-(c). In aspects, the element priority assessment protocol comprises applying a positive priority score factor to evaluation submission semantic terms identified in one or more indexes associated with attributes that typically result in more efficient queries, such as a finished good index, a domain index, or a combination thereof. In aspects, the method comprises obtaining a desired output from the end user and the element priority assessment protocol comprises applying a positive priority score factor to system-identified terms associated with the desired output. In aspects, the method comprises determining the hierarchy of evaluation submission semantic terms by comparison of a collection of evaluation submission semantic terms against one or more preprogrammed system dataset schemas and applying a positive priority score factor to evaluation submission semantic terms associated with a higher hierarchy in one or more system dataset schemas. In aspects, the method comprises performing two or more queries of PIDC datasets, each successive query being performed with a search element comprising or derived from a system-identified term that (a) has a priority score higher than a preprogrammed priority score threshold or (b) has the highest priority score calculated of any system-identified term that has not already acted as a basis for a query. In aspects, the method comprises evaluating identified PIDC datasets against a preprogrammed query quality standard and stopping queries once a sufficient number of PIDC datasets are identified to meet/exceed a preprogrammed query quality standard.

In aspects, a method also comprises identifying one or more evaluation submission semantic terms in system-identified terms and, by automatic operation of the processor component, recognizing if there is an association or expected association between an evaluation submission semantic term and another system-identified term or extraneous alphanumeric character to identify one or more evaluation submission element sets in the evaluation submission and by automatic operation of the processor component, performing one or more queries of PIDC datasets, wherein the first query of the PIDC dataset is performed using a search element comprising or derived from one or more evaluation submission element sets to identify PIDC datasets associated with a similar element set or search element. In aspects, by automatic operation of the processor component, the method comprises comparing recognized terms, alphanumeric characters, records, or a combination thereof, contained in a PIDC dataset associated with a combination of elements identified by the query to corresponding system-identified terms, extraneous alphanumeric characters, records, or a combination thereof in the evaluation submission to (a) assess whether there is an error or omission in the one or more evaluation submission terms or records, (b) identify a relationship or potential relationship between evaluation submission and one or more PIDC datasets identified in the query, (c) identify one or more product-related or manufacturer-related terms that are related to the system identified term in or used to generate the search element, or (d) perform any combination of steps (a)-(c). In aspects, the method comprises (1) the processor component automatically evaluating generating a putative element set comprising an evaluation submission semantic term and one or more other system-identified terms, one or more extraneous alphanumeric characters, or both, which are spatially related or otherwise associated with the evaluation submission semantic term; (2) comparing the putative element set against one or more system record schemas or system dataset schemas contained in the memory component to determine if the similarity of the putative element set and the one or more system dataset schemas meets or exceeds a preprogrammed similarity threshold; and (3) identifying putative element sets that meet or exceed the preprogrammed similar threshold as element sets. In aspects, the element set comprises one or more expected attribute-value pairs. In aspects, the element set comprises a collection of semantic terms relating to a system-recognized category of semantic terms, such as manufacturer identity, product identity, or regulatory status identity. For example, a category/categorized collection of semantic terms/semantic N-grams named "Party" or "Customer" or "Client" can comprise semantic terms corresponding to Client Name, an Entity-identifying term (such as a corporate ID, e.g., an IRS EIN number, FDA registration number, or the like) domain of interest to Client, and region of activity (e.g., North America). A "Part" collection/category can comprise semantic terms/n-grams corresponding to Component Name, Component-identification field (e.g., a part ID), material composition data (Ingredient(s)), and a description. A "Submission" category/collection can comprise semantic-terms/records/N-grams relating to applicable regulation, regulatory declaration/sentiment or other status, regulation type, and the like. Tokens and vectors can be generated from such system-identified collection of semantic terms and used for queries, providing DOS more efficient and effective results in aspects. In aspects, use of search elements from such combinations of semantic terms/n-grams are prioritized, as described above, in terms of order of query, weighting of query result, or both. In aspects, the method comprises determining the hierarchical status of two or more semantic terms by comparison of the semantic terms against one or more system dataset schemas and performing the query based on a search element that comprises the hierarchical status of the two or more semantic terms.

In aspects, methods also can comprise, by automatic operation of the processor generating a modified evaluation dataset from the evaluation dataset by (a) one generating one or more putative hierarchical element relationships by generating a combination of an evaluation submission semantic term and one or more other system-identified terms, one or more extraneous alphanumeric characters, or both, which are spatially related or otherwise associated with the evaluation submission semantic term; (b) comparing the putative element set against one or more system dataset schemas contained in the memory component to determine if the similarity of the putative and the one hierarchical element relationship and or more system dataset schemas meets or exceeds a preprogrammed similarity threshold; and (c) identifying a putative hierarchical element relationships that meet or exceed the preprogrammed similar threshold as an evaluation submission hierarchical element relationship. In aspects, methods comprise, by automatic operation of the processor component, performing one or more queries of PIDC datasets, wherein the first query of the PIDC dataset is performed using a search element comprising or derived from one or more evaluation submission element sets to identify PIDC datasets associated with a similar element set or search element and by automatic operation of the processor component, comparing one or more system recognized PIDC hierarchical relationships between elements of a related PIDC dataset to an evaluation submission hierarchical element relationship to determine if the PIDC hierarchical element relationship and the evaluation submission hierarchical element relationship meet or exceed a similar threshold to identify one or more similar hierarchy PIDC datasets.

In aspects methods also can include, by automatic operation of the processor component, (a) evaluating any records, terms, or other elements contained in one or more PIDC datasets identified in earlier steps and that the computer system identifies as being associated with product risk/status information, manufacturer risk/status information, or both, to assess whether the risk associated with the product reflected in the evaluation submission meets a preprogrammed risk threshold, (b) if the processor determines that the evaluation submission meets or exceeds the risk threshold, and (c) reporting the risk to the end user or automatically performing one or more actions to reduce or eliminate the risk. In aspects, a risk is associated with the regulatory status of the evaluation submission product and the method comprises automatically generating a regulatory authority submission associated with the evaluation product for submission to a regulatory authority. In aspects, a method comprises automatically submitting the generated regulatory authority submission to a regulatory authority. In aspects, the risk is associated with the reputation of one or more parts/components of the evaluation submission product, one or more ingredients of the evaluation submission product, or one or more product manufactures in the client product manufacturer's supply chain the method comprises the processor automatically reporting alternative supply options to the end user.

A method carried out by a computer system provided by the invention also can include (1) providing a computer system comprising a PIDC as described above and automatically, by operation of the processor component, (a) determining if any part of the evaluation submission can include unharmonized data, unharmonized data being data comprising data that does not comply with the system data harmonization standards, and applying a data harmonization protocol to any such data that can comprise unharmonized data to generate a data harmonized dataset containing data that is consistent with data in the PIDC in respect to the data harmonization standards in terms of treatment of symbols, punctuation, case, and spacing of digits; (b) applying a term identification protocol to the data harmonized dataset to generate a term-identified evaluation dataset, the term identification protocol identifying (I) system-identified terms, each system-identified term comprising a collection of linked alphanumeric characters of a minimum size set off by term boundaries identified by reference to preprogrammed term boundary standards and (II) any present extraneous alphanumeric characters that are not part of any system-identified term; (c) characterizing system-identified terms in a term-identified evaluation submission dataset as evaluation submission lexical terms or evaluation submission semantic terms by applying an attribute identification protocol that comprises comparing uncharacterized system-identified terms against one or more specialized preprogrammed attribute indexes, each specialized preprogrammed attribute index comprising a plurality of curated manufactured product-related terms, product-manufacturer-related terms, or both, to characterize previously uncharacterized system-identified terms that correspond to system-recognized attributes as evaluation submission semantic terms and to otherwise characterize system-identified terms that do not correspond to system-recognized attributes as evaluation submission lexical terms, thereby generating a term-identified evaluation submission dataset, (d) applying the semantic term token generation protocol to the term-identified evaluation submission dataset to generate evaluation submission semantic term electronic tokens, each evaluation submission semantic electronic term token comprising one or more evaluation submission semantic terms, (e) applying a semantic term vector generation protocol on each corresponding evaluation submission semantic term electronic token to generate evaluation submission semantic term vectors; (f) applying a lexical term token generation protocol to evaluation submission lexical terms in the term-identified evaluation submission dataset to generate evaluation submission term electronic lexical term, each evaluation submission lexical electronic term token comprising a collection of N-grams of a selected size corresponding to (I) term fragment N-grams which consist of fragments of (strings within) evaluation submission lexical terms, (II) combinations of extraneous alphanumeric characters, (III) combinations of one or more extraneous alphanumeric characters and characters contained in evaluation submission lexical terms, or (IV) any combination of (I)-(III), and (g) applying a lexical term vector generation protocol on each corresponding evaluation submission lexical term electronic token to generate a corresponding evaluation submission lexical vector; (2) by automatic operation of the processor component, performing a query of PIDC lexical vectors comprising (a) selecting an evaluation submission lexical vector and measuring the cosine distance between the evaluation submission lexical vector and each PIDC lexical vector, (b) identifying PIDC lexical vectors having a cosine distance that meets or exceeds a preprogrammed lexical vector similarity threshold as similar lexical vectors, and (c) repeating steps (a) and (b) with a plurality of evaluation submission lexical vectors to generate a collection of similar lexical vectors; (3) by automatic operation of the processor component, comparing recognized terms, alphanumeric characters, records, or a combination thereof, contained in a PIDC dataset associated with a similar lexical vector identified by the query of step (2), to one or more evaluation submission lexical terms or evaluation submission extraneous alphanumeric characters associated with the evaluation submission lexical vector used to identify the similar lexical vector according to a lexical term comparison protocol to thereby (a) assess whether there is an error or omission in the one or more evaluation submission lexical terms, (b) identify a relationship or potential relationship between the one or more evaluation submission lexical terms and such similar lexical vector-associated datasets, (c) identify one or more product-related or manufacturer-related terms that are related to the one or more evaluation submission lexical terms, or (d) perform any combination of steps (a)-(c); (4) by automatic operation of the processor component, performing a query of PIDC semantic vectors comprising (a) selecting an evaluation submission semantic vector and measuring the cosine distance between the evaluation submission semantic vector and each PIDC semantic vector, (b) identifying any PIDC semantic vectors having a cosine distance that meets or exceeds a preprogrammed semantic vector similarity threshold as similar semantic vectors, and (c) repeating steps (a) and (b) with a plurality of evaluation submission semantic vectors to generate a collection of similar semantic vectors; (5) by automatic operation of the processor component, performing a semantic comparison of terms contained in PIDC datasets that are associated with similar semantic vectors generated by the query of step (4) to one or more evaluation submission semantic terms associated with the evaluation submission semantic vector that identified the similar semantic vectors according to a semantic term comparison protocol so as to (a) determine if there is a risk of an error or omission in the evaluation submission, (b) assess whether a change in one or more aspects of the status of the product, the supply of product parts or ingredients, or both, which the computer system determines is likely to reduce a supply risk issue, improve a supply chain, or both, (c) determine if there is a relationship or potential relationship between an aspect of the product described in the evaluation submission and an aspect of a product in the PIDC dataset, or (d) perform any combination of steps (a)-(c); and (6) by automatic operation of the processor component, generating an updated evaluation submission by (a) correcting identified errors, correcting identified omissions, or both; (b) associating the updated evaluation submission with one or more PIDC datasets; (c) making a change in one or more aspects of the status of the product or supply of product parts or ingredients or recommending one or both thereof to the end user; or (d) performing any combination of steps (a)-(c).

In aspects, a lexical term token generation protocol comprises (a) generating a series of lexical N-grams from one or more lexical terms, beginning by generating a first N-gram of the series starting at the first alphanumeric digit of the evaluation submission lexical term and generating a successive N-gram starting at each successive digit of the evaluation submission lexical term up to a final N-gram of the series starting at the last alphanumeric element of the evaluation submission lexical term that provides an N-gram of the term having the N-gram size, and (3) adding the generated series of overlapping evaluation submission lexical term fragment N-grams to an evaluation submission lexical vector. E.g., as described above, if the N-gram size is 3, "A.B. Systems" can, through such a protocol generate a collection of vectors as described above (e.g., "ab_", "sys", "yst", etc.). In aspects, a lexical term token generation protocol also comprises (a) concatenating adjacent extraneous alphanumeric characters to generate one or more assembled character N-grams and adding such assembled character N-grams to an evaluation submission lexical token, (b) adding one or more space-filling characters to any collection of adjacent extraneous alphanumeric characters that are less than the N-gram size to generate one or more assembled character N-grams and adding such assembled character N-grams to an evaluation submission lexical token, (c) combining extraneous alphanumeric characters with characters from an adjacent lexical term to generate one or more assembled character N-grams and adding such assembled character N-grams to an evaluation submission lexical token, or (d) performing any combination of (a)-(c). E.g., as exemplified, combining the characters "A" and "B" to for the N-gram "ab" or "ab_".

In aspects, methods comprise prompting an individual seeking to make a submission to the computer system to submit evidence of authorization to use the system as an end user on behalf of a client product manufacturer, (2) by operation of the processor component, upon receipt of a submission of authorization evidence, automatically using an authorization protocol to evaluate whether the submission of evidence of authorization meets with one or more preprogrammed authorization standards, and (3) if the computer system determines that the authority of the individual to act as an authorized end user has been established, automatically allowing the authorized user associated to submit evaluation input to the system (aspect 6).

In aspects, for one or more system-identified terms in a PIDC dataset, an evaluation submission, or both, or for a PIDC dataset or an evaluation submission overall, (1) the computer system automatically assigns a credibility score based on the presence of a system-identified term, the credibility score is determined by a credibility score generation protocol that evaluates (a) an identified source of the system-identified term, wherein the computer system associates the identified source with a credibility score or credibility score factor, (b) the inclusion of the term in an attribute index of the system wherein the computer system associates the attribute in the index with a credibility score or credibility score factor, (c) the number of terms in the evaluation submission that are contained in one or more attribute indices of the computer system, (d) the degree of matching of two or more terms to a preprogrammed dataset schema of the system, (e) system reputation data associated with a product, manufacturer, or both, contained in PIDC datasets; (f) the number of similar PIDC datasets identified by querying PIDC datasets with the evaluation submission lexical vectors, evaluation submission semantic vectors, or both, (g) the degree of similarity of PIDC datasets identified by querying PIDC datasets with the evaluation submission lexical vectors, evaluation submission semantic vectors, or both, or (h) any combination of (a)-(g), and (2) upon determining the credibility score the computer system automatically (a) reporting the credibility score to the end user, (b) using the credibility score in determining whether to modify an evaluation submission, or (c) performing both steps (a) and (b).

In aspects, the invention provides the method wherein the method comprises the processor component automatically (1) evaluating the validity of one or more evaluation submission lexical terms by application of a lexical term validity protocol that comprises (a) determining (I) degree of repetition of the term in an evaluation submission, (II) the placement of the term in relation to a semantic term, (III) the degree of similarity of PIDC lexical terms in datasets identified in queries of the PIDC performed with evaluation submission lexical vectors, evaluation submission semantic vector, or both, (IV) the number of similar PIDC lexical terms in datasets identified in queries of the PIDC performed with evaluation submission lexical vectors, evaluation submission semantic vector, or both, or (V) any combination of (I)-(IV), (2) measuring an impact on the assessment of lexical term validity arising from any one or more determinations made in step (1) by comparing the one or more determinations to one or more preprogrammed validity assessment standards, (3) determining if the overall assessment of validity for each evaluated evaluation submission lexical terms; (4) identifying any invalid evaluation submission lexical terms; and (5) performing one or more steps of the method or re-performing one or more steps of the method only using evaluation submission lexical terms that the computer system determines to be valid.

In aspects, a method comprises (1) the end user submitting unstructured data to the computer system, (2) the computer system, upon detecting submission of the unstructured data in the evaluation submission, automatically identifying alphanumeric content contained in the unstructured data, and (3) using the identified alphanumeric data to generate evaluation submission lexical vectors and evaluation submission semantic vectors. In aspects, unstructured data comprises image data and the method comprises comparing detected images against one or more system image libraries to identify any images contained in the image libraries and adding one or more alphanumeric attributes to the evaluation submission in association with any identified images contained in an image library to generate one or more evaluation submission semantic terms.

In aspects, a method can also comprise (1) the computer system automatically comparing groups of one or more system-identified terms in unstructured data to one or more system dataset schemas, (2) evaluating the degree to which the one or more groups of system-identified terms in the unstructured data comply with a part of dataset schema, identify the hierarchical status of one or more system-identified terms contained in the unstructured data, and (3) modify the evaluation submission dataset by adding information reflecting the hierarchical status of the one or more system-identified terms in the unstructured data that the computer system determines exhibit a sufficient match to one or more system dataset schemas based on a preprogrammed schema comparison protocol.

In aspects, a method can also comprise the computer system automatically applying a prioritization score to one or more evaluation submission semantic vectors, one or more evaluation submission lexical vectors, or both, and prioritizing querying the PIDC with a semantic vector with a higher prioritization score, a lexical vector with a higher prioritization score, or both, and evaluating PIDC datasets identified with such queries before performing other queries of PIDC datasets with other semantic vectors or lexical vectors.

In aspects, a method can also comprise the system automatically determining the hierarchical status of a semantic term as described elsewhere and assigning a semantic term associated with a higher hierarchical status with a higher prioritization score.

In aspects, methods also comprise applying a higher prioritization score to one or more evaluation submission semantic term vectors generated from evaluation submission semantic term tokens comprising one or more semantic terms associated with (1) an FG attribute, (b) a product domain attribute, (c) an ingredient attribute associated with an ingredient that is subject to system-recognized regulatory requirements, or (4) a combination of any one of (1)-(3).

In aspects, methods also comprise the processor analyzing a data harmonized evaluation dataset for the presence of undesirable duplicate characters or undesirable duplicate system-identified according to preprogrammed data deduplication standards and removing any identified undesirable duplicate characters or identified undesirable system-identified terms according to a data deduplication protocol to generate a deduplicated dataset and subjecting the deduplicated dataset to further processing to generate semantic vectors and lexical vectors therefrom. In aspects, deduplication is repeated one or more times. In aspects, counts of frequency are made before application of deduplication step(s).

In aspects, PIDC source data is derived from at least two distinct data collections, the two distinct data collections comprising (1) a data collection derived from a private collection of manufactured product and associated product manufacturer data submissions made by data submitters, each data submitter not being affiliated with the system owner and most of the product manufacturers associated with data submitters not being affiliated with or in a supply chain with the product manufacturer associated with the evaluation submission and (2) at least one publicly accessible data collection comprising manufactured product-related records, product manufacturer-related records, or both. In aspects, PIDC source data is a credibility factor. E.g., data derived from a SEC filing, another regulatory submission, or from a government generated website might be given a higher credibility than data derived from general internet-identified source data. That said, in aspects, at least one publicly accessible data collection comprises internet information generally. In aspects, the internet information is a collection of internet information that is product/product manufacturer related (e.g., a collection of web page hits from a general internet search). In aspects, the publicly accessible data collection(s) comprises (1) a proprietary publicly accessible data collection, (2) a government generated data collection, (3) a curated data collection generated from internet information, or (4) a combination of any thereof.

In the aspects, methods also can comprise obtaining one or more desired outputs or output applications from the end user priority to performing queries of PIDC datasets and factoring the desired output or output applications into (1) the prioritization of lexical vectors, semantic vectors, or both used to query PIDC datasets, (2) limiting the lexical vectors, semantic vectors, or both used to query PIDC datasets, (3) the evaluation of the relevance of PIDC dataset records associated with similar lexical vectors or similar semantic vectors, (4) the type of output reported or applications performed by the computer system based on the analysis of PIDC datasets identified by PIDC dataset queries, or (5) any combination of (1)-(4).

In aspects, methods also can comprise the processor component automatically (1) querying one or more lemmatization indexes based on one or more evaluation submission semantic terms, (2) adding one or more identified lemmas identified by querying the one or more lemmatization indexes to an evaluation submission semantic term token to generate a new evaluation submission semantic term token or a modified evaluation submission semantic term token, and (3) generating evaluation submission semantic term vectors from a new evaluation submission semantic term token, a modified evaluation submission semantic term token, or both, and (4) performing a query of PIDC semantic term vectors using one or more evaluation submission semantic vectors generated in step (3).

In aspects, methods also can comprise the processor component automatically (1) comparing evaluation submission semantic terms to one or more related term indexes, system dataset schemas, or both, to identify two or more evaluation submission semantic terms that fall within a preprogrammed semantic term category and (2) generating an evaluation submission multiple semantic N-gram token comprising the two or more evaluation submission semantic terms that fall with the semantic term category, (3) generating a evaluation submission multiple semantic N-gram vector from the token generated in step (2), and (4) performing a query of PIDC semantic records with an evaluation submission multiple semantic N-gram vector.

In aspects, preprogrammed semantic term categories used in methods or employed by system components also can comprise (1) product identifying information, (2) part identifying information, (e) manufacturer identifying information, (4) product status identifying information, or (5) a combination of any of (1)-(5).

In aspects, some, most, generally all, or all PIDC datasets also comprise multiple N-gram semantic vectors corresponding to a collection of two or more semantic terms in a semantic term category in a PIDC dataset and (2) the method comprises the processor component (a) automatically prioritizing performing a query of PIDC multiple N-gram semantic vectors with one or more evaluation submission multiple N-gram vectors, (b) automatically according greater weight to similar vectors that are PIDC multiple N-gram semantic vectors identified by querying with an evaluation submission multiple N-gram semantic vector, or (c) automatically performs both step (a) and step (b).

In aspects, the method comprises the processor component automatically performing multiple queries of PIDC datasets, each query performed with two or more distinct evaluation submission lexical vectors, two or more distinct evaluation submission semantic vectors, or a combination thereof, and evaluating all of the PIDC datasets associated with similar vectors identified through the multiple queries.

In aspects, the method comprises the processor component identifying one or more values contained in semantic terms or lexical terms that are associated with one or more identified semantic terms by comparing a collection of two or more nearby semantic terms against one or more system dataset schemas.

In aspects, the method comprises the processor automatically (1) identifying a first attribute and a second attribute in the evaluation submission and determining whether the first attribute and second attribute have a hierarchical relationship by comparing the first and second attribute to a system record schema, system dataset schema, or both and determining that the similarity of a proposed relationship of the first attribute and second attribute exhibits a similarity to a system record schema or system dataset schema that meets or exceeds a preprogrammed similarity threshold, the first attribute having a higher level in the hierarchy than the second attribute; (2) identifying a first value associated with the first attribute and a second value associated with the second attribute, by comparing the first value and first attribute to a system record schema and determining that the relationship between the first attribute and first value and second attribute and second value meet or exceed a preprogrammed similarity threshold; (3) using the hierarchical relationship between the first attribute and the second attribute and the first value and the second value to determine a third value, associated with the second attribute, the product, or both, such as the computer system automatically identifying a part attribute (first attribute) and an ingredient contained in each part (a second attribute), a number of parts value (a first value), an ingredient concentration value (a second value), and deriving the total amount of the ingredient in the product (the third value) therefrom (aspect 30).

In other aspects, methods and systems comprise querying Customer Input one or more times against one or more Data Repositories (DRs) to identify similar records in the DRs and using the information from such records to perform one of the various methods described herein (e.g., identifying missing/incorrect information in Customer Data or preparing a prediction or risk assessment relating to possible missing/wrong information). In aspects, such DR(s) comprise confidential Supplier Product Related Records (SPRRs or simply PRRs). In aspects, methods and systems also or alternatively comprise querying Customer Input against Publicly Accessible Data (PAD) relating to Customer Product(s)/Profiles, Supplied Product(s), or both. In aspects, methods/systems (sometimes referred to as "MOTI/SOTI") further also comprise querying Customer Input or Enhanced Customer Input (e.g., Customer Input enhanced by querying a Supplier Product Information Data Repository (SPIDR)) and receiving information relevant to the Customer Input, e.g., information obtained from a Regulatory Information DR (a RIDR)). The resulting analysis obtained by such methods/engine(s) can be used for further applications, such as facilitating connections or contracts between Customer(s) and Supplier(s), providing an analysis of Customer Product Information, or even preparing Regulatory Authority (RA) Submissions.

Any of these methods or other methods described in the Summary, the Listing of Exemplary Aspects, or described with respect to the Figures below, can be combined with other aspect(s) described in this Detailed Description.

In aspects, the invention described herein provides i.a. new methods and Systems for receiving and typically also analyzing Customer Product-related inputs (CPISs) and performing one or more Functions based on a CPIS (ORTA an new product record information submission (NPRIS)) and PRRs in a Supplier Product Information Data Repository ("SPIDR") (e.g., an Independent Entity ("IE") SPIDR ("IESPIDR")) contained in the SOTI.

Typically, a SPIDR contained/used in a method/system will be an IESPIDR. In general, any method/System described herein with respect to a SPIDR can be performed with an IESPIDR and vice versa and the disclosure of a method/System with respect to one such type of DR provides implicit support for the other. Aspects related to IESPIDRs typically require a higher level of inventiveness in view of a typically larger number of unstructured Records involved and the complexity of Supplier information associated with processing information from several IEs.

A SPIDR, such as an IESPIDR, typically comprises numerous Supplier Product Related Records (SPRRs), which PRRs typically are also associated with numerous Suppliers (typically most, generally all, substantially all, or all the Suppliers associated with SPIDR PRRs are IEs). In aspects where the inventive Systems/Methods are adapted also to the supply of services, a corresponding DR that can be characterized as a Supplier Data Repository ("SDR"), and the PRRs of the SDR can comprise information about Supplier services. For sake of brevity, Systems/Methods are described herein in relation to Products and SPIDRs. Skilled persons, however, will understand that the methods/systems described herein also can be applied to services or combinations of service/product information.

SPIDRs of Systems/Methods (SOTI/MOTI) can be relatively large and complex DRs. In exemplary aspects, an IESPIDR comprises ≥~100, ≥~250, ≥~500, ≥~1000, ≥~2500, ≥~5000, ≥~10,000, ≥~20,000, ≥~50,000, ≥~100,000, ≥~250,000, ≥~500,000, or ≥~1,000,000 SPRRs. In aspects, the PRRs of the SPIDR are associated with ≥~10, ≥~50, ≥~100, ≥~250, ≥~500, ≥~1000, ≥~5000, ≥~10,000, ≥~25,000, ≥~50,000, or ≥~100,000 Supplier Entities. In aspects, most, at least generally all, or at least substantially all the SPRRs in a SPIDR will comprise a plurality of Product Qualities (PQs), Product Properties (PPs), Elements, etc. In aspects, a SPIDR will on average, mostly, generally, substantially, or only contain ≥3, ≥5, or ≥7 of PQs, PPs, Elements, etc. E.g., SPRRs can include (e.g., on average, mostly, or at least generally) ≥5, ≥7, ≥10, ≥12, ≥15, or ≥20 information features (IFs), even excluding Entity-identifying data set features (DSFs). In aspects, SPIDR(s) comprise ≥~10,000 DSFs, ≥~100,000 DSFs, ≥~500,000 DSFs, ≥~1,000,000 DSFs, ≥~5,000,000 DSFs, ≥~10,000,000 DSFs, ≥~25,000,000 DSFs, or even ≥~100,000,000 DSFs.

SOTIs in aspects can comprise processor function(s)/component(s) or systems ("processors"), as covered elsewhere, that perform the Functions on DRs of such size with remarkable speed, as compared to the time required for human performance of corresponding Functions in such DRs (if even possible), particularly given the capabilities of the System's Functional Modules (FMs) or the Records/Data Structures generated by the SOTI. In aspects, the combination of Functions described herein (or MOTI) are performed in ≤~48 hours, ≤~36 hours, ≤~24 hours, ≤~18 hours, ≤~12 hours, ≤~8 hours, ≤~6 hours, ≤~4 hours, or ≤~2 hours, e.g., less than about 100 minute, ≤~60 minutes (min), ≤40 min, ≤30 min, ≤20 min, ≤10 min, ≤5 min, ≤2 min, or even less than a minute (e.g., ≤~45 seconds (sec), ≤~30 sec, ≤~20 sec, or even ≤~10 sec.

One aspect of the invention (i.e., one aspects) is a method for analyzing a CPIS comprising (a) providing a first Non-Transitory Computer Readable Medium (NTCRM) comprising a processor and storing an IESPIDR comprising at least 5,000 product-related records ("PRRs" or "SPRRs") originating from at least 1,000 IE Suppliers (but possibly also comprising non-IE Suppliers), each PRRs of the IESPIDR comprising (i) ≥1 supplier defining qualities ("SDQ(s)") that associate the PRR with at ≥1 IE(s); (ii) Product Defining/Definition Qualities ("PDQs" or "PRR PDQs") that at least define physical characteristic(s) of the Product, and (iii) at least one PRR non-PDQ product property ("PRRNPDCPP"), at least one non-SDQ supplier property, or both; and (b) executing (causing processors(s) to execute) computer-executable instructions (CEIs) stored in the first NTCRM, a NTCRM of a second device networked with the first NTCRM, or CT, to (i) receive customer input comprising (A) Customer Product Information Submission (CPIS) and (B) desired output based on Function(s) performed by the processor(s); (ii) evaluate whether synonyms exist for one or more parts/aspects (i.e., DSFs) of the CPIS, and where synonyms are identified associating such synonyms with one or more of such parts, generate an enhanced CPIS (ECPIS) comprising synonym(s); (iii) query the IESPIDR based on the CPIS or ECPIS (if generated) to identify PRRs comprising information relevant to the desired output to generate an analysis; and (v) report the results of the analysis to the Customer. An ECPIS can be a component of a broader enriched CI DS (ECIDS) comprising more DSF(s) than just Customer PRRs ("CPRRs"), such as CII, customer defined qualities (CDQs), Regulatory status information, and the like. In general, any disclosure of an ECPIS or equivalent term is exchangeable with the term ECIDS and any equivalent thereof.

In aspects, the CPIS comprises document input(s) ("DOCI(s)"). In aspects, CPIS comprises both DOCI(s) and direct input information ("DII"). In aspects, the method comprises executing CEIs on DI(s) including character recognition method(s) (e.g., any of the optical character recognition (OCR) known method(s). In aspects, DOCI, DII, or both are analyzed using a trained semantic network (SN), natural language processing (NLP), or both to interpret and harmonize (blend) DSFs of the CPIS. In aspects, CPIS comprises unstructured DOCI. In aspects, CPIS comprises multiple documents, typically comprising, generally being, substantially being, or only being unstructured documents. In aspects, the MOTI comprises executing CEI for modifying CPIS information, comparing CPIS information from different inputs (e.g., a document and CII, two or more documents and CII), or both, and preparing an enhanced CPIS (ECPIS) based on such Function(s) and querying the IESPIDR based on the ECPIS.

In aspects, systems comprise/methods employ semantic network(s) (SN(s)) adapted for functions described herein, such as in the generation of additional terms/synonyms (readers will recognize that references to synonyms herein does not mean that such methods must be limited to actual synonyms in all cases but, rather, can include similar/related terms to a particular term in a dataset). Such disclosure is implicitly provided wherever the term synonym is used. In aspects, most, generally all, or all synonyms generated by a step/function are actual recognized natural language synonyms. In other aspects, some, most, generally all, or all words identified in such "synonym" methods are related terms. Semantic networks are known in the art. Any suitable type of semantic network, adapted to the relevant context of methods/systems, can be employed. In aspects an SN in systems/methods is a definitional network, an assertional networks, an implicational network, an executable SN, a learning SN, or a hybrid SN. Relevant principles, methods, etc., are described in, e.g., Sowa (1987). "Semantic Networks". In Stuart C Shapiro (ed.). Encyclopedia of Artificial Intelligence; Poon et al. Proceedings of the 2009 Conference on Empirical Methods in Natural Language Processing: Volume 1-Volume 1. Association for Computational Linguistics, 2009; Lehmann, Fritz; Rodin, Ervin Y., eds. (1992). Semantic networks in artificial intelligence. International series in modern applied mathematics and computer science. Vol. 24. Oxford; New York: Pergamon Press. p. 6. ISBN 978-0080420127; U.S. Pat. Nos. 9,256,595; 6,813,616; 10,984,318; 9,298,702; 11,157,533; 8,566,273; 8,756,185; US20130166590; U.S. Pat. No. 10,547,698; US20200234180; U.S. Pat. No. 8,108,410; and others.

In aspects, the CPIS includes both textual information document inputs (TIDIs) and non-textual information document inputs (NTIDIs). For example, in aspects, CPISs can include design schematics, chemical structure information, safety symbols, industry standard icons, or other non-textual information, which CEIs are trained to recognize, translate, find synonyms for, and selectively combine with text DSFs. Thus, e.g., a MOTI can comprise executing CEI for interpreting and evaluating NTIDI(s), determining whether to include/retain information from NTIDI(s) in CPIS or ECPIS, and if such information is retained in the CPIS or ECPIS combining NTIDI information with TIDI information and optionally also DII, e.g., in an iteration of an ECPIS prior to querying the IESPIDR. A MOTI can comprise development and use of several iterations of ECPISs depending on steps of the method. E.g., several Functions or inputs can be applied at different stages to CPIS or earlier iteration(s) of ECPIS to arrive at a further enhanced iteration of ECPIS.

In aspects, CPIS comprise unstructured customer document(s) that primarily relate to Finished Goods (FGs) but that also comprise information concerning Components, Ingredients, or both Components and Ingredients; (b) the desired output relates to Components, Ingredients, or both Components and Ingredients of FGs, (c) the method comprises executing CEI(s) for identifying Component information (information features, (IFs)), Ingredient DSFs, or both, from the unstructured customer FG document(s) to develop an iteration of an ECPIS comprising such Component DSF(s), Ingredient DSF(s), or Component and Ingredient DSF(s), and (d) the querying step of the method comprises querying the IESPIDR based on the Component, Ingredient, or Component and Ingredient information.

In aspects, the desired output comprises Product Properties including at least one Non-Product Defining Quality Product Property (NPDQPP) and the method comprises executing CEI(s) for identifying Product Defining Qualities (PDQs) and one or more NPDQPPs and querying the IESPIDR based on both PDQ(s) and NPDQPP(s). In aspects, systems recognize these terms most of the time, generally all of the time, or substantially all of the time, initially or after iterations of the applicable method (e.g., in the case of using neural network(s), such as recurrent neural networks, transformer neural networks, or convolution neural networks, or other ML/AI methods that "learn" to identify such terms increasingly with use/training). In aspects, methods/systems comprise specialized training sets, schema, corpora, and the like used by the system/in methods to facilitate the identification of such types of data in records.

In aspects, the method comprises executing CEI(s) to assess whether a User has sufficient authentication to represent the Customer, access one or more Functions/aspects of the System (first NTCRM), or both. In aspects, the method comprises executing CEI(s) for presenting, negotiating, and executing one or more legally binding contracts with a Customer. In aspects, the method comprises executing CEI(s) for identifying user level of access to information contained in the analysis and applying redaction or exclusion rules to the information based on the User/Customer level of access.

In aspects, the method comprises executing CEIs for obtaining information relevant to the desired output, query, or both, from publicly accessible source(s) (PAS(s)), evaluating PAS information ("PASI") with respect to CPIS data, IESPIDR data, or both, and if the PASI is determined to be useful, combining selected PASI with the CPIS (e.g., in generating the query), updating the IESPIDR (in generating the analysis), or both.

In aspects, the desired output comprises regulatory information, such as the regulatory classification of a Product, and the method comprises executing computer readable instructions for obtaining regulatory information from one or more sources of regulatory information and evaluating the regulatory information with respect to the CPIS, the IESPIDR information, or both, in generating the analysis.

In aspects, the method comprises CEI for monitoring if an event arises and re-performing the query upon the occurrence of an event, updating the analysis, and reporting the updated analysis to Stakeholder(s). The event can be, e.g., a passage of time, or the actual detection of an event, such as a change in a Customer Product, changes in identified SPRRs, changes in the IESPIDR, or changes in Regulations, each of which may be detectible by the performance of automated status queries performed by SOTI and the analysis or comparison of data obtained therefrom.

In aspects, the method comprises executing CEI(s) for performing one or more machine learning (ML) methods on one or more Function(s)/aspects of the method. In aspects, development of MLM method(s) comprise the steps of applying Feature learning method(s), Feature engineering methods(s), or both to Function(s)/DS(s) to develop MLM method(s); applying supervised or semi-supervised learning/refinement of such MLM-implemented Function(s); applying reinforced learning, unsupervised learning to enhance such Function(s); and eventually allowing Function(s) or aspects of Function(s) to be governed by the trained model. In aspects, ML-implemented Functions ("MLIFs") characterize/catalog DSF(s), Records, Customers, etc. In aspects, MLIFs identify patterns or relationships. In aspects, MLIFs detected unexpected relationships, data, or both, such as unexpected anomalies. MLIFs can also be used to predict matches, differences, events, and the likes.

A variety of known ML algorithms/models are known that can be employed in such approaches, such as data classification methods, Naive Bayes classification (or Bayesian network methods), decision tree methods, decision rule methods, regression methods (e.g., logistic regression, lasso regression, SVM regression, ridge regression, or linear regression), random forest methods, support vector machine methods, and neural network methods, which are often employed in supervised ML methods. In aspects, ML models comprise method(s) often used in unsupervised or reinforced ML methods such as k-means (or variants thereof, such as K means++)/nearest neighbor analytical models, such as k-nearest neighbor analysis; other clustering methods (e.g., partitional clustering, mean shift clustering, density based clustering (e.g., DBSCAN methods), or hierarchical clustering (such as agglomerative clustering)); and multi-dimensional mapping methods, such as self-organizing mapping methods; and affinity mapping (e.g., for detection of events or prediction of events). In aspects, reinforced learning methods are applied such as artificial neural network methods. In aspects, ML methods include ML methods for decomplicating data such as decomposition methods, such as single value decomposition methods, dimensionality reduction methods (e.g., principal component analysis (PCA), Singular value decomposition (SVD), or TSNE), etc. In aspects, ML methods employ model-free methods, such as in the context of reinforced learning, such as a Q-Leaning method. In aspects, MLIFs comprise model-agnostic methods, such as Partial Dependence Plot (PDP) methods, ICE methods, ALE plot methods, LIME methods, and the like. Other ML models that can be employed include partial dependence plot methods, Generalized Linear Models (GLMs) and Generalized Additive Models (GAMs), and the like. MLIFs can comprise deep learning methods, shallow learning methods, or a combination of both ML methods.

In aspects, systems comprise/methods employ NNs. In general, any suitable engine described herein can represent an NN that performs the described function. In aspects, systems comprise a combination of NN and non-NN engine(s) (traditional rule/algorithm-based programs). Generally, any suitable type of neural network for performing functions described herein, such as NLP functions, can be incorporated into systems or used in methods of the invention. Neural networks are well understood in the art and, accordingly, are only briefly described herein, though some preferred aspects of the invention can include neural network characteristics as aspects of the invention.

Neural networks generally comprise a number of networked neurons in multiple layers forming an architecture. Often, a neural network neuron operates through a perceptron, which, in turn, typically consists of input values, weights, and a bias, a weighted sum, and activation function. An activation function decides whether a neuron should be activated or not, and sometimes is referred to as an activator. In aspects, neural networks can comprise multi-layer perceptrons (MLPs). In aspects, neural networks comprise non-linear activators, such as sigmoid activation functions/logistic function activators or non-sigmoid activators. In aspects, most or generally all of the activators/neurons in one or more neural network(s) are not sigmoid activators. In aspects, most of the activators or generally all of the activators in one or more neural networks are also or alternatively not Tanh (hyperbolic function) activators. Examples of non-linear activators/neurons include, e.g., Rectified Linear Activation Function (ReLU) activators. Neural networks, with, e.g., primarily ReLU activators are often classified as ReLU neural networks or rectifier neural networks and can be incorporated in systems of the invention in some aspects. In aspects, some, most, or at least generally all of the activators of one or more neural networks are known variants of ReLU activators, such as Softplus (Soft Plus), Softmax, Swish, Leaky ReLU, ELU (exponential linear unit), Gaussian Error Linear Unit (GELU), and SELU (scaled exponential linear unit) activators. In aspects, visible layers of a neural network are generally free or substantially free of ReLU activators and ReLU variant activators. In aspects, hidden layers generally lack or substantially lack sigmoid or Tanh activators. In aspects, visible layers comprise sigmoid or Tanh activators. Aspects of activators and other elements of neural network architecture/operation are described in, e.g., Goodfellow, DEEP LEARNING, 2016, ISBN-10: 0262035618. The term "artificial neural network" (ANN) generally is synonymous with the term "neural network," but sometimes the term ANN is used to describe MLP NNs or other types of NNs that are not recurrent NNs (RNNs) or convolutional NNs (CNNs). In aspects, neural network(s) of a system can comprise/be characterized as feedforward neural networks. Other NN architectures that can characterize NN(s) of systems, in aspects, include radial basis network, deep feed forward, long/short term memory (LSTM), gated recurrent unit (GRU), auto encoder (AE), variational AE, denosing AE, sparse AE, Markov chain, Hopfield Network, Boltzman Machine (BM), restricted BM, deep belief network, deep convolutional network, deconvolutional network, generative adversarial network, liquid state machine, extreme learning machine, echo state network, deep residual network, Kohonen Network, support vector machine, and Neural Turing Machine architectures/types, or any other similarly known architectures in the art that are suitable for the applicable NN.

In aspects, one, some, most, or at least generally all of the NNs are RNNs. However, in other aspects, at least most, at least generally all, or at least substantially all of the NNs of the system are non-RNN neural networks. RNNs and other relevant concepts used herein, such as natural language models, are described in, e.g., U.S. Pat. No. 11,144,725. Some of these concepts and others (e.g., various layers of operation, cloud computing systems, tokens, NLP functions, and the like) are further described in US 20210342380 and US 20210182662. System elements/methods described in such references that are adapted to systems/methods herein can be combined with any systems/methods of the invention. In aspects, neural network(s) can comprise convolutional neural networks (CNNs). CNNs are similar to feedforward networks, but they are usually utilized for recognition of data, such as pattern recognition, e.g., image recognition, rather than, e.g., for natural language processing functions. In other aspects, some, most, generally all, or least substantially all of the NNs of the system are not classifiable as CNNs. In aspects, NN(s) can comprise n adaptive-resonance (ART) neural network (described in, e.g., G. A. Carpenter & S. Grossberg, "Neural dynamics of category learning and recognition: Structural invariants, reinforcement, and evoked potentials", in M. L. Commons, R. J. Hermstein, S. M. Kosslyn, & D. B. Mumford, (Eds.), 9 Computational and clinical approaches to pattern recognition and concept formation. Quantitative analyses of behavior (Hillsdale, N.J., Lawrence Erlbaum Associates, 1990)).

In aspects, the trainable neural networks of the invention can be considered "deep" neural networks. Uncontradicted, a "deep" neural network in the context of this invention is a neural network containing at least three layers, typically where at least one layer is considered a "hidden" layer, one an input layer, and one an output layers. Often NNs will include many hidden layers. Such concepts are well known in the art. In aspects, a neural network can include ≥5, 10, 20, 30, 50, 100, 200, 250, 300, 500, 700, 800, 1000, or even more layers. In general, any suitable numbers of layers can be used in neural networks of the invention. Each layer of an NN can comprise any suitable number of neurons. The number of neurons in, e.g., an input layer can be selected based on known factors, such as the number of inputs, provided that in language Neurons can be of any suitable type, including multi-valued neurons. Neural network(s) can include, in aspects, complex-valued neural network(s) (CVNN(s)) or NNs having CVNN-like functioning/properties (see, e.g., Bassey et al., arXiv:2101.12249, Jan. 28, 2021).

In aspects, some, most, generally all, or all NNs of a system are capable of processing sequential input data, such as natural language (which is not possible with certain other types of NNs). In aspects, some, most, generally all of the NNs in a system are capable of processing sequential data out of order (e.g., as in the case of a transformer neural network).

Neural network(s) in systems of the invention can include one or more attention layers or other "attention" elements known in the art. Neural network(s) can, for example, comprise a transformer architecture (and can be characterized as transformer neural network(s)) (see, e.g., Vaswani et al., 2017, arXiv:1706.03762). In aspects, some, most, at least generally all, or at least substantially all of the NNs of systems are characterizable as comprising/having a transformer architecture/operation.

In aspects, NNs that exhibit significant language processing capabilities, similar to any of the performance characteristics known with respect to leading neural network systems, such as BERT, GPT-3, and the like. E.g., in aspects, one or more neural networks involved in NLP/NLM functions of a system exhibit a few-shot LAMBADA accuracy of at least about 50%, at least about 60%, at least about 65%, at least about 70%, at least about 75%, at least about 80%, at least about 85%, or ≥~90%, employing methods that have been used to evaluate leading neural networks, such as, e.g., GPT-3. Such methods are known in the art (see, e.g., Paperno et al., 2016, Conference: Proceedings of the 54th Annual Meeting of the Association for Computational Linguistics (Volume 1: Long Papers) (DOI:10.18653/v1/P16-1144); T. Brown, B. Mann, N. Ryder, M. Subbiah, J. Kaplan, P. Dhariwal, A. Neelakantan, P. Shyam, G. Sastry, A. Askell, and others. arXiv preprint arXiv:2005.14165 (2020); and Vu, Tu et al. "STraTA: Self-Training with Task Augmentation for Better Few-shot Learning." EMNLP (2021) (principles of each of which may also be applicable to other aspects of the invention).

Neural networks, such as any of the NLM neural network described herein, can be referred to as a "model" or in respect of a "model." The term "model" is sometimes applied to NNs, in general (i.e., in the sense that a NN can be considered an analytical model, computational model, machine learning model, etc.). In another sense, the term "model" in the art refers to either the function or type of function performed by a neural network (e.g., semantic element prediction) or a neural network characterized as being trained to perform a function. Skilled persons will recognize this variability in meaning of this term and be able to work with it given context of its use.

Neural networks are "intelligent" systems and can "learn" or "evolve" with training/learning, including learning/training that occurs through use that increases the overall training set available to the NN, feedback, or both. Methods of learning/training NNs are known in the art. Uncontradicted, training of an NN herein comprises performance of various techniques that typically result, usually indirectly, in detectable or significant changes in weight(s) of neuron(s) of an NN, usually also or alternatively leading to a detectably or significantly change in output, in terms of output of the NN or of the system, in respect of a given analysis/function, input, or both. Typically, such changes in weights occurs from further training of the neural network or changing the parameters of such training (e.g., applying different rewards to an NN for complying with a standard, such as output of another NN). Skilled readers will understand that in this and several other respects, systems/methods of the invention embody "deep learning" approaches to information processing/analysis. Because NN(s) "learn" and "evolve," NN(s) (or models) can be described as either immature or mature. While such terms are relative, they will be generally understood in the art at least in clear cases (e.g., immature NN(s)/model(s) meaning models in the first number of iterations of a method/use of a system and mature NN(s)/model(s) meaning when an NN approaches convergence (e.g., generally or substantially producing substantially identical results in each use/iteration).

In aspects, methods comprise application of one or more cleaning algorithms/Function(s) in operation of the System, generally, as part of a process comprising MLIF, or prior to training of a MLIF. Data cleansing Functions can detect data issues (e.g., redundant, incomplete, incorrect, inaccurate, or irrelevant data) and either remove or correct problematic data. Common errors that can be detected or corrected by data cleaning methods include spatial errors, duplication errors/redundancy, inconsistency errors, or formatting errors. In aspects, a data cleaning Function (DCF) detects or corrects classification or nomenclature errors. In aspects, the system uses a set of definitions or rules to determine inconsistency errors and other types of data corruption errors (e.g., in aspects the method comprises development, maintenance, and application of a dictionary, glossary, or authority file). In aspects, DCFs comprise the use of strict validation rule(s), fuzzy validation rule(s), or both. In aspects, DCFs comprise cross-checking one or more DSF(s) or Records with DSF(s) with Records or DSF(s) that have been validated. In aspects, DCFs detect and address structural errors, such as incorrect attributes, mislabeling, and the like. A variety of data cleaning methods/algorithms are known and can be applied or adapted for such steps/Functions. Examples include Duplicate Count Strategy++ (DCS++), Dedup, Progressive Sorted Neighborhood Method (PSNM), and the Innovative Windows (InnWin) method. Products for data cleansing known include IBM InfoSphere services/products, OpenRefine, Winpure, Trifacta Wrangler, the DataMatch components of Data Ladder, Quadient Data Cleaner, and Salesforce's Cloudingo. In aspects, the method comprises applying ML to aspect(s) of DCF(s). In aspects, DCF(s) comprise rules or inputs trained for or otherwise comprising/factoring in analysis/use of Product information (e.g., Qualities, Properties, or both), Regulation information, or a combination thereof ("CT"), optionally with Entity-related information.

In aspects, methods comprise performing DCF (e.g., string) matching step(s), string stemming step(s), or both. String/DCF stemming/matching Function(s)/step(s) can be applied in, e.g., performing data cleaning, querying, ranking, etc. In aspects, string matching/stemming steps include applying fuzzy (approximate) string matching methods, which are known and can be performed using available tools/methods such as methods that use Levenshtein Distance methods, e.g., methods employing functions of the Python FuzzyWuzzy or fuzzymatcher package/library (setting, e.g., minimum ratios for compared strings). String stemming methods suitable for performance of stemming step(s) incorporation in stemming Functions also are known. In aspects, stemming step(s) include use of a preprogrammed lookup table. In aspects, stemming step(s) include application of preprogrammed prefix stripping rules, suffix stripping rules, lemmatization algorithms, stem database matching algorithms, etc. (e.g., affix stripping). In aspects, stemming step(s) comprise application of trained/trainable probabilistic stochastic algorithm(s). In aspects, stemming, matching, or both used in MOTI/SOTI comprise rules/inputs trained for, comprising, or otherwise factoring analysis/use of Product information (e.g., Qualities, Properties, or both), Regulation information, etc., optionally in combination with Entity-related information. In aspects, stemming step(s)/FM(s), matching step(s)/FM(s), or both, comprise an ML component/method (e.g., ML applied to a stochastic algorithm trained by supervised learning or supervised and semi-supervised learning). In aspects, the matching or stemming functions are also applied to non-string inputs, such as images, values, and the like. Any part of TD described in terms of string matching will be understood as providing simultaneous support for application of such other methods or a broader class of data matching/stemming comprising two or more of such different types of data. Matching is often performed on the basis or on the establishment of DSF(s) in compared DS(s) that are deemed to sufficiently correspond to one another in attributes, value entries, schema, etc.

Stemming and matching Functions applied to strings can be considered aspects of an NLP Function. References to NLP FM(s) generally herein will be understood to have the ability to comprise any stemming FM or matching FM described in this disclosure or any counterpart known.

Several Functions, such as data cleaning, stemming, matching, and any combination thereof ("ACT") can be claimed and described in "means for" or "step for" terms where explicitly claimed or described. E.g., an aspect can be a method according to one or more paragraphs above in this section, wherein the method comprises a "step for string matching," a "step for string stemming," or both.

In another aspect, the invention provides Systems comprising FM(s) that perform any of the step(s) of any MOTI(s) in paragraphs provided above. Such a system can comprise NTCRM(s) for storing data, processors, and CEI(s) that correspond to such FM(s).

Skilled persons will recognize that methods/Systems described so far in this Summary of the Invention can be applied to several technical problems, including matching Customers and suitable potential Suppliers; evaluating the quality of Customer Product Information; providing updates to Customers when information has changed in the industry, Supplier network, or Regulations; and assessing Regulatory compliance of a Customer's Products from i.a. Supplier Regulatory Information.

In one example of such an application, the invention provides a method for matching a Customer (or automatically identifying and matching a potential Customer) with one or more potential Suppliers. The exemplary method comprises providing (making available/accessible) a first NTCRM storing an IESPIDR (e.g., an IESPIDR comprising ≥500, ≥1000, ≥5000, ≥10,000, ≥25,000, or ≥100,000 SPRRs from ≥50, ≥100, ≥250, ≥500, ≥1000, ≥5000, or ≥10,000 IEs), each SPRR (sometimes simply referred to as a PRR) of the IESPIDR comprising (i) one or more supplier defining qualities ("SDQs") that associate the SPRR with at least one IE Supplier; (ii) one or more product definition qualities ("PRR PDQs" or sometimes simply "PDQs") that at least define physical characteristic(s) of the Product, and (iii) at least one PRR non-PDQ product property ("PRRNPDCPP"), at least one non-SDQ supplier property, or both. The method further comprises executing CEI(s) stored in the first non-transitory computer-readable medium (which can comprise several different NTCRMs, such as a number of networked computers), a computer-readable medium of a device networked with the first non-transitory computer-readable medium (e.g., a User's mobile phone or other portable computing device), or a combination thereof to (i) receive customer input ("CI") comprising (I) Customer-identifying information (CII) optionally comprising one or more customer defined qualities (CDQs) and (II) Customer-Sought Product Information (CSPI) comprising one or more CSPI PDQs and at least one Customer-Associated Non-PDQ Product Property (CANPDQPP), at least one CDQ, or both; (ii) evaluating whether synonyms exist for one or more of the CSPI PDQs, non-CDQ Customer Property, or both, and where synonyms are identified associating such synonyms with one or more of such inputs, to generate an enhanced customer input; (iii) querying the IESPIDR based on the CSPI or Enhanced Customer Input (ECI) if generated to identify PRRs comprising PRR PDQs that sufficiently match the one or more CSPI PDQs; (iv) ranking PRRs based on, at least in part, the match of CDQ(s), CANPDQPP(s), or both, with one or more Non-SDQ Supplier Properties (NSDQSP(s)), PRRNPDQPP(s), or both; and (v) displaying the results to the Customer. In aspects, CSPI PDQs and PRR PDQs comprise Product-Related Measurements (PRMs) such as dimensions/weights; operational characteristics such as shelf life; compositional characteristics such as component characteristics or ingredient characteristics; etc. In aspects, PRRs that match the query(ies) performed in the MOTI are determined based on a System determination of matching at least two types of CSPI PDQs and PRR PDQs and the method comprises evaluating the matches against one or more preprogrammed threshold values, evaluating the matches using different weights for at least some of the matches, or both. In aspects, SPRRs/PRRs comprise pricing information and matching/ranking is based at least in part on price. In aspects, at least part of the information used to characterize CSPI PDQ(s), CANPDQPP(s), or both, is extracted from unstructured or semi-unstructured customer documents (DOCI); from PASs containing CI (including enhanced public data); from information concerning the customer or the customer's products already stored in the IESPIDR; etc. In aspects, the method comprises validating one or more SDQs, one or more PRRNPDQPPs (Customer or Supplier), one or more PRRPDQs (Customer or Supplier), etc. based on PAS query(ies). Additional queries, such as a PAS query, are typically executed automatically by the SOTI, but can be performed in response to User option, response to a recommendation, etc. In aspects, results without factoring in PAS query result(s) are presented. In aspects, results without factoring in PAS query result(s) are presented separately for basis of comparison of information. In aspects, matching of DSs or ranking of results/hits is performed based on the comparison of factors comprising (a) at least two CANPDQPPs and at least two corresponding PRRNPDQPPs or (b) at least one SDQ and at least one CDQ and at least one CANPDQPP and at least one PRRNPDQPP. In aspects, the ranking also is based on consideration of Regulation(s) (e.g., Regulatory Authority requirements), e.g., as obtained by querying Regulatory Information Data Repositories (RIDR(s)). In aspects, ranking is based on comparison of at least two factors other than pricing. In aspects, at least two factors used for matching/ranking comprise at least two factors selected from the list comprising product regulatory status information (RSI), supplier location information (SLI), product market information (PMI), and supplier social responsibility information (SSRI). Such methods include steps of data cleaning, applying stemming, applying NLP/SN in developing/executing/analyzing queries, applying matching methods, and the like, as described in connection with other aspects in TD. In aspects, AI/ML methods/Functions/models are developed and employed in such S/Fs, such as in CI recognition, data cleaning, truncating/stemming, synonym generation, matching, or application of the results/analysis.

In aspects, a MOTI, such as the MOTI described in one of the preceding paragraphs, comprises executing CEIs for offering, negotiating, or entering into one or more contract(s) with the Customer (e.g., contract(s) between Customer and Owner, Customer and Supplier, Customer and other Stakeholder, etc) (e.g., for performing Function(s) with the System, for performing additional services relating to output/analysis obtained by the MOTI such as generating a regulatory submission, for entering into supply agreement(s) with Suppliers identified by queries, and the like). The MOTI/SOTI can also include a step/Function (S/F) of/for connecting a Customer with one or more Supplier(s) identified by the analysis as suppliers of Product(s) that are expected good fits for the Customer. In aspects, such a method also comprises monitoring for events and re-querying/querying the SPIDR, PAS, RIDR, etc. upon event occurrence(s) (e.g., the passage of time, detection of a new customer product, change in the status of a current customer product, change in customer requirements, change in regulations relating to the product, etc.). In aspects, the method comprises re-querying 3, 4, 5, or more times either in a single day or over a period of several days, weeks, months, quarters, or years. In aspects, such a method also comprises performing a query of the IESPIDR with CI to identify possible omissions or errors in the CI, reporting the possible errors and omissions back to the Customer or enhancing the CI (automatically or upon further CI, e.g., further CI prompted by reporting of error/omission) to form ECI.

Another exemplary aspects is a Product Record enrichment System comprising a NTCRM storing a searchable IESPIDR comprising at least 1,000 PRRs originating from at least 100 IE(s) (but possibly also comprising Customer or Customer Affiliate PRRs), and CEIs that when executed by a processor (a) relay/transmit (e.g., display) system use instructions to a User and (b) receive a NPRIS (ORTA a CPIS) from the User including (i) Customer information (e.g., CII and optionally CDQ(s)), and (ii) one or more Customer Product Related Records (CPRRs) comprising Product Information Element Records (PIERs). The processor further (c) analyzes informational content of the NPRIS; (d) optimizes alphanumeric content of the NPRIS (e.g., by converting NTIDI to textual information, data cleaning, or both) to optionally create an enriched NPRIS (ENPRIS); (e) evaluates if the NPRIS/ENPRIS contains a minimum actionable dataset (MAD); and (f) informs the User if the NPRIS/ENPRIS is determined to not contain a MAD (typically along with help instructions, prompts for more information, or both). If the NPRIS/ENPRIS contains a MAD, the method further comprises the processor (f) assigning a submission reference to the CI; (g) generating a new product submission dataset (NPSD) by identifying Product Information Element Records (PIER(s)) in CI; (h) generating synonyms for at least any PIERs in the NPSD determined to be associable with synonym(s); (i) querying the IESPIDR with query elements comprising the PIER(s) and any identified synonyms; and (j) analyzing and optionally ranking matching IESPIDR records (IESPIDRRs) based on matching PIER(s) in the SPRRs with the PIER(s) in the NPSD. In aspects, at least some of which IESPIDRRs contain independent entity confidential information (IECI), identified as comprising one or more elements matching one or more query elements. In aspects, the method comprises the System associating each identified or sufficiently matching IESPIDRR with the NPSD (e.g., through record entries, tags, or dynamic links). In aspects, the method comprises the System comparing the PIERs of the CI with related Elements/Features of any one or more identified IESPIDRRs to identify differences in PIER(s) between the NPSD and IESPIDRRs, unmatched PIER(s) between the NPSD and IESPIDRRs, or both; and optionally further based on the comparison (1) determining the risk of error or omission in the NPSD and reporting the risk to the user, (2) preparing an updated NPSD (sometimes referred to as a UNPSD) based on expected omissions and errors (e.g., imputation(s) of categories/attributes, structure(s)/hierarchies, values, or omitted entries, etc.), or (3) both (1) and (2). In aspects, the System ensures that any IECI contained in the IESPIDRRs is not accessed by or reported to the User or other unauthorized Entity (e.g., by comprising one or more firewall Function(s)). Such functions can be any suitable firewall Functions, which are well-described/known. Outlier assessment (e.g., against SD, percentiles, etc.) or rules can be part of validation, suspected error identification, exclusion, or weighting rules, etc., applied in a SOTI/MOTI.

In aspects, a System according to one of the preceding paragraphs is provided, wherein the System comprises a FM that evaluates if a Submission comprises a MAD. In aspects, a MAD must comprise PIER(s) comprising one or more of (i) a System-recognized Product name, (ii) a System-recognized Product brand (trademark/trade name), (iii) a System-recognized Product description, (iv) a System-recognized Product reference (e.g., a Regulatory reference code), (v) a description of the Product comprising a listing of System-recognized Component(s)/Ingredient(s) or Component/Ingredient references, (vi) data about current FG/Component/Ingredient Supplier(s), or (viii) ACT; and (b) at least a majority of the SPRRs in the IESPIDR comprise DSF(s) comprising (i) Supplied Product name; Supplied Product brand, or Supplied Product reference (e.g., a Regulatory required reference or industry-recognized reference) and (ii) Product Qualities (PQs), Element(s), or both. In aspects, the System updates the IESPIDR by adding a PRR corresponding to the NPSD or an enriched NPSD.

In aspects, the invention provides a System according to one of the preceding paragraphs (of this section) wherein (a) at least some of SPRRs are Multi-Level PRRs for FG(s) that comprise Component, Ingredient, or Component and Ingredient information and optionally further include amount information for Components in such FG(s), Ingredients in such FG(s)/Component(s), or both; (b) the System comprises CEI for processing Multi-Level SPRR(s) comprising (i) Supplier, Product, Component, and Component amount PIERs; (ii) Supplier, Product, Ingredient, and Ingredient amount PIERs; or (iii) Supplier, Product, Component, Component amount, Ingredient, and Ingredient amount PIERs, and (c) the System comprises CEI(s) for querying the IESPIDRR based on Component name(s), Component reference(s), Ingredient name(s), Ingredient reference(s), etc., with System-generated truncations or synonyms for one or more thereof, and associating CI with one or more SPRRs in the IESPIDR based on sufficiently matching PIERs or other DSF(s) in the CI and SPRR(s). In aspects, (a) the System analyzes Multi-Level NPRIS(s), SPRR(s), or both, comprising at least three levels of PIERs, e.g., (i) at least two levels of Component records (e.g., in a multi-level Bill of Materials (BOM)) or (ii) at least one level of Component records and at least one associated level of Ingredient records and (b) the system queries the IESPIDR based on the at least three levels of PIER(s)/DSF(s).

In aspects, the invention provides a System according to one or more of preceding section paragraphs wherein PIERs of at least some of the SPRR(s) comprise Regulatory Status Information ("RSI") or contractual information associated with one or more Regulatory Authorities and the System comprises CEI(s) for assessing the Regulatory or contractual status of the identified SPRR(s) and optionally reporting such information to the User. In aspects, the System accesses one or more RIDR(s) to determine RA requirements for the FG(s), Component(s), or Ingredient(s) associated with the CIPS, SPRR(s), or both.

In aspects, a System according to one or more preceding section paragraphs comprises a FM for processing document submission(s) as a part of CI along with DII. In aspects, such as system comprises an OCR Function that can recognize textual elements of such document parts of a Submission. In aspects, a SOTI, such as a System having such features, comprises FM(s) that can tokenize such recognized textual input. In aspects, the System comprises an Image Recognition Function (IRF) a specific capability of an Input Recognition Module (IRM) that recognizes image(s) in DOCI (e.g., by querying an image database trained to identify common PRR-related images, such as chemical formulas, product designs, hazard symbols, QR codes, bar codes, and ACT) and associates such DSF(s) with alphanumeric information, tags, links, etc., and harmonizes (data blends) such NTIDI with TIDI and DII, performs data cleaning Function(s) thereon, to develop a putative CIPS/CI Submission, which can be evaluated to assess if it is a MAD and, if so, used as a NPRIS/CPIS.

In aspects, the invention provides a System comprising facets of any of the Systems described in one or more preceding section paragraphs and that further comprises FM(s) that (a) queries PASI/PAD, such as publicly accessible data relevant to Supplier, Product, Component, or Product and Component information; (b) compares a ECPIS/ENPRIS or UNPSD/ENPSD/NPSD to relevant PASI; (c) evaluates the risk of omission or error in the CI based on the PASI; and (d) either (i) reports expected discrepancies or omissions in the CI based on the PASI (ii) generates ECI based on the PASI (e.g., an ECPIS), or both.

In aspects, a System according to, e.g., one or more preceding section paragraphs comprises a FM for evaluating User authorization to use the System, represent the Customer, or both, and taking one or more action(s) based on a conclusion or determination of risk of insufficient User authorization (e.g., reporting the issue to a Customer, rejecting the Submission, requiring more evidence of authorization from the User, etc.). In aspects, such System(s) also comprise FM(s) for presenting, negotiating, explaining, entering, and transferring ownership of one or more contract(s), such as any of the contract(s) covered elsewhere.

In another aspect, the invention provides an AI/ML managed Product Record enrichment System comprising NTCRM(s) storing a computer-readable IESPIDR comprising at least 1,000 product-related records (PRRs) originating from a plurality of independent entities (e.g., at least 100 independent entities), and CEI(s) comprising (a) (i) a trained or trainable semantic network (SN) having Product-relevant knowledge obtained through supervised learning using PRR(s) or other forms of PRR-relevant knowledge (e.g., PRR structure information, PRR Feature relationship information, PRR Level information, and the like) (ii) a natural language processor (NLP) that recognizes input based on one or more natural languages (in aspects based on ≥3, ≥5, ≥10, ≥15, ≥20, ≥30, ≥50, or ≥100 natural languages), or (iii) both a SN and an NLP; and (c) a collection of FMs including (i) an input module (IM) that (A) receives, if necessary reads, and organizes User-submitted CI to generate a new product related information submission (NPRIS) and (B) identifies PIER(s) (e.g., at least 3, 5, 7, 10, 12, 15, or 20 PIERs) contained in the NPRIS to generate a new product submission dataset (NPSD), (ii) a query module (QM) that evaluates and, if suitable, generates synonyms for PIER(s) (e.g., by stemming/truncation, lemmatization, or both) and queries the IESPIDR based on PIERs and any generated synonyms to identify PRRs comprising one or more elements expected to be associated with the PIERs based on a degree of matching between SPRR Elements (SPIERs) and PIERs (customer PIERs, CPIERs); (iii) a record comparison module (RCM) that evaluates, ranks, or analyzes identified PRRs; (iv) a linking module (LM) that creates one or more dynamic links or other associations associating the NPSD with the identified SPRRs; (v) a confidential information module (CIM) that identifies confidential information associated with SPRRs and selectively redacts, omits, or hides confidential information in the PRRs from User access or User reporting; (vi) a reporting module (RM), enrichment module (EM), or reporting and enrichment module that (A) reports results to the User based on the output of the RCM, (B) updates the NPSD based on the output of the RCM, or (C) performs both (A) and (B); and (vii) one or more ML modules (MLMs) that automatically or semi-automatically (A) evaluates and amends one or more ML model(s), (B) evaluates and amends the operation of one or more of the IM, QM, RCM, and reporting and enrichment module (e.g., 2 thereof, 3 thereof, or all 4 thereof), or (C) performs both (A) and (B), detectably or significantly improving the performance of the System with increased use. In aspects, the System processes MLR CPISs, MLR SPRRs, or both (e.g., comprising PRRs comprising Supplier, FG, and Component information and optionally further comprising Ingredient information, amount information, or both), recognizing such terms, Levels, and querying the IESPIDR and ranking results based on such terms, synonyms thereof if identified, and optionally Level information. In aspects, a MLM of the System automatically or semi-automatically assesses the performance of the System with respect to the QM developing synonyms for DSF(s) in CI, SPRR(s), or both, and in aspects, a MLM of the System automatically or semi-automatically accesses the QM based on training resulting from such an assessment. In aspects, the MLM detectably or significantly improves the size, accuracy, relevance, or both of such QM Functions with increased System use. In aspects, DR(s) of the SOTI comprise a sizable amount of MLR DS(s) (e.g., in aspects ≥10%, ≥20%, or ≥33% of the DS(s) in the DR(s) are MLRs).

In aspects, the invention provides SOTI, such as a SOTI described above in this section wherein the IM of the System is configured to receive NTIDI along with TIDI and DII and the System comprises a Machine Learning Module (MLM) that comprises evaluating the System's conversion of one or more types of NTIDI into alphanumeric information, tags, links, references, and the like and the MLM either automatically or semi-automatically (the latter in, e.g., a supervised learning mode) updates the IM with respect to recognition of NTIDI, conversion of NTIDI, harmonization of NTIDI with DII/TIDI, etc., such that the System DOS improves in terms of its accuracy of NTIDI recognition, completeness of NTIDI recognition, or both, with increased System use.

In aspects, SOTI(s), such as a System having the features of the Systems described above, comprise FM(s) capable of receiving, reading, and analyzing multi-DOCI as well as DII, cleaning data associated with such CI, and identifying PIER(s) therein to generate a NPSD, and an MLM that automatically or semi-automatically assesses the performance of at least some of (a) the IM associating such multiple product information sources, (b) the IM identifying unique PIER(s) in the multiple product information sources, (c) the IM using identified PIERs in assembling a completed NPSD, or (d) ACT, and the MLM updates the IM to DOS improve on the performance of such one or more of (a)-(c) with increased system use. In aspects, a SOTI, comprises a MLM that assesses the cues/questions used in collecting DII from Users and automatically or semi-automatically improving on such prompts, thereby DOS improving DII (on average, in significant part, or both) with increased System use. As with many other MLM(s) described herein such MLM(s) typically are provided or trained with Product-relevant and Entity-relevant information (terms, rules, associations, levels, etc.). In aspects, a SOTI comprises an RCM that executes Function(s) that assesses the likelihood of error or omission in CI (and optionally generating or reporting a risk score or risk evaluation associated therewith) and in aspects such a SOTI comprises an MLM that automatically or semi-automatically assesses or modules such Function(s) and DOS improves such Function(s) with increased System use.

In aspects, SOTI(s) such as those described in one or more of the preceding paragraphs of this section comprise FM(s) that query PAD from one or more source(s). E.g., in one aspect, the QM comprises a web crawling/search application that queries the internet, a specific site, or a subset of websites, based on PIER(s) (and optionally other PIER synonyms) or other DSF(s) of CI (e.g., CII or CDQ) to locate and retrieve PAD Records/information that the System determines are sufficiently related to (match) elements of the NPSD. In aspects, such a SOTI comprises an MLM that automatically or semi-automatically assesses the performance of the QM's query Function(s) of PAD(s), e.g., a PAD web crawling query, the QM's internet Record selection, the QM's internet Record processing, the RCM's comparison of internet Records with the NPSD, etc., and the MLM updates the QM, RCM, or both, to DOS enhance the performance of any assessed Functions performed thereby with increased System use.

In aspects, a SOTI, such as any of the SOTI(s) described in preceding section paragraph(s) comprises NTCRM(s) that comprise one or more RIDR(s); the QM queries the RIDR with the PIER(s), PIER(s) plus synonyms, or other CI DSF(s); the QM retrieves sufficiently related (matching) RIDR Records; the RCM compares the RIDR records with the PIERs to, e.g., perform a risk assessment, judgment, or both concerning the applicability of any Regulations reflected in the RIDR query with respect to a Customer Product reflected in the CPIS. In aspects, one or more PRRs comprise Ingredient amount information associated (optionally associated with Component(s)) and the RCM compares the Ingredient amount information in the NPSD with either SPRR(s), RIDR Records, or both. In aspects, such a SOTI comprises a MLM that automatically or semi-automatically assesses the performance of (a) the QM's generation and execution of a search of the RIDR (e.g., stemming); (b) the QM's retrieval of hits from the RIDR (matching); (c) the RCM comparing the RIDR records with the PIERs (e.g., to provide an automatic regulatory risk assessment, a regulatory status judgment, or both); or (d) combination(s) of (a)-(c), and automatically or semi-automatically modifying one or more thereof thereby DOS improving on the performance of such one or more of (a)-(c) with increased System use. In aspects, a SOTI applies such information by preparation of a RA submission generated by a (RA) Submission Preparation Module (SPM). The SPM uses the content of a NPSD/UNPSD and results of RIDR queries and optionally other information such as RA submission requirements/forms, to generate a RA submission for providing Regulatory information associated with the Product of the NPSD to one or more Regulatory Authorities (RA(s)). In aspects, a System comprises an MLM that automatically or semi-automatically assesses the performance of the SPM in preparing a RA submission, or both, and automatically/semi-automatically updates the SPM to DOS improve on the performance of the SPM with increased System use. In aspects, a System will further comprise a RA Submission Module (RASM) that automatically or semi-automatically submits/transmits ("files") the RA submission with one or more RA(s), typically upon receipt of User authorization, Administrator approval, or both. In aspects, such a SOTI comprises an MLM that automatically or semi-automatically assesses the performance of the RASM and updates the RASM to DOS improve the performance of the RASM with increased System use.

In aspects, a SOTI comprises Authorization Module(s), such as a User Authorization Module (UAM) that assesses the authority of a User to use the System, to execute contracts on behalf of Customer, to make a submission on behalf of the Customer, etc. In aspects, the SOTI comprises a MLM that automatically or semi-automatically assesses the performance of the UAM and updates the UAM to DOS improve on the performance of the UAM with increased system use. In aspects, such a SOTI also or alternatively comprise an electronic contracting module (ECM) that generates one of several possible executable electronic contracts between the Customer and the Owner, the Customer and another Stakeholder, or both, for access to the System, further services based on the performance of the System, or supply of Products identified by the SOTI.

In aspects, a SOTI, such as any one of the Systems described in any one or more of preceding section paragraph(s) comprises an Event Monitoring Module (EMM) that monitors one or more parts of the system for events, such as the IESPIDR, the RIDR, CI, etc. Upon occurrence of an event monitored by the EMM, the EMM can cause other FM(s) to perform Functions, such as re-running query routine(s) performed by the QM and Functions "downstream" of (subsequent to application of the Function of) the QM described above (e.g., FM(s) involved in ranking, reporting, or enriching Records). In aspects, a SOTI comprise(s) an MLM that automatically or semi-automatically assesses the performance of the EMM and updates the EMM to DOS improve performance of the EMM with increased System use.

In another aspect, the invention provides a Product information monitoring system comprising NTCRM(s) containing Stored Customer Product Information Record(s) (SCPIR(s)) and an IESPIDR (e.g., an IESPIDR comprising $\geq 500$, $\geq 1000$, $\geq 5000$, $\geq 10,000$, $\geq 25,000$, or $\geq 100,000$ SPRRs associated with $\geq 25$, $\geq 50$, $\geq 100$, $\geq 250$, $\geq 500$, $\geq 1000$, $\geq 2000$, or $\geq 5000$ IEs). In aspects, several SPRRs in the IESPIDR (e.g., $\geq 0.5\%$, $\geq 1\%$, $\geq 2\%$, $\geq 3\%$, or $\geq 5\%$ of the SPRRs in the IESPIDR) were previously demonstrated to comprise PIER(s) related to PIER(s) in the SCPIR(s)). Such a SOTI will typically comprise CEI(s) that cause processor(s) to, upon the occurrence of a triggering event, (a) evaluate if SPRR(s) in the IESPIDR that are associated with the SCPIR(s) have been changed; (b) evaluate if changes in SPRR(s) indicate that a change in SCPIR(s) is warranted; and (c) either prepare updated SCPIR(s), report suggested changes to SCPIR(s) to the Customer (or other Stakeholder(s)), or both. In aspects, the SOTI prepares tentative updated SCPIR(s) for User review/approval upon the determination that a change is likely warranted from changes in System information. In aspects, on the occurrence of the triggering event the System automatically or semi-automatically performs one or more queries, such as an updated IESPIDR query, an updated RIDR query, an updated PAD query, etc. In aspects, the SOTI is programmed with several triggering events and subsequent/related actions (e.g., a first trigger that causes a query of the RIDR and evaluation of whether an update to CI based on new or newly applicable Regulations and a second trigger that causes a query of the IESPIDR and an evaluation whether to update CI based on new insights from the updated IESPIDR query/results). In aspects, trigger(s) cause the System to query PAD, e.g., by executing a web crawler/search engine to search the internet or specific site(s), evaluate findings therefrom, and if appropriate to update Records (CI, SPRRs, or both) based on such results. In aspects, the SOTI performs additional actions based on updated information, such as the preparation of an updated RA submission.

In yet another aspect, the invention provides Systems for preparing Regulatory Authority (RA) submissions based on enriched CI, enriched CPIS(s), or both, comprising NTCRM(s) storing (a) an IESPIDR (e.g., an IESPIDR comprising $\geq 200$, $\geq 500$, $\geq 1,000$ or $\geq 10,000$ PRRs originating from $\geq 50$, $\geq 100$, $\geq 250$, $\geq 500$, or $\geq 1000$ IEs) and (b) a regulatory information data repository (RIDR) comprising RA requirements for one or more RA(s); and (c) CEI(s) that when executed by a processor of a computer causes the processor to (i) receive a new product record information submission (NPRIS) from a User that includes (1) CII and (2) Customer PRR(s) or a Profile, in either case comprising PIER(s); (ii) format and organize (e.g., clean) information in the NPRIS to generate a new product submission dataset (NPSD); (iii) generate synonyms for the PIERs in the NPSD (e.g., by methods including truncation/stemming); (iv) query the IESPIDR with query elements comprising CI PIER(s) or Customer PIER(s) and synonyms; (v) identify IESPIDR Records by comparing/matching SPRR(s) matching query elements; (vi) associate each sufficiently matching SPRR with the NPSD; (vii) prepare an updated NPSD (UNPSD) based on comparing the records identified in the IESPIDR query with the NPSD to identify expected omissions and errors, or both; (viii) query a RIDR using PIERs in the UNPSD to identify regulatory requirements applicable to the UNPSD; and (ix) prepare a RA submission based on applying identified RA requirements to the UNPSD. In aspects, such a SOTI receives User-Identified desired output (UIDO) comprising whether to (i) transmit the RA submission to the Customer or other Stakeholder or (ii) submit the RA submission to a RA. In aspects, the System is adapted to submit the RA submission to an RA on behalf of the Customer. In aspects, the System is configured to transfer ownership of a RA submission (through electronic contracting), at least temporarily, to the Owner, e.g., to facilitate automatic submission of the RA submission. In aspects, IESPIDR SPRRs, CPIS(s), or both, are MLR(s), e.g., comprising FG PRR(s) comprising Component DSF(s), Component number DSF(s), Ingredient DSF(s), Ingredient amount DSF(s), etc., which are compared with corresponding DSF(s) in CI/NPSD in developing ECI, such as an UNPSD. In aspects, the RIDR comprises ≥20, ≥50, ≥75, or ≥100 Regulatory/RA requirements (e.g., requirements associated with Ingredients, amounts, or a combination of Ingredients and amounts ("Points of Concern" or "POC(s)"). In aspects, (a) Regulatory/RA requirements in the RIDR are at least partially dependent on amount of Ingredients in a Product, amount of Components in a Product, or both; (b) Records in the IESPIDR and the CPIS (e.g., UNPSD) comprise information concerning Ingredients, Components, and amounts of one or both thereof; and (c) the System compares the amounts of ingredients, Components, or both in the CPIS/UNPSD with the Regulatory/RA requirements in preparing or aiding in the preparation of a RA submission. In aspects, the System is specialized on the operation of one Regulatory regime (e.g., drug regulation, food regulation, or environmental reporting); one RA; or one Regulatory regime and RA ((e.g., set of laws and regulations of a particular area of regulation for a particular country, such as the US FDA or EU's SCIP/REACH regulations). Such a SOTI can further comprise any of the above-described Modules or Functions associated with SOTI/MOTI (e.g., an UAM, an ECM, Modules for protecting confidential information, etc.).

In another aspects, a System described in a preceding section paragraph (or a corresponding method performing steps performed by the steps encoded by the CEI(s) of the System) comprises also or alternatively identifying RSI associated with or being in SPRR hits identified in the IESPIDR query(ies) of the method having a desired Regulatory status (e.g., listed, approved, etc.) in a Regulatory regime/system that allows reference to Regulatory file(s)/dossier(s) and the like ("RAF(s)") (e.g., SCIP dossiers, FDA NDAs, etc.) with such a status; optionally evaluating the ability to reference the RAFs associated with such "hit" SPRR(s); and preparing a RAS for a Customer Product comprising a reference to one or more of such RAF(s) associated with Products associated with "hit" SPRRs. In such a method, changes to the CPIS can optionally be skipped where the desired outcome of the method is the right to make a reference to another RAF for Regulatory compliance versus making a complete RAS.

In another aspect, the invention provides a product information monitoring system comprising PTRCRM storing a DR comprising (a) product information data set(s) ("UEPIDS(s)"); (b) an independent entity product information data repository ("IESPIDR"), at least some of the IESPIDRRs therein being related to PIERs of the UEPIDS, and (c) CEI that cause a processor to, upon the occurrence of a triggering event (1) evaluate if PRRs in the IESPIDR that are associated with the UEPIDS have been changed; (2) evaluate if the changes in the IESPIDR PRRs indicate that a change in the UEPIDS is warranted; and (3) either (A) prepare an updated UEPIDS, (B) report suggested changes to the UEPIDS to the user, or (C) both. In aspects, the system prepares a tentative UEPIDS, transmits the tentative UEPIDS to the user, and receives input from the user concerning the approval of the tentative UEPIDS. In aspects, the system identifies confidential information in the IESPIDR records and ensures that the user does not have access to or receives such information. In aspects, the SOTI queries the IESPIDR to identify records in the IESPIDR that have been added or amended since the last query of the IESPIDR and which contain records that are associated with PIERS in the UEPIDS. In aspects, the SOTI also includes a RIDR and upon a triggering event the system comprises evaluating the applicability of regulatory requirements in the RIDR to PIERs in the UEPIDS. In aspects, the system comprises a plurality of triggering events. In aspects, the system comprises a web crawler query system that queries the internet (or specialized web sites, or both) for information related to PIERs in the UNPISD upon occurrence of a triggering event. In aspects, the SOTI prepares a proposed new regulatory authority submission or an amendment to a regulatory authority submission based on the applicability of regulatory requirements in the RIDR to PIERs in the UEPIDS. In aspects, the SOTI prompts the user to obtain updated supplier or product information upon occurrence of a triggering event and uses the updated product information to evaluate changes to the UEPIDS. In aspects, the system provides possible/actual contract terms to the user and engages the user in an electronic contract for services, e.g., use of the system.

Engines, Modules, and Functions

Systems of the invention perform various Functions and, according, can comprise a variety of Engines/Modules (FMs), etc., for carrying out such functions. Engines/FMs present or used in SOTIs/MOTIs are typically stored in CRM and performed by a processor component/processor reading and executing (sometimes shortened to executing) CEI contained in the Engine/Module. CEI can be encoded in the code of one or more software program(s)/application(s). The physical recording of such specialized CEI in combination with a processor component capable of executing such CEI results in/provides specialized computing device(s)/system(s) to perform specific processes to achieve specific technical effects. In aspects, most, or generally all such Function(s) are provided by a form/variant of a known coding language/software platform(s), such as SQL, Python, etc.

Examples of Functions (AKA, operations, processes, or protocols) that can be employed as S(s)/FM(s) include DS analysis, search, and modification Functions, such as art-recognized regular expression ("Regex") Function(s) (e.g., Count, Extract, or Replace Function); character recognition Functions (e.g., Functions that determine if data has language characters, characters from a natural language, characters from a natural language (NL) group (e.g., Latin language characters), functions for detecting language used, or functions for determining natural language variations, transliteration Function(s), numeric character recognition Function(s)); Functions for recognizing types of fields/entities or other data (e.g., Company name recognition functions); data cleaning Functions (such as Clean, Count, Remove, TRIM, and Extract, and Functions for finding/fixing double encodings, encoding error identification/fixing Functions, etc.); DS/search term expansion and related DS modification Functions (e.g., Suffix Functions); DSF comparison Functions (e.g., string comparison functions, e.g., string functions focused on comparison of longest common subsequence, Levenshtein distance, words determined to be meaningless by certain rules, comparison of entries that differ in punctuation and other comparison Functions such as optimal string alignment Functions, NGram Functions, and Shannon Entropy Functions. Related and other categories of such Functions and additional FM(s)/S(s) of SOTI/MOTI are described in the following sections.

Receiving Input/IM

MOTI/SOTI typically involve reception of one or more forms of User Input, which also herein is sometimes referred to simply as "input", a submission, or an evaluation submission. As covered elsewhere, User Input can include information about the User (e.g., for assessing authorization to use a SOTI), an associated Entity (typically the manufacturer of the product associated with an evaluation submission), Desired Output (DO), or a combination thereof. To receive such input, a System will comprise one or more input modules/functionalities. Input functionalities/Engines/Modules and step(s) can comprise processing of "direct input information" (DII), such as direct User (AKA, End User) input (e.g., User input submitted through a keyboard, selection of answers by selection in a list of options, voice input, and the like). The processing of direct input by various methods is known (e.g., data is transmitted to a CPU, processed by an OS and/or application(s), etc.). Software functions, such as the Scanner function in Java, Input function in Python, and the like, are known and similar instructions for the interpretation of DII (or both DII and documentary input (DOCI)) are known. Accordingly, the features of such systems are not described in detail here.

In aspects, Input also (i.e., also or alternatively) comprises DOCI, e.g., comprises one, two, three, or more documents that are scanned and recognized via optical character recognition (OCR) Functions. In aspects, Input also comprises DOCI records already present in digital form that are inputted via other means (e.g., by referencing a web page, a file, etc.). Input devices in communication with other aspects of a System can, accordingly, comprise any suitable type of advice or combination thereof, including alphanumeric key input devices, auditory input devices, scanner devices, file upload or selection devices, nonalphanumeric key input devices (e.g., menu or item selection devices), and any/all combination thereof (ACT). Other physical components typically comprise a graphical user interface (GUI) that displays input information to the User.

Input can also be received as an unstructured or semi-structured electronic file or combination thereof, such as an email, text/SMS message, etc., as covered elsewhere. In aspects, Input comprises web-submitted XML document submissions. In aspects, Input comprises scanned and uploaded electronic document files, such as PDF files or Microsoft Word document files. Input modules can comprise computerized systems/components including, e.g., streaming data processor(s), interface cards (e.g., NIC card(s)), etc., such as, e.g., virtual interfaces. Input modules/engines can further comprise specialized code that analyzes input, e.g., to determine if input represents a minimum actionable dataset, as described elsewhere. Output systems/modules can also comprise specialized engines, components, or both, such as network interfaces. Input systems, output systems, or both, can comprise a security system, such as one or more firewalls In aspects, SOTI can comprise a series of programmed prompts/cues for information (e.g., presented in the form of fillable fields, questions in series, and the like). Question/prompt elements can comprise, e.g., a series of questions/prompts, means for storing and analyzing responses, etc., which facilitate receiving DII, augmenting DOCI information (e.g., where DOCI information is ambiguous to the SOTI), or both, etc. Questions/prompts can be directed to the various Functions of a SOTI. E.g., an Authorization Module (AM) can be associated with several questions/prompts designed to elicit information from a User concerning the User's authorization to use the SOTI or to access certain information or Functions of an SOTI (e.g., to enter an electronic contract on behalf of the Customer). Questions/prompts relating to CPIS of an SOTI typically comprise, primarily comprise, or at least substantially consist of Product-relevant information (e.g., Product-relevant terms), which can comprise, materially comprise, or considerably comprise Type-specific term(s) or data (e.g., terms relating to computer devices, transportation devices, products comprising polymeric materials, products comprising metal materials, etc.).

Input Recognition/IRM

Systems can comprise input recognition ("IR") Functions or IR Module(s) (IRM(s)). Example of IR Functions include data recognition methods known, e.g., character recognition (e.g., OCR), voice recognition, and image recognition methods.

In aspects, input recognition/input module processes comprising conversion of data sets in an initial submission, such as conversion of file input(s), into system standard file format(s) (e.g., copying the content of a non-preferred file format into a system standard file format which can be, e.g., an XML, JPEG, HTML, JSON, SQL server file format, etc.).

Input recognition (IR) can comprise, in aspects, image recognition. Image recognition can comprise comparison of image(s) detected in a submission/Input to one or more image indexes, using methods described elsewhere and their equivalents. In aspects, image recognition indexes include chemical structure indexes. In aspects, methods include identifying image content and adding alphanumeric semantic terms to the submission (generating a modified submission) and associating such semantic term(s) with the image or replacing the image with such semantic term(s). In aspects, such semantic terms can include generic ingredient name(s), brand ingredient name(s), ingredient reference(s) (e.g., references used by one or more governmental/regulatory authorities), chemical formulas, or other ingredient-identifying terms, such as corresponding SMILES data, corresponding INChi data, etc. In aspects, step(s)/function(s) comprise appending related data, such as regulatory requirement-related data associated with an ingredient, safety data relating to an ingredient, or association of the ingredient with one or more social responsibility information (SRI) factors, such as environmental, social, and governance (ESG) factors.

IR Functions can comprise recognition of the meaning of inputs, conversion of input into alphanumeric characters, conversion of alphanumeric characters into records, data set features (attributes, values, or both), or conversion of such data into data sets, including, in aspects, hierarchical datasets. Input functions can include application of metadata to the input to generate a modified evaluation submission, such as applying a metadata tag that identifies date of submission, source of submission, nature of the submission, desired output (DO) information, or a combination thereof.

Various methods of input recognition are known and generally any suitable and known method, including those described herein and equivalents, can be employed in interpreting input. Typically, such step(s)/FM(s) comprise receipt of input (either DII or DOCI), processing of input typically based on rules which may draw upon one or more indices/indexes (e.g., System dictionaries/glossaries, thesauruses, schemas, corpuses, or higher-order data structures such as semantic network(s) (SNs)). In aspects, input recognition comprises application of context recognition rules, e.g., by comparing combinations of system-identified terms, system-identified terms and extraneous characters, or both, against one or more system record schemas (comprising, e.g., a schema of a common relationship between two or more terms) or system dataset schemas (comprising, e.g., a collection of related records, e.g., comprising a number of attribute/value pairs, and in aspects comprising a hierarchical structure comprising two, three, four, or more levels of information (e.g., FG, Part/Component, and Ingredient information). Data recognition functions/step(s), such as in DOCI data recognition, e.g., textual input recognition, can comprise term/element delimiter identification (based on, e.g., recognition of spacing, punctuation, and the like), which also can be incorporated in rules/algorithms for determining content meaning (e.g., by term isolation/tokenization). In aspects, step(s)/Function(s) (S(s)/F(s)) comprise contextual rules for $\geq 1$, $\geq 5$, or $\geq 10$ delimiters. Rules concerning recognition and non-recognition of capitalization differences, combinations of numbers and letters, etc., also are often employed. Methods known but described in different contexts can be combined with aspects of TD to perform such S(s)/F(s).

In aspects, S(s)/F(s) include subject matter classification (SMC) algorithm(s) that can ascertain the context of a DS, such as a RR, PRR, etc. SMC algorithms of an SOTI comprise massively parallel workflow architecture (e.g., comprising $\geq\sim 100$, $\geq 500$, $\geq 1000$ processor/memory combination(s)) to render a classification to other FM(s) or that is reported to a User; typically, in $\leq\sim 30$, $\leq\sim 10$, or $\leq\sim 5$ seconds. In aspects, data is also subject to data sorting or reclassification using a data classification model.

In aspects, image Input(s), e.g., scanned documents, or DSs comprising image(s), are analyzed for positional information. In aspects, text in Input is analyzed with various Natural Learning Processing techniques for determining dominant language, text content, and paragraph/sentence or other field/structure intent. In aspects, Entity recognition is performed by use of Entity recognition algorithm(s). In aspects, Entity data is extracted and stored as metadata or is associated with SI protection rule(s)/protocol(s).

In aspects, Input can comprise email Input(s). E.g., SOTI can comprise e-mail stream monitoring FM(s) (methods comprising e-mail stream monitoring step(s)). Email Input processing Function(s) can comprise protocols for recognition of attachments, email text, or both. NLP and other processing tools/methods are employed to infer email intent (e.g., request for DO services).

Function(s), such as Email input/monitoring Function(s), often comprise a workflow architecture that can be characterized as comprising massively parallel processes/very large workflow. Massively parallel processes employed by this or other data-intensive S(s)/F(s) of MOTI/SOTI (NLP or other MLM Functions, ranking function(s), enrichment function(s), etc.), can be achieved by use of large system step functions, such as Amazon Web Services (AWS) Step Functions.

Function(s) of a SOTI or a SOTI overall also can be characterized as being "highly available" or comprising "highly available" workflow(s). In aspects, a highly available Function/System exhibits $\geq\sim 97\%$, $\geq\sim 98\%$, $\geq\sim 99\%$ availability (accessibility and standard/optimal operability) over a period (e.g., per quarter, year, 3-year period, 5-year period, etc.), and in more particular aspects, a highly available System/Function OTI exhibits $\geq 99.8\%$, $\geq 99.9\%$, $\geq 99.95\%$, or $\geq 99.999\%$ availability. High availability can be achieved by any suitable method(s) including normal means, message queues, lambda retry functions (e.g., in AWS), etc. General resources/structures for high availability comprise application of component redundancy, component monitoring and management, failover (node/process substitution/routing), use of distributed replicated volume(s), load balancing, or any combination thereof ("ACT").

An IRM can include a linking/tagging module (LTM), which draws upon similar methods and other known NLP methods for translating inputs from multiple natural languages (e.g., English, Chinese, Japanese, German, French, Spanish, Arabic, Hindi, Russian, Korean, and ACT), such that SPRRs, CI, or both, in a SOTI/MOTI can be based on inputs from $\geq 2$, $\geq 3$, $\geq 5$, $\geq 10$, $\geq 15$, or $\geq 20$ natural languages (NLs), NL dialects (e.g., Mandarin and Cantonese), etc. Typically, such a SOTI will comprise rules and DRs for each such natural language or engage with resources able to process such different NL data. Skilled persons will recognize that the processing of multiple NL input(s) by a LTM adds an additional level of complexity to SOTI/MOTI, putting the fast performance of such SOTI/MOTI beyond the capability of humans or systems available when computing and processing methods were less developed.

Input can comprise CII/CDQ, CSPI or CPIS, etc. Input can also comprise Customer Affiliate information (including Affiliate PRRs), information about a Customer's current Suppliers/supplied Products, or both. Input can comprise structured, semi-structured, and unstructured data, or highly structured (MLR) data.

Allowable, suggested, or required Input DSF(s) (IDSFs) can be numerous and varied in type. In an exemplary aspect where Input is employed for RR compliance, for example, Mandatory DSF Input(s) (MDSI(s)) include PDQs such as Product (article) name, and >1 primary/reliable Product identifier (e.g., European Article Number (EAN), Global Trade Item Number (GTIN), Universal Product Code (GPC), ECHA Article ID). MDSI(s) can also include CII requirements, such as client name, reference (official or System), etc. Ingredient, amount, and quantity information may be MDSI(s) or conditional MDSI(s) if not derivable from other MDSI(s) by the System. IM may require further MDSI(s), such as NSPDQQ(s) (e.g., country of origin, safe handling instructions, pricing, market availability, etc.) and other PDQ(s) (e.g., dimensions, weight, required functional properties, etc.). Ingredient-related IDSFs can include recognized material category (e.g., a EUPCS mixture category), material characteristics, nominal concentration, etc. Product IDSF(s) can include Product Type/category, function, safe use information. Requested IDSF(s) (RIDSF(s)) can include Product, Component, or Ingredient synonyms and identifier equivalents; internal part number(s) and other references; complexity characteristics; units of measures used in Input; disassembly instructions; etc. Corresponding DSF(s) can be contained in PRR(s) and other DR DS(s) of a SOTI.

Recognition of BOM-related information, e.g., using a relational brain module, learning algorithm, or both, which may be adapted to analysis of CI and IESPIDR records are provided in patents cited in the Background, which are specifically incorporated herein. Methods relevant to recognition of inputs, such as DOCI, including unstructured DOCI, and levels/hierarchies or structures of data therein, are known, as exemplified by disclosures including U.S. Pat. No. 10,055,391, US20100174980, US20100174985, US20110173528, US20120311426, EP0394633A3, US20040006742, US20140026033, U.S. Pat. Nos. 8,549, 399, 10,572,578, 8,782,516, 8,886,676, 7,707,206, US20030227643, US20100306260, US20120137207, U.S. Pat. Nos. 9,483,694, 9,229,911, US20040236740, U.S. Pat. No. 7,937,338, US20070177183, US20030154071, U.S. Pat. Nos. 5,848,184, 10,699,112, 8,311,331, 5,999,664, 6,009,194, 6,038,342, 5,669,007, 5,159,667, and references disclosed/cited therein and patent documents related thereto. These and other methods known can be employed to the processing of DOCI in steps/FM(s) described in TD.

Any suitable image recognition method(s) (ORTA visual recognition method(s)) can be employed by an IRM (or other FM of a SOTI, such as a QM), including image recognition in context, feature-based image recognition, or both, applied to, e.g., codes (bar codes, QR codes, and the like), and other two-dimensional image or three-dimensional image information. Basic principles employed in image recognition typically will include processing images as raster/vector images, processing associated data (e.g., corresponding array/matrix data, such as image pixel data, or more advanced data elements such as may be obtained by use of running edge detectors, color detectors, employing Haar-like Features, Histogram Oriented Gradients (HOGs), Principal Component Analysis (PCA), Linear Discriminant Analysis (LDA), Scale-Invariant Feature Transform (SIFT) methods, Sped Up Robust Feature (SURF) methods, and the like; classification of image patterns; and pattern matching (often employing a trained predictive model often with AI/ML element(s) to identify image-related features/patterns, and such training model data often comprising labels for classification of matched images). Classification rules/algorithms employed in SOTI/MOTI commonly comprise (e.g., CC or MC) image types, features, etc., specific to Products, Types, and other DSF(s) commonly used in MOTI/SOTI. Training of image recognition model(s) also can be done using DRs that CC, MC, or primarily comprise Product-specific image(s) (e.g., BOMs of different types, subparts thereof, etc) Image recognition (computer vision) processes employed in SOTI/MOTI can include rules/methods/subprocesses for assessing and dealing with image deformation, class variation (e.g., a problem given unstructured nature of BOMs, e.g.), and the like. In aspects, image recognition is performed by neural network(s), deep learning methods, or both, processing multiple such features/elements/rule(s) as part of an SOTI/MOTI. Methods for image recognition, search (sometimes ORTA reverse image search), and image matching known can be employed in this and other aspects that process or process and use image-based input/data in performing Functions. Examples of such methods are described in, e.g., U.S. Pat. No. 10,289,931, 10,223,454, US20200201915, U.S. Pat. No. 9,959,259, US20110276589, U.S. Pat. No. 9,519,543, US20190205962, EP1971952, U.S. Pat. No. 9,846,708, WO2020181793, U.S. Pat. No. 10,789,287, US20140376819, US20040100465, US20110302206, US20120141032, U.S. Pat. Nos. 6,247,009, 10,191,921, US20170277720, US20090099839, U.S. Pat. Nos. 5,790, 691, 5,870,495, 5,457,540, and references disclosed/cited therein. US20200311126 and US20180107688 exemplify methods for associating image input with keywords or other alphanumeric information that can be used in generating DSs, generating query terms, and the like. US20200050610 exemplifies the combined use of image and textual information in combined queries, which may be employed by FM(s) of SOTI. US20040021700 exemplifies methods of combining user input with image recognition results. US20190108280 exemplifies methods of searching images with textual/keyword information that also can be employed in FM(s). Chemical structure recognition tools are exemplified in, e.g., U.S. Pat. Nos. 9,558,403, 5,157,736, 10,572, 545, US20080004810, and US20110202331. Handwriting recognition methods are exemplified in, e.g., US20100163316A1. Recognition and processing of tabular structures is exemplified in, e.g., US20090304282, U.S. Pat. No. 8,443,278, US20130218913, and US20100174975. Similar methods to each of these methods are known.

Additional aspects relevant to input receipt, processing, recognition, enhancement, etc., are covered elsewhere.

Data Enhancement—Cleaning, Synonym Generation, and Truncation

SOTI/MOTI typically include S(s)/F(s) related to data enhancement, such as data cleaning (e.g., SOTI often comprise a DCM), synonym generation, and truncation (e.g., stemming) Principles and examples of data cleaning and stemming/truncation are covered elsewhere, including in the Summary Synonym generation often draws from methods related to stemming/truncation methods, such as lemmatization, and use of SNs, NLP processes, or both. Such methods are known as are resources adaptable to performing such methods in the context of SOTI/MOTI. E.g., in Python the NLTK WordNet corpus can be employed with lemma functions to generate synonyms for commonly used English terms. In the context of SOTI/MOTI, specialized DRs can be generated that comprise (e.g., CC, MC, or PC) System-related terms and synonyms (e.g., for Product Components, Ingredients, amounts, NPDQPPs, RRs, etc.). In aspects, a specialized DR and matching algorithm comprising such System-specific synonyms can be used or combined with available broad-based NLP resources. Additional approaches to synonym generation that may be adaptable to S(s)/F(s) OTI are described in, e.g., U.S. Pat. Nos. 7,636, 714, 8,392,413, 10,546,012, US20100082657, US20100313258, US20160253418, U.S. Pat. Nos. 9,361, 362, 9,489,370, 8,832,092, and 8,812,541. In aspects, a QRD also comprises search/query element(s) that are generated from combination of terms (term combination) in a source or from source(s), according to frequent combination detection, system rules, or other suitable method. Examples of combined search term methods are described in, e.g., US20100138411 and US20110184725. In aspects, developing a QRD, matching, and ranking involves decomposition of DS(s) into Elements, such as PIER(s) and comparison on an Element basis (e.g., identifying Elements of a multi-level BOM). Elements can include, e.g., a System recognized Product name, primary Product Type identifier, primary Product identifier reference/value, etc. In aspects, the lack, change, or error in respect of Element(s) causes a FM to alert a User, Administrator, or both, and to prompt for or require additional entry with respect to such Element(s). In aspects, development of a query ready dataset (QRD)/query dataset, searching, matching, ranking, etc. comprises first applying one or more methods including data cleaning, synonym generation, stemming/truncation, record decomposition, term combination, token generation, vector generation, etc.

Dataset Construction

SOTI/MOTI typically comprise S(s)/F(s) for generating DSs from data determined to be associated in one or more way(s). E.g., SOTI/MOTI can comprise S(s)/F(s) for generating a DS from Input, taking recognized data from DII, DOCI, or often both sources, and, often after data cleaning, organizing such information into a form appropriate for generating QRD(s) and for storage in target DR(s), such as a relational database ("RDB"). SOTI/MOTI also typically comprise S(s)/F(s) for amending DS(s), e.g., in the generation of enhanced Customer Product Information (ECPI). Such S(s)/F(s) comprise typical functions known of analyzing DS content, writing to the DS, deleting content from the DS, reorganizing data in the DS, applying metadata to the DS, applying level/hierarchy or other structural elements to the DS, etc.

As indicated already, S(s)/F(s) of SOTI/MOTI can "decompose" Records to identify or isolate/retrieve element(s), e.g., according to hierarchy/structure rules and algorithm(s) in an SOTI. Such processes often draw on data recognition, matching, principles as covered elsewhere, to identify Levels of Records. Such processes often comprise matching different Levels and associating such DSF(s) through links, tags, or other associations (e.g., a Record for a Bike can be determined to comprise a DSF for a tire Component and the tire Component determined to be associated with Ingredient(s) and each such Ingredient associated with amounts). In aspects, QRDs comprise Level-associated information that is used to query DR(s) using or factoring in Level-associated information (e.g., in aspects involving regulatory compliance of products, decomposition/Leveling of DSF(s) into Components, Ingredients, and amounts can be used to determine if RRs are applicable to a Product or are at risk of requiring RA-action based on the RR information in similar records in DR(s) based on analysis of such Level/Element information). Level/Element information can similarly be employed in matching algorithms, ranking algorithms, or both. Similarly, S(s)/F(s) can comprise the ability to construct/reconstruct records based on levels of DS-related information, for storage for other applications.

SOTI/MOTI can comprise S(s)/F(s) for applying metadata such as tag(s), link(s), reference(s), and the like to DS(s) (e.g., a DS generated from CI and SPRR(s), records in a RIDR, or both) and for reading metadata associated with Records. As covered elsewhere, metadata can be part of QRD(s), and factored into matching or ranking. Metadata can include, e.g., unique Record identifiers, and DR structures, such as database primary key(s) (e.g., SQL primary key(s)).

Information Storage (DRs) and PTRCRM/NTCRM

S(s)/F(s) of MOTI/SOTI comprise Record storage capabilities for storing Input, DR(s), and CEI(s). SOTI will contain such stored information in physical, transferrable, and reproducible computer readable medium (PTRCRM) and S(s)/F(s) can comprise relaying such PTRCRM between device(s), system(s), and the like to reproduce or transfer such PTRCRM in different device(s)/system(s) and to execute application(s) of instruction(s) contained therein. Such transfer(s) can be of only part(s) of an entire system or relate to a specific step, and MOTI can comprise, e.g., several such transfer to several different system/devices, as exemplified elsewhere in this disclosure. Information storage methods and resources are known ITA and are also covered elsewhere.

Event Monitoring and Updating

Some SOTI/MOTI comprise S(s)/F(s) for monitoring for the occurrence of event(s) and executing action(s) upon the occurrence of such event(s) (e.g., an EMM). E.g., such S(s)/F(s) can comprise monitoring for a passage of time; monitoring for a change in RRs, Customer information, or DR information (e.g., changes in SPRRs linked to a SCPIR); monitoring for changes in PAD; etc. Action(s) executed upon such occurrences can include providing report(s) to Stakeholders, updating Records, updating other output(s) (e.g., RA submissions), and the like, and will typically include updating DR(s)/DS(s) to reflect the updated information.

Inter-System and Inter-System Data Communication Functions/Means

SOTI/MOTI will typically include S(s)/F(s) for relaying communication between different FM(s), devices, systems, etc., that make up part of the SOTI or that are external to the SOTI but involved in an application of the analysis of an SOTI, such as the filing of an RA submission. Methods of data communication are known and briefly covered elsewhere. Such S(s)/F(s) can comprise translation of data, packetization, and relay via protocols such as Wi-Fi, Bluetooth, ethernet, and the like. Inter-system communication(s) can include, e.g., inter-chip communications, inter-software communications, inter-DR communications, and the like.

Entities

Systems/methods of the invention typically comprise the use of various Entity information. Given that Entity-related information dictates the function of many steps(s)/Function(s) the classification of data with a type of entity can be associated with technical effects. Accordingly, such Entities will be briefly described here.

Customers

A Customer is typically an Entity that is associated with a User of the System and as covered elsewhere is seeking to perform one or more Function(s) by application of the SOTI/MOTI. A Customer can include an actual Customer that has on-market Product(s), information concerning which may be a partial basis for analysis by the SOTI/MOTI. A Customer also can be a potential Customer, seeking information based on a target/Profile or a Type. In aspects, a Customer's Affiliate's may be included in the scope of "Customer," but in other aspects Affiliates are excluded from the definition of "Customer."

Owner/Broker

An "Owner" is an owner or at least an entity managing/operating an SOTI. An "Owner" can also be referred to as a "Broker" as in many aspects the Owner acts as a broker between Customers and Suppliers, between Suppliers and other Suppliers (e.g., a MOTI can comprise identification of Suppliers that can stand in for a first Supplier when issues arise with the first Supplier that cause it to be difficult or impossible for the first Supplier to meet all of its supply obligations), or between Customers/Suppliers and other Stakeholders (e.g., RAs).

Suppliers

Suppliers are Entities that supply Products or services, typically Products (although MOTI/SOTI could be employed in services contexts as well, adapting the various S(s)/F(s) of MOTI/SOTI to application with Suppliers of services). Like Customers, in aspects, Suppliers can be or can comprise "potential" Suppliers, that the SOTI identifies as having the capability to be able to likely supply desired Product(s) within reasonable/set time periods. In most aspects, Suppliers somewhat, mostly, generally, or only consist of Independent Entities (IEs). Typically, IEs have contracting terms with the Broker, such that the Broker is able to access confidential (secret) information (SI) of such Supplier(s) that is inaccessible to the other Suppliers, Customer, or typically both. As covered elsewhere, MOTI/SOTI in such aspects typically provides S(s)/F(s) that ensure the protection of SI, while leveraging such SI for applications of the MOTI/SOTI, such as analyzing likely element(s) of a Customer's product, analyzing a Customer's RR compliance, or other actions of SOTI. In aspects, DR(s) also comprise Customer PRR(s), Customer Affiliate PRR(s), or both, along with IE PRR(s).

Stakeholders

Stakeholders comprise any other Entities that may receive output/analysis of a SOTI/MOTI. Stakeholders can include, e.g., RA(s), other Entities involved in the supply chain of a Customer, Customer Affiliates (where Affiliates are excluded from the scope of Customer), customers of a Customer, investors, and the like.

Users and Administrators

Two types of individuals that often will interact with SOTI/MOTI are Users and Administrators. A User is an individual or group of person(s) that is responsible for providing Input to a SOTI/MOTI, typically on behalf of Customer(s). Administrator(s) typically are employees or agent(s) of a Broker/Owner, which are responsible for certain functions/activities, such as supervised learning supervision, providing human system management support function(s), overriding operation of a SOTI, inspecting functioning of a SOTI, evaluating S(s)/F(s) of a MOTI/SOTI, and the like.

Records, Datasets, and Data Collections

A common feature of SOTI/MOTI are DR(s) comprising PRR(s) for supplied Product(s). Several common types of item(s) associated with such DS(s) are described here.

As covered elsewhere, Products broadly relate to any kind of manufactured, sourced, or improved items. "Manufactured" in this sense means any kind of manufacturing including, e.g., machine manufacturing, synthesis (in the case of biological/chemical products), construction through coding (in the case of software products), or sourcing (e.g., in the case of naturally sourced/isolated products (e.g., mineral commodities, petroleum products, and the like), cultured products (e.g., cultured biological products, agricultural products, and the like).

FG(s) represent an important type of Product in many aspects. An FG is any Product that is ready for sale and Customer application "as is" without requirement for combination with other Products. FG(s) can be simple FG(s), such as commodities (e.g., chemicals, agricultural products, and the like). In aspects, FG(s) are Assembled/Complex/Multi-Level FG(s) that comprise Components, Ingredients, or both.

A Component is a part of a Product that typically is the subject of some interaction, assemblage, etc., with other Components and usually is manufactured to perform a discrete function, provide a structure, or both in an FG. In this respect, Component(s) will often be distinguishable from Ingredient(s) (though there can be overlap in what is a Component and what is an Ingredient). E.g., in the case of a computer that is an FG, a processor could be a Component/Part.

Ingredient(s) can be naturally sourced or manufactured (e.g., through chemical reaction, derivation, synthesis, isolation, improvement, refinement, concentration, and the like). Ingredients are usually distinguishable from Component(s) in not providing a distinguishable structural or function element, outside of the level of chemical reaction with other Ingredient(s). As noted above, there can be overlap between such Levels, but a skilled person will typically recognize in a context what is an Ingredient and what is a Component and S(s)/F(s) of a SOTI/MOTI will usually associate certain DSF(s) with one level versus the other. E.g., in the case of a computer FG, chemical(s)/mineral(s) used to make a processor Component (e.g., plastics, silica, and the like), would be Ingredients of both that Component and, in combination with Ingredient(s) that make up other Components (e.g., a battery, memory, etc.), the computer FG.

Most of TD is focused on SOTI/MOTI involving Products, but SOTI/MOTI can be adapted to operate with respect to Service(s) (e.g., Service(s) of IE(s) can be stored in an IE Service Provider DR that is queried using Customer Input based on Qualities of Service(s), Properties of Service(s)/Service Provider(s), or combination(s) thereof.

In aspects, Type(s)/Profile(s) is/are used in place of or with CPIS(s). A Type (Profile) can comprise range(s) in place of value(s) that are typically present in a corresponding CPIS; a group of suitable Qualities, Properties, or both; and ACT. In other aspects, CSPI is also used as Input.

Records and Datasets

Customer information, Supplier and Supplied product information, and related information, such as RRs, are contained in DSs stored in DR(s) accessible by the MOTI/SOTI. A dataset (or data set/DS) can comprise or consist of any suitable collection of data (comprising attribute(s), value(s), or both). DS(s) can comprise tabular data (e.g., each column of a table representing a variable and each row comprising a Record, each typically containing value/nominal entries for each attribute (datum)).

There are not set rules for what constitutes a DS and what constitutes a DR in the art. E.g., the term Dataset ITA is applied to files, collections of files (folders), or entire databases, etc. In TD, the terms "Dataset" and "Record" in TD, can be interpreted to refer to a named collection of data (e.g., a Record, such as a single entry in a tabular data collection) or a collection of multiple related records or a structure containing multiple related records (e.g., file(s), schemas, and the like). DSs typically are catalogued/named and can be, e.g., are treatable as objects/referenceable by S(s)/F(s) of MOTI/SOTI that employ object-oriented programming principles.

Record collection(s) (optionally associated with other data) can be characterized as Dataset Collections ("DSCs"). Examples of DSCs include pages or projects in SQL DRs, which can comprise multiple Records, index information, metadata, and combinations thereof. aspects described with respect to DS(s) typically can be applied to DSC(s) and aspects described with respect to DS(s) should be interpreted as implicitly being applicable to DSC(s) unless contradicted explicitly or by clearly contradicting context or implausibility. In aspects, DS(s) comprise blockchain DSF(s)/structures. In aspects, a dataset amendment module (DSAM) or other FM can add blockchain-like DSF(s) to DS(s) (e.g., a CPIS, recording, e.g., transactions involving Customer Products, or to a User profile DS, recording, e.g., System transactions performed by a User on behalf of Entities). In aspects, blockchain structures/functions are used in, e.g., performing electronic contracting between entities. Blockchains used in aspects can be multi-dimensional blockchains, which are known. Blockchain approaches/resources also can be utilized in, e.g., making RA documents.

DSs can be read, written, or both by any suitable method(s). In one exemplary aspect, some, most, or all the DSs in some, most, or all DRs of a SOTI are capable of being read, written, or both, by a publicly accessible form of SQL (Structured Query Language).

DSs can be in any suitable format using any suitable syntax. Common formats for DSs include records in SQL objects and other RDB entries, HTML files, XML files, text files, CSV files, and the like.

Attributes and Features, and
Qualities/Characteristics, and Other Elements

DSs comprise DSF(s) (numerical/nominal value(s) for attribute(s) (sometimes ORTA "fields," "entries," or "datum"). In aspects, DSF(s) serve as primary key(s) in DSC(s)/DR(s) (e.g., in an RDB).

In aspects, one, some, most, or all DSF(s) of a Record are Elements/Features (IFs). What characterizes DSF(s) as an Element can depend on S(s)/F(s) of any aspect of a MOTI/SOTI. E.g., in aspects, Element(s) comprise Ingredient(s). In such aspects, S(s)/F(s) analyze FG or Component Records to identify Ingredient DSF(s) contained therein, and to utilize such Ingredient information in searching, matching, ranking, etc.

PRR DSs typically comprise Product Qualities. Qualities typically include physical characteristic(s) information (e.g., weight, size dimensions, and the like). Qualities that define a suitable Product for S(s)/F(s) are typically characterized as PDQ(s). Qualities also can include functional information (e.g., expiration data, battery life, productivity metrics, etc.).

In aspects, PRR DSs also comprise Properties, which typically comprise information about Products that are distinguishable from physical/functional characteristics (to clarify this point the reference NPDPP is used to describe such Properties). Examples of Properties can include country of origin/manufacture information, pricing information, intellectual property information, Regulatory information (however, in aspects, RR information is characterized separately from Properties), and compliance information (e.g., inclusion of conflict minerals; production in factories from countries with relatively low protection of worker rights; etc.).

Hierarchical Relationships, Datasets, Levels, and
Schemas

In aspects, DSs are MLRs, comprising multiple Levels of information about a Product, Entity, etc. Inclusion of Levels typically means that the Record in such an aspect is a DSC, comprising Records for each Level. E.g., a complex FG DSC can comprise FG Record(s) at a Level, Component Record(s) at a "lower" Level, and Ingredient Record(s) at an even lower Level, each Level comprising, e.g., PDQ(s) or NPDQPP(s). MLR data can include, e.g., "make" versus "buy" information associated with aspects of CSPI/PRRs (regarding how Product(s) are obtained). MLRs and other Records can include various references, such as part numbers, BOM type, BOM level, etc.

DSCs can be organized according to any one or more structures, hierarchies, or organizational patterns. E.g., Records in a DSC can be arranged in a sequential manner (by number, date of entry, alphabetic keyword, etc.). DSCs also can be partitioned DSCs or "library" (comprising a directory of the DSC and members, DSs), allowing for easier direct access of Records therein. A DSC can also be a keyed sequence data set, such as a VSAM (Virtual Storage Access Method) DSC, associating keys with records to allow for efficient searching of DSCs.

Metadata

Records can comprise or be associated with metadata, such as tags, links, etc., examples of which are covered elsewhere and known. MLR(s) can comprise metadata at one, some, most, or all Level(s) of the MLR/DSC. Tag(s) can comprise identifier(s), keyword(s), classifier(s), and the like. Link(s) can comprise, mostly comprise, or consist of dynamic link(s), e.g., dynamic links that are automatically update(d) according to rule(s)/algorithm(s) of S(s)/F(s) of SOTI/MOTI. Link(s) typically link Record(s), Level(s), DSC(s), DR(s), etc. E.g., links can associate Record(s) with performed queries, Entities (Customers, Suppliers, or RA(s)). Metadata associated with DSs also can include descriptive information about the DS (e.g., what are attributes, what are expected values, units of values, or AC) or type/nature of DS (DS entity information). The lines between what defines metadata and data, however, are not always clear ITA, and what is classified as metadata by a skilled person or DS/DSC can be classified by data by another skilled person or DS/DSC (e.g., location data). Accordingly, except for certain types of metadata (links and tags), it will be understood that some types of metadata (e.g., date of Record entry or update) can be recorded as data and vice versa. In aspects, certain metadata (e.g., keywords) also are actual data (e.g., Elements). Metadata also can be used to define levels of access/authorization as well as Levels within a DS (or other hierarchy/structure). Given the nature of the operation of SOTI/MOTI, most, generally all, or all of the System-generated or System-modified DS(s) used in performing Function(s) (e.g., querying, matching, ranking, and serving as basis for enhancement of other DS(s) or related activities (e.g., preparation of RA submissions), whether associated with metadata or not, can be characterized as "functional data," in that the content/format of at least some of the DSF(s) in such DS(s) contributes to the operability of such Function(s). Metadata associated with DS(s) used in SOTI/MOTI (e.g., PRRs/CPISs) can provide particularly clear functional data characteristics such as, e.g., protecting SI by imparting access level/SI status information; enabling identification of relationships, opportunities, POC(s), and the like through linking/tagging, e.g., with other DS(s) in the same or other DR(s) (e.g., other PRRs, Records in a RIDR, etc.), synonym content or links to relevant rules/corpus (or corpora) for synonym application, lemmatization, etc., and rules for structure of DSF(s), priority of DSF(s), etc., which can be used in matching, match evaluation (determining hits/misses), ranking hits, assessing confidence of Functions, and the like.

Data Repositories (DR(s))

A collection of DSs that cover a field of related information (e.g., Supplied Products, RR(s), etc.) are typically contained in a DR. DR(s) are large collection(s) of related DS(s), DSC(s), or both. Components of a DR typically have some level of independence/separability from each other, as compared to elements of a DSC. E.g., an IESPIDR comprises PRRs from IE(s) that do not share connections other than types of attributes, values, and Levels therein (and structuring of thereof), whereas complex FG DSs in an IESPIDR comprise related FG, Component, and Ingredient Records. A DR can be any suitable type of DR. DRs known include, e.g., databases, data warehouses, and data lakes. In aspects, one, some, most, or all DR(s) in a SOTI/MOTI are databases, e.g., relational database(s) comprising multiple Record(s), DSC(s), or both, linked by DB relationship(s) (e.g., primary key(s)). DR(s) in a SOTI/MOTI can comprise different focuses. Typically, a SOTI will comprise a SPIDR (e.g., an IESPIDR). In aspects, a SOTI will also comprise a RIDR. In aspects, SOTI comprise multiple SPIDR(s) or RIDR(s), e.g., that are directed to particular collection(s) of Records/DSC(s), separated by characteristics such as region(s)/countries, language, Product Type(s), etc. Metadata associated with Records can include descriptive metadata is descriptive information (e.g., Record title, abstract, author, and keywords), structural metadata (e.g., data types, data relationships, attributes, hierarchies, expected ranges/types/units, Levels, etc.), administrative metadata (e.g., permissions, creation date, update date, update instructions, Administrator contact information, etc.), reference metadata (how data was obtained—e.g., combination of DII, DOCI, PAD, etc., and results of System processes, such as application of MLM/AI to certain datum, amendment as a result of data cleaning, etc.).

In aspects, some, most, generally all, or all data of a DR/SOTI is stored in a flexible relationship DB, such as a NoSQL database or similar database that stores and retrieves data without needing to define its structure first, or other relationship database. In aspects, some data of a DR/SOTI is maintained in a graph database. In aspects, System data is contained in a combination of two or all a flexible relational (e.g., NoSQL) DB, a structured relational (e.g., SQL) DB, and a graph database (comprising connected node/relationship data). The use of two or three of such DR(s) for containing the functional DR(s) described in TD (e.g., the RIDR, SPIDR, or both) is another aspect of the invention.

Pre-Analytical Steps

Authentication, Access, and Contracting

In aspects, Users are cable of performing action(s) through querying a SOTI or by applying the results/output of a SOTI/MOTI, such as the preparation or preparation and submission of a RA Submission. In such aspects, SOTI/MOTI typically will comprise FM(s)/S(s) for SOTI/MOTI can comprise S(s)/F(s) for assessing User authorization, Customer authorization, or both (e.g., an AM/UAM). Methods of authorization evaluation are known, and such methods can be adapted to practice of such S(s)/F(s). Authorization components can include, e.g., pre-shared key/device authentication/recognition, password/code authentication, biometric information, knowledge-based authorization, use of key fobs/devices or authentication applications (e.g., operated on mobile devices), behavioral/psychometric authentication, etc. (e.g., two-factor or three-factor authorization methods). More sophisticated authorization methods, principles, etc., adaptable to such aspects are described in, e.g., U.S. Pat. Nos. 5,684,951, 6,421,943, 5,832,209, 6,263,432, 7,904,956, 7,991,902, 5,999,711, 5,613,012, 5,742,756, 6,289,344, 6,594,759, 6,675,153, 6,711,681, EP1115074, U.S. Pat. No. 7,434,257, US20020032661, US20200286055, US20020184161, US20200329051, US20200267147, US20200311285, U.S. Pat. Nos. 6,910,041, 7,080,037, 7,685,173, 7,366,913, 7,178,163, 7,664,752, 8,365,254, 8,024,794, US20080183625, and U.S. Pat. No. 8,646,027.

Figure 2:
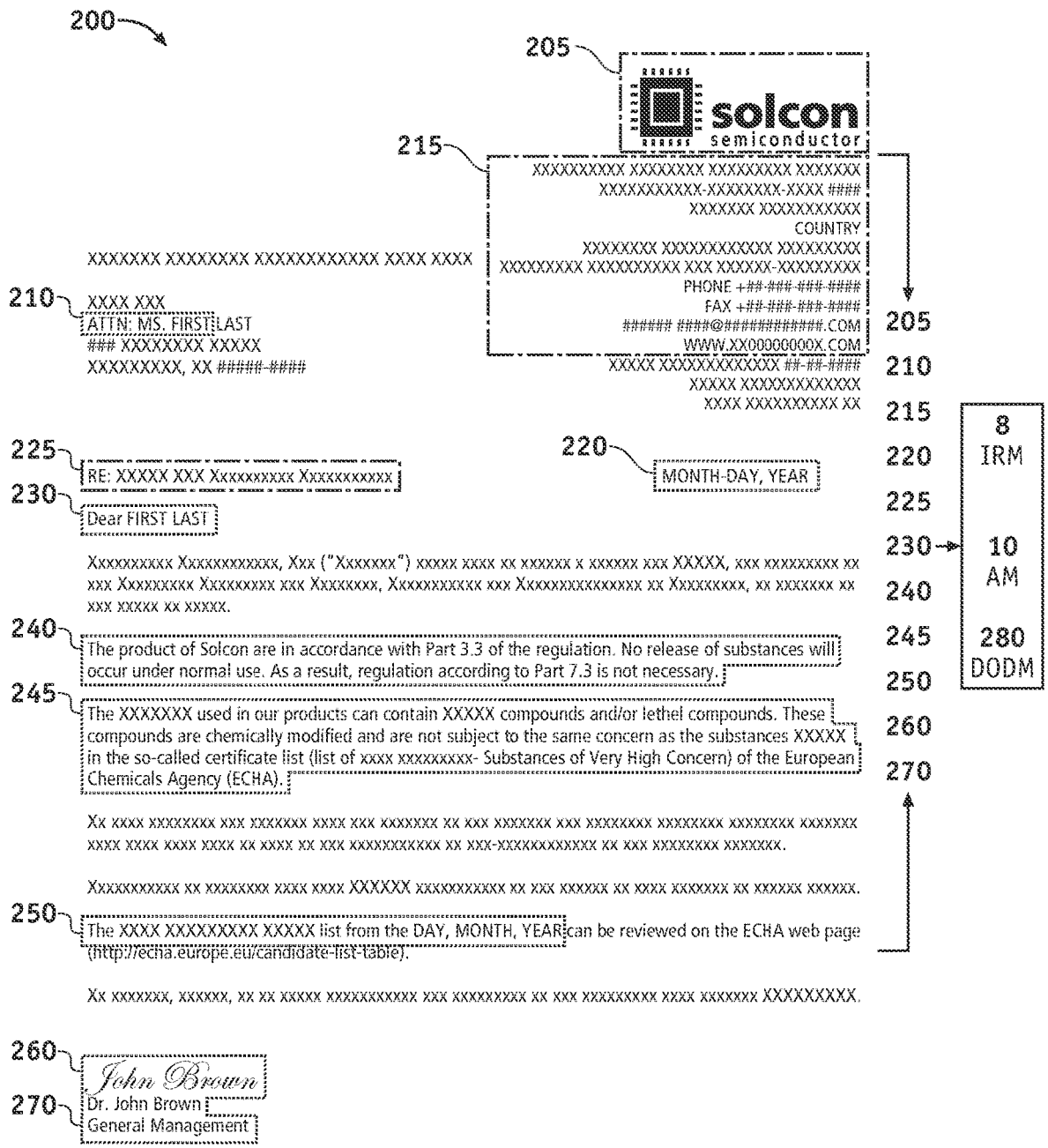
FIG. 2 is an exemplary document input (DOCI) (here, a letter of authorization) analyzed by a UAM using text recognition techniques (e.g., OCR and NLP methods).

In aspects, authentication can include analysis of Input, such as DOCI/DII (as exemplified in FIG. 2). In such aspects, S(s)/F(s) of the MOTI/SOTI analyze such Input, e.g., identifying DSF(s) of Input that is identified as associated with a User's association to a Customer, position/role (e.g., level in the Customer's organization), whether the User is new to the SOTI, etc. S(s)/F(s) can rely mostly, entirely, or only partially on such DOCI/DII Input. In aspects, the Input comprises one or more DOCI Input(s), such as letters of authorization on Customer letterhead, and the like, again as exemplified in FIG. 2. Through employing scanning, character recognition, tokenization, matching, and ranking function(s), a SOTI/MOTI can evaluate whether such DOCI is sufficiently determinative or supportive with other factor(s) as to whether a User has established one or more level(s) of authorization. In aspects, S(s)/F(s) comprise determining a level of risk associated with User/Stakeholder Access to a SOTI or results/analysis, etc. and permitting a level of access or denying access based on the risk score, and optionally reporting attempted access by Entities with a high-risk score to Administrators, Stakeholders, or authorities.

SOTI/MOTI can comprise S(s)/FM(s) that apply levels of access to data, Functions, output, or output-related actions (e.g., generation of a RA Submission, submission of a RA Submission prepared by a SOTI, and the like). In aspects, access analysis determines the level of access that an individual has to System resources. E.g., a trusted/high level Administrator that is an employee of Owner/Broker may have access to certain SPRR information that is confidential/secret information (SI), subject to confidentiality agreement(s) between Supplier and Broker, whereas a User will be blocked from access to such information. As another example, certain Users may be authorized to submit Customer Information, to run certain queries in the System, or both, but not be able to, e.g., enter contractual commitments with the Broker, other Suppliers, or both. Leveling of data access can be achieved, e.g., by creation of virtual private databases (VPDs), providing data access to part(s) of DR(s)/ data in a SOTI, using preprogrammed policies and access methods known.

Sufficiency Evaluation (Minimum Actionable Dataset)

SOTI/MOTI can comprise a S/F for assessing the sufficiency of an initial Submission (e.g., an IM determining if a Submission contains a Minimum Actionable DS (MAD)). The required DSF(s) that make up a MAD will depend on factors such as DO, and the S(s)/F(s) performed by the MOTI/SOTI to obtain the DO. Typical DSF requirements for a MAD are (1) a Product name/reference, if a well-known Product Type or sufficient PDQs with respect to the DO (e.g., Ingredients and amounts thereof); (2) CII including Customer identity and contact information; (3) User identification information such as name and relationship to Customer; and (4) clear DO that is accessible by operation of the System. SOTI/MOTI can report on the failure to provide a MAD, seek supplementation of Input when a determination of failure to provide a MAD is reached, or both. S(s)/F(s) following a determination that an initial Input is not a MAD can comprise prompting for and receiving supplemental Input, such as Input directed to addressing the deficiencies in the Submission identified when determining that the Submission did not constitute a MAD.

DO/Sought Analysis

MOTI/SOTI can be used for a variety of purposes, including identification of potential Suppliers for current or planned Products; evaluation of regulatory compliance for Customer or Supplier Products; determining size/characteristics of Product markets; facilitating contracts or negotiations between Entities; and other purposes that can be derived from the use of SPIDR/IESPIDR (or corresponding Service Provider) data. Parameters for, e.g., inclusion in a QRD, determination/measurement of matches (hits), ranking of hits, application of hit data to DS enrichment, and other function(s) typically use such DO as a factor.

Input Receipt and Interpretation

As mentioned, and covered elsewhere, the initiation of many MOTI begins with Customer Input, and SOTI comprise resources, such as FM(s), for the receipt and handling of Input (e.g., an IM and IRM). Aspects of the Input process (e.g., receipt of DII, DOCI, etc.) are covered elsewhere and are known.

Typical aspects of Input will be User Information (e.g., name, title, contact information, authorization access information, role/title, other identifying information, etc.) and Customer Information (e.g., CII such as Entity name, location, and other identifying characteristics, and optionally CDQs (e.g., requirements such as no use of conflict metals, sourcing products from only Suppliers with certain locations, certifications, or other qualifications, etc.)). In aspects, Input comprises CPIS, CSP (e.g., comprising a Type/profile), or both, which is used to perform queries and analysis using the DR(s) of the SOTI. CPIS or other Input can be provided through DII, DOCI, or both. In aspects, multiple documents are submitted as part of Input. In aspects, one, some, most, generally all, or all DOCI comprises unstructured data (as compared to the structure of one or more DR(s) of the SOTI, such as an IESPIDR PRR structure). Input/CI is received by the system, organized into an at least initial Customer Information DS (typically a CPIS also called a CPRR or a NPRIS). Aspects of such a CI DS typically are enhanced by the operation of the MOTI/SOTI, e.g., in the case of CPIS, which is enhanced upon analysis of the CPIS against PRRs in the IESPIDR to determine errors, omissions, relationships, status(es), Qualities, Properties, etc. or similar data, to generate an ECPIS (ENPRIS). In aspects, CPIS comprise $\geq 1$ Customer associated non-PDQ product property (CANPDQPP) (e.g., that the particular property cannot comprise certain potentially toxic Ingredient(s) that are banned or subject to onerous Regulations in key Customer markets). CI Submissions can also be stored as a part of DR(s) of a SOTI (and characterized then as a SCPIR). As covered elsewhere, the Input process can comprise presenting a series of cues/prompts, e.g., questions, and feedback on input for sufficiency.

Processing of Documents, Images, and Other Unstructured Data Inputs

As covered elsewhere, SOTI/MOTI comprise S(s)/F(s) for recognizing, analyzing, and assembling/formatting CI. Data recognition methods, such as OCR and image recognition, are covered elsewhere and known. An IM can be adapted to receive Input in multiple formats and from multiple sources, such as email, file upload, scanned document(s), web page reference(s), and DII through various device(s) (laptops, mobile phones/devices, etc.). An IRM will typically be able to recognize both TIDI and NTIDI (e.g., image information), including in aspects NTIDI of several classes relevant to typical DOCI submitted to the SOTI (e.g., chemical compound structure(s), component/ assembly drawing(s) for devices, circuit board layouts, semiconductor designs/mask works, blueprints, process charts/flow charts, and other types of images that may appear in DOCI such as BOMs). An IRM will typically comprise FM(s) or perform step(s) that identify terms, values, and images in DOCI that are unstructured with respect to the organization of Records in the DR(s) of the SOTI; some, most, generally all, or substantially all other DOCI received into the System; or both. Such rules/algorithm(s) include, e.g., the use of NLP method(s) and reference to SN(s) for detected alphanumeric values contained in DOCI, typically in combination with matching rules/associations, application of synonyms, etc., to determine expected meaning(s) of such alphanumeric data. Image recognition can comprise step(s)/Functions covered elsewhere, such as recognition of image(s) against a library of image(s), image properties, and the like, and association of such image(s) with meanings to aid in, e.g., the building of a QRD (such processes can also comprise associating System image(s) with alphanumeric text, such as a chemical structure image with the name of the associated chemical). An IRM can apply contextual rules, such as structure archetypes, placement in document rules, and the like, to also evaluate data in DOCI based on context, expected structure of the DOCI, etc. Various CI from DOCI, DII, or both detected/received are combined to generate an initial CI DS, which is typically subject to further processing/analysis by S(s)/F(s). Input processes will often involve tokenization and element association to permit the System to understand the meaning of data in data source(s), enabling FM(s) to find synonym(s) for such DSF(s), run searches (make matches) using such DSF(s), analyze DS(s) comprising such DSF(s) (e.g., for PDQS or Properties), and the like.

In aspects, Input analysis comprises evaluation of whether Input comprises data that according to rule(s)/protocol(s) used by the System or used by the System in the context of the DO, require that the Input be separated into two or more distinct DS(s). E.g., an Input can comprise information about an FG and an associated Product that can be characterized as a spare part (e.g., a spare tire for a car). Under ECHA, an article that is classifiable as a spare part is submitted under a separate dossier from any associated FG. In such a case and in other contexts, a S/F comprises evaluation of possible multi-DS feature(s) in Input and the separate of such DS(s) based on rule(s), assessment(s), etc., in two separate DS(s). E.g., in the specific case of spare parts under ECHA, the System can generate separate DS(s) for the car FG and for the tire spare part, to facilitate preparation of ECHA-related RA submissions.

Input Modification

Data Cleaning/Harmonization

Typically, initial CI DS is subject to data cleaning, data harmonization/formatting (blending), or both. Such S(s)/F(s) can comprise, e.g., a validity assessment of initial CI. Validity assessments can comprise, e.g., measuring the degree to which detected CI data (e.g., values and attributes, especially Elements) conforms to expected attributes/values, etc., based on preprogrammed rules/constraints or archetypes. A DCM/IRM can, e.g., rank data with lower validity scores lower in analysis, exclude data determined to be invalid/irrelevant, alert a User to expected invalid data (or conversely present detected valid data, or report both excluded and retained data to a User), etc. Constraints can include, e.g., range constraints (expectation of values of a particular attribute falling within a numerical range (e.g., size/weight) or nominal values falling within a certain set (e.g., terms that match Products)). Constraints also can be applied to pricing, dates, and other values per rules (usually maximum and minimum expected values). DOCI input can be subject to mandatory constraints (required entries), unique constraints (information that particularly identifies/ associates the CI with one or more items of information), or both. Regular expression pattern recognition is commonly employed in the recognition of such input. In aspects, cross-field validation methods can be used (e.g., in a detected Ingredient list providing amount or percentage information ensuring that the list adds up to an expected whole). Methods in the various patents cited in the Background also can be applied or adapted to the practice of such S(s)/F(s). Even data that is determined to be valid (or where no validity step is performed) an IRM can apply an accuracy assessment and assign an accuracy score to CI to weight its value to generating a combined CI DS. Accuracy/validity assessments for data cleaning can comprise comparison of data with validated sources of information. E.g., CII can be compared against corresponding Dun and Bradstreet data for the Customer or aspects of a CPIS can be compared against publicly available corresponding information, such as information available on the Customer's web page, Regulatory listings, etc.

A DCM/IRM also will perform a completeness evaluation/assessment, particularly where mandatory constraint rules for CI are employed. A completeness assessment or score will evaluate the degree to which required data is included in the proposed CI. In aspects, a DCM/IRM will infer missing data, but only where such data is retrieved from validated sources or is associated with a high level of confidence in the System. In aspects, some, most, or all instances of incompleteness result in a rejection of a proposed Submission, typically coupled with a cue/request for supplementation by the User. In aspects, the DCM/IRM seeks to determine the source(s) of incompleteness, such as poorly readable DOCI, expected typographical errors (typos) in DII, etc. In aspects, default values for certain entries can be used by a DCM/IRM. In aspects, default values are presented to a User prior to association with other aspects of CI.

DCM/IRM FMs typically will assess consistency between sources of Input (e.g., between different documents, between DOCI and DII, between either or both thereof and validated data or expected forms/measures, etc.). Consistency measures are performed by matching against rules or between Records and is an element of data matching in search/ ranking and similar S(s)/F(s). In aspects, consistency analysis is performed using measures (which can be reported to a user, employed by algorithms with cutoff functions, etc.). In aspects, FM(s) make consistency determinations and take actions (alerting a User of the issue or making a determination to omit or amend data), e.g., where a consistency determination is clear from rules (e.g., where there are two Customer addresses provided in CII or two clearly different names provided for a User). Consistency evaluation can comprise time of entry factoring (e.g., more recent data being considered more reliable); data source reliability factoring (e.g., certain Input(s) or User(s) or types of Input(s), e.g., in terms of clarity/detail or document type, being considered more reliable); logical evaluation (e.g., a record for a bicycle weighing 1,000 Kg would likely be flagged as a consistency risk/error); testing of data element(s) against validated data, rules, etc. A related assessment is uniformity, which looks at types of values, units of values, etc., in various Inputs or DSs, but often non-uniform information can be harmonized in data blending/harmonization processes (e.g., converting inches to centimeters, pounds to kilos, mole percentages to weight percentages, volumes to weights, amounts to ppm/ppb, etc.). Integrity can be used to describe analysis of combinations of two or more of validated data, consistent data, accurate entry, complete entry. In aspects, data cleaning follows an evaluation of integrity.

A DCM typically performs data auditing to assess Input/ DS anomalies, contradictions, other errors, etc., using rules, constraints, statistical analyses, etc. and removing/amending some, most, generally all, or all detected anomalies, identified errors, or other problematic data as part of a DCM workflow (e.g., detection of syntax errors/parsing). Unexpected values/attributes can be identified by statistical methods (e.g., mean, SD, range, or clustering algorithms), application of rules, application of AI/MLM models, and the like, as also covered elsewhere. Such or similar methods can also be used to handle identified missing values, which can be replaced by one or more plausible values, usually only on application of certainty rules/standards, via data augmentation algorithm(s), as covered elsewhere. Data visualization methods applied across data can be also to identify anomalies, errors, or omissions. Data cleaning S(s)/F(s) can be repeated ≥2 times, such that an aspect of data cleaning can include initial data cleaning post-processing of initially cleaned data.

A DCM will typically perform inspection S(s)/F(s) (usually after profiling the analyzed data), cleaning S(s)/F(s), and post-cleaning (deletion, amendment, reformatting, etc.) verification/validation S(s)/F(s). A DCM can often report or cause other FMs (e.g., an ARM) to report suspected errors, changes based on application of cleaning algorithm(s), or both. The DCM will or cause other FM(s) (e.g., a DSAM) to update DS(s) to comprise data/metadata concerning changes, issues, etc., identified/applied in the data cleaning S/F.

A DCM will typically comprise duplicate (redundancy) detection and elimination function(s) to minimize Record size, enhance efficiency, etc. Such function(s) can be applied ≥2 times in the process of a MOTI (e.g., in processing a single source of Input, such as a single DOCI; when all sources of Input have been processed and combined; etc.). Numerous algorithms for duplicate detection are known and covered elsewhere.

A DCM also will comprise S(s)/F(s) for identification of relevant/irrelevant data, to restrict data to expected or known relevant data, etc. (in this respect a DCM can draw on NLP functionality, e.g., NER covered elsewhere). Correlation matrixes also can be generated, employed, or both, to assess relevance and other aspects of data quality in a DCM, IRM, or similar Function. As covered elsewhere, NLP(s) can draw on linguistic rules and statistical patterns, usually drawing upon/referencing a corpus or "authority file," to identify and extract DSF(s) from Input. NLP processes can comprise evaluation based on text polarity characteristics known (e.g., the association of ranges of values, multiple meanings, true/false status, etc. with a NL element). NLP can be employed in question-answering (QA) Function(s) used in FM(s), such as an IM, or in connection with reporting errors, issues, etc., with an ARM.

A DCM also can detect syntax error(s), such as delimiter error(s) (white space, excess white space, punctuation errors, or other grammatical/formatting errors). A DCM also can identify; evaluate; and remove, skip, or omit "stop-words" (e.g., "a", "an", "the", or "in").

Evaluation of redundancy and general IRM S(s)/F(s) can include evaluation of synonyms (car and automobile), stems/truncations (automobile and auto), translations (e.g., car and the Spanish equivalent "coche"), etc., in matching of terms against rules/dictionaries, measurement of difference between entries (e.g., string differences). Normalization methods also can be employed to detect errors, omissions, and anomalies.

A DFAM/DIOM will usually apply data transformation protocols/algorithm(s) or processes on cleaned data, to appropriate map data from current format (e.g., separate CI elements, such as separate DOCI or DOCI and DII; raw combined CI; or both) to an optimized/required format (e.g., a format used for PRRs in an IESPIDR, a MLR format, or the like). Such functions can include application of a LTM for translation of languages or mapping of terms in different natural languages to a single type of attribute/value. Transformation processes can transform data into expected data types based on form/structure, requirement, etc. (e.g., date-like fields to date fields, numerical like data to numerical fields, etc.). Transformation can comprise exchange of Product references such as Entity part numbers for System part numbers. Metadata association can also occur at such times/ levels, including application of RR information (e.g., EC TARIC code(s) and the like) to PRR-related DS(s).

Data cleansing S(s)/F(s) also can be coordinated with or comprise Data harmonization (blending or normalization of data). E.g., a DCM can combine DS(s) of various size, formats, etc., such as different file formats, naming conventions, layouts, etc., and to transform such data into a single cohesive data set. An example of such a transformation at the DCM level can be taking various data determined to be related (e.g., "st," "str", "St.", or "street," are transformed to "Street"). More complex transformations can be made in cases involving NMI and TIDI, e.g., transforming chemical structures, chemical formulae, chemical references, and alternative chemical names into System-preferred chemical names.

FM(s) involved in DC, data blending, and modification of CI (e.g., CPIS) based on search results of querying DR(s) of a SOTI and other information sources, such as PAD source(s), also can engage in DS enhancement process(es). DS enhancement typically will comprise adding expected missing data (e.g., appending identified Components to FG Records) or correcting DSF(s) expected to be clear errors by indication(s) that are assessed to be strong indication(s) by the relevant FM.

Interpreation of Evaluation Submission/Input Data

SOTI/MOTI comprise QM(s)/search(es) of DR(s) that are a part of a SOTI. To perform effective searches, SOTI/MOTI will comprise S(s)/F(s) for developing a QRD that is used as the basis (or at least the starting point) for the search. A QRD can in aspects be amended during searching and matching/ ranking processes, e.g., where new likely synonyms not yet in the System corpus/SN(s) are identified in association with search term(s). S(s)/F(s) of a QM/IRM or other FM(s) (e.g., DFAM, DIOM, or both) can overlap in terms of identifying the meaning of data (interpreting data) in a DS. The content of the QRD (e.g., lemmas and synonyms) and the technical aspects (S(s)/F(s)) employed in generating the QRD are generally more important than assignment of responsibility for such S(s)/F(s).

Initiation of interpretation of data in Input or DSs generally can comprise, e.g., tokenization as discussed above, at various levels (e.g., a single term/delimiter level, a bigram level, a trigram level, or higher Ngram level, etc., often in combination with testing such different level(s) against expected syntax, common expressions, meaning/NER, etc.) (e.g., identifying "New York" as a particular stage/city by bigram tokenization, versus evaluating the data as "New" (possibly disregarded) and "York" at an individual token interpretation level). NLP processes by an NLP FM can be performed to interpret many forms of Input. NLP processes can be combined with the use of specialized SN(s), e.g., SN(s) trained on PRR-relevant terms and meanings, synonyms, delimiters and other grammatical/syntax or formatting rules, and the like. Again, there are overlaps in such S(s)/F(s). E.g., NLP processes typical involve tokenization in the forms of word recognition, sentence segmentation, field segmentation (e.g., in tabular data), or paragraph segmentation. NLP processes typically further comprise part of speech recognition (and part of speech tagging), tense recognition/tagging, and the like. NLP processes also typically comprise application of lemmatization processes to find basic word forms that connect read terms in Input/DS(s), and evaluating word relationships (e.g., by dependency parsing (e.g., shallow parsing/"chunking"), phrase identification, word sense disambiguation, natural language generation, coreference resolution, sentiment classification, and Named Entity Recognition (NER), which are known). NER processes for PRR-specific terms can require the inclusion of specific PRR-related corpus/SN in a SOTI. NLP processes can comprise analysis based on sentence/phrase/expression morphology or syntax, and NER processes can draw on factors such semantics or pragmatics. Although S(s)/F(s) of MOTI/SOTI involving NLP can involve NL translation (e.g., by a LTM), interpretation of non-typical NL terms, and a variety of unstructured documents, the accuracy of NLP interpretation S(s)/F(s) in a MOTI/SOTI can be very high (≥~85%, ≥~90%, ≥~95%, ≥~97%, ≥~99%, ≥~99.5%, or ≥~99.9%), particularly given the limited paragraph and phrase/word collection structure of many inputs in the PRR context. NLP processes/resources will often involve the use of trained MLM/AI processes, such as supervised learning (SL) or semi-supervised learning (SSL) processes. Numerous NLP function(s), algorithm(s), resource(s) are related principles/tools are known and widely available and can be adapted to the S(s)/F(s) described in TD. E.g., in the NLTK, WordNet, BERT (sub-word token) model, and spaCy library resources in Python are known tools for common NLP processes. The use of subword token method(s) in NLP can aid in detectably reducing out of vocabulary (OOV) interpretation problem(s). NLP processes also can be employed in Input processes, such as receipt of instructions, responses to questions, etc., made by an IM.

SOTI/MOTI can be distinguished from prior art systems in, i.a., the ability to accurately interpret multiple Inputs from IE(s) that can comprise multiple data formats, types, and presentations and to do so for a large variety of Product Types and to similarly build effectively searchable DR(s) from such highly different Input(s). To accomplish such S(s)/F(s), MOTI/SOTI draw on multiple (e.g., ≥5, ≥10, ≥15, ≥20, ≥50, or ≥100), flexible schemas/patterns (e.g., SNs, document/record format schemas, and the like), algorithms, rules, etc. for recognizing formatting, patterns, attribute indicators, context(s), etc., in such varied Inputs. The data recognition process can also employ repetition in performing such S(s)/F(s), such as performing multiple iterations of interpretation; validation through presentation and feedback from User, Administrator, or both or through inter-Input, intra-Input, or initial DR/external data (PAD) query/matching; or the application of MLM(s). As covered elsewhere, to perform such processes in a timely manner SOTI can employ massive parallel processing capabilities.

Term-Identification

In aspects, IRM and other processes ascribe higher levels of meaning to read data than term recognition. One example is the identification of keywords/expected keywords in a DS. Keywords can be used, e.g., in evaluation of correctness of data interpretation. Keyword identification method(s) are known. Examples of such methods include, e.g., "bag of words" (BoW) and similar frequency-based methods in which word counts are used to identify expected keywords. Another such method is Term Frequency-Inverse Document Frequency (TF-IDF), which involves scoring of word frequency in a document/DS versus the inverse rarity scoring of a word across a collection of documents/Record as a method of identifying possible keywords.

Given the specialized nature of DR(s) in SOTI (e.g., RIDRs and SPIDRs) recognition of meaning typically requires, as covered elsewhere, matching against a specialized "corpus" (dictionary or library of terms). Accordingly, in S(s)/F(s) involving interpretation of Input, matching of DSs, ranking of matches, and the like, such S(s)/F(s) can comprise evaluation of a match of terms (whether in text, metadata (e.g., image-associated terms), or both), against terms in such one or more specialized corpuses (e.g., a Regulation corpus, a PRR-related term corpus, or both).

In aspects, a SOTI can comprise one or more SN(s) that can be used for determining term/phrase or sentence meaning. In aspects, a system comprises one or more specialized concept SN(s) (e.g., a Regulatory SN, a PRR-related SN, or both), which comprise a minimum or average of 2, 3, 4, 5, or ≥5 nodes/relationships per SN concept. In aspects, S(s)/F(s) comprise analysis of SN hierarchy in evaluating term/phrase or sentence meaning. SN evaluations can be performed at an individual corpus level or at a level that factors semantic type(s) (e.g., Qualities, Properties, Product type, RR, etc.), concept(s), edges, semantic relationships (links, link labels, or both), and ACT. In aspects, SN(s) can combine two or more major areas of interrelated information such as PRR-related information and RR information, which can be associated (e.g., SCIP reporting requirements, Ingredients, and amounts). A SN can be any suitable SN, including a definitional network, assertion network, learning/executable network, or hybrid network. In aspects, SN(s) are trained by MLM/AI processes, are trainable, or both.

SOTI can comprise a corpus, SN, or both, or, as noted, a SN can operate both as a corpus (through identification of concepts as terms) and a SN. Given the overlap in functions, aspects described in connection with a dictionary/corpus (or related term, such as a terminology DR/DB and the like) implicitly provides support for a corresponding aspect in which a SN is used in place of the corpus and vice versa. The same principle holds for dictionaries (which are typically term limited) and corpuses which can comprise higher level grammatical structures such as phrases.

Relationship/Structure Determination (Hierarchies)

MOTI/SOTI typically comprise S(s)/F(s) for determining if DS(s) comprise hierarchies and, if so, identifying Level(s) associated with DSF(s). Principles of DS structure identification are known and covered elsewhere. Such processes can comprise evaluating term relationships, DS structure, DSF associations, and the like, usually by matching against rules, a corpus, an SN, etc. In the case of identified MLR structures Level information typically is associated with relevant DSF(s) determined to be at Level(s). MLM/AI approaches, such as SL and SSL can be used to train FM(s) in the determination of Level(s), particularly in dealing with unstructured Input(s), such as different BOMs from different suppliers from different industries, geographical areas, and the like.

QRD/Search Element Generation/Selection

After DS(s), such as a CI DS, are interpreted, such DS(s) can be subjected to expansion/enrichment using various methods for increasing the number of DSF(s) associated with the DS, to increase the likelihood of identifying all relevant matching Records based on such a search. Such an expanded DS can be referred to as a QRD. Exemplary methods for expanding a DS, such as an initial CI DS, to generate a QRD, follow.

Stemming and Lemmatization

SOTI/MOTI typically comprise FM(s)/S(s) for morphological analysis of DSF(s) and identification of related terms/DSF(s), e.g., via stemming DSF(s), lemmatization of DSF(s), applying other truncation (e.g., in connection with values, images, and the like) to DSF(s), etc. Stemming methods are known and often used in the generation of search elements/matching processes. A Stemmer FM reduces terms to a base/root form according to preprogrammed algorithm(s), rule(s), etc. In the case of PRR-related terms, a PRR-related term-specific SN can comprise stems for commonly employed PRR-related terms. Stemming in TD can include suffix removal, prefix removal, or both. Several well-known stemming algorithms are known and available, including the Porter Stemmer, the Lovins Stemmer, the Dawson Stemmer, the Krovetz Stemmer, the Xerox Stemmer, N-gram Stemmer, the Lancaster Stemmer, and the Snowball Stemmer. In aspects, S(s)/F(s) comprise the use of 1, 2, ≥2, ≥3, ≥4, or ≥5 of such stemming methods in generating a QRD, matching evaluations, and the like. Stemming will typically be performed on a per Natural Language basis (e.g., terms in French or Thai will comprise different stems than terms in English).

SOTI/MOTI can comprise S(s)/F(s) that also employ lemmatization techniques (other than stemming) in addition to stemming In general, lemmatization methods typically employ rules to ensure that a base lemma associated with DS terms is a term that is defined as meaningful by FM(s) of a SOTI (e.g., according to a System dictionary/SN) (such a limitation does not have to be true in the case of stemming) Lemmatization tools/resources and principles are known (e.g., the WordNetLemmatizer function of nitk.stem and the Lemmatizer Class in the spaCy library in Python provide NLP lemmatization functions for common English terms). Given the wide variety of possible terms and presentation of terms a SOTI can encounter, in aspects a SOTI will comprise FM(s) comprising both stemming and lemmatization functions.

Synonym Generation

Preparation of QRD(s) for search S(s)/F(s) of MOTI/SOTI typically comprise determination whether term synonyms exist and if such terms exist associating such synonym(s) with the DSF-related terms in the QRD/search string/logic. Synonym evaluation and generation methods are known and covered elsewhere. Such methods can comprise, e.g., searching and matching DSF-related terms against a dictionary/thesaurus or other type of term corpus, or SN to identify potential synonyms, matching, and ranking, and making determinations, recommendations, or both concerning the application of such synonym(s) to a QRD/search logic. Development of specialized thesauruses are known (see, e.g., US20100198821).

Queries

QRD(s) can be used in any suitable manner to perform searches of DR(s) and other source(s) of information accessed by S(s)/F(s) of MOTI/SOTI, such as PAD source(s). Search Functions can use QRD terms, combination of terms, phrases, sentences, etc., in conducting 1, 2, 3, ≥5, ≥7, ≥10 searches of DR(s) as part of a combined/overall "query" or "search," employing 1, ≥2, ≥3, or ≥5 algorithm(s) for assessing matches/"hits" (e.g., employing a k nearest neighbor method for identifying/ranking matches and a minimum scoring to determine what is a "hit" that is presented/reported or utilized in downstream action(s)/Function(s)). Search/matching and ranking methods are known and covered elsewhere. Examples of search/matching technologies and principles that may be adaptable to S(s)/F(s) of MOTI/SOTI are described in, e.g., U.S. Pat. Nos. 10,572,221, 10,452,764, 8,145,654, 6,625,615, and US20160306868, and references cited therein. Search S(s)/F(s) can comprise the use of metadata, such as search "tags" (e.g., as exemplified by US20140039877, U.S. Pat. No. 7,844,587, US20080270451, U.S. Pat. No. 9,305,100, and US20200097595).

In aspects, a system comprises a SPIDR, such as an IESPIDR, and S(s)/F(s) comprise performing IESPIDR queries, identifying sufficiently matching PRR(s) therein (e.g., to CPIS or CSP/CSPI), and reporting results, enriching CI, or both, based on comparison of such CI with matching PRR data based on rule(s), application of algorithms/models (e.g., MLM(s)), or a combination thereof. In aspects, such S(s)/F(s) comprise matching on a basis of PDQ(s) in CI and PRR(s). In aspects, such S(s)/F(s) also comprise matching based on NPDQPP(s) in CI and PRR(s). In aspects, matching, ranking, or both, is based upon evaluation of Element(s) in CI and PRR(s). In aspects, ranking is based on number of matching terms, frequency of matching terms, context of matching terms, determined/assigned importance/weight of matching term(s) to the DO/query/Function, etc.

In aspects, a system comprises RIDR(s) comprising RRs and related information (e.g., reporting requirements, deadlines, formats, etc.). A system can comprise a RIDR comprising combined RR(s) for multiple RA(s). Alternatively, a system can comprise one or more focused RIDRs, that are directed to only a single country, single RA, or even the application of a single Regulatory system/Regulation (e.g., SCIP/ECHA, California Proposition 65, US EPA TSCA, US FDA Adverse Event reporting requirements, etc.). In aspects, RIDR "hits" are reported (e.g., as an evaluation of compliance risk for a CPIS), used to enrich CI, or both.

Query Methodology

Queries can be performed using any suitable method. In certain aspects, one or more specific methods such as those described in this section or other parts of this disclosure provide technical advantages in performing methods. Query methods typically comprise the employment of search engine(s) or similar data query engines/modules, as discussed elsewhere, which employ comparison of records by various methods. Text comparison methods suitable for application in such methods are known, provided they are adapted to the particular context of the methods/systems of the invention (e.g., by training with a product-specific training set, by use of product information-relevant corpora/schemas, and the like). Examples of methods suitable or adaptable to methods/systems are described in, e.g., Prasetya et al., Int. J. Adv. In Intelligent Informatics. Vol. 4 (1) (2018), pp. 63-69 and Gandhi et al. National Journal of System and Information Technology; New Delhi Vol. 10, Iss. 2, (2017): 139-154.

Lexical Similarity Comparison Methods

In aspects, query-type analyses performed herein comprise lexical similarity comparisons. E.g., the comparison of lexical vectors of one data collection (e.g., lexical vectors generated from a CPIS) to another (e.g., lexical vectors in a PIDC).

Lexical similarity methods are known in the art and any suitable lexical similarity method or methods can be utilized by engine(s) or other components of systems in the performance of methods. Lexical similarity typically provides a measure of the similarity of two texts based on the intersection of the word sets of same or different languages. There are several different ways of evaluating lexical similarity such as Jaccard Similarity, Cosine Similarity, Levenshtein Distance, etc. A lexical similarity of 1 typically suggests that there is complete overlap between the vocabularies while a score of 0 suggests that there are no common words in the two texts. In aspects, such methods can be combined with related vector-relevant methods such as vector space modeling methods (e.g., binary vector space modeling, term frequency (TF) modeling, or Term Frequency (TF): Inverse Document Frequency (TFIDF) modeling). Other methods that also can be used in term comparison methods/engines include, e.g., Jaro, Jaro-Winkler, Euclidean distance methods, and N-gram/Q-gram embedding methods, which are known in the art. See, e.g., Guthrie; et al. (2006). "A Closer Look at Skip-gram Modelling," Lioma, C. et al. (2008). "Part of Speech n-Grams and Information Retrieval" (PDF). French Review of Applied Linguistics. XIII (1): 9-22; Sidorov, Grigori et al. (2014). "Syntactic n-Grams as Machine Learning Features for Natural Language Processing". Expert Systems with Applications. 41 (3): 853-860. doi:10.1016/j.eswa.2013.08.015; Cohen, W. W et al. KDD Workshop on Data Cleaning and Object Consolidation. 3: 73-8; Jaro, M. A. (1989). "Advances in record linkage methodology as applied to the 1985 census of Tampa Fla.". Journal of the American Statistical Association. 84 (406): 414-20. doi:10.1080/01621459.1989.10478785; Jaro, M. A. (1995). "Probabilistic linkage of large public health data file". Statistics in Medicine. 14 (5-7): 491-8. doi:10.1002/sim.4780140510. PMID 7792443; Winkler, W. E. (1990). Proceedings of the Section on Survey Research Methods. American Statistical Association: 354-359; and Sidorov, Grigori et al. (2013). "Syntactic Dependency-Based N-grams as Classification Features" (PDF). In Batyrshin, I.; Mendoza, M. G. (eds.). Advances in Computational Intelligence. Lecture Notes in Computer Science. Vol. 7630. pp. 1-11. doi:10.1007/978-3-642-37798-3_1. ISBN 978-3-642-37797-6. Still other similarity measures that can be employed or adapted to methods/engines of the invention can include, e.g., Hamming similarity, w-shingling, Pearon similarity, Damerau-Levenshtein similarity, Smith-Waterman similarity, etc. In aspects, most, generally only, or only token-based similarity measure methods are utilized (e.g., cosine similarity or Jaccard methods). In aspects, so-called hybrid methods, e.g., Moge-Elkan or Soft TF-IDF methods also are used.

Semantic Similarity, on the other hand, typically measures the similarity between two texts based on their meaning rather than their lexicographical similarity. Semantic similarity is highly useful for summarizing texts and extracting key attributes from large documents or document collections. Semantic Similarity can be evaluated using methods such as Latent Semantic Analysis (LSA), Normalized Google Distance (NGD), Salient Semantic Analysis (SSA), etc. Other methods of semantic similarity are described elsewhere. Other methods such as some/all of those described above (e.g., Jaccard Similarity, w-shingling similarity, and the like) also can be used for semantic similarity analysis. Such principles are known. See, e.g., Briggs (2019) in Towards Data Science (towardsdatascience.com/semantic-search-measuring-meaning-from-jaccard-to-bert-a5aca61fc325). A few of such methods that can be employed in, or by, methods/engines of the invention are described in further detail here to assist readers.

Jaccard Similarity

The Jaccard similarity is typically defined as an intersection of two texts divided by the union of that two data elements/documents. In other words it can be expressed as the number of common words over the total number of the words in the two texts/records or documents. The Jaccard similarity of two documents ranges from 0 to 1, where 0 signifies no similarity and 1 signifies complete overlap. The mathematical representation of the Jaccard Similarity is shown below: $J(A,B)=|A \cap B|/|A \cup B|=|A \cap B|/|A|+|B|-|A \cap B|$. Graphically this can be represented as $$J(A, B) = \frac{|A \cap B|}{|A \cup B|} = \frac{|A \cap B|}{|A| + |B| - |A \cap B|}$$

The related concept of the Jaccard Index is known to be represented by $$\text{Jaccard Index} = \frac{\text{the characters in both words}}{\text{the characters in either word}} \times 100.$$

Cosine Similarity/Distance

In case of cosine similarity, typically two data elements/records/documents are represented in a n-dimensional vector space with each word represented in a vector form. Thus, the cosine similarity metric measures the cosine of the angle between two n-dimensional vectors projected in a multi-dimensional space. As is known, the cosine similarity ranges from 0 to 1. A value closer to 0 indicates less similarity whereas a score closer to 1 indicates more similarity. The mathematical representation of the Cosine Similarity is shown below $-\text{similarity}=\cos(\theta)=A \cdot B/\|A\|\|B\|=\Sigma ni=1 AiBi\Sigma ni=1 A2i\text{-------}\sqrt{\Sigma ni=1 B2i}\text{-------}\sqrt{}$. Graphically this can be presented as:

$$\text{similarity} = \cos(\theta) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}}$$

or $$\text{cosine similarity} = S_C(A, B) := \cos(\theta)$$
$$= \frac{A \cdot B}{\|A\|\|B\|}$$
$$= \frac{\sum_{i=1}^{n} A_i B_i}{\sqrt{\sum_{i=1}^{n} A_i^2} \sqrt{\sum_{i=1}^{n} B_i^2}},$$

And a further simplified expression of the cosine similarity (with respect to vectors V1 and V2) is graphically presented as $$\text{Cos}(V1, V2) = \frac{\vec{V_1}\vec{V_2}}{\|V_1\| * \|V_2\|}$$

The related concept of cosine distance is also known in the art and in aspects is used in vector comparisons, such as, e.g., the comparison of lexical vectors in methods. Cosine distance can be represented as $$\text{cosine distance} = D_C(A,B) := 1 - S_C(A,B).$$

Levenshtein Distance

Levenshtein distance comparison is generally carried out between two words. This method/technique determines the minimum number of single character edits required to change one word to another. The higher the number of edits more are the texts different from each other. An edit is defined by either an insertion of a character, a deletion of character or a replacement of a character. For two words a and b with lengths i and j the Levenshtein distance can be defined s follows:

leva,b(i,j)= $\lceil$ $\lfloor$ | | | | | |max(i,j)min $\lceil$ $\lfloor$ | |leva,b(i-1,j)+1leva,b(i,j-1)+1leva,b(i-1,j-1)+1(ai≠bj)otherwise.if min(i,j)=0, which can be graphically represented as $$lev_{a,b}(i, j) = \begin{cases} \max(i, j) & \text{if } \min(i, j) = 0, \\ \min \begin{cases} lev_{a,b}(i-1, j)+1 \\ lev_{a,b}(i, j-1)+1 \\ lev_{a,b}(i-1, j-1)+1_{(a_i \neq b_j)} \end{cases} & \text{otherwise.} \end{cases}$$

In aspects, most, generally all, or all vector comparisons of a type (e.g., lexical vector comparisons) or most, generally all, or all vector comparisons of any type are performed by Jaccard Similarity or a cosine similarity method (distance/similarity method). In aspects, generally none or none of the analysis is performed using an editing-based similarity measurement, such as Levenshtein Distance analysis. In aspects, most, generally all, or all of such analyses comprise cosine distance/similarity comparison.

Additional Aspects of Query Methodologies

Hits can be evaluated for POCs, such as the presence of Ingredient(s) in amounts that trigger a RR (e.g., SVHC content in the context of SCIP), safety concern, supply concern, or the like. POCs also can comprise Product Properties. Hits can be evaluated to determination of a DSF, such as a POC, in multiple, similar DSs (e.g., in multiple PRRs determined to be similar to CPIS). Such a finding can be the basis for reporting, further action, etc., including, e.g., enriching DS(s), such as CPIS. In aspects, DS(s) comprise both PRR-related information and RR-related information (e.g., PRRs can comprise SCIP numbers) and both types of information are analyzed in comparison/matching S(s)/F(s) and used for reporting or further System actions.

Elements of matching processes are covered elsewhere. In aspects, the matching process (and related processes, e.g., determining confidence of enriching a DS based on matches) can comprise consideration of ≥2, ≥3, ≥4, ≥5, ≥6, ≥7, ≥10, ≥12, ≥15, or ≥20 factors/areas (e.g., 2, 3, 4, 5, 6, 7, 8, 10, 12, 15, 20 or more PDQs; 2, 3, 4, 5, or more NPDQPPs; or both). In aspects, matching comprises weighting of matches based on factors such as determined similarity of values for each matched factor (scoring based on application of rule(s) or the like). E.g., matching/ranking can be based on evaluation of the number of matching DSF(s); the assessed quality of matches (similarity, uniqueness, or both); the weight of matching DSF(s) (e.g., based on confidence of the DSF(s) as determined through data quality, data validation, etc.; based on importance of the DSF (e.g., is it a keyword, Element/PIER, PDQ, etc.); or both); confidence of the match based on similar match(es); matching at different Levels; matching in data and metadata elements; contextual logic of a match (DS(s) for a bike may not logically match DS(s) for a cell phone); etc. DR(s) of a system can be physically or virtually subjected to partitioning, segmenting, grouping, structuring/hierarchies, etc., and DS(s) contained therein associated with such structuring (e.g., by metadata), that can aid in the searching or searching and matching/ranking processes (e.g., separating cell phone PRR(s) from bike PRR(s)). DR search principles and methods are known, and such methods can be adapted or incorporated in S(s)/F(s) relating to querying, matching, and ranking. Searching, matching, and ranking processes also can factor User/Customer information, DO information, or both, into such S(s)/F(s) (e.g., employing a multiplier or addition/subtraction function to other factors based on such Inputs—e.g., reducing the value of cell phone PRRs when Customer is a bike manufacturer). Examples of disclosures providing additional or other relevant methods, principles, resources, etc., relating to searching, matching, ranking, data attribute recognition (e.g., Entity recognition) and related processes are provided in e.g., U.S. Pat. Nos. 7,155,427, 7,386,554, 7,400,784, 6,829,606, 5,940,825, 5,940,825, 6,598,039, US20070168382, U.S. Pat. Nos. 6,463,433, 7,013,300, 7,107,263, 9,218,412, 7,761,462, 8,103,661, 8,027,543, 8,738,601, 10,810,218, 10,275,403, 8,745,271, US20050041863, US20070016612, EP1271361, US20120324020, and US20090106383, as well as references cited therein, and other references covered elsewhere.

Product Information Data Collections Queried

PAD Sources

In aspects, methods/systems comprise step(s)/function(s) (sometimes abbreviated "S(s)/F(s)" herein) for searching PAD source(s), comparing PAD information "hits" with CI, reporting such information, or applying such information (e.g., in the enrichment of CI, in validation of other Inputs/DSs, etc.). PAD source(s) (PADs) can comprise public domain information, such as freely publicly accessible web pages, information in DSs based on enriched publicly available information, information in proprietary but publicly accessible PADs (e.g., Dun and Bradstreet data for Entity information), etc.

Output Data and Applications

Methods/systems can include S(s)/F(s) for reporting results of DR searches. In general, any suitable method of reporting analysis/output can be used including reporting by email or other communication method (e.g., SMS/text), reporting by HTML/XML file report, or reporting within a search/operation application that accesses Function(s) of a MOTI/SOTI and displays results via a GUI on a networked device (e.g., a smartphone). In reporting results, S(s)/F(s) typically will comprise reference to SI rule(s), algorithm(s), and the like, typically drawing on authorization/access level information (e.g., generated by an AM), to ensure that SI is not inappropriately released from DR(s) of the System.

Confidentiality of System Information

As covered elsewhere, S(s)/F(s) of MOTI/SOTI can comprise DS enrichment, e.g., CI enrichment, drawing upon the comparison of hits of DR searches against CI (e.g., a comparison of CPIS against PRR(s) identified as hits in an IESPIDR query using a QRD). FM(s), such as a DSAM, can comprise or draw upon various rules or other methods/ resources (e.g., a neural network) for assessing whether to enrich data based on DR DSs identified as hits in searches (e.g., by using confidence scores derived from the various matching method(s) covered elsewhere and similar methods known). Enrichment steps can comprise application of MLM/AI approaches, such as SL and SSL; presentation of proposed modifications and receipt of User responses; or both. S(s)/F(s) can comprise generating multiple proposed enriched DSs, performing multiple enrichment steps, or both.

SOTI/MOTI can comprise F(s)/S(s) for ensuring confidentiality of confidential information in DR(s) containing SI that are stored in the System, accessible to the System, or both. Typically, such SI DR(s) are subject to one or more types of encryption(s), firewall protection (including, e.g., web application firewall(s)), or both. Secure Sockets Layer (SSL) protocols can be employed in such respects to protect SI. Secure channel Java applet transmission is another well-known method for protecting relayed SI. Known examples of effective data encryption algorithms include, e.g., RSA Data Security RC4, Data Encryption Standard (DES), and Triple DES (3DES). In aspects, S(s)/F(s) comprise SI access, use, or transfer monitoring, such as by employing Database activity monitoring (DAM) software/ tools, which are known. Examples of other commercially available data security tools that can be applied to a SOTI (or that corresponding components can be incorporated into an SOTI) include Sophos Intercept X for Server, IBM Security Guardium, Oracle Audit Vault and Database Firewall, Imperva Data Security, Trend Micro ServerProtect, and SQL Secure. In aspects, firewall Functions comprise a list of authorized commands, which can vary, e.g., with level of User/Entity authorization. Firewall and authorization features, such as IP address evaluation, etc., can also overlap, as can reporting of unusual information, attacks on the System, and the like. In aspects, FM(s), DR(s), etc., are segmented from other DS(s)/FM(s), e.g., PRR(s) are segmented from CI. Typically, each type of DS is identified with one or more identifiers, including type identifier(s), which aid in segmentation and protection of SI. Typically, a SOTI will comprise a CIM, which can comprise or consist of a key management system, which stores access keys, policies, protocols, monitoring method(s), etc. Most, or all System information is stored encrypted at rest. Regional storage tags/rules, etc., also can be applied to limit/control or validate information access. In aspects, part(s), most, or all components of a SOTI reside on a secure network without ability or limited ability to receive internet-based external (incoming) communication(s). A SOTI can in aspects comprise several isolated sub-systems, but which, in aspects share or sometimes share message queues. In aspects, data is extracted from a SOTI/MOTI only by an API call. Other examples of methods/technologies for the protection of SI in networks/systems, such as encryption, firewalls, and the like, which may be adaptable to SOTI/MOTI, are described in, e.g., U.S. Pat. No. 10,601,593, WO2001037152, U.S. Pat. No. 8,010,791, WO2013064565, U.S. Pat. Nos. 6,148, 342, 10,581,605, US20180300497, U.S. Pat. Nos. 9,436, 841, 6,148,342, and references cited therein.

Electronic Contracting Steps/Functions

In aspects, MOTI/SOTI comprise electronic contracting S(s)/F(s) (e.g., an ECM). Electronic contracts (e-contracts) methods and principles are now well known. Examples of suitable contracts can be click wrap agreement(s), electronic agreement(s) designed to receive electronic signature(s) (e.g., via DocuSign, Adobe Sign, or similar platforms/ methods), or both. Typically, e-contracting is performed after authorization(s) are determined for one or more contracting Entity(ies). E-contracting step(s) can include presenting terms and even negotiating terms with a Customer, e.g., according to a set of predefined rules/scenarios. In situations in which sought contract terms are beyond the bounds of such rules, the S/F can comprise alerting an Administrator to assist with contracting.

In aspects, the Owner acts as a broker for contacting between Supplier(s) and Customer. In such aspects, Owner may have received predefined authorization from such Supplier(s) to enter binding agreement(s) on behalf of Supplier for Supplier Product(s) or services (e.g., within a range of acceptable boundaries). In situations in which sought terms are beyond authorization, the System may alert an Administrator, the Customer(s), or both, to allow for human intervention with negotiation.

Contracting may also be directly between Customer(s) and the Owner/Broker. Such e-contracting can comprise contracting for services, such as performing an analysis using the SOTI. In aspects, such e-contracting is for additional actions, such as the preparation of a RA submission based on an analysis performed by a SOTI/MOTI. In aspects, such e-contracting comprises contract(s) that facilitate such transactions. E.g., in one aspect, e-contracting comprises a transfer of a RA submission from the Customer to the Broker/Owner for the Broker/Owner to be able to submit the RA Submission (which is typically performed as a S/F of a MOTI/SOTI as covered elsewhere). In such aspects, e-contracting can further comprise a retransfer of the Submission (e.g., a RA dossier, filing, market authorization, listing, etc.) to the Customer or a license to the Customer or other Stakeholders. In aspects, the e-contracting S/F performs multiple contract negotiations and ratifications/entries in series or simultaneously in a single agreement or set of e-contracts.

Linking Datasets, Labeling, and Other Metadata Applications

MOTI/SOTI can include S(s)/F(s) for applying metadata, such as tags (e.g., DS grouping tags), links (e.g., dynamic links or other associations), and the like between DSs as part of or in combination with a DS enrichment process.

Further Application of Results

SOTI/MOTI can include FM(s)/S(s) that apply analysis/ results (e.g., enriched DS(s)) to further Customer/Stakeholder action(s) or transaction(s) between Entities.

Preparing a Regulatory Submission

In one aspect, analysis obtained by a MOTI/SOTI is used to prepare a RA Submission. In one aspect, ECPIS is developed by S(s)/F(s) such as those discussed above or covered elsewhere, the ECPIS is compared to RRs (e.g., by RIDR queries for reporting Regulations, submission Regulations, etc.), and the resulting analysis is used to prepare a RA submission. In aspects, a reference to another Product associated with identified PRR(s) is used as part of or in place of a more complex/substantive RA submission.

Submitting a Regulatory Submission

As covered elsewhere, in aspects, a MOTI/SOTI comprises S(s)/F(s) for further submitting a RA submission on behalf of a Client or other Stakeholder. In such aspects, the System comprises rules, schemas, or other FM(s) for analyzing formatting requirements, submission requirements, etc.; determines data in ECPIS or other DSs to employ in generating a RA submission and applies such data to associated parts/fields of a RA submission. MLM/AI approaches can be applied to such S(s)/F(s) to DOS improve performance of such S(s)/F(s) with increased System use.

Generating Market Research Reports

In aspects, results of analyses can be used to generate reports, such as market research reports, from analysis of querying DR(s), such as IESPIDR(s) with CSPI (e.g., Product Type information). In such MOTI/SOTI, FM(s)/S(s) can comprise Function(s) for identifying data in results with appropriate fields, syntax, etc., for the generation of a report, typically drawing upon templates, NLP, or both.

Facilitating Entity Connections/Networks

Results of SOTI/MOTI can be used to promote, make, or otherwise facilitate connections or network formation/growth between Entities (e.g., a Customer and Suppliers; groups of Suppliers; or the like). E.g., a User could employ a SOTI/MOTI to identify Suppliers that would be impacted by a proposed Regulation and the results used to facilitate formation of a coalition of such Suppliers (e.g., sending alerts to such Suppliers about the proposed regulation, proposals to join the coalition, or both). System-generated connection(s) can include providing recommended connections, such as recommended Suppliers (e.g., based on a comparison of CDQs and SDQs along with CPIS/PRR information, to provide "like-minded" Suppliers to a Customer). In aspects, such function(s) are performed automatically or upon occurrence of an EMM-recognized event.

Entering Contracts

As covered elsewhere, in aspects, SOTI/MOTI can comprise presenting, negotiating, and executing contracts (deals) between Entities, such as between a Customer and Supplier for supply of Product(s) or between Supplier(s) (e.g., for subcontracting supply of Component(s) or Ingredient(s) for FG(s)). Such S(s)/FM(s) typically will utilize an ECM and known e-contracting methods, such as click wrap agreement or digital signature methods.

Monitoring Elements of an Initial Query/System

In aspects, MOTI/SOTI comprise S(s)/FM(s) for monitoring event(s) and performing action(s) upon occurrence of event(s) (e.g., an EMM). Events can include any suitable event or combination of event(s)/condition(s), including passage of time. As covered elsewhere, action(s) following upon event detection can include reporting, execution of queries and reporting/DS enrichment, new application(s) (e.g., preparation of an RA submission when it is determined that a product is now outside of RR compliance), or amendments of applications (e.g., negotiating amended contracting term(s) when conditions of contract have changed, such as a contract for supply of Product(s) has expired).

Machine Learning/Artificial Intelligence Training and Applications

As covered elsewhere, ML/AI method(s) can be applied to/included in many of the S(s)/FM(s) of MOTI/SOTI described in TD. Any suitable MLM/AI method can be used in such S(s)/FM(s). In aspects, one, some, most, generally all, or all the ML processes of a SOTI/MOTI include or utilize Tensorflow or AutoKeras ML stacks.

ML/AI applications (AIAs) applied to S(s)/FM(s) can be characterized on the level of supervision of the MLM/AI application. In one aspect, MLM(s) is/are supervised learning (SL) MLM(s). In aspects, MLM(s) are semi-supervised learning MLM(s). In aspects, MLM(s) are unsupervised MLM(s). In aspects, MLM(s) are rewarded MLM(s). In aspects, a SOTI/MOTI comprises 2, 3, or all 4 of such types of MLMs. In aspects, some, most, generally all, or all MLM(s) of a MOTI/SOTI progress from one form of MLM to one or more other forms of MLM (typically less supervised form of MLM, such as by progressing from a SL MLM to an SSL MLM or an unsupervised MLM). In aspects, a MLM comprises Feature/Element recognition S(s)/F(s) based on training datasets relevant to the S(s)/F(s) performed by the MOTI/SOTI (e.g., a PRR-related dataset for training MLMs on identification/interpretation of Input (IM/IRM Function(s)—e.g., tokenization, phrase/sentence/field segmentation, data structure recognition, etc.), data cleaning, generation of QRDs (e.g., synonym recognition/application, stemming/truncation, lemmatization, metadata factoring, etc.), determination of query matches/hits, deciding to enrich DS(s), and enriching of DS(s)). Specific AIAs/MLMs, e.g., Naïve Bayes, Nearest Neighbor, Decision Tree, and related methods are covered elsewhere and known (e.g., exemplified by patent references discussed in the Background). Conditional random fields (CRF) methodology can be used in combination with training on relevant data sets in Feature engineering/identification step(s) of an MLM. Classification processes can comprise application of a Multinomial Naive Bayes (MNB) classification type algorithm. MLM processes also can comprise use of other clustering algorithms, such as mean-shift clustering, Gaussian mixture models, or DBSCAN. MLMs can be dynamically updated over time through feeding of updated training data, User feedback, Administrator input/supervision, etc. Training is typically directed/performed to extracted or pre-identified Feature(s)/Element(s). In aspects, SI is removed from training information or replaced with altered data based on SI data, redacted data, etc.

MLM training data in aspects can comprise focused/specialized corpus data (e.g., PRR-focused data, RR-focused data, or both) or interaction with other processes/resources that also are often characterized as MLM methods/resources, such as SN(s), NLP(s), or both. SL and SSL MLMs can comprise generation of a confidence score and assessment of the confidence score for the MLM against a threshold (e.g., an auto-tuned threshold), wherein failure to meet the confidence score threshold will route the test to an Administrator for real-time review of the ML output. Subsequent Administrator performed or managed tests/analyses, etc., are typically fed back to the applicable FM/Function to continue System processing and fed back to the ML training set for inclusion or specific training/modification of the MLM. To facilitate ML/AI method(s)/Function(s), a SOTI can comprise one or more neural network processor(s), and/or distributed processors capable of being configured as a neural network, and/or be capable of executing software to model and/or simulate neural networks, which may be used to implement machine learning.

As exemplified in the Figures, MLM(s) can be trained by Feature Engineering (FE) and Feature Learning (FL) processes against training data, early application data, or both. Some, most, GA, or all MLM(s) of a SOTI/MOTI at least initially operate or operate on an SL or SSL basis. In aspects in initial stages of MLM functioning a higher level of human involvement is typical to ensure improvement of the MLM function to comparable or better than human performance. In aspects, the application of MLM(s) results in DOS improvement of performance of the Function with increased use of the Function; DOS improvement of human only performance (if even possible within relevant periods/accuracy), human programmed Function only performance, or both; and a combination thereof.

Physical System Components (Hardware/Software)

The S(s)/F(s) of MOTI/SOTI are carried out using hardware device(s), software application(s), or both. In general, S(s)/F(s) may be implemented in hardware, firmware, software, etc. Hardware can comprise, e.g., one more application specific integrated circuit (ASICs), digital signal processors (DSPs), neural network processors (NNPs), digital signal processing devices (DSPDs), programmable logic devices (PLDs), field programmable gate arrays (FPGAs), processors, controllers, micro-controllers, microprocessors, electronic devices, other electronic units designed to perform S(s)/F(s) described in TD. Firmware/software components can comprise, e.g., microcode, procedures, functions, and so on that perform S(s)/F(s) of aspects. CEI, such as program code, can reside in any suitable PTRCRM, such as a NTRCRM, and executed by processor(s).

Computer(s) (e.g., mobile phones, laptops, servers), networks, and accessible processor functions (e.g., in a distributed computing environment) comprise processing function(s), data memory, and typically both (or a system comprising multiple devices will comprise both). Processors comprise any suitable type and number of switching elements (e.g., electronic circuits), which maintain states (e.g., binary states suitable for application of binary code machine language) or other suitable states (e.g., in the case of quantum computers, DNA computers, or other alternative computing platforms), with selective change of state functionality and means for reporting state (output), typically based on the logical combination of the states of one or more other switching elements, such as logic gates. These basic switching elements may be combined to create more complex logic circuits, including registers, adders-subtractors, arithmetic logic units, floating-point units, or the like.

Processor Function(s) can be implemented using a combination of hardware, firmware, and software. System components/devices can include GUI(s) for facilitating display of results, questions, alarm reports, interpreted input, and the like. Thus, a "processor" can refer to a component of a hardware system, a hardware system, a mechanism, or component that processes data, signals, or other information. A processor can include a system with a central processing unit (CPU), multiple processing units, dedicated circuitry for achieving functionality, or other systems. Processing need not be limited to a location or have temporal limitations. For example, a "processor" function can perform S(s)/F(s) in "real-time," "offline," in a "batch mode," etc. Portions of processing can be performed at different times and at different locations, by different devices.

System(s) can comprise multi-processor systems, network devices, mini-computers, mainframe computers, data processors, and the like, in various configurations (e.g., in parallel processing or massively parallel processing configurations/workflows as covered elsewhere). S(s)/F(s) can be performed by a computer, or a special purpose computer or data processor that is specifically programmed, configured, or constructed to perform the functions described in detail herein (e.g., storing and accessing DS(s) in DR(s), e.g., a DR containing SI such as an IESPIDR).

As covered elsewhere, in aspects, multiple parallel processor(s) are employed to perform the necessary S(s)/F(s) of MOTI/SOTI, particularly in short time frames (e.g., $\leq 5$ min, $\leq 2$ min, $\leq 1$ min, $\leq 30$ seconds, $\leq 15$ seconds, $\leq 10$ seconds, or $\leq 5$ seconds), maintain high availability, and provide highly accurate results based on multi-factor comparison of rigorously cleaned DS(s), precisely but broadly/appropriately expanded QRD(s), and rapid search/matching and ranking of hits in large DR(s), such as SPIDR(s) comprising $\geq 1000$, $\geq 10000$, or $\geq 100000$ PRRs, each PRR comprising $\geq 5$, $\geq 7$, $\geq 10$, $\geq 12$, $\geq 15$, $\geq 20$ attributes with matching variables, of various types/weights, and in aspects also being associated with metadata that also is factored into such S(s)/F(s), in aspects at various weight(s) depending on the type of such metadata, DO(s), Input(s), etc.

In addition to processor(s), computers/systems (networks) used in implementing aspects typically also comprise data storage means (computer readable media) containing data (e.g., DR(s)) and CEI(s) executed by processor(s); means for input/output (I/O), such as output of results, analysis, or resulting products (e.g., RA submission forms) and input of data, such as CI (e.g., scanners, keyboards, and the like); means for relaying, receiving, and processing data between different function(s), component(s), device(s), and the like; and interfacing means/functions (protocols) and the like.

As exemplified from the foregoing and other portions of TD, suitable computers or computer systems can include a CPU, a ROM, a RAM, a HD, and I/O device(s). I/O devices can include a keyboard, monitor, printer, electronic pointing device (for example, mouse, trackball, stylus, touch pad, etc.), or the like. ROM, RAM, and HD are NTCRM memories known for storing computer-executable instructions executable by the CPU or capable of being compiled or interpreted to be executable by the CPU. PTRCRM or NTCRM can include volatile and non-volatile computer memories and storage devices such as random-access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Either type of CRM can refer to, e.g., a data cartridge, a data backup magnetic tape, a floppy diskette, a flash memory drive, an optical data storage drive, a CD-ROM, ROM, RAM, HD, etc. At least some of the CRM involved in many MOTI/SOTI can comprise at least several terabyte(s) of storage capacity (TB(s)) (e.g., $\geq 10$ TB, $\geq 20$ TB, $\geq 50$ TB, $\geq 100$ TB, $\geq 250$ TB, or $\geq 500$ TB). In aspects, CRM(s) in SOTI/MOTI comprise $\geq 0.5$, $\geq 0.75$, $\geq 1$, $\geq 1.5$, $\geq 2$, or $\geq 5$ petabytes (PB(s)) of data storage capacity. Processing capabilities of processor function(s)/processors(s) in SOTI/MOTI typically exceed ~1 gigahertz (GHz), such as $\geq$~2 GHz, $\geq$~3 GHz, or $\geq 4$ GHz. As covered elsewhere, in aspects multiple processor structures are employed in performing some, most, generally all, or all the S(s)/F(s) of MOTI/SOTI. The significant amount of data processed in just searching, and analyzing, e.g., $\geq 5,000$, $\geq 10,000$, $\geq 25,000$, $\geq 50,000$, or $\geq 100,000$ PRRs and other DSF(s) (e.g., RRs) in MOTI/SOTI within reasonable time periods (e.g., $\leq 0.5$ days, $\leq 4$ hours, $\leq 2$ hours, $\leq 1$ hour, $\leq 30$ minutes, $\leq 15$ minutes, $\leq 5$ minutes, or $\leq 2$ minutes) can require combinations of such data storage and processing capability, reflecting the system performs tasks that cannot be performed by even very large groups of individual humans. Other aspects, such as various privacy protection rules, monitoring, etc., at high levels of accuracy achievable by MOTI/SOTI (≥99%, ≥99.5%, ≥99.9%, or ≥99.999% accuracy in one or more S(s)/F(s)), also reflect that such MOTI/SOTI cannot be performed by combinations of human individuals.

CRM will typically comprise software programming (code) that can be human readable (e.g., source code), machine readable (e.g., object code), or both. In aspects, some or all the software components may reside on a server computer or on any combination of separate servers.

CEI executed by processor(s) and stored in CRM may comprise, PC, or CEO of assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, Java, Visual BASIC, Python, or the like, and procedural programming languages, such as the "C" programming language, database-focused programs (e.g., SQL), or similar or other suitable programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In aspects, electronic circuitry including, for example, programmable logic circuitry, field-programmable gate arrays (FPGA), or programmable logic arrays (PLA) may execute CEI by utilizing state information of the CEI to personalize the electronic circuitry, to perform S(s)/F(s).

While S(s)/F(s) and many aspects are described in terms of FM(s) comprising instruction(s) (function(s)/step(s)) that execute on one or more computing devices, skilled persons will recognize that other implementations may be performed in combination with other types of program modules and as covered elsewhere various FM(s) can comprise other FM(s), share functions with other FM(s), and the like, such that no FM should be viewed as critical, referring to a necessarily separate part of programming or system operation, etc. Generally, FM(s) described herein can comprise any suitable number of routines, programs, components, data structures, and other types of structures/instructions and the like that perform tasks or implement particular instructions or possess the relevant data/data types.

Device(s) in SOTI can store, operate, or store and operate an operating system (OS) utilized to control the operation of device(s). OSs are known and include LINUX, WINDOWS, Apple iOS, Android, UNIX, SOLARIS, and other suitable platforms.

Networks and system(s) can comprise wired and/or wireless medium that conveys data between point(s)/node(s)/component(s) of the device, system, network, etc. Wired or wireless medium may include, for example, a metallic conductor link, a radio frequency (RF) communication link, an Infrared (IR) communication link, an optical communication link, or the like, without limitation. The RF communication link may include, for example, WiFi, WiMAX, IEEE 802.11, DECT, 3G, 4G or 5G cellular standards, Bluetooth, or the like. A communication(s) link may include a voice-over-Internet-Protocol (VoIP) line, a cellular network link, an Internet protocol link, or the like. The Internet protocol may include an application layer (e.g., BGP, DHCP, DNS, FTP, HTTP, IMAP, LDAP, MGCP, NNTP, NTP, POP, ONC/RPC, RTP, RTSP, RIP, SIP, SMTP, SNMP, SSH, Telnet, TLS/SSL, XMPP, or the like), a transport layer (e.g., TCP, UDP, DCCP, SCTP, RSVP, or the like), an Internet layer (e.g., IPv4, IPv6, ICMP, ICMPv6, ECN, IGMP, IPsec, or the like), and a link layer (e.g., ARP, NDP, OSPF, Tunnels (L2TP), PPP, MAC (Ethernet, DSL, ISDN, FDDI, or the like), or the like). Other suitable communication channels may also be applied, including technologies which may not be available or known at the time of this application.

S(s)/F(s) also can be performed in/by distributed computing environments, where tasks or modules are performed by remote processing devices, which are linked through a communications network such as a local area network (LAN), wide area network (WAN), and/or the Internet. In a distributed computing environment, program modules or subroutines may be in local or remote memory storage devices. Programs or program modules used in a distributed environment can distributed electronically over the Internet or over other networks (including wireless networks). In specific aspects, DR(s) are stored in whole or in part and processor function(s) are employed via AWS.

In aspects, application(s) executing on Client or Stakeholder device(s) that are part of a System or networked with a System through a web browser application, such as Mozilla Firefox, Google Chrome, Microsoft Edge, Apple Safari, or other suitable browser (typically such aspects allow access and use of functions in 2, 3, 4, or more browsers). Client applications can operate via hypertext transfer protocol ("HTTP") or another appropriate protocol over the network. Client application(s) can communicate with a SOTI or System devices across the network by any suitable method known, including remote procedure calls, SOAP-based Web services, remote file access, proprietary client-server architectures, and the like. As covered elsewhere, in aspects, the System or System component(s)/device(s) comprise firewall(s) or other known resources for limiting incoming internet-based communications, as a means of ensuring protection of SI. Accordingly, in aspects, certain components (FM(s)) can comprise the ability to interact with internet resources or receive Input, DO, etc., or share results, applications, etc., via the internet, but other component(s) such as MLM code, specialized corpus/SN components, matching ranking data, and data/metadata containing SI or SI-derived information such as PRRs, are secured by firewall(s), encryption, and maintained generally "offline" with respect to internet access.

Specific Aspects Shown in the Figures

Aspects of the present invention are described herein with reference to flowchart illustrations; block diagrams of methods; apparatus (systems), and datasets/inputs according to aspects, as reflected in the Figures. It will be understood that each "block" of flowchart illustrations and/or block diagrams, and combinations of blocks in the flowchart illustrations and/or block diagrams, can be implemented by CEI. More particularly, CEI corresponding to S(s)/FM(s) reflected in such "blocks" can be provided to processor(s) of specifically programmed general purpose computer(s), special purpose computer(s), or other programmable data processing apparatus, or combination of devices, to produce a machine, system, or both, such that the CEI executed by a processor implement the S(s)/F(s) specified in the block(s). Such CEI are stored in CRM, such as PTRCRM (e.g., NTCRM) that can direct a computer, a programmable data processing apparatus, or other suitable devices to function in a particular manner according to the CEI, such that the CRM comprising DR(s) (comprising functional data) and CEI(s) comprises an article of manufacture which implement(s) useful steps/functions.

Flowcharts, block diagrams, and the like reflected in the Figures illustrate the architecture, functionality, and operation of possible implementations of SOTI/MOTI. In this regard, each block in the flowchart or block diagrams may represent a module, segment, or portion of CEI, which comprises one or more executable instructions for implementing the specified S(s)/F(s). In some alternative implementations, S(s)/F(s) described or referred to in the blocks may occur out of the order noted in the Figures. E.g., two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions etc. or carry out combinations of special purpose hardware and computer instructions.

Different programming techniques can be employed such as procedural or object-oriented approaches in FM(s)/S(s). Any routine can execute on a single computer processing device or multiple computer processing devices, a single computer processor or multiple computer processors. Data may be stored in a single storage medium or distributed through multiple storage mediums and may reside in a single database or multiple databases (or other data storage techniques). Thus, although the steps, operations, or computations may be presented in a specific order, this order may be changed in alternative aspects and any of the specifically disclosed routines/workflows provided here can comprise rearrangement, repeating, skipping, combining, etc. of any one or more FM(s)/S(s) or corresponding blocks that will provide suitable DO according to any general aspects. In some embodiments, to the extent multiple steps are shown as sequential in this specification, some combination of such steps in alternative embodiments may be performed at the same time. Where suitable, any sequence of operations described herein can be interrupted, suspended, or otherwise controlled by another process, such as an operating system (OS), kernel, etc. The routines can operate in an OS environment or as stand-alone routines. Functions, routines, methods, steps, and operations described herein can be performed in hardware, software, firmware, or any combination thereof, as covered elsewhere.

Displayed Figure elements are typically identified with the "#" symbol in the following. Where reference to an element is repeated in a Figure description, additional element reference(s) are sometimes omitted. The abbreviation "n.s." means "not shown."

FIG. 1

Figure 1:
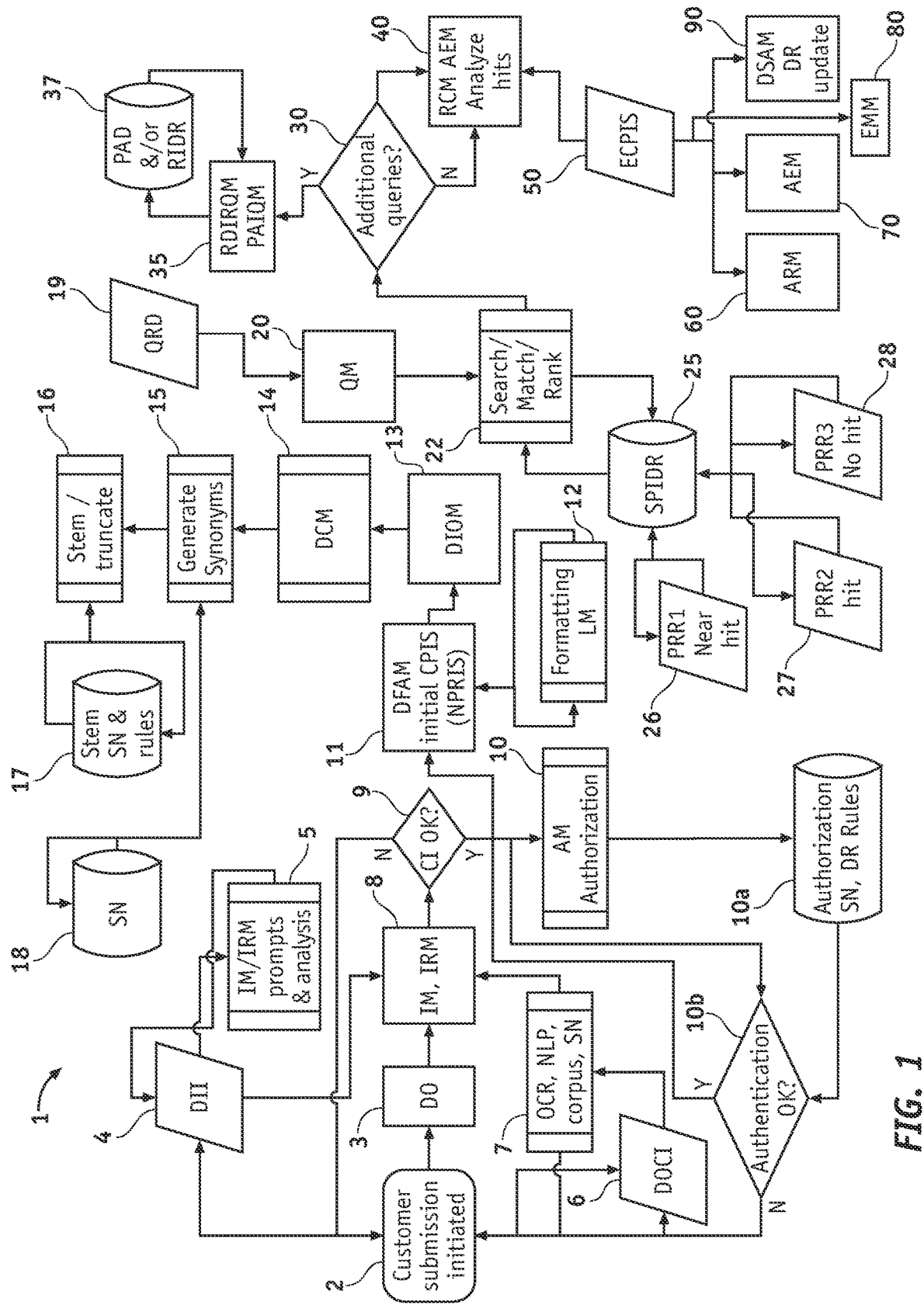
FIG. 1 is a mixed system map/flow chart describing steps performed in an exemplary method by components of an exemplary system of the invention.

FIG. 1 provides a flow chart illustrating the S(s)/F(s) of an exemplary MOTI/SOTI. System #1 comprises several FM(s)/S(s), which will be discussed in detail in the order indicated, with the understanding that such FM(s)/S(s) can be repeated, skipped, changed in order, co-executed, executed as part of a single process, comprise other processes, etc., in any suitable manner, as is the case with any of the exemplary MOTI/SOTI illustrated in the Figures.

Operation of the System is initiated by a Customer Submission process/FM #2 which can comprise any suitable submission S(s)/F(s) for acquiring Input from User(s). In aspects, Submissions can be made through communications with the System, such as through email communications as covered elsewhere. In other aspects, Submission #2 also is made through a web portal (e.g., using a specific application/API). A Submission will typically include CII, User information, and DO #3. DO may be selected from a menu, inferred from Input (e.g., from email, voice command, file/document upload, or other message to the System), or other suitable method. DO can in aspects comprise DR(s) to be analyzed in whole or part, reporting to be provided, and further action(s) (e.g., data transformation(s), e.g., preparation of a RA submission, market research report, etc.).

As exemplified in FIG. 1, informational components of a User Submission, such as CPIS or CSPI, can include direct input (DII, #4) and DOCI #6. The exemplary SOTI #1 includes an IM comprising an IRM (IM, IRM #8). The IM/IRM can comprise S(s)/F(s) that provide prompt(s), question(s), instruction(s), etc. to User #5 and analysis thereof as part of the IM S(s)/F(s). With respect to DOCI #6, IM/IRM can comprise processes for interpretation of DOCI data, such as, e.g., OCR, NLP processes (e.g., tokenization, delimiter identification, sentence/phrase identification, structure determination, etc.) (e.g., #7), and comparison with SN or corpus/rule(s) for determination of specialized terms, such as PRR-relevant terms, RR-relevant terms, and the like. As covered elsewhere, subprocesses can include special functions for Entity recognition or recognition of other aspects of CII (address, contact information, etc.). IM/IRM #8 can also comprise image recognition S(s)/F(s), as covered elsewhere.

IM/IRM #8 or other FM/S evaluates the CI and determines if the CI represents a MAD or is otherwise sufficient #9. If step/FM #9 evaluates as a "yes" (Y), authentication module ("AM") (a UAM) #10 performs an authentication/access step #10b, usually drawing from specific authorization-focused data recognition references #10a, such as data recognition (DR) rule(s), use of a specialized corpus, SN, or the like, based on matching function(s) and possibly also NLP function(s). Switching of S(s)/F(s) #8, #3, and #10 is an example of where reordering may be possible as alternative aspects (n.s.), or even desired in aspects, and such switched order processing (or co-processing) resulting in similar outcomes with respect to operation/performance of systems/methods Regardless of the order of AM/IM FM(s) and sufficiency tests, complete raw Input captured by the IM is "passed" (literally or figuratively) to a FM such as a data formatting and amendment module (DFAM, #11) that execute(s) formatting and amendment function(s) to enhance the raw data and prepare it for further processing. The DFAM can format the raw Input, e.g., associating detected DSF(s) with correct attributes or in the case of Input that is identified as containing MLR data associating DSF(s) with level(s). A DFAM in aspects can perform DC functions. E.g., the DFAM #11 can remove redundant entries, remove excess/unnecessary delimiters, and the like in the process of formatting the raw CI into a formatted D. The output from DFAM S(s)/F(s) can be considered a System-analyzable CPIS (ORTA as a New Product Related Information Submission (NPRIS)). The NPRIS can be amended by a LM subroutine/process #12, which applies tags, links, and other metadata to the ECPIS DS (e.g., CII metadata, Product type metadata, Element metadata, DO metadata, User metadata, and the like).

A DIOM #13 can then further refine the NPRIS and prepare the NPRIS DS for queries of System DRs. Subprocesses of the DIOM include a DCM #14 that perform(s) data cleaning function(s) in place of or in coordination with data cleaning processes in the DFAM, employing a synonym generation module (SGM) to generate synonyms for CPIS DSF(s) and associating such synonyms with corresponding DSF(s) of the CPIS #15, and performing stemming/truncation or lemmatization on CPIS DSF(s) and synonym(s) and associating such stems/lemmas or truncated DSF(s) with corresponding facets of the CPIS #16 (e.g., referencing lemmatization/stemming SN/rules #17 in the case of the stemming F/S #16, and referencing a SN, corpus, or rules #18 in the case of the SGM #15). The DIOM can perform additional DS optimization step(s) if not already performed by the other FM(s), such as determination, identification, and marking of Element(s) or other unequally ranked DSF(s) in the CPIS. Output of the DIOM #13 and its subprocesses (#14, #15, and #16) is a Query Ready Dataset (QRD, #19).

In the System #1 of FIG. 1, the DFAM #11 is depicted as a separate FM from DIOM #11, but again illustrating the interchangeability/flexibility of S(s)/F(s) of MOTI/SOTI, in aspects a DFAM can be considered a component of a DIOM or be omitted based on the inclusion of similar functions in a DIOM.

The QRD #19 is used as the primary or only DS input for Query Module (QM), #20. A QM can carry out DR search S(s)/F(s) using matching processes and rank matches #22 (e.g., in a manner comprising or similar to the operation of an RCM, not referenced in this block) based on DSF(s) in the QRD and QM parameter(s) (e.g., number of matching points, similarity of matches, ranking of matching and non-matching attributes or values, and the like). In the illustrated System #1, QM #20 runs search(es) of PRR(s) contained in a Supplier (or Supplied) Product Information DR (SPIDR, #25)). The SPIDR comprises PRRs (#27 and #28) containing either sufficiently matching DSF(s), PIER(s), or both, #27, or not, #28, to be identified as a hit (#27) or "miss" (non-sufficiently matching DS) (#28). After SPIDR PRR matches are identified and ranked #22 by QM #20, the System can, if desired #30, perform additional DR queries, #35, such as a RIDR query employing a RIDRQM, PAD queries via a PAIQM, or both, using a system RIDR, selected PAD source(s), or both, #37.

RCM #40 can analyze the hits identified by the SPIDR QM #20, and, if additional DR queries were selected other QM(s) #35, as compared to the CPIS and AEM #40 can based on matching score(s), weights, standards, and other analyses determine whether to enrich the CPIS with data from matching PRR(s) in the SPIDR, Regulatory information in the RIDR, PAD information from PAD source(s), etc. The output of the RCM/AEM process(es) #40 is an enriched CPIS (ECPIS, ORTA an ENPRIS, #50). The System #1 can utilize the ECPIS in additional action(s), such as reporting the output to the User via an ARM #60, performing additional action(s) from the ECPIS (e.g., via AEM, #70) such as preparation of an updated BOM for the Customer Product referenced in the CPIS; trigger an EMM #80 that will monitor events for re-performing the S(s)/F(s) of the System, performing new actions, or both; employ a DSAM to amend SPIDR or other DR(s) (#90) to contain records corresponding to the ECPIS; etc.

FIG. 2

FIG. 2 is an exemplary DOCI #200 Input that can be received by an IM, recognized by an IRM, and used as Input for the development of a CPIS, recognition of CII, or both; determining DO(s); for operation of an AM/UAM (e.g., to determine if a User is authorized to use a SOTI or to assign authorization/access level(s) to the User which the System can use in evaluating whether the User has access to certain Function(s) (e.g., the ability to enter e-contracts on behalf of Customer)); etc. Such DOCI may be presented as evidence if authorization or simply submitted as part of a submission to a System, such as an e-mail submission.

The exemplary DOCI #200 shown in FIG. 2 is in the form of a letter. IM/IRM #8 can employ various DSF recognition functions covered elsewhere or specific methods known. E.g., the IM/IRM #8 can recognize company logo #205 by the various image matching method(s) covered elsewhere or employing specific logo matching methods known (see, e.g., U.S. Pat. Nos. 9,508,021, 9,280,561, 9,076,071, 10,776,675, and references cited therein). The recognition of the logo can be used as one element of Entity recognition and applied to development of a CII DS. The logo may also be a factor in determining/evaluating the authenticity or authority of document #200 as an Input in generating CII from multiple information sources.

Sender address #215 and name/position information #270 can be recognized by IRM using document placement and formatting rules and also used for generating, validating, or enriching CII. Reference numbers/product name information (subject information) #225 also can be identified based on format and location detection and can be assigned a higher ranking with respect to DSF(s) of the Input than some other DSF(s). Methods of attribute/value pair recognition based on document structure are known. E.g., methods of attribute/value recognition in similar structured document settings (e.g., business card scanning) are known and can be adapted to such S(s)/F(s) (see, e.g., US20110305406).

IM/IRM #8, AM #10, or DO determination module (DODM #280) can use NLP or reference to field-specific corpus/SNs to evaluate other elements of DOCI #200. E.g., statement #240, comprises an assessment of RR compliance, which may be determined to be a likely DO, such that one goal of the system is to assess the accuracy of the statement. Statement #245 also in the body of the document contains DSF(s) that IM/IRM #8 would be trained to recognize, such as reference numbers, a name of a RA ("ECHA"), and keywords associated with Ingredients ("contain," "compounds," and "chemicals") (Ingredient attribute triggers/identifiers). The content of statement #245 can be factored into developing a CPIS, such as an MLR CPIS (and signaling to the IM/IRM #8 that CPIS Input comprises multiple Levels). In addition to the logo and sender information (name, title, etc.), AM #10 can evaluate intended recipient data #210, #230; signature #260; or both in evaluating authorization/access based on such Input. Date information #220 can be appended as metadata or recorded in DS(s) and used for evaluation in comparison with other Input DS(s), e.g., in evaluating whether information in the record may be at risk of being out of date. Thus, e.g., date information can be used for assessing reliability/weight of Input. Another format-rich passage that can be readily detected by the IM/IRM #8 is final body passage #250 which includes date information, the keyword "list", a reference to a known RA ("ECHA"), and a web site reference (due to the presence of website formatting elements.

FIG. 3

Figure 3:
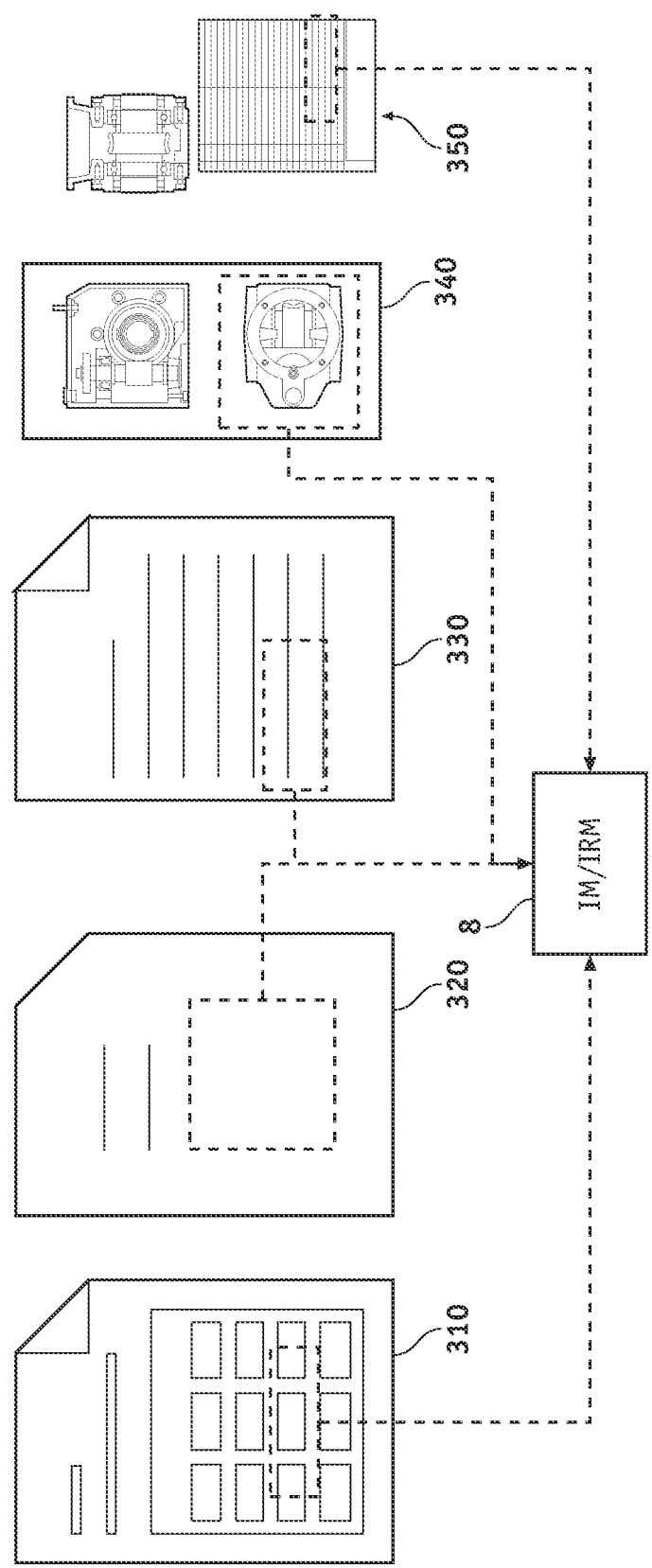
FIG. 3 is an illustration of exemplary NTIDI and TIDI elements from different forms of input that can be provide to, and coordinated by, exemplary systems.

FIG. 3 is a simple block diagram reflecting the various types of DOCI that can be processed by an IM/IRM #8. First exemplary type of DOCI #310 represents tabular data, which given formatting can be recognized by the IM/IRM #8 using methods covered elsewhere and equivalents known. Attributes can be determined through header column/row information or from inferring the attributes based on patterns in values contained in rows/columns (e.g., Ingredients and amounts). Second exemplary type of DOCI data #320 represents readily recognizable PRR-related image data, such as chemical structure data. Third exemplary DOCI #330 reflects text input in a natural language, unstructured format. Fourth exemplary DOCI #340 reflects another example of image input, in the form of a product design or engineering BOM (EBOM), which the IM/IRM typically will process through image matching/recognition and tagging method(s) covered elsewhere and known. Fifth and final exemplary DOCI #350 reflects a semi-structured input comprising different table and field elements, such as may be encountered in other types of BOMs, product labels, or Ingredient lists. IM/IRM will require functionalities for recognition of these and other types of Input, and for generating comparisons between such Inputs to generate a CPIS. This reflects one of the technical features and complicating factors of SOTI/MOTI described here.

FIG. 4

FIG. 4 exemplifies a DOCI analyzed by the SOTI/MOTI in the form of a BOM #401. Column headers (e.g., #410, #420) are used by the IM/IRM to determine/assign attributes for DS(f). E.g., part number value #415 is associated with the part number header column header #410, and the evaluation of each by the IRM #8 (drawing on NLP, SN/corpus resource(s), and rules/algorithm(s) forming part of or accessible by the IRM) is used to validate the other (e.g., by applying data consistency and formatting evaluation methods/principles). Similarly, description data #425 is associated with description column header #420. Header #430, for a supplier part number, is similarly associated with associated column values, e.g., #435. Moreover, IRM #8 or related/contained FM(s) (e.g., a LM (n.s.)) can link the attributes of part number DSF(s) #420 and #430, the format of such reference numbers, and other information derivable from such relationships in generating a CPIS. It is worth noting that although previous methods have been described for the recognition of BOM data, such methods were employed on related BOMs from related entities. In aspects, records of numerous IE Suppliers and Customers independent from such Suppliers are analyzed to build the DS(s)/DR(s) of the System. As such, FM(s) such as an IRM in a SOTI/MOTI typically are trained or resourced with many times the number of patterns, rules, entries, or models of particular attributes, layouts, etc., (e.g., ≥3×, ≥5×, ≥10×, ≥20×, ≥50×, or ≥100× of each or all thereof) and several additional layers of rules (especially broader set of pattern recognition rules) than employed/found in such prior art systems/methods.

FIG. 5

Figure 5:
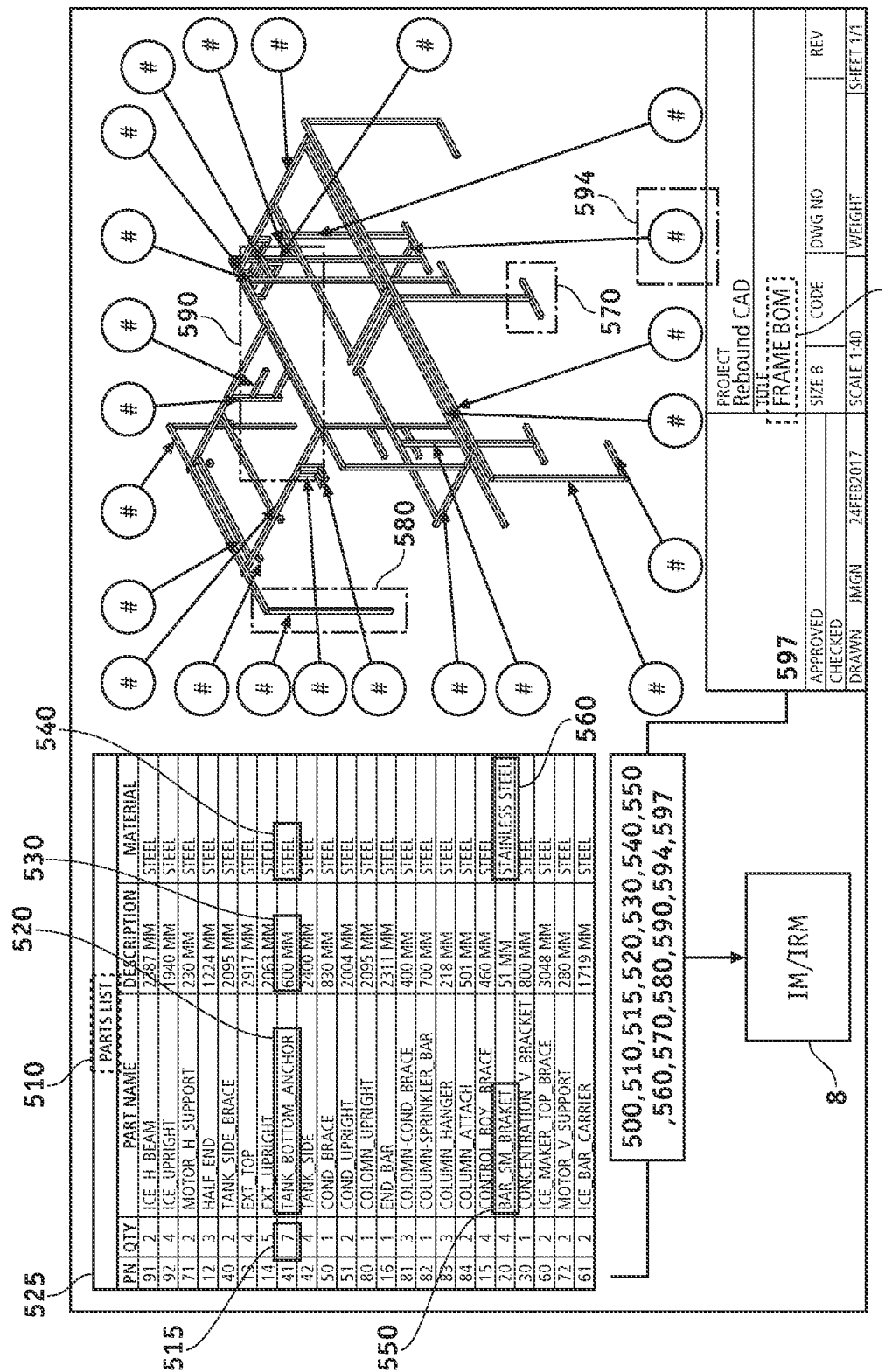
FIG. 5 is another exemplary DOCI (scanned BOM) including NTIDI and TIDI.

FIG. 5 exemplifies yet another example of the kind of various DOCI that can be supplied and analyzed by an IM/IRM #8, #500, BOM (BOM of a frame). The document/Figure contains a mixed document comprising a "Frame BOM," #500, reflecting a visual representation of parts and their relationship/assembly, and a parts list #510. Image recognition aspects of IRM S(s)/F(s) can detect the inclusion of different image(s) that can be identified as Components/expected Component(s) (e.g., foot/base #570, upright frame post #580, and horizontal frame post #590). Numerical entries, for parts, #594, can be informative (e.g., by identifying a part number, quantity, etc.) and subject to comparison analysis against System resources and other DSF(s) in this document (e.g., part number entries in Parts List #510) and in such a respect can serve to provide a validation reinforcing element for the reference number.

Parts List #510 includes attributes DSF(s) including PN #525 (interpreted by corpus, rule, schema, SN, or other interpretive function(s)/IRM(s) as "part number"), QTY (#515) (interpreted correctly by application of one or more such method(s) as "quantity"), Description, Part Name (e.g., #550) and Material (a keyword recognized as indicating Ingredient(s)). FIG. 5 exemplifies that even Ingredient DSF(s) (e.g., stainless steel, #560), can confer Levels of data to the IM/IRM #8, which IRM S(s)/F(s) can recognize and apply to DS(s), such as a CPIS (e.g., here applying like ranges of iron, chromium, and carbon at a lower Leve than "stainless steel," and optionally triggering the IRM to evaluate for likely related Ingredient(s) such as nickel, molybdenum, titanium, niobium, or manganese). Values under the heading of Description (e.g., #530) are recognized by bigram or other analysis as providing dimension information (given the combination of a numerical value and the presence of an expected unit indicator "mm" that would be recognized by interpretation resources of the IM/IRM #8).

The various data in such a DOCI can be used in various S(s)/F(s) of MOTI/SOTI. For example, part number DSF(s), in the Parts List section of the DOCI, #525, entries can be used in an inter-DS/Input matching analysis with Frame BOM PN DSF #594 by FM(s)/S(s) for assessments of DSF validation, error, redundancy, etc. Inclusion of entries within a single document can be a weighting factor in System S(s)/F(s), such as data validation processes or assessment of enrichment process(es) when an initial CPIS is compared with PRR data (e.g., with redundant and inter-DOCI matching/near matching data being associated with a higher confidence level). Descriptive information in text form (e.g., #520 and #530) can be compared with interpretations of image information (e.g., #570) (e.g., matching the term "anchor" in #520 with the image of #570) to similarly make inter-DOCI associations. Description (here, dimension) information (e.g., #530), can be used as a PDQ (e.g., with PRRs directed to similar Products but having the wrong size of "anchor" being rejected or given lower matching scores in a SPIDR query). Ingredient information #540, #560 can be a PIER/Element in System function(s), particularly relating to Ingredient-based RR analysis (again, taking into consideration expected lower Levels of such information from the content of the Ingredient DSF(s) detected by IM/IRM). Quantity (amount) DSF(s) (e.g., #515) applied to Component DSF(s) (e.g., #520 and #530) and associated Ingredient DSF(s) (e.g., #540) can be used to determine the compositional makeup of the FG or collection of Component(s), which is useful for Ingredient-based RR analysis. Further extractable data from such a DOCI as exemplified in FIG. 5 is, e.g., signatory authority, such as approval sign off #597 for such a BOM (#500). Evaluation of such authority can be a S/F of the SOTI/MOTI.

FIG. 6

FIG. 6 diagrams stages of DS development in the generation of CPISs, QRDs, and ECPISs (UNSDs) by SOTI/MOTI using exemplary information. The first part of the exemplary DS development table #600 is directed to the initiation/Input/Submission stage of a SOTI/MOTI ("initiation," #608). DSF(s) in DII #604 is listed on the left and DSF(s) identified through document upload (DOCI), OCR, tokenization, and data recognition, are reflected on the right side #606 of this portion of the table. As can be seen by comparing DII DSF(s) #604 and DOCI DSF(s) #606 there are differences in the DSF(s) from different sources.

The next section of the DS development table, "Harmonization," #611, reflects a DS resulting from the evaluation and comparison of the two Input DSs (#604 and #606). E.g., Entity information (CII), DO (Deliverable), User, and Product Description, obtained from DII are retained, as are DSF(s) for Component I and Component II, identified in both Input DSs, and Component III, identified only in the DOCI Input, but determined to be sufficiently credible to include in a combined raw Input CI DS.

The third section, "NSD" (for New Submission Dataset), #612, reflects the application of a submission reference identifier (tag) applied to the above-described "harmonized" DS. Other metadata can also be applied to or associated with the developing DS at this or other stages in the DS development process, such as by adding/associating dynamic links to DR DS(s) for the Customer, User, etc., or tags concerning the Product Type, etc.

Section four, #615, Synonym generation, exemplifies the application of synonyms for entries, in this case a term such as "BPA" in this context is recognized by a SGM as being equivalent to, e.g., "Bisphenol A" and associated with CAS Registry No. 80-05-7, and the displayed chemical structures. Similarly, synonyms for amounts/units (amount equivalents) are generated such as 1000 micrograms for 1 mg. These synonyms and base terms used in generating synonyms can be subject to stemming, lemmatization, etc., to find additional terms (n.s.) to add to QRD (n.s.).

Section five, #620, Results from database (query) (QM execution), contains four exemplary PRR entries, comprising various product descriptions, composition entries, and amount entries. Although all four PRRs were determined to be sufficiently related based on the matching rule(s) of the System, they differ considerably in their entries. As such, in generating an enriched record, such as the so-called "Updated NSD" (UNSD) shown at #690, rules/algorithms/ processes relating to the decision to/confidence in enriching CPIS based on comparison with such PRR DSF(s) are applied, to arrive at the updated NSD, which then can be reported to the Client, used for further applications, or both.

FIG. 7

Figure 7:
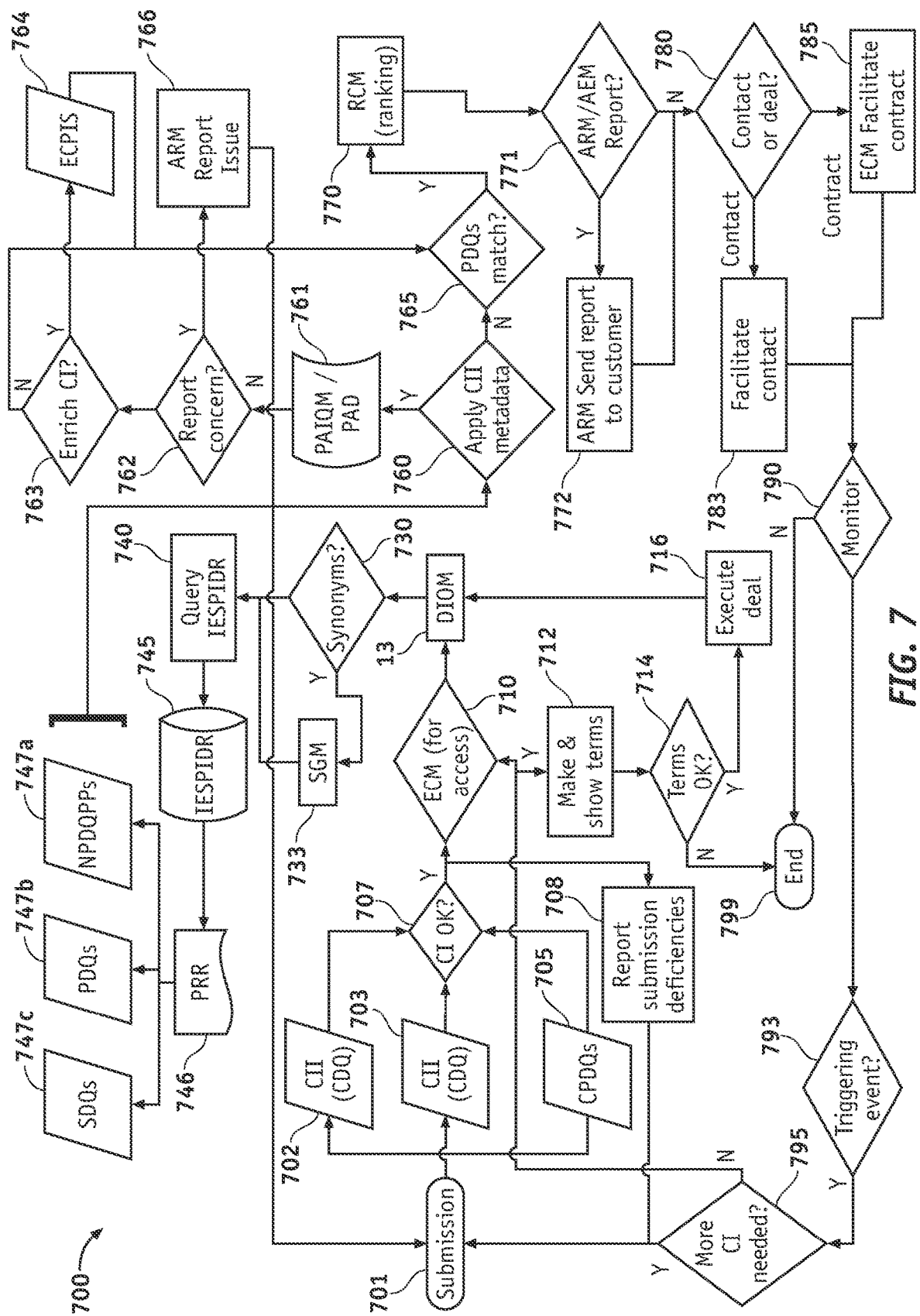
FIG. 7 is a flow chart depicting steps of an exemplary process of the invention.

FIG. 7 exemplifies another process flowchart, #700, for an exemplary SOTI/MOTI, reflecting the application of MOTI/ SOTI to different types of data in CPISs and DRs and DR DSs, such as PRRs. The process starts with a Submission #701, Submission from DII, DOCI, or both.

CI in this example includes CNPDQPP(s) #702 (such as vendor management requirement properties (e.g., requirements for location of production, conditions of production facilities, condition of ingredients, and the like); regulatory requirement properties (e.g., having RA authorization or compliance for sale in one or more countries/regions, such as the EU, USA, or China); or corporate social responsibility PPs (CSR PPs) (e.g., not using "conflict minerals" in the Product, using only products developed under "cruelty free testing standards," using only ingredients that are OMRI certified as Organic, and the like). CI also includes CII/CDQ information #703 and CPDQs #705 (necessary Product physical and functional Qualities).

A sufficiency determination #707 is made as covered elsewhere with a negative response comprising reporting Submission deficiencies and returning to the Submission stage #708.

In this example, a determination of whether to initiate ECM functions is made #710. ECM, if initiated, can perform steps of displaying proposed e-contract terms #712, modifying until terms are deemed acceptable by User and System #714 according to, e.g., ECM rules/parameters, application of MLM, Administrator input, etc., and, if so, executing the e-contract #716 through execution means as covered elsewhere/known to create a legally binding agreement between Owner and User/Customer. As covered elsewhere, S(s)/F(s) can be performed in modified order from what is illustrated in these Figures, and in this case ECM S(s)/F(s) could be performed prior to receive or initial analysis of CI.

After initial CI is received (and ECM S(s)/F(s) employed if elected), CI is analyzed and modified by DIOM #13, employing data cleaning and data blending functions to generate a refined CI DS, which is subjected to expansion to generate a QRD. Expansion S(s)/F(s) include determining if synonyms exist for DSF(s) #730, and if so, applying a SGM #733 to apply synonyms to the record. The further enhanced DS comprising initial DSF(s) and synonym(s) (e.g., terms corresponding to terms; terms corresponding to images; terms corresponding to audio records; terms corresponding to input selections; etc.) are used (optionally after application of stemming/lemmatization, not show) to form a QRD that is fed to a QM (n.s.) to perform an IESPIDR query #740, in which PRRs in IESPIDR #745 are checked using principles/methods covered elsewhere. IESPIDR, #745, comprises PRRs #746, with PRRs (e.g., in exemplary SOTI #700 comprising NPDQPP(s), #747a, PDQs, #747b, and associated SDQs #747c (e.g., in metadata or via metadata such as linking to Supplier DS(s)), which is used in the query processes of matching, ranking, etc.

At #760 CII metadata (or data or both) can be optionally applied to the initially enriched DS or combined hit/CI DS, obtained from the query S/F #740, although the CII metadata (and optionally other metadata) could be applied in various other parts of the SOTI/MOTI workflow (e.g., before query #740). If the determination is made to add/associate CII, #760, S(s)/F(s) can include, e.g., using PAD source(s) through a PAIQM CII validation step #761, to assess the validity of expected CII DSF(s). At #762 concerns, if any, based on confidence evaluation of the tentatively associated/ appended CII metadata/data can be reported to User, Administrator, or Stakeholders, via ARM #766, or if no concerns exist a determination can be made to enrich CI or not #763 via, e.g., application of a DSAM (n.s.), resulting in one iteration of a ECPIS #764.

In the matching/ranking process of this SOTI #700, matching can be staged, e.g., requiring first a determination of sufficient PDQ matching #765 to proceed with any further ranking, as means for excluding unsuitable/irrelevant similar PRRs from analysis. PRRs comprising minimum/sufficient PDQs are ranked by RCM #770, as covered elsewhere, but including in this example evaluation of the quality of PDQ matches, NPDQPP matching, and SDQ matching, enabling the identification of Products that are both suitable for Customer's Product physical/functional requirements but that also, e.g., meet Customer's financial, Regulatory, quality characteristics, or corporate image/value profile at the Product or Entity level. Ranking draws upon rules that can be applied based on, e.g., indicated value of NPDQPP(s), SDQ(s), or both, optionally in view of DO, other Input(s), etc. The resulting analysis/output can, if desired, #771, be reported via ARM to Customer #772 (or other Stakeholders/ Administrator(s) or FM(s)), e.g., identifying a set of Suppliers with Products that meet Supplier sought properties. In aspects, S(s)/F(s) leading to such a result can be applied by the System automatically as a method of identifying new opportunities for a Customer. In this respect, such a SOTI/ MOTI can be combined with, e.g., an EMM, so as to run such operation(s) repetitively over time (e.g., in a subscription service where Customer(s) subscribe to have updates in the Supplier "landscape" reported to them on a recurring time or other event basis. The output also can be used for further actions. E.g., in the shown SOTI/MOTI #700, a determination #780 is made whether to facilitate a contract between Customer and Supplier(s) (e.g., where Owner can act as agent/broker for Supplier(s) or where Owner acts as an agent for both Entities, typically after entering e-contracts with each Entity) and if deal entry is selected taking the step #783 of negotiating and ratifying contract entry through an ECM #785. Alternatively, the SOTI/MOTI can comprise a step of facilitating contact between Customer/Supplier (e.g., sending an email of introduction or similar communication to representative(s) of each Entity known to the SOTI reflecting aspects of the output, such as potential opportunities, shared characteristics of Product(s)/Entities, etc. A determination #790 is made whether to continue to monitor data source(s), and if selected to monitor for if a triggering event arises #793, and to thereafter optionally determine if more Input is required #795, and then either receive Submission #701 again, move to an ECM evaluation/determination #710, or go to other FM(s)/S(s) (n.s.), performing such S(s)/F(s) as many times as desired before ending the S(s)/F(s) #799.

FIG. 8

Figure 8:
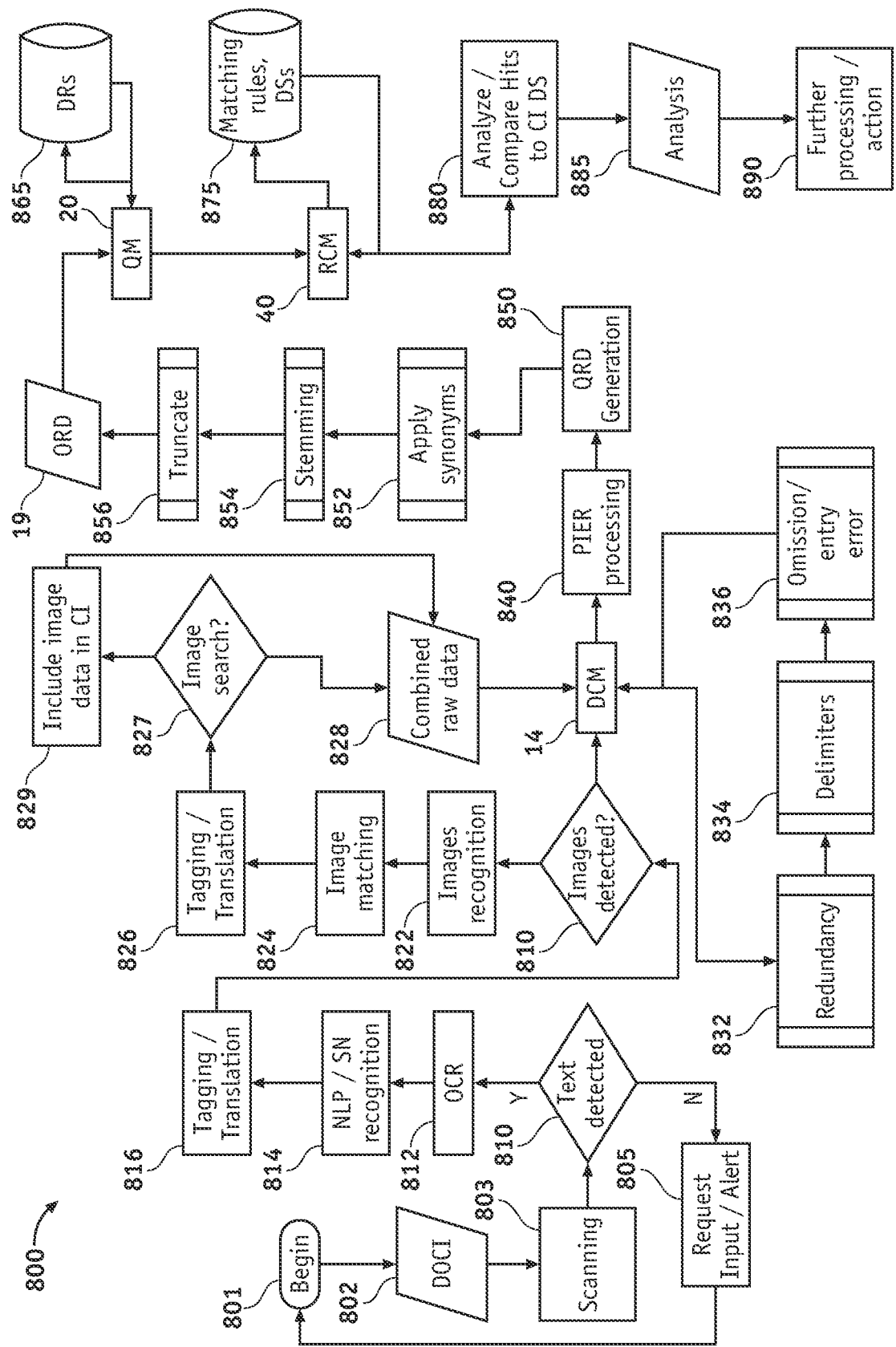
FIG. 8 is a flow chart illustrating exemplary data processing steps of methods.

FIG. 8 provides a more detailed view of exemplary S(s)/F(s) (subprocess/subsystem) #800 performed in processing of DOCI #801. After process is initiated #801, DOCI, #802, is inputted through IM (n.s.) S(s)/F(s), such as scanning #803, and scanned image(s) are evaluated for content, such as text (TIDI) detection #810. If text is not detected, #810, the system can provide a request for more input, provide and alert, or both, #805, and re-initiate the process #801. If text image(s) (alphanumeric characters) are detected by IRM (n.s.), #810, the IM/IRM can perform OCR #812 and character data is passed to other IRM input recognition processes #814 such as NLP, corpus:matching, or SN:matching recognition, etc., to generate a System readable DS (SRDS). The SRDS is subjected to further modification by IRM/DFAM/DIOM processes such as translation (e.g., by application of an LTM, n.s.), metadata application/tagging, or both (#816) to further enhance/expand the CI DS.

Consideration of whether non-text image content is present (NTIDI) can be performed at this stage #820. If so, image DSF(s) can be similarly identified, if present recognized #822, subjected to matching #824, subjected to tagging and translation #826, etc. A S/F for determining if searching based on image components of the input can be performed, #827. If so, image data can be added to the CI DS #829. If not, only the corresponding textual descriptions, tags, and the like for the identified data are added to the CI (combined raw data).

The resulting combined raw data (initial or initially modified CI DS) #828 can be fed to/acted on by (or subjected to) a DCM #14, which executes S(s)/F(s) including redundancy detection/elimination #832, error-prone delimiter detection/ elimination #834, and evaluation of omission/erroneous entry error(s) #836 based on rule application, validation rules (e.g., logical rule application, inter- or intra-document data consistency, comparison with related DS(s), etc.), MLM application, and the like, and with sufficient confidence fix clear errors. In the exemplary SOTI #800, the cleaned CI DS is further subjected to keyword/PIER processing #840, identifying and applying ranking information or other instructions/metadata in the PIER functional data.

Modified CI DS is then subjected to QRD generation #850. S(s)/F(s) of the QRD generation process include applying synonyms #852, apply stemming #854 or other truncation #856 (e.g., image feature recognition to create "truncated" image sub-feature DSFs) and where stemming, truncation, or synonyms are associated/added creating lists/ groups for each particular combination of value/attribute or other type/value DSFs to generate QRD #19.

QRD #19 is "fed" to (subjected to/analyzed by) QM #20, which performs search(es) of DRs #865 using RCM #40 for determination of matching DSF(s) in DR DS(s) compared to some or all the QRD. RCM #40 also applies matching rules, DSs, algorithms, and processes #875 to determine matches/ hits. The DS of matching QR DSF(s), DS(s), etc. is compared with CI DS(s) #880, otherwise analyzed (e.g., for content such as patterns therein), or both, to generate an output/analysis #885. The analysis #885 is then subjected to further processing/action #890.

FIG. 9

System #900 in FIG. 9 further exemplifies how different types of NPDQPPs or combinations of different NPDQPPs (which may be subject to different requirements, weights, ranges, criteria, etc.) can be used in SOTI/MOTI. Submission, #901, comprises PDQ input(s), #903a, but also includes three classes of NPDQPPs in the form of corporate social responsibility information (CSR), #903b (e.g., tolerance of sourcing from countries with human rights violation issues, use of conflict minerals, and the like); Product compliance requirement related information (PCR) #903c (e.g., a requirement for the ability to sell in Europe or USA); and vendor management requirement-related information (VMR) #903d, such as a corporate culture assessment, alliance management profile, vendor network profile, management profile, business modus operandi profile/practices, location information, exclusivity profile, customization need profile, return policy information, price tolerance information, quality value assessment, market placement information (premium, affordable, middle market, etc.), and the like. Processing of such input can require application of different NLP processes, corpora/SN(s) (including keywords, schemas, etc.), and the like, focused on the different types of information associated with VRM(s), CSR(s), and PCR(s), and separately processing PDQ(s).

QRD generation can include steps such as synonym application for CSR, PCR, and VMR in CI #910, which may also require drawing on specific rules, corpus/corpora or SN(s), and the like. Step(s) not shown but implicit in QRD generation can include applying DCM and DFAM processes, as well as truncation/lemmatization. The QRD is fed to QM #20, which, in the exemplified system #900, searches an IESPIDR #917, comprising many IE SPRRs, such as Records 1, 2, and 3, #921, #922, and #923, respectively, shown to exemplify DR DS structure and matching in the exemplary MLR query process of #900. As shown, each Record comprises VMR, PCR, CSR, and PDQ information (e.g., Record 1 #921 includes VMR DSF(s) #921a, PCR DSF(s) #921(c), CSR DSF(s) #921b, and PDQ DSF(s) #921(d)). Records may be deemed to match CSPI or other CI DS based on the content of the CI DS and other CI along a spectrum of similarity (close to far), or a binary determination (yes or no), or tentative determination (maybe—which typically would be reported to User/Administrator), giving consideration to DO and CI, such as CDQ information and NPDQPP(s), and applicable system rule(s)/process(es). E.g., Record 2 may be identified as a hit based on suitably similar/matching PDQ DSF(s) #922(d) and two out of the three close matches in terms of CSR, VMR, or PCR (#922b, #922a, and #922c) compared with corresponding CI NPDQPPs. Record 3, e.g., may be excluded based on its PDQ DSF(s) #923d not being sufficiently matching, one of its SNPDQPPs (#923a-c) containing information deemed "unacceptable" by DO/rules, or both. An initial or expected matching DS of IESPIDR SPRRs identified by multi-level searching and matching using such different types of Factors is generated #930. As suggested, the process can include an evaluation whether expected hits match on PDQ requirements or similarity score requirements #935, with rejection leading to ARM reporting #937, DS exclusion from further processing (optionally with reporting), or if all records fail to match to stop (#999), amend CI, or re-start the process #980. A sufficiently PDQ matched record collection DS (MRCDS) can then be analyzed for whether a minimum NPDQPP match is present (or required NPDQPP(s) present) #940. S(s)/F(s) can include eliminating non-matches, #943, developing a set of enhanced matches (an EMRCDS), #945, or both. The EMRCDS is then subjected to ranking, #950, and the ranked EMRCDS is subjected to reporting/further action, #970.

FIG. 10

The SOTI/MOTI #1000 of FIG. 10 provides a high-level overview of a system for using IESPIDR and RIDR DR queries and hit analysis to identify regulatory compliance issues or to generate a RA submission, possibly submit the RA submission to RA(s), and to monitor relevant information with an EMM to enable keeping Product(s) in RR compliance.

In this exemplary SOTI/MOTI, initiation #1001 is followed immediately by determining User authorization via AM #10 and thereafter receiving CI via IM/IRM, #8. DCM and DFAM, #14 and #11, enrich/expand CI DS, optionally along with other FM(s) (e.g., a SGM, or Stemming/Lemmatization/Truncation Module (SLTM))(n.s.), to develop a QRD that is fed to QM #20. QM #20 uses the ECPIS to query IESPIDR #917 and RIDR #112, and optionally also PAD(s), #1014, to identify or generate a MRCDS, and based on analysis of the MRCDS as compared to CI to generate a proposed/tentative RA Submission DS (RASDS) containing all DSF(s) determined to be relevant to compliance with applicable RR(s) identified based on or in DO/CI. An evaluation, #1018, of whether the tentative RASD contains sufficient/necessary or credible/valid data is made. If not, #1022 RA Submission DS CRM (RASDCRM), drawing on RRs and RA submission requirements #1020, identifies and reports on missing or known/expected errors/omissions and further IM/IRM processing of additional input follows.

IF RASD is satisfactory, DO, in terms of additional RA-related action(s) is inputted at #1003, determining if the next S(s)/F(s) is reporting of RA submission (RAS)-related recommendations via ARM #60 or the preparation of a RA submission via SPM #1026. In cases where RAS-related information reporting is selected, the workflow can be submitted at least optionally to an EMM (#1038) to monitor for further changes, and from the EMM to optionally execute S(s)/F(s) of a RSUM #1040 (which update(s) RA submissions upon event triggers and analysis using such a SOTI/MOTI), and to a DBBM #1030 (ORTA as or a type of DSAM), which records the enriched CI (e.g., ECPIS and related DS(s)) in DR(s) of the SOTI.

In cases where RAS preparation is selected, SPM prepares a proposed or final RAS drawing on RRs, RA submission requirements (RASRs), CI, and QR hit information. A determination #1027 is made as to whether Owner or Client will submit the RAS. If Client will submit information, transmission module #1028 transmits the proposed RAS to Client, typically after application of SI rules to ensure protection of SI, which may impact the quality or nature of the RAS. If Owner will submit, ECM #1032 can optionally execute e-contacting function(s) relating to the Submission including, in aspects, transfer of ownership of the RAS to the Owner, but with back-licensing or promise of retransfer to Client or other identified Entity. The RAS is transmitted to a RA as a Submission (e.g., a "dossier", "application", "report", or the like per applicable RRs and RA), by analyzing RAS data, transforming/transferring DSF(s) therein to fields required by the applicable RAS(s), and relaying via available mean(s) (e.g., secure Internet submission at a RA website/portal). In aspects, some or most RAS(s) generated comprise references to other RAS(s) with corresponding information identified through IESPIDR query, where reference submissions are possible, saving Client and RA the expense/complexity of making/analyzing and maintaining a full (but largely/entirely redundant) RAS. As noted above, additional processes can comprise application of EMM #1038, RSUM #1040, and DBBM #1030 to monitor for updates, prepare/submit updated RAS(s), and to ensure capture of updated records reflecting changes in CI generated by SOTI actions.

FIG. 11

The method #1100 shown in FIG. 11, also exemplifies how ML/AI can be developed and applied to S(s)/F(s) from CI Input to QRD generation.

In this example, after start #1102 a MLM modified AM, #10, analyzes User authentication/access using DII, DOCI, or both, and evaluating Input(s) through NLP, corporate/SN analysis, and related algorithms encoded in CRM and executable as CEI corresponding to the AM. A general pattern for the development of MLM(s) applied to FM is shown here and at other nodes/blocks of the process #1100.

Step(s) of the MLM development process here and elsewhere in TD can be classified as including Feature engineering ("FE") #1110a (providing MLM or working with MLM to develop DS/DSF attributes, ranges, formatting rules, and the like) (in the case of an AM this may include, e.g., learning to identify position-related attributes, company authority policies, and indicators of authenticity) and transformation into MLM optimized formats (e.g., One-hot encoding, Log transform; and the like) (noting that Feature engineering can be ML driven based on extraction of features through pattern recognition, etc.); Feature learning ("FL") #1110b typically comprises the interpretation of Features and relationships between such Features (e.g., in the context of the AM MLM #10 the relationship between Entity name(s) and Entity types, such as authorizer name Feature and position/role Feature; Entity name Feature and Entity role Feature (e.g., as Customer); and the like. Neural network(s) can be employed using various ML models as covered elsewhere in combination with gradient based optimizations or other decision optimization methods, exemplifying ML/AI; or both Feature engineering and Feature learning (as shown).

In this and other aspects, established or generated ML framework(s) are used and adapted to the Features in and after the Feature Engineering/Feature learning S(s)/F(s). E.g., the Keras programming interface known can be employed in a programming language context, such as Python, providing a standardized and simplified programming interface to ML framework(s), such as the TensorFlow (Google) ML framework. Examples of neural network neurons/pathways in the context of the AM MLM can include (a) name, position, company, and company authorization policies; position DSF(s), authenticity indicator(s) (e.g., presentation with company logo); and like, which can be recorded in, e.g., SN(S). Again One-hot encoding or similar ML-facilitating transformation(s) can be used to simplify the MLM operation based on such neurons/nodes/Features. Output of prior processes, such as training processes, or earlier operational runs, can be used as another layer in the neural network/MLM process, which in combination with initial layer(s) and relationship calculations can be used to make prediction(s)/assessment(s) (e.g., concerning authority/access, validity, or authenticity).

In the case of AM #10, a determination of authentication #1115 based on MLM input is made (as covered elsewhere), and the process allowed to continue, terminated, or re-started to supplement AM-related CI (e.g., combined with reporting of expected deficiencies/issues to the User).

With Features in place, further application of ML-trained and in-training processes can occur through SL/SSL #1110c, and, if opted for (e.g., after determination of sufficient level of success in SL/SSL or run as a parallel process) in reinforcement learning (RL)/unsupervised learning/application (ULOA) #1110d. Such progressions, which can overlap, be modified, etc., are generally known, as are methods employed in such S(s)/F(s) as covered elsewhere. IM/IRM #8 processes, e.g., exemplified in FIG. 12 with respect to MLR Input(s), are performed, and data optimized by a $1^{st}$ DIOM #13.

DIOM S(s)/F(s) can similar be subjected to MLM S(s)/F(s) including FE #1130a, FL #1130b, SL/SSL #1130c, and RL/UL or unsupervised action/learning (UA or UA/L, ULOA) #1130d. Using specialized corpora/corpus, SN, and the like, such MLM steps can be applied to, e.g., data cleaning, SGM operation, formatting, metadata application, etc. A data validation assessment step, #1144, can be performed at this stage. In this example, a second DIOM S/F #1142 is further utilized, which is focused on i.a. PRR-related attributes/features and drawing from stored Client data (#1150) or other relevant data is used to assess #1143 if CI is complete and valid. MLM(s) are developed using S(s)/F(s) 1142a-1142d.

An evaluation of whether the CI DS contains any portions that are required under regulatory requirements to be separate DS(s) (RSDS(s)), #1147, based on applicable rules (e.g., as an applied by a unified DS module #1146, which is an FM capable of or trained to perform such analysis). A unified DS module can in this aspect, and others be present and evaluate whether CI comprises entries for Products that should be the subject of separate analysis based on one or more factors, such as applicable regulatory rules. For example, a DS for a spare part DS typically will have a separate RAS under ECHA RRs and, accordingly, is identified as an RSDS when originally combined with a DS for an associated FG). If such a non-unified data set (non-unified DS) risk is identified in #1147, portion(s) of the DS are separated (#1152), creating document/Part I (#1153) and document/part II (#1154), which are each then returned to the start of process #1100 for separate re-evaluation and processing. MLM S(s)/F(s) can be developed/trained or employed #1146a-1146d for such process(es).

If CI DS is determined to be ready by the system for further application/use it can be further processed by SGM, LM, Truncation/Lemmatization Module (TLM) or a combination of SGM/LM/TLM #1148. Again, MLM(s) can be developed, trained, or deployed applying to some or all these processes (#1148a-d). After S(s)/F(s) #1148, a determination can be made if the resulting DS is a QRD ready for QM applications #1149. If so, the applicable DS is used as a basis for querying and further processing (e.g., as described in FIG. 15) and, if not, the relevant DS is subjected to further processing, e.g., by the first DIOM, #13. Data generated in the process can be added to stored client/other data, #1150.

FIG. 12

As indicated in FIG. 11, the S(s)/F(s) #1200 in FIG. 12 reflect a stage/subprocess or collection of FM(s) used in handling MLR Inputs. Although shown in connection with FIG. 11, such processes can be employed in other contexts, such as where MLM application(s) are not employed.

As shown, Input comprises a first DS of non-regulatory low structure (semi-structured or unstructured) information ("NRLSI"), #1231a, e.g., a collection of BOMs, ingredient lists, correspondence, etc. Structure in this respect and in general in TD can be determined by both comparison to structure of System DR(s) (e.g., IESPIDR); to schema (e.g., BOM-type schemas developed by analysis of typical formats); or by other measures of structure (e.g., scoring based on use of sections, tabular entries, clearly associated attribute/value pairs, and the like); etc. E.g., a low structure determination can be made on a scoring system based on ≥1 of such factors. Second and third Non-regulatory low structure information Inputs, #1231b and #1231c also are received/processed by IM/IRM (n.s.). DIOM/DFAM (n.s.) coordinates/harmonizes (blends) DSF(s) identified in the NRLSI Input(s), typically taking into account validity/confidence rules/processes as covered elsewhere. The coordination process #1232 includes recognition and Leveling of DSF(s) given that each Input comprises MLR data. Given that RR analysis is performed in the example at a Component level, a decomposition step separates (physically or virtually such as by application of metadata) Component Records 1233a-1233e so they are separately analyzable, resulting in a collection of Component Records that becomes the analyzed DS, rather than the NRLSI DSs. Each Component Record is subjected to further attribute/structure analysis to determine if it contains further Levels (#1237a-e, respectively). Where such further Component Levels are identified (e.g., #1233a1-a3 and #1233e1-e3) they are also separated/separately tagged and used in place of the corresponding Component Records to make a decomposed base Component Level DS comprising the collection of Component/Sub-Component Records. These can be reclassified #1234, as operable units (e.g., equivalent units), e.g., PIERS, which are optionally incorporated as DSF(s) of a combined DS, #1236, which can be evaluated based on known or inputted RR9s #1235 as an initial step in evaluating RR compliance relating to the CPIS derived from the NRLSI Input(s) (#1231a-c). The process identifies how Component/Sub-component analysis/decomposition processes are used in performance of aspects, optionally avoiding the comparison of, e.g., an FG DS, a Component DS, a Sub-Component DS, and an Ingredient DS, which may result in errors or inefficiencies if the only analysis performed in SOTI/MOTI.

FIG. 13

FIG. 13 provides a more specific application of some of the S(s)/F(s) of MOTI/SOTI #1300 and exhibits complexities that the IRM, DFAM, and other FM(s) (e.g., DCM/DIOM (n.s.)) handle in processing varied and potentially low structured Inputs. DOCI 1 #1301 contains, e.g., chemical structure data (3-dimensional and 2-dimensional) as well as compound references/names and amounts in percentage format. DOCI 2 or DII #1302 comprises a list of ingredients by chemical abbreviations (e.g., PVC, BPA) and various measurement amounts/concentrations (e.g., ppm/g/wt. %). DOCI 3 #1303 contains industry references for Ingredients, e.g., CAS 80-05-2. IRM/DFAM #1310 receives, interprets, and seeks to harmonize such information using specialized resources (corpora/SN, etc.). An initial POC analysis #1320 can be performed drawing on PAD/DR data DS(s) #1351 (which can also be adapted to, e.g., SGM function(s), matching function(s), etc.). In this case the data source comprises entries associated with BPA, several of which correspond with Input(s) (e.g., CAS number, abbreviation, and chemical structure). Accordingly, the presence of BPA, a POC in many RA/RR systems (e.g., ECHA/REACH/SCIP), is determined to be likely present with high confidence. An amount analysis #1330 using amount identified DSF(s) is performed, drawing on thesaurus/corpus/SN or rules for amount indicator equivalents #1352. Combined amount/POC DS can be subjected to a RIDR QM #1340 that searches a RIDR #1312 and assesses RRs or other DS(s) found therein. LM #1360 can apply various tags (noted), or metadata based on RIDR hits analysis. Confirmation/validation and expansion of the analysis can be performed by PAIQM #1370 which searches PAD(s) #1014 for relevant information. The growing modified DS with RIDR- and PAD-derived data can be fed to QM #20, which performs SPIDR/IESPIDR queries (n.s.), and the results of the various System queries and matching S(s)/F(s) are fed to DSAM #1390, which updates System records associated with the CI; Inputted DS(s)/records (either through direct modification if editing access is provided to Owner/Broker or through generation of a proposed amendment to such DS(s); or both.

FIG. 14A and FIG. 14B

FIGS. 14A and 14B can be read together to exemplify illustrative Input and DR DS structures and the technical effect/advantage of employing multiple processor, parallel processing resources, MLM methods, and other aspects, to the analysis of Product-related Submissions and DR Records can be advantageous in terms of obtaining "real time" accurate analytical results and further processing/production therefrom in view of the potential complexity of analysis involved in S(s)/F(s) of MOTI/SOTI, even in respect of a relatively simplified example as shown in these Figs.

NSD (New Submission Dataset) example, #1401, in FIG. 14A, is a structured MLR generated by FM(s) of a MOTI/SOTI. Each Level of the MLR reflects different groupings of data, and the relationships of Levels reflects hierarchies/relationships that impart information to FM(s)/S(s). The SOTI/MOTI can handle, identify, and analyze different styles/forms of NSDs or of data in NSDs (e.g., for different Product Types, for CPIS vs. CSPI, for Products vs. Services, different BOM types, and the like) and the identified style of the DS (format, schema, content, etc.) can be a first factor/grouping for analysis. Such step(s) can be also used in aspects.

Components (here 4, with a fifth, Component III, shown as missing/absent from this NSD) represent another Level, as do Sub-Components (labeled as an IRM recognizable term, "sub-comp") (here 8 at 2 different Levels), and respective Ingredients (here 11, with two additional ingredients shown as missing/absent from this NSD). The apparent omission of Component III (n.s.), or alternatively the apparent omission of a fourth ingredient under SUB.COMP.II.1 or under SUB.COMP.V.1.1 may be a point picked up by a DIOM/IRM and reported to User/Administrator acted on by SOTI to determine if a correction can be imputed from DS(s).

FIG. 14B PRRs, #1403 and #1405, in an IEPSIDR #917, comprise different Components DSF(s) (#1411, #1420, #1430, #1440, #1450 in the case of Product 1, #1403, and only #1420 and #1440 in the case of Product 2). Each Component DS can comprise additional information. E.g., #1411 includes Ingredient and corresponding amount tabular data #1412. Similar DSF(s) #1422, #1434, #1446, and #1457 are found in association with Sub-Components at lower Levels in the PRRs. Components #1420, #1430, #1440, and #1450 each comprise Sub-Components (e.g., #1421, #1431, #1435, #1441, and #1451), and some with 1-2 additional (lower) Levels of Sub-Components (e.g., #1433, #1443, #1444, and #1454). NSD #1401 (FIG. 14A) comprises DSF(s) that are matching to DSF(s) in PRR(s) but only at lower Levels in the PRR DS hierarchies (#1412, #1422, #1434, #1446, #1457), reflecting the potential importance of Level analysis/DS decomposition/PIER identification. As all five of the matching DSF(s) are found in the Product 1 PRR #1403 (versus only two for Product 2, #1405, i.e., #1457 and #1422) the Product 1 PRR can either be considered the only matching PRR or accorded the highest weight in terms of imputing information to NSD #1401 (CPIS) depending on applicable matching/ranking S(s)/F(s). E.g., if Component III is imputed to be present in NSD based on such results, the presence of multiple, detailed matches in Product 1 PRR DSF(s) and NSD DSF(s) may provide sufficient confidence for such imputation or a recommendation of such imputation.

FIG. 15

Process/FM collection #1500 in FIG. 15 exemplifies development and application of MLM to various querying, matching, and DS enrichment S(s)/F(s). As noted, #1500 can be considered a continuation of the MLM-related processes described in FIG. 11 (and FIG. 16), such that all three Figs. can be optionally viewed as a single combined Fig./process/FM group. DS developed in FIG. 11 and RIDR RRs #1551 and CI DS(s) #1552 can be used as Inputs, which are fed to a RIDR QM, #1553, which queries RIDR(s) (n.s.), in part either training, employing, or training and employing MLM(s) for RIDR QM function(s) (QRD development, searching, matching, ranking, etc.). RIDM processes can comprise, e.g., recognition of listed requirements, compositions, and amounts, etc., and related key fields, such as, e.g., the SVHC preferred substance name, CAS number, EC number, ECHA substance ID, and associated amounts in the ECHA Candidate List, all of which can be Features for exemplary ECHA-related MLM RR compliance evaluation processes. MLM development can comprise FE and FL steps/stages, #1553a and #1553b (e.g., identifying RR attributes, RA attributes, etc.) and application can include SL/SSL and RL/ULOA stages #1553c and #1553d, respectively. RIDR tested or enhanced DS can be optionally further fed to PAIQM #1554 for identification of relevant PAD information (RRs, CII, etc.), again with MLMs being stagewise developed #1554a-b and deployed #1554c-d. An AM #10 can be optionally included prior to allowing access to QM #20 against IESPIDR #917 can be aided by MLM modules (#1556c-d), generated/improved by MLM development steps (#1556a, 1556b) (e.g., QRD development, search development, match development, etc.). Protection of SI can be facilitated/enhanced by CIM #1557, taking into account authorization/access, which can also be subject to MLM processes developed and implemented similarly (#1557a-d) (e.g., identification of SI, application of SI rules, application of authorization rules, correct determination of accessing person (e.g., Administrator vs. User), and the like). CIM-modified MRCDS fed to RCM for analysis of hits/misses and building of ECPIS #1558 through matching, ranking, and imputation of addition, deletion, or amendment of CI, on determination, which S(s)/F(s) similarly can be subject to MLM processes (#1558c-d), typically developed after Feature engineering/feature learning (FE/FL) (#1558a-b).

FIG. 16

Subprocess/FM(S) #1600 in FIG. 16 can follow S(s)/F(s) displayed in FIG. 15. An ECPIS, #1602, developed by such S(s)/F(s) is fed to DFAM #11 to format the DSF(s) in preparation for RAS-harmonized DS generation. The pre-RAS DFAM #11 S(s)/F(s) can be subject to MLM processes (#1611c-d) developed by FE/FL (#1611a-b). DO #3 determines whether RAS-related findings should be reported to Client #1612 via ARM or fed to RASPM #1615 for preparation of RAS(s). Here, too, MLM processes (#1615c-d) developed by FE/FL (#1651a-b) can be employed to improve S(s)/F(s). Once a RAS is prepared a determination #1620 concerning whether Owner/Broker or Client will submit the RAS(s) to RA(s). If Client will submit, ARM/Transmission Module #1622 securely transmits the RAS or RAS-formatted data to Client. Formatting of an RAS will include consideration of RA requirements, standards, etc. E.g., for an ECHA submission formatting for S2S connectivity for use with ECHA's RestAPI can be part of the RASPM S(s)/F(s) for submission of SCIP data and also creation of ECHA employed encryption keys. If submitted by Broker, ECM #1625 optionally enters ownership/licensing-related transactions to facilitate registration of the RA Submission and the RASM #1630 submits the RAS to RA(s). Following such processes, resulting DS(s) can be fed to monitoring processes described in FIG. 17.

FIG. 17

Subprocess/FM collection #1700 in FIG. 17 relates to monitoring and DR updating S(s)/F(s) that can be applied after, e.g., completing RAS-related analyses/action(s) as described above in connection with FIG. 16. Upon an EMM Triggering event, #1750, an EMM query module (EMMQM) can evaluate various data sources, such as updated CI #1751a, updated IESPIDR #1751b, updated RIDR #1751c, etc. The EMMQA #1752 F(s)/S(s) can be subject to MLM(s) (#1752c-d) developed by FE/FL S(s)/F(s) (#1752a-b). Exemplary aspects of such processes/Features can include determination of an update, identification of updates, or both. A determination #1753 of whether to update DS(s), output(s), action(s), etc. is made, which can also be the subject of MLM processes/training (#1753a-d), resulting in generation of an updated ECPIS/CI DS #1754. A decision regarding whether an update occurs or not, DO #3, can be obtained and reviewed with respect to, e.g., RAS-related analysis, and either RAS-related elements reported via ARM #60; fed to RASPM and TM #1756, resulting in preparation of an RAS (in whole or part) and relay of the RAS to client (typically through encrypted/secure communication means); or fed to RASPM and RASM (RASSM) #1755, which prepares and submits an RAS. MLM functions (e.g., #1755c-d) can be applied to the RASPM S(s)/F(s), RASM S(s)/F(s), or both, after MLM development (#1755a-b) (of course, "after" in this sense can refer to an ongoing process, as is typically the case with any MLM described in TD). After the selected action(s), DSAM #90 updates DS(s)/DR(s), e.g., by adding updated ECIS #1754 information to DR(s), such as updated client data #1751a, updated IESPIDR #1755b, or both (S(s)/F(s) n.s.), which function can also be performed, at least in part, by MLM modules #1760c-d, trained by FE/FL, #1760a-b.

FIG. 18

System #1800 shown in FIG. 18 is a representation of an exemplary network of physical components, Functions, and Input S(s)/F(s) employable in S(s)/F(s) OTI. Users 1-4, #1801a-d, representing ≥1 Customers, can provide various Input(s) #1803a-d to System #1800 by any suitable method #1805a-d. E.g., User 1 #1801a, uses scanner input #1805a, to upload an e-copy of physical (paper) document #1803a, and submits the same as an email attachment #1807a mailed to an email address such that the Input is received by an Email Receiving Module (ERM (n.s.) contained in System supercomputer or network #1820, which can represent e.g., a distributed network with massive parallel processing capabilities. User 2, #1801b, in contrast submits DOCI #1803b, on a mobile phone/device #1805b, using a mobile-friendly secure web portal #1808a. User 3, #1801c, uses facsimile and email, #1805c and #1807b, to provide Input. User 4, #1801d, provides web page #1808b submission of DII #1803d, through a laptop/PC #1805d. Electronic contract terms (#1809a-d) are offered to each User and e-contracts negotiated and finalized. User Inputs are submitted to PTR-CRM (system/device) #1820, comprising FM(s), with User and outside access to FM(s) and DR(s), particularly DS(s) containing SI (e.g., IESPIDR DS(s)) protected by, e.g., firewall(s) (represented by #1810). Administrator(s) #1840 can access, interact with, and manage FM(s) in CEI(s) encoded by device/system #1820 (e.g., SL/SSL MLM(s)) via device(s)/interface(s) #1830 and System #1820 can generate output #1850, such as an RAS or proposed Supply contract, which can be relayed to identified Stakeholder system(s) #1860.

FIG. 19

Step(s)/FM(s) #1900, shown in FIG. 19, provide another example of the processing of MLR Inputs by SOTI/MOTI. In the illustrated example, IM receives Cell Phone Record #1901 which is submitted to IM/IRM #8, which receives and translates DSF(s) contained therein. The IM/IRM identifies via structural and content analysis several Levels in the Input, via Component analysis #1910, identifying and creating separate DS(s) for Display, #1921, Memory Chip, #1922, Battery, #1923, Processor Chip, #1924, Camera, #1925, Sensor 1, #1926, Sensor 2, #1927, and further identifying Sub-Components associated with Processor Chip #1924 and creating DS(s) for Chip #1928, Coating, #1930, and Retainer, #1932. Component and Sub-Component DS(s) are used to generate QRD that is fed to QM #20 used to search IESPIDR #917. SPRR(s) in IESPIDR for Coating 1, Coating 2, Coating 3, and Coating 4 (#1950, #1952, #1953, and #1954, respectively) are identified via matching and contents thereof (e.g., Ingredient POC:BPA and amount data) are analyzed by POC RCM #1940. If POCs are determined to exist (or likely exist) in matching coating PRRs, #1960, FM(s) report a suspected POC alert regarding Coating #1930 of CIPS, via ARM #1970 to user and optionally receive additional/feedback from User via IM/IRM #8 as to next steps, additional information, and the like. If no POC is found, process can terminate #1999.

FIGS. 20, 20A, and 20B-20D

FIGS. 20 (process #2000), 20A, and 20B-D provide a related overview of another exemplary application of Input, processing, querying, reporting, and application FM(s)/S(s). FIG. 20 provides an overview of the entire process, described in detail by being broken down into 3 parts as FIGS. 20B-D. FIG. 20A reflects the flow of the three parts of the process reflected in FIG. 20B, FIG. 20C, and FIG. 20D. In the Figure sheets provided, FIG. 20A is provided alongside each of FIGS. 20B-20D to clarify which parts of the larger process are being illustrated.

In FIG. 20B (provided next to FIG. 20A to indicate that the steps related to the beginning par to the larger process, #2000, are being illustrated), a User Submission #2001, comprising, e.g., DO is received by IM/IRM #2010. DII #2003 also includes User information, such as a Submitted ID, Customer (Company) information, and possible Authority-related information, received by IM/IRM. DOCI #2005, also submitted to IM/IRM includes several DSF(s) at different Level(s) such as Brand, Class/Type, Component, and Ingredient attributes (and amount information for Ingredients). Fractional numbers near DSF(s) reflect hypothetical possibilities for entries. E.g., Component A description is 1 of 10 possible suitable descriptions recognized by NLP/IRM and Ingredient C1 amount is in 1 of 8 possible recognizable format(s). As noted at bottom of DOCI block #2005, the combination of element(s) provided as examples reflects 1 in 1.25×10e11 possible entries, which, processed by FM(s)/S(s) can be used to uniquely identify associated Product(s), assign confidence/validity indicator(s) to the submission, etc. DFAM #2015 can clean, harmonize (blend), and format data, including data structure, and apply metadata ("Assign dataset record 5"). DFAM also can comprise SGM (n.s.)/TLM (n.s.) that identifies synonyms/equivalents, lemmas, or both for DSF(s) (e.g., drawing from SN/corpora and applying relevant matching function(s)).

Referring to FIG. 20C (shown alongside a repeat of FIG. 20A wherein the middle section of steps is shaded, indicating that FIG. 20C reflects a "middle" set of steps of overall process #2000), initial CI DS developed in FIG. 20B is used as a QRD by QM #2020, which analyzes SPRRs (#2022, #2024, #2026, and #2028) contained in IESPIDR (n.s.). Taking the combination of possible entries in just these four shown SPRRs means that, e.g., possibly 6.29×10(11) different combinations could be contained in the records, reflecting, again, the complexity of such S(s)/F(s) and the need for use of computerized systems with sufficient processing capability and memory (in most embodiments the number of data points in a DR would be at least 1, 2, 3, or more orders of magnitude greater). Non-matching DSF(s) (relating to Component D) are highlighted and bolded for convenience, reflecting consistent presence in matching SPRRs, providing basis for imputing or reporting the likely omission of Component D in CPIS. At a lower Level, Ingredient D1 DSF(s) are found in 3 of 4 SPRRs, suggesting its inclusion which may be a basis/component for reporting or for imputing (or both). In 2 of the 4 cases, the information is associated with a reference (Reference J), which can provide more weighting to the data, if credible. In contrast, Ingredient D2 is only identified in SPRR #2024, albeit in association with Reference Q. Credibility of Reference Q may be enough to impute Ingredient D2 to CPIS, to report issue for further investigation, or both. Again, as noted, just considering the 4 SPRRs identified as matches requires the analysis of an estimated 6.29*10e11 DSF(s) applying the same probabilities of occurrence noted in FIG. 20B, #2005. Skilled persons will understand that the shown values are provided merely to demonstrate the possible/typical scale of data points potentially involved in MOTI/SOTI. Other relevant calculations of DSFs can be made generating smaller or larger numbers, e.g., $\geq 1*10e6$, $\geq 1*10e7$, $\geq 1*10e8$, or $\geq 1*10e9$ DSFs.

ECPIS obtained from QM #2020 is fed to PAIQM #2030, which queries PADs (n.s.) identifying PAD data #2032 and PAD data #2034, each containing PDQs, Component Records, Ingredient Records, and amount information, along with source indicators. In the shown example, Component D is again identified in PADs, reinforcing RCM #2040 recommending imputing Component D to CPIS in an expected/putative ECPIS that would contain Component D, as well as likely including Ingredient D1 (in both PADs and 3 of 4 SPRRs) in amount D1 (same). PAD source indicator(s) can also be weighted in the analysis used by RCM #2040.

Referring to FIG. 20D (once again shown alongside a repeat of FIG. 20A, with the last section of FIG. 20A shaded reflecting that FIG. 20D illustrates latter steps of process #2000), expected EPCIS/MRCDS from FIG. 20C S(s)/F(s) is fed to RIDR QM, RCM, and AEM #2065, which references RIDR #2070, to evaluate if POC(s) are present in expected EPCIS. ARM #2050, reports anticipated errors/omissions in CI DS (e.g., Component D, Ingredient D1) to User. Report #2055 can include such items, along with any assessment of possible POCs, based on, e.g., if Ingredient D1 in amount D1 would be a POC based on comparison with RRs (e.g., in a RIDR (n.s.)). IM #2060 can receive User feedback from/response to report #2055. Additional analysis can be performed #2075 by RCM based on User feedback and ARM can report new analysis factoring in such additional input/feedback. Further action(s) at decision point #2078 can include receiving even further User Input #2080, which is evaluated/acted on by RCM, AEM, or relaying further refined ECPIS DS to SPM #2085, that prepares RAS DS #2080, imputing Component D information, and appending references/tags as indicated (e.g., Reference J for Component D, which is likely a RA recognized reference for Component D), and, if selected in DO, having SPM prepare RA submission #2095, which is relayed #2099 by RASM to RA as a RA dossier/filing.

FIG. 21

FIG. 21 provides a simple graphical representation of a first type of scenario entities may face while attempting to comply with SCIP-related regulations. In aspects, FIG. 21 illustrates a scenario in which a system or method of the invention provided herein can be applied and, e.g., can provide utility and benefit, e.g., with regard to risk reduction, operational efficiencies, etc. to an entity using such a system.

In the provided scenario of FIG. 21, the entity #2140, is comprised of disparate legal entities (#2110, #2115, #2120, #2130, #2145, and #2150). For example, entity #2140, e.g., "A.G. SUPPLIER" may be comprised of legal entities #2110 "A.G. SUPPLIER IRELAND", #2115 "A.G. SUPPLIER GREECE", #2120 "A.G. SUPPLIER SPAIN", #2130 "A.G., SUPPLIER GERMANY", #2145 "A.G. SUPPLIER SWEDEN", and #2150 "A.G. SUPPLIER PRANCE". Further, each individual legal entity may be comprised of sub-entities, #2165, #2170, #2175, #2125, and #2135. For example, entity #2130 "A.G. SUPPLIER GERMANY" may comprise sub-entity #2135 "A.G. SUPPLIER GERMANY JUNIOR", or, e.g., entity #2115 "A.G., SUPPLIER GREECE" may comprise sub-entity #2165 "A. G. SUPPLIER GREECE JUNIOR 1" and sub-entity #2170 "A.G. SUPPLIER GREECE JUNIOR 2". Yet further, each sub-entity may utilize one or more third-party distributors, #2180, #2185, #2190, and #2195, which, such as is shown in the case of third-party distributor #2180, can be shared by multiple sub-entities (#2125 and #2175). FIG. 21 illustrates the data duplication which can occur in scenarios where an entity comprises multiple legal entities, and, further, the challenges faced by such entities in managing/maintaining multiple identical product-related portfolios.

FIG. 22

FIG. 22 provides a simple graphical representation of a second type of scenario entities may employ while attempting to comply with SCIP-related regulations. In aspects, FIG. 22 illustrates a scenario in which a system or method of the invention provided herein can be applied and, e.g., can provide utility and benefit, e.g., with regard to risk reduction, operational efficiencies, etc. to an entity using such a system.

In the provided scenario of FIG. 22, like the entity of FIG. 21, the entity #2210 is still comprised of multiple legal entities #2215, #2265, #2270, #2275, #2280, and #2285; however, in this scenario, all data is streamlined through a single master legal entity (#2215). In this scenario, data streamlined through the single master legal entity can be referenced by other legal entities. In this scenario, all data sent to a SCIP data repository #2220 is received by the data repository from the single master legal entity (#2215). Similar to the structure described in FIG. 21, each legal entity can comprise sub-entities (e.g., #2225, #2230), which, each, can comprise third-party distributors (#2235, #2240, 2245, and #2250, #2255, and #2260, respectively). The single master legal entity scenario of FIG. 22 is characterizable as a "hub and spoke" model. Such a model may mitigate the risk of supplier burnout, prevent the overwhelming of resources, reduce non-compliance, or a combination of any or all thereof. Such a model may be preferable in terms of efficiency, risk reduction, cost reduction, etc. compared to the model of FIG. 21 (disparate legal entities). Systems and devices of the methods herein can, in aspects, be applied to either or both types of scenarios shown in FIGS. 21 and 22.

FIG. 23

FIG. 23 illustrates a decision tree for aiding in compliance with the International Electrotechnical Commission (IEC) 63000 standard. In aspects, this decision tree illustrates elements of compliance which can benefit from the application of systems and methods of the invention, as is described in detail elsewhere herein.

According to this exemplary workflow, a supplier assessment related to a part is initiated #2310. An analysis of contractual language in master services agreement(s), purchase order(s), and, e.g., supplier sites is analyzed #2315. If contractual language is deemed insufficient, the process reverts to the start of the supplier assessment #2310. If contractual language is deemed sufficient, a determination is made regarding the presence of a supplier declaration #2320. If a supplier declaration #2320 does not exist/has not been received, an analysis is performed by a technical team regarding the risk of lack of such a declaration (#2330). If the risk is deemed to be low, the analysis and associated document(s) are stored in the technical file #2325. Further, if a determination is made that a supplier declaration has been received at step #2320, the declaration and, e.g., other associated document(s) is/are stored in the technical file. On the other hand, if a supplier declaration was not received and the analysis performed by a technical team regarding the risk of lack of such a declaration (#2330) deems the risk of lacking such a document to be high, an analysis of materials is performed. If the materials are unknown #2350, materials are tested #2355. If materials are tested #2355 and identified as clear of restricted substances, the part is deemed compliant #2380. On the other hand, if materials are tested #2355 and identified as containing restricted substance(s), an analysis is performed to determine if there is an exception for the restricted substance(s). If an exemption exists, the product is deemed compliant #2380. If no exemption exists, the product is identified as non-compliant (not compliant) #2375.

Returning to the step in the exemplified process where it is determined that lack of a supplier declaration presents a high risk, an analysis is performed to determine whether or not the part is likely to contain restricted substance(s) #2345. If likelihood of restricted substance(s) is identified, an analysis is performed to determine if an exemption exists for the substance(s) #2360. If there is no exemption, such a part is excluded from products entering regulated markets #2365, or the product is deemed non-compliant #2375, or both.

FIG. 23 demonstrates that many critical evaluations are performed during diligence efforts to maintain compliance with standards such as IEC 63000. Systems and methods of the invention provide tools for collecting and assessing information and documentation required for demonstrating compliance.

FIG. 24

FIG. 24 is a flow chart exemplifying one aspect of methods of the invention comprising the establishment of ngram vectors from tokenized index content and comparison thereof to search index(es).

Symbols, punctuation, case, and spacing (e.g., trimming and duplication) are normalized in the index content #2410 before tokenization. Index content is then tokenized #2420, preserving word boundaries, into trigrams of character sequences. In this tokenization step, common abbreviations contained in names are auto expanded or replaced #2430. A vector representation of the "ngram" (the, e.g., trigrams of character sequences but which may, in aspects, comprise rules such as, e.g., 2, 3, or 4-letter ngrams) is then created for comparison of similarity to the input query #2440.

The vector representation #2440 is then submitted to the search index #2450. Each token of the vector representation is weighted #2460 by the number of occurrences in the input query, with an additional inverse weighting factor applied for the frequency of occurrences of the ngram across the index ("inverse document frequency") that underweights any particular value by this frequency. Once the vector representation #2440 is submitted to the search index #2450, vectors are compared using a cosine similarity scoring system. The cosine similarity scoring system ranks the similarity of the vectors by their "percent similarity", and a score between 0-1 is assigned (#2480) to indicate their similarity wherein 1 indicates a "complete" match for the input string.

FIG. 25

FIG. 25 illustrates one aspect of the systems and methods described herein, wherein (a) single vectors are created from the extraction of multiple terms from a single submission, and (b) such vectors are compared to content of a data repository.

FIG. 25 shows a document, e.g., a BOM, comprising multiple pieces of data (#2515, #2520, #2525, #2530, #2535, #2540, #2545, #2550, #2555, #2560, #2570, #2575, #2580, #2585, #2590, and #2595). Each of such individual pieces of data are comprised of term(s). In aspects of the invention, a system of the invention is capable of extracting terms and associating such terms as a being a term associated with a particular attribute. In aspects, such terms belonging to the same attribute are grouped together to form a single vector.

In FIG. 25, the terms represented by "NAME" #2525, "CORP ID" #2520, "DOMAIN" #2525, and "REGION" #2530 are identified as being associated with the attribute "PARTY", and PARTY VECTOR #2510 is created comprising those related terms.

Further, terms represented by "PART A" #2535, "PART B" #2540, and "PART C" #2545 are identified as being associated with the attribute "PART"; as are terms represented by "#####A" #2550, "#####B" #2555, "#####C" #2560, and further, terms represented by "MATERIAL A" #2570, "MATERIAL B" #2575, and "MATERIAL C" #2580. Each of these three "PART" attribute-related terms are combined to form PART VECTOR #2597.

Finally, terms represented by "REG" #2585, "DEC/SENT" #2590, and "TYPE" #2595 are identified as being associated with the attribute "SUBMISSION", and SUBMISSION VECTOR #2596 is created.

FIG. 25 further illustrates that once one or more vectors are created by combining like attribute terms, such vectors are compared to a data repository, e.g., to data in an ISPIDR, to identify like-vectors. Such identified like vectors can be used, e.g., to make comparisons to the submission, e.g., the BOM, to determine if information is missing and, potentially, to provide such missing information in order to form a more complete submission. Such elements of the system are described in more detail elsewhere herein, such as, e.g., illustrated in FIG. 26.

FIG. 26

FIG. 26, while simplistic, illustrates one aspect of systems and methods of the invention whereby an analysis is performed to compare individual attributes of vectors, e.g., the vectors illustrated in FIG. 25, with data in a data repository.

In FIG. 26, a vector, e.g., a PART vector #2610 (e.g., corresponding to PART vector #2597 in FIG. 25) is compared to content of a data repository #2620. PART vector #2610 (e.g., fields of part vector #2610) is compared to vector data within data repository #2620. Vector matches within the data repository are identified. The level or degree of the vector match is compared to a pre-determined, pre-established threshold. If the match meets or exceeds such a pre-determined, pre-established threshold, system resources are utilized to compare vector data at an attribute level within content of the database wherein such a match exists (e.g., a particular index). The results of such attribute comparison are collected #2630 and used to evaluate the status of the original submission (e.g., the BOM of FIG. 25). If such evaluation should determine that data are missing from the original submission, the analysis of FIG. 25 can be used, e.g., in aspects, to fill in potentially missing information within the original submission so as to render a final product which is more complete than the original.

FIG. 26 further exemplifies ways in which the systems and methods of the invention provide detectable or significant efficiencies. For example, of the level or degree of the above-described vector match does not meet or exceed a pre-determined, pre-established threshold, system resources are conserved by not further querying for attribute targets within, e.g., indices wherein such a match was absent. Instead, system resources can be directed elsewhere, to queries, for example, where other matches exist based on one or more other queries (such as, e.g., to indices wherein a match meeting or exceeding a pre-defined threshold does exist).

FIG. 27

FIG. 27 illustrates one aspect of the invention, wherein systems and methods comprise the establishment of ngrams from uncharacterizable terms identified in a submission, and, in further aspects, the establishment of a vector therefrom. Such aspects improve upon the ability of the systems and methods herein to identify record matches from queries generated from submissions comprising uncharacterizable content.

In FIG. 27, one or more uncharacterizable terms #2710 are identified in a submission. An uncharacterizable term is a term e.g., having no standard meaning, or, e.g., a term otherwise unrecognizable by a processor charged with evaluating terms it receives. The steps of FIG. 27 illustrate the treatment of such a single uncharacterizable term #2710; however, it should be understood that multiple uncharacterizable terms may be identified, the treatment of each of which can follow steps such as those described in FIG. 27. In aspects, such processing of two or more uncharacterizable terms can happen serially or in parallel.

Once an uncharacterizable term #2710 is identified, e.g., the term "BRANDXXXMMM A.B." in the provided example, two or more ngrams, or, e.g., two or more sets of ngrams, are created. A created ngram can comprise a ngram following established rules, such as 2-letter, 3-letter, 4-letter, 5-letter, or 6-letter, etc. rules. In aspects, two or more ngrams following the same rule are created (e.g., two or more ngrams having a rule of 3 are created). In aspects, multiple, e.g., two or more, ngrams comprising ngrams having different rules are established, e.g., ngrams having a rule of 3 and ngrams having a rule of 4 are both created. In aspects, 2, 3, 4, or 5 or more ngrams each having a different rule are established. As shown, ngrams having a rule of 3 #2740, ngrams having a rule of 4 #2750, and ngrams having a rule of 5 #2760 are created. Once at least one ngram set is created (e.g., comprising at least 2 ngrams), all ngrams are combined #2730 to create a single ngram vector #2770. The ngram vector is then compared to data in a data repository #2780 as a lexical search.

As shown in each of, e.g., the groups of ngrams #2740, #2750, and #2760 of FIG. 27, ngrams comprise combinations of letters of an unrecognizable term which overlap one another. For example, in the ngram having a rule of 3 (#2740), the first three letters "BRA" are extracted from the unrecognizable term "BRANDXXXMMM A.B." to form the first ngram. The second ngram overlaps the first, starting with the second letter of the unrecognized term and following the rule of 3 to form the ngram "RAN". Continuing on, the third ngram overlaps the second, starting with the third letter of the unrecognized term and following the rule of 3 to form the ngram "AND", and so on. The same type of overlapping ngram formation is illustrated by the exemplary ngrams in the ngram rule of 4 group #2750 and the ngram rule of 5 group #2760.

In aspects, in the formation of ngrams, when a term is, e.g., smaller than a ngram rule size, elements of the unrecognizable term can be combined. See, e.g., the ngram rule of 5 group #2760, wherein the "A.B." part of the unrecognized term "BRANDXXXMMM A.B.", comprising only 2 letters, is combined, in whole or in part, with other parts of the unrecognized term, to form, e.g., the ngrams "XMMMA" and "MMMAB".

Therefore, in aspects, FIG. 27 describes an aspect of the invention wherein use of a trained index of, e.g., product-related terms can be analyzed both via characterizable terms, e.g., by semantic searching (described elsewhere), and, e.g., via uncharacterizable terms, e.g., by the lexical searches described by FIG. 27. In semantic searches, such terms are not broken down into pieces (ngrams). In lexical searches, terms are broken down to form ngrams.

FIG. 28

FIG. 28 illustrates one aspect of the invention comprising the use of multiple forms of comparisons, e.g., index and schema comparisons, in a process for generating a final finished good report based upon an initial submission.

FIG. 28 shows a submission, e.g., a Bill of Materials (BOM) #2805 submission wherein #2810, #2814, and #2815 are identified as fields (e.g., Field 1 #2810, Field 2 #2814, and Field 3 #2815). Identified Fields #2810, #2814, and #2815 are indexed against multiple indexes #2320, whereby multiple terms, e.g., Attribute 1 #2811, Attribute 2 #2812, and Attribute 3 #2813 are identified as attributes. For the sake of simplicity, FIG. 28 shows the breakdown of only Field 1 #2810 of the BOM #2805 into Attributes (#2811, #2812, and #2813), however it should be understood that the same type of breakdown could apply to multiple fields, e.g. to each of Field 1 #2810, Field 2 #2814, and Field 3 #2815.

Each identified attribute, e.g., each of Attribute 1 #2811, Attribute 2 #2812, and Attribute 3 #2813, are indexed against multiple indexes #2325, wherein one or more values, e.g., #2830, are identified. In indexing for example attributes and values, a component #2320 can be identified.

Once a component #2320 is identified, such a component can be compared against multiple component schemas #2835, e.g., a first component Schema C1 #2840 and others, e.g., Schema C2 #2845, Schema C3 #2850, Schema C4 #2855. Based upon the analysis of the how well such an identified component matches with any one compared schema, a product can be identified #2860.

Upon identification of a product #2860, such a product can be compared against one or more product schemas #2865, e.g., product Schema P1. Such a schema, e.g., Schema P1, can comprise multiple elements #2880, such as, e.g., data related to product type or classification identifiers, (e.g., finished good), part, part number, subpart, subpart number, ingredient, ingredient amount or concentration, country of origin, regulatory control (e.g., body or regulation under which good is regulated), and details about such regulation.

Upon comparison of an identified product #2880 with a product schema #2880, in, e.g., #2865, difference between the present product content and the expected content can be identified #2870 and reported #2875. The resulting report #2885 can comprise information related to all elements present in the matching schema (e.g., Schema P1 #2880). In aspects, information in the original submission expected to be present in the submission but which is identified as missing can be filled in, e.g., provided or completed, using data present in the matching schema (Schema P1 #2880).

FIG. 29

FIG. 29 is a flow chart which exemplifies one aspect of the invention, whereby systems and methods comprise the evaluation of terms from a submission, and from such evaluation, different types of vectors can be generated which are then used for further analysis.

The process in FIG. 29 starts with a submission #2910, such as, e.g., a Product Record Evaluation Submission, and the recognition of the alphanumeric content of the submission #2915. The submission data is then harmonized, or, e.g., data derived from the source/submission data is harmonized #2920. Term delimitation #2925 is then applied to recognize terms based on one or more established delimitation rules. Exemplary delimitation rules can be, e.g., a blank space delimitates a term, or other indicators, such as, periods, commas, semicolons, end of lines, end of cell, etc. delimitates a term. Once terms are identified, terms are subjected to attribute analysis #2930, wherein terms are compared against one, or more indexes, such as, e.g., 2, 3, 4, 5, 6, 10, 20, or more indexes. To identify the type of submission or to characterize a submission, identified terms can be compared to multiple indexes (#2935, #2940, #2945) of different types, e.g., one type of finished goods data repository that is for vehicles (a vehicle index, e.g., Index 1 #2935), one type of finished goods data repository that is for pharmaceuticals (a pharmaceutical index, e.g., Index 2 #2940), and, e.g., one type of finished goods data repository that is for computer hardware (a computer index, e.g., Index 3 #2945).

Once the terms are compared against the index(es), the term is identified as either being known or categorizable/characterizable (e.g., it is a term present in an index) or alternatively as unknown or uncategorizable/uncharacterizable (e.g., it is a term that is not present in an index) #2950. A known or categorizable/characterizable term is referred to herein as an attribute (something that is known). If the term is identified as a known attribute term (e.g., a categorizable/characterizable term), semantic vectors as described elsewhere herein are generated #2955 from the attribute/semantic term. If the term is identified as an unknown attribute term (e.g., an uncategorizable/uncharacterizable term), lexical vectors are generated #2960 from, e.g., term fragments, combined characters, or both (e.g., ngrams).

FIG. 30

FIG. 30 exemplifies how a vector query works in aspects of the systems and methods of the invention described herein.

FIG. 30 begins with the receipt of a harmonized evaluation submission (e.g., "base data" therefrom) #3005. From that submission, semantic terms are identified and from those identified semantic terms, semantic vectors are created; and also or alternatively, from that submission, lexical terms are identified and from those identified lexical terms, lexical vectors are created #3010. Collected terms and vectors are then combined as a dataset, #3015. The dataset can comprise non-semantic and non-lexical data, represented by the "Other Data" component #3020 of the dataset #3015. The dataset can comprise semantic data, e.g., Semantic 1 #3025, Semantic 2 #3026, Lexical 1 #3030, and Lexical 2 #3031.

A query is then performed #3035 of stored datasets #3045 and #3075 in a data repository #3040, to identify similar datasets (e.g., #3045 and #3075) comprising similar vectors (e.g., dataset #3045 comprising similar vectors #3055, #3060, #3065, and #3070), and dataset #3075 comprising similar vectors #3085, #3090, #3095, and #3099). Such similar vectors can be associated with "other data" (e.g., non-semantic or non-lexical data), e.g., #3050 in dataset #3045 and #3080 in dataset #3075.

An assessment of the similarity of such identified datasets can then lead to the direction of the system to analyze particular components of such datasets, or, e.g., indices related to such datasets, etc. Such aspects can, e.g., improve upon efficiencies of systems and methods described herein.

FIG. 31

FIG. 31 exemplifies the ability of systems and methods of the invention to operate efficiently or to improve upon efficiency based upon selective querying.

The example shown in FIG. 31 begins with a dataset #3105 generated from an evaluation submission comprising a generated semantic vector #3115 and a generated lexical vector #3120, both of which are associated with other data (e.g., "extra data") data characterizable as non-semantic and non-lexical data #3110. The generation of this dataset is described as element #3125. The semantic vector data #3115 and the lexical vector data #3120 of dataset #3105 is then compared #3165 to the content of a data repository #3130, the data repository comprising multiple datasets #3135 and #3150 which match dataset #3105 in different ways, or, e.g., to greater or lesser extent(s). For example, as shown, dataset #3135 demonstrates similarity to dataset #3105 in its semantic vector #3145, however the "other/extra data" #3140 looks very different—the "other data" or "extra data" of dataset #3105 (element #3110) being shaped like a home plate and the "other/extra data" #3140 of dataset #3135 being shaped like a diamond. In another example, as shown, dataset #3150 demonstrates similarity to dataset #3105 in its lexical vector #3160, however the "other/extra data" #3155 looks very different. In dataset #3150, the "other/extra data" #3155 is shaped as two stripes.

At this stage of the process, some matching, e.g., at least some similarity, between dataset #3105 and dataset(s) #3135 and #3150 of a data repository #3130 has been identified. A comparison is now performed #3196 using at least detectably or significantly more of, or, e.g., all of, the original submitted data, e.g., more than just the semantic #3115 or lexical #3120 vectors of dataset #3105. Here, for example, in the comparative analysis of #3170 and #3185, the "other data" #3175 of dataset #3105 is compared to the "other data" #3180 of dataset #3150 and is further compared to the "other data" #3195 of dataset #3135. This comparison leads to an evaluation #3198 of what data should be added to or amended in the evaluation submission. In FIG. 31, it is determined that the "other data" of dataset #3150 is a better match to the evaluation submission data than is, e.g., the "other data" of dataset #3135, and the evaluation submission is amended accordingly.

FIG. 32

FIG. 32 exemplifies the concept of a method comprising use of multiple searches of a particular type. Here, the method comprises making multiples (e.g. multiple vectors) of a single type of term (e.g., multiple lexical term vectors), wherein all of such multiples (multiple vectors) are used to search a data repository.

FIG. 32 starts with a harmonized evaluation submission (e.g., "base data" therefrom) #3205. From this data, a plurality of lexical terms, a plurality of semantic terms, or both a plurality of lexical and semantic terms is/are identified #3210. From such terms, representative vectors (e.g., a plurality of lexical vectors, a plurality of semantic vectors, or both a plurality of lexical and a plurality of semantic vectors) are created. Each such vector, as has been described, representing lexical tokens, each representing a collection of characters derived from terms. In the example shown, a plurality of a single type of vector, e.g., semantic vectors, #3220, #3225, #3230, and #3235 are created. This plurality of vectors, e.g., the plurality of semantic vectors (#3220, #3225, #3230, and #3235) are then grouped as a dataset #3215 and used to query a data repository #3240; that is, the data repository is queried with a plurality of generated vectors.

Upon querying, multiple records are identified, e.g., Hit 1 #3245, Hit 2 #3250, and Hit 3 #3255, by their association with vectors identified as similar to those of the harmonized evaluation submission. For example, a first search resulted in Hit 1 #3245, a second search resulted in Hit 2 #3250, and a third search resulted in Hit 3 #3255. The identified records Hit 1 #3245, Hit 2 #3250, and Hit 3 #3255 are then analyzed #3250 and weighted #3255, according to their similarity to the base data.

FIG. 33

FIG. 33 exemplifies an aspect of the systems and methods of the invention wherein prioritization is utilized to increase system/program efficiency.

FIG. 33 begins with the identification of semantic terms in the data of an evaluation submission #3310. Such semantic terms are compared #3320 to one or more schemas, one or more indexes, or both, to characterize the hierarchical status of the term, e.g., finished good, part, sub-part, ingredient, etc. (e.g., an attribute the term describes). Stored data, e.g., data stored in a data repository, is then queried with vector(s) corresponding to a token of high-level semantic terms or including high level semantic terms #3330. Here, the identification of high priority terms provides an opportunity to query a data repository based on hierarchical priority. This provides system efficiencies, such that system resources are directed to searches which can, as they are performed, narrow in on what may be the most relevant records to utilize in comparison with submission data. For example, an important first index for querying may be a Domain index #3340 or a Finished good index #3350. In aspects, these indexes will narrow down the searches to be performed by the system quickly, e.g., faster than if such selectivity is not applied. That is, once the domain is identified, the system may then identify what other attributes should be expected and, hence, what other indices to search. In this way, system resources are directed to searches which may be more fruitful and useful, providing system efficiencies. Further evaluation #3360 can be performed on other identified semantic terms by schema or index comparison to further determine hierarchy of evaluation submission data.

Once attributes are identified, the system can be directed to identifying values associated with such attributes #3370. Values are identified by their association with attributes by their, e.g., proximal location to an attribute (proximal analysis), by their presence within a schema (schema analysis), or, e.g., both by proximal analysis and schema analysis.

Next, an evaluation of whether or not a change in status of the product is needed or recommended #3380. Here, status of the product can mean, e.g., the indication associated with a product record of whether or not a regulatory submission has been made. This may indicate that, e.g., a regulatory submission needs to be made for such product. Further, if the aim is to evaluate environmental social guidance/guidelines, and it is identified that there may be a risk associated with a particular vendor, a change in status may be, e.g., that a different vendor is required. If such an evaluation results in a need to change a product status or a need to alert the user to a potential need to change a product status, an application is applied #3390 to change the product, product supply, etc. or recommendations are made to the user as to what related actions may be required.

FIG. 34

FIG. 34 exemplifies aspects of the invention wherein reputation data, e.g., company or product reputation data, are applied to evaluation processes. In aspects, a system user can obtain information related to a reputation event or a reputation profile of a, e.g., product.

FIG. 34 begins with the generation of, or, e.g., the provision of, a stored collection of reputation data #3420. Such reputation data can be, e.g., reputation data associated with a manufacturer, or, e.g., reputation data associated with a product. As is the case with many or most other data collections in the systems described herein, such data can be derived from multiple sources #3410, #3430. In aspects, such sources are, e.g., external source(s) #3410. In aspects, such sources are e.g., internal source(s) #3430. In aspects, both internal and external sources are used. Here, internal source(s) #3430 could be a collection of data housed within the system itself. Here, external source(s) #3410 can be data obtained from outside of the system, e.g., by internet query, FDA report, SEC filings, etc.

End user product information and the risk tolerance of the end user is collected #3440. For example, an end user may be identified as very risk tolerant, or, alternatively, risk averse. The system, e.g., a system processor, then automatically queries #3450 collected reputation data to identify associated products, e.g., products meeting such a reputation and risk profile. The processor automatically determines the risk profile associated with the product or manufacturer #3460, and reports the risk to the end user, takes action based on the risk profile, or both #3470.

Accordingly, FIG. 34 demonstrates an aspect of the invention wherein automatic and system-directed action can be taken based on known reputation data and a comparison of such known reputation data with a user's preferences (e.g., risk profile).

FIG. 35

FIG. 35 exemplifies elements of the system comprising human input, and where, e.g., in systems and methods of the invention, human input may be utilized, required, beneficial, or otherwise a component of methods described herein.

FIG. 35 begins with the receipt by the system of an evaluation submission input #3505. The content of the submission is evaluated #3510. In aspects, the evaluation comprises comparison of the submission to related record data, comparison #3515 of the submission against established rules, comparison of the submission against one or more indices, one or more schemas, or both index/indices and schema(s). Based on this analysis, a proposed optimized evaluation submission #3520 is established. The optimized evaluation submission is presented #3525 to the end user, and as shown here, feedback from the end user can be collected #3530. Such an evaluation by a human can include, e.g., an assessment of whether the results are flawed in any way, or, e.g., a search was flawed in any way. Based on the receipt of end user feedback, and evaluation by the processor is performed #3535 to determine if further modification of the evaluation submission is required. This is specifically indicated by decision point #3540. In some respects, it may be determined that one or more queries need to be re-performed #3545. This may be a complete query or, e.g., a partial query, or a partial set of queries. Results of such queries #3550 can be presented to the end-user, wherein again, human evaluation #3540 of the results can determine next actions to be taken. In some aspect, it may be determined by an end user that, e.g., results should be modified #3555, at which time such action can be taken. In aspects, only portion(s) of such a report is/are modified. In aspects, a report may be rejected in-full. In some aspects, it may be determined by an end user that all results can be accepted #3560.

Therefore, FIG. 35 demonstrates the role that direct human involvement can play in systems and processes described herein.

FIG. 36

FIG. 36 describes an aspect of the invention wherein priority terms are used to more efficiently utilize system resources related to the generation and performance of search queries. This element of the invention was touched upon in FIG. 33.

In FIG. 36, a semantic inquiry is performed #3610 to identify a priority term. Each identified priority term is then queried against one or more priority term indexes #3620. Such a priority index could be, e.g., any high-level (e.g., high level according to a data hierarchy) index, such as, for example as shown in FIG. 36, a domain index (e.g., Priority Term Index 1: Domain, #3630), a finished goods index (e.g., Priority Term Index 2: Finished Goods, #3640), or, e.g., a well-known company index (e.g., Priority Term Index 3: Well-Known Company, #3650).

Upon querying such indexes, the priority term can be identified #3660 and hence characterized based upon the index in which it was located. That is, for example, the priority term may be identified as a finished good. Therefore, the system can direct further queries #3670, to indices more likely to be relevant, e.g., to part indices known to be associated with such a finished good.

EXEMPLARY ASPECTS OF THE INVENTION

The following is a non-limiting list of exemplary aspects of the invention.

In aspects, the invention provides a method carried out by a computer system comprising providing a computer system comprising (a) a processor component (also referenced in this listing of exemplary aspects simply as a "processor",) and (b) a memory component, the memory component comprising a product information data collection ("PIDC") comprising stored product-related datasets, each stored product-related dataset comprising (A) PIDC alphanumeric records contained in or derived from PIDC source data, each PIDC alphanumeric record relating to a manufactured product, a manufacturer of a manufactured product, or both; (B) a collection of PIDC semantic term vectors, each PIDC semantic term vector having been generated from and corresponding to an electronic semantic term token, each electronic semantic term token comprising one or more system-identified semantic terms identified as corresponding to one or more product attributes, manufacturer attributes, or both, contained in the PIDC source data, each electronic semantic term token generated by a semantic token term generation protocol; and (C) a collection of PIDC lexical term vectors, each PIDC lexical term vector having been generated from and corresponding to an electronic PIDC lexical term token, each electronic PIDC lexical term token comprising a collection of PIDC lexical N-grams (or "ngrams"), each PIDC lexical N-gram formed corresponding to (i) one or more PIDC term fragment N-grams comprising a string contained in a PIDC lexical term, wherein a PIDC lexical term is a system-identified term contained in the PIDC source data not associated with a system-recognized attribute, (ii) a collection of PIDC assembled character N-grams comprising combinations of one or more spatially related extraneous alphanumeric characters not associated with any system-identified term, combinations of extraneous alphanumeric characters and characters in term fragment N-grams, or both, or (iii) a combination of one or more PIDC term fragment N-grams and one or more PIDC assembled character N-grams, each PIDC lexical term token generated by a lexical token generation protocol; each system-identified term and extraneous character used to generate PIDC lexical term tokens and each PIDC semantic term used to generate electronic semantic term tokens being in conformity with system data harmonization standards prior to tokenization, the system data harmonization standards comprising standards for consistent treatment of symbols, punctuation, case, and spacing of digits in data (aspect 1).

In aspects, the invention provides the method of aspect 1, wherein the method further comprises, upon the computer system receiving an evaluation submission from an end user, (1) automatically, by operation of the processor, (a) determining if any part of the evaluation submission can include unharmonized data, unharmonized data being data comprising data that does not comply with the system data harmonization standards, and applying a data harmonization protocol to any such data that can comprise unharmonized data to generate a data harmonized dataset containing data that is consistent with data in the PIDC in respect to the data harmonization standards in terms of treatment of symbols, punctuation, case, and spacing of digits; (b) applying a term identification protocol to the data harmonized dataset to generate a term-identified evaluation dataset, the term identification protocol identifying (I) system-identified terms, each system-identified term comprising a collection of linked alphanumeric characters of a minimum size set off by term boundaries identified by reference to preprogrammed term boundary standards and (II) any present extraneous alphanumeric characters that are not part of any system-identified term; (c) characterizing system-identified terms in a term-identified evaluation submission dataset as evaluation submission lexical terms or evaluation submission semantic terms by applying an attribute identification protocol that comprises comparing uncharacterized system-identified terms against one or more specialized preprogrammed attribute indexes, each specialized preprogrammed attribute index comprising a plurality of curated manufactured product-related terms, product-manufacturer-related terms, or both, to characterize previously uncharacterized system-identified terms that correspond to system-recognized attributes as evaluation submission semantic terms and to otherwise characterize system-identified terms that do not correspond to system-recognized attributes as evaluation submission lexical terms, thereby generating a term-identified evaluation submission dataset, (d) applying the semantic term token generation protocol to the term-identified evaluation submission dataset to generate evaluation submission semantic term electronic tokens, each evaluation submission semantic electronic term token comprising one or more evaluation submission semantic terms, (e) applying a semantic term vector generation protocol on each corresponding evaluation submission semantic term electronic token to generate evaluation submission semantic term vectors; (f) applying a lexical term token generation protocol to evaluation submission lexical terms in the term-identified evaluation submission dataset to generate evaluation submission term electronic lexical term, each evaluation submission lexical electronic term token comprising a collection of N-grams of a selected size corresponding to (I) term fragment N-grams which consist of fragments of (strings within) evaluation submission lexical terms, (II) combinations of extraneous alphanumeric characters, (III) combinations of one or more extraneous alphanumeric characters and characters contained in evaluation submission lexical terms, or (IV) any combination of (I)-(III), and (g) applying a lexical term vector generation protocol on each corresponding evaluation submission lexical term electronic token to generate a corresponding evaluation submission lexical vector; (2) by automatic operation of the processor, performing a query of PIDC lexical vectors comprising (a) selecting an evaluation submission lexical vector and measuring the cosine distance between the evaluation submission lexical vector and each PIDC lexical vector, (b) identifying PIDC lexical vectors having a cosine distance that meets or exceeds a preprogrammed lexical vector similarity threshold as similar lexical vectors, and (c) repeating steps (a) and (b) with a plurality of evaluation submission lexical vectors to generate a collection of similar lexical vectors; (3) by automatic operation of the processor, comparing recognized terms, alphanumeric characters, records, or a combination thereof, contained in a PIDC dataset associated with a similar lexical vector identified by the query of step (2), to one or more evaluation submission lexical terms or evaluation submission extraneous alphanumeric characters associated with the evaluation submission lexical vector used to identify the similar lexical vector according to a lexical term comparison protocol to thereby (a) assess whether there is an error or omission in the one or more evaluation submission lexical terms, (b) identify a relationship or potential relationship between the one or more evaluation submission lexical terms and such similar lexical vector-associated datasets, (c) identify one or more product-related or manufacturer-related terms that are related to the one or more evaluation submission lexical terms, or (d) perform any combination of steps (a)-(c); (4) by automatic operation of the processor, performing a query of PIDC semantic vectors comprising (a) selecting an evaluation submission semantic vector and measuring the cosine distance between the evaluation submission semantic vector and each PIDC semantic vector, (b) identifying any PIDC semantic vectors having a cosine distance that meets or exceeds a preprogrammed semantic vector similarity threshold as similar semantic vectors, and (c) repeating steps (a) and (b) with a plurality of evaluation submission semantic vectors to generate a collection of similar semantic vectors; (5) by automatic operation of the processor, performing a semantic comparison of terms contained in PIDC datasets that are associated with similar semantic vectors generated by the query of step (4) to one or more evaluation submission semantic terms associated with the evaluation submission semantic vector that identified the similar semantic vectors according to a semantic term comparison protocol so as to (a) determine if there is a risk of an error or omission in the evaluation submission, (b) assess whether a change in one or more aspects of the status of the product, the supply of product parts or ingredients, or both, which the computer system determines is likely to reduce a supply risk issue, improve a supply chain, or both, (c) determine if there is a relationship or potential relationship between an aspect of the product described in the evaluation submission and an aspect of a product in the PIDC dataset, or (d) perform any combination of steps (a)-(c); and (6) by automatic operation of the processor, generating an updated evaluation submission by (a) correcting identified errors, correcting identified omissions, or both; (b) associating the updated evaluation submission with one or more PIDC datasets; (c) making a change in one or more aspects of the status of the product or supply of product parts or ingredients or recommending one or both thereof to the end user; or (d) performing any combination of steps (a)-(c) (aspect 2).

In aspects, the invention provides the method of any one or both of aspect 1 or aspect 2, wherein (1) PIDC lexical N-grams and one or more evaluation submission lexical N-grams contain the same number of characters, wherein the size of the PIDC lexical N-grams and the evaluation submission lexical N-grams is 2-5 characters in length (aspect 3).

In aspects, the invention provides the method of any one or more of aspects 1-3, wherein (1) the lexical term token generation protocol comprises (a) generating a series of lexical N-grams from one or more lexical terms, beginning by generating a first N-gram of the series starting at the first alphanumeric digit of the evaluation submission lexical term and generating a successive N-gram starting at each successive digit of the evaluation submission lexical term up to a final N-gram of the series starting at the last alphanumeric element of the evaluation submission lexical term that provides an N-gram of the term having the N-gram size, and (3) adding the generated series of overlapping evaluation submission lexical term fragment N-grams to an evaluation submission lexical vector (aspect 4).

In aspects, the invention provides the method of any one or more of aspects 1-4, wherein the lexical term token generation protocol comprises (a) concatenating adjacent extraneous alphanumeric characters to generate one or more assembled character N-grams and adding such assembled character N-grams to an evaluation submission lexical token, (b) adding one or more space-filling characters to any collection of adjacent extraneous alphanumeric characters that are less than the N-gram size to generate one or more assembled character N-grams and adding such assembled character N-grams to an evaluation submission lexical token, (c) combining extraneous alphanumeric characters with characters from an adjacent lexical term to generate one or more assembled character N-grams and adding such assembled character N-grams to an evaluation submission lexical token, or (d) performing any combination of (a)-(c) (aspect 5).

In aspects, the invention provides the method of any one or more of aspects 1-5, wherein the method comprises, (1) by operation of the processor prompting an individual seeking to make a submission to the computer system to submit evidence of authorization to use the system as an end user on behalf of a client product manufacturer, (2) by operation of the processor, upon receipt of a submission of authorization evidence, automatically using an authorization protocol to evaluate whether the submission of evidence of authorization meets with one or more preprogrammed authorization standards, and (3) if the computer system determines that the authority of the individual to act as an authorized end user has been established, automatically allowing the authorized user associated to submit evaluation input to the system (aspect 6).

In aspects, the invention provides the method of any one or more of aspects 1-6, wherein for one or more system-identified terms in a PIDC dataset, an evaluation submission, or both, or for a PIDC dataset or an evaluation submission overall, (1) the computer system automatically assigns a credibility score based on the presence of a system-identified term, the credibility score is determined by a credibility score generation protocol that evaluates (a) an identified source of the system-identified term, wherein the computer system associates the identified source with a credibility score or credibility score factor, (b) the inclusion of the term in an attribute index of the system wherein the computer system associates the attribute in the index with a credibility score or credibility score factor, (c) the number of terms in the evaluation submission that are contained in one or more attribute indices of the computer system, (d) the degree of matching of two or more terms to a preprogrammed dataset schema of the system, (e) system reputation data associated with a product, manufacturer, or both, contained in PIDC datasets; (f) the number of similar PIDC datasets identified by querying PIDC datasets with the evaluation submission lexical vectors, evaluation submission semantic vectors, or both, (g) the degree of similarity of PIDC datasets identified by querying PIDC datasets with the evaluation submission lexical vectors, evaluation submission semantic vectors, or both, or (h) any combination of (a)-(g), and (2) upon determining the credibility score the computer system automatically (a) reporting the credibility score to the end user, (b) using the credibility score in determining whether to modify an evaluation submission, or (c) performing both steps (a) and (b) (aspect 7).

In aspects, the invention provides the method of any one or more of aspects 1-7, wherein the method comprises the processor automatically (1) evaluating the validity of one or more evaluation submission lexical terms by application of a lexical term validity protocol that comprises (a) determining (I) degree of repetition of the term in an evaluation submission, (II) the placement of the term in relation to a semantic term, (III) the degree of similarity of PIDC lexical terms in datasets identified in queries of the PIDC performed with evaluation submission lexical vectors, evaluation submission semantic vector, or both, (IV) the number of similar PIDC lexical terms in datasets identified in queries of the PIDC performed with evaluation submission lexical vectors, evaluation submission semantic vector, or both, or (V) any combination of (I)-(IV), (2) measuring an impact on the assessment of lexical term validity arising from any one or more determinations made in step (1) by comparing the one or more determinations to one or more preprogrammed validity assessment standards, (3) determining if the overall assessment of validity for each evaluated evaluation submission lexical terms; (4) identifying any invalid evaluation submission lexical terms; and (5) performing one or more steps of the method or re-performing one or more steps of the method only using evaluation submission lexical terms that the computer system determines to be valid (aspect 8).

In aspects, the invention provides the method of any one or more of aspects 1-8, wherein the method comprises (1) the end user submitting unstructured data to the computer system, (2) the computer system, upon detecting submission of the unstructured data in the evaluation submission, automatically identifying alphanumeric content contained in the unstructured data, and (3) using the identified alphanumeric data to generate evaluation submission lexical vectors and evaluation submission semantic vectors (aspect 9).

In aspects, the invention provides the method of any one or more of aspects 1-9, wherein the unstructured data comprises image data and the method comprises comparing detected images against one or more system image libraries to identify any images contained in the image libraries and adding one or more alphanumeric attributes to the evaluation submission in association with any identified images contained in an image library to generate one or more evaluation submission semantic terms (aspect 10).

In aspects, the invention provides the method of any one or more of aspects 1-10, wherein the method comprises (1) the computer system automatically comparing groups of one or more system-identified terms in unstructured data to one or more system dataset schemas, (2) evaluating the degree to which the one or more groups of system-identified terms in the unstructured data comply with a part of dataset schema, identify the hierarchical status of one or more system-identified terms contained in the unstructured data, and (3) modify the evaluation submission dataset by adding information reflecting the hierarchical status of the one or more system-identified terms in the unstructured data that the computer system determines exhibit a sufficient match to one or more system dataset schemas based on a preprogrammed schema comparison protocol (aspect 11).

In aspects, the invention provides the method of any one or more of aspects 1-11, wherein the method comprises the computer system automatically applying a prioritization score to one or more evaluation submission semantic vectors, one or more evaluation submission lexical vectors, or both, and prioritizing querying the PIDC with a semantic vector with a higher prioritization score, a lexical vector with a higher prioritization score, or both, and evaluating PIDC datasets identified with such queries before performing other queries of PIDC datasets with other semantic vectors or lexical vectors (aspect 12).

In aspects, the invention provides the method of any one or more of aspects 1-12, wherein the method comprises determining the hierarchical status of a semantic term according to aspect 11 and assigning a semantic term associated with a higher hierarchical status with a higher prioritization score (aspect 13).

In aspects, the invention provides the method of any one or more of aspects 1-13, wherein the method comprises applying a higher prioritization score to one or more evaluation submission semantic term vectors generated from evaluation submission semantic term tokens comprising one or more semantic terms associated with (a) a finished good attribute, (b) a product domain attribute, (c) an ingredient attribute associated with an ingredient that is subject to system-recognized regulatory requirements, or (d) a combination of any one of (a)-(c) (aspect 14).

In aspects, the invention provides the method of any one or more of aspects 1-14, wherein the method comprises the processor analyzing the data harmonized evaluation dataset for the presence of undesirable duplicate characters or undesirable duplicate system-identified according to preprogrammed data deduplication standards and removing any identified undesirable duplicate characters or identified undesirable system-identified terms according to a data deduplication protocol to generate a deduplicated dataset and subjecting the deduplicated dataset to further processing to generate semantic vectors and lexical vectors therefrom (aspect 15).

In aspects, the invention provides the method of any one or more of aspects 1-15, wherein the PIDC source data is derived from at least two distinct data collections, the two distinct data collections comprising (1) a data collection derived from a private collection of manufactured product and associated product manufacturer data submissions made by data submitters, each data submitter not being affiliated with the system owner and most of the product manufacturers associated with data submitters not being affiliated with or in a supply chain with the product manufacturer associated with the evaluation submission and (2) at least one publicly accessible data collection comprising manufactured product-related records, product manufacturer-related records, or both (aspect 16).

In aspects, the invention provides the method of any one or more of aspects 1-16, wherein the at least one publicly accessible data collection comprises generally internet information (aspect 17).

In aspects, the invention provides the method of any one or more of aspects 1-17, wherein the at least one publicly accessible data collection comprises (1) a proprietary publicly accessible data collection, (2) a government generated data collection, (3) a curated data collection generated from internet information, or (4) a combination of any thereof (aspect 18).

In aspects, the invention provides the method of any one or more of aspects 1-18, wherein the method comprises obtaining one or more desired outputs or output applications from the end user priority to performing queries of PIDC datasets and factoring the desired output or output applications into (1) the prioritization of lexical vectors, semantic vectors, or both used to query PIDC datasets, (2) limiting the lexical vectors, semantic vectors, or both used to query PIDC datasets, (3) the evaluation of the relevance of PIDC dataset records associated with similar lexical vectors or similar semantic vectors, (4) the type of output reported or applications performed by the computer system based on the analysis of PIDC datasets identified by PIDC dataset queries, or (5) any combination of (1)-(4) (aspect 19).

In aspects, the invention provides the method of any one or more of aspects 1-19, wherein the method comprises the processor automatically (1) querying one or more lemmatization indexes based on one or more evaluation submission semantic terms, (2) adding one or more identified lemmas identified by querying the one or more lemmatization indexes to an evaluation submission semantic term token to generate a new evaluation submission semantic term token or a modified evaluation submission semantic term token, and (3) generating evaluation submission semantic term vectors from a new evaluation submission semantic term token, a modified evaluation submission semantic term token, or both, and (4) performing a query of PIDC semantic term vectors using one or more evaluation submission semantic vectors generated in step (3) (aspect 20).

In aspects, the invention provides the method of any one or more of aspects 1-20, wherein the method comprises the processor automatically (1) comparing evaluation submission semantic terms to one or more related term indexes, system dataset schemas, or both, to identify two or more evaluation submission semantic terms that fall within a preprogrammed semantic term category and (2) generating an evaluation submission multiple semantic N-gram token comprising the two or more evaluation submission semantic terms that fall with the semantic term category, (3) generating a evaluation submission multiple semantic N-gram vector from the token generated in step (2), and (4) performing a query of PIDC semantic records with an evaluation submission multiple semantic N-gram vector (aspect 21).

In aspects, the invention provides the method of any one or more of aspects 1-21, wherein the preprogrammed semantic term categories comprise (1) product identifying information, (2) part identifying information, (3) manufacturer identifying information, (4) product status identifying information, or (5) a combination of any of (1)-(4) (aspect 22).

In aspects, the invention provides the method of any one or more of aspects 1-22, wherein (1) PIDC datasets comprise PIDC multiple N-gram semantic vectors corresponding to a collection of two or more semantic terms in a semantic term category in a PIDC dataset and (2) the method comprises the processor (a) automatically prioritizing performing a query of PIDC multiple N-gram semantic vectors with one or more evaluation submission multiple N-gram vectors, (b) automatically according greater weight to similar vectors that are PIDC multiple N-gram semantic vectors identified by querying with an evaluation submission multiple N-gram semantic vector, or (c) automatically performs both step (a) and step (b) (aspect 23).

In aspects, the invention provides the method of any one or more of aspects 1-23, wherein at least one evaluation submission multiple N-gram semantic vector is generated from a token comprising at least three evaluation submission semantic terms identified by the processor as being with the same semantic term category (aspect 24).

In aspects, the invention provides the method of any one or more of aspects 1-24, wherein the method comprises the processor automatically prioritizing one or more evaluation submission semantic vectors that are generated from evaluation submission semantic tokens comprising a combination of (a) one or more product-identifying words and one or more product-identifying references, (b) one or more part/component-identifying words and one or more part/component-identifying references, (c) one or more ingredient-identifying words and one or more ingredient-identifying references, or (d) one or more manufacturer-identifying words and one or more manufacturer-identifying references (aspect 25).

In aspects, the invention provides the method of any one or more of aspects 1-25, wherein the method comprises the processor automatically evaluating if an input to the computer system contains enough information to satisfy one or more preprogrammed minimum actionable dataset standards prior to the computer system determining that the input constitutes an evaluation submission (aspect 26).

In aspects, the invention provides the method of any one or more of aspects 1-26, wherein the method comprises updating the PIDC to contain information regarding the evaluation submission and any other PIDC records determined to be related to the evaluation submission or relevant to the evaluation submission in performing other steps of the method (aspect 27).

In aspects, the invention provides the method of any one or more of aspects 1-27, wherein the method comprises the processor automatically performing multiple queries of PIDC datasets, each query performed with two or more distinct evaluation submission lexical vectors, two or more distinct evaluation submission semantic vectors, or a combination thereof, and evaluating all of the PIDC datasets associated with similar vectors identified through the multiple queries (aspect 28).

In aspects, the invention provides the method of any one or more of aspects 1-28, wherein the method comprises the processor identifying one or more values contained in semantic terms or lexical terms that are associated with one or more identified semantic terms by comparing a collection of two or more nearby semantic terms against one or more system dataset schemas (aspect 29).

In aspects, the invention provides the method of any one or more of aspects 1-29, wherein the method comprises the processor automatically (1) identifying a first attribute and a second attribute in the evaluation submission and determining whether the first attribute and second attribute have a hierarchical relationship by comparing the first and second attribute to a system record schema, system dataset schema, or both and determining that the similarity of a proposed relationship of the first attribute and second attribute exhibits a similarity to a system record schema or system dataset schema that meets or exceeds a preprogrammed similarity threshold, the first attribute having a higher level in the hierarchy than the second attribute; (2) identifying a first value associated with the first attribute and a second value associated with the second attribute, by comparing the first value and first attribute to a system record schema, and determining that the relationship between the first attribute and first value and second attribute and second value meet or exceed a preprogrammed similarity threshold; (3) using the hierarchical relationship between the first attribute and the second attribute and the first value and the second value to determine a third value associated with the second attribute, the product, or both, such as the computer system automatically identifying a part attribute (first attribute) and an ingredient contained in each part (a second attribute), a number of parts value (a first value), an ingredient concentration value (a second value), and deriving the total amount of the ingredient in the product (the third value) therefrom (aspect 30).

In aspects, the invention provides the method of any one or more of aspects 1-30, wherein the PIDC datasets comprise status information associated with a product record, status information comprising one or more records associated with a manufactured product, product component, product ingredient, or product manufacturer, such as regulatory status, production status, or availability status, and wherein the method comprises evaluating the product status information (aspect 31).

In aspects, the invention provides the method of any one or more of aspects 1-31, wherein the status information includes environmental, social, and corporate governance status information (ESG status information) (aspect 32).

In aspects, the invention provides the method of any one or more of aspects 1-32, wherein ESG status information comprises conflict mineral use status information, greenhouse gas emission status information, human rights policy status information, or a combination of any thereof (aspect 33).

In aspects, the invention provides the method of any one or more of aspects 1-33, wherein status information comprises information about individuals associated with a manufacturer that are barred or limited with respect to performing product-related activities, manufacturers that are barred or limited with respect to performing product-related activities, or both (aspect 34).

In aspects, the invention provides the method of any one or more of aspects 1-34, wherein status information includes product reputation status information, manufacturer status information, or both, and wherein the method automatically comprises the processor evaluating the reputation of products, manufacturers, or both, associated with PIDC records identified by querying PIDC datasets with evaluation submission semantic vectors, evaluation submission lexical vectors, or both (aspect 35).

In aspects, the invention provides the method of any one or more of aspects 1-35, wherein the status information includes regulatory compliance status information and wherein the method comprises the processor automatically evaluating whether a change should be made to a part of the evaluation submission based on the regulatory status of PIDC datasets associated with similar lexical vectors, similar semantic vectors, or both (aspect 36).

In aspects, the invention provides the method of any one or more of aspects 1-36, wherein the method comprises the processor automatically evaluating the likelihood of a regulatory approval risk, a regulatory compliance risk, a reputational risk, a supply chain failure risk, or a combination thereof, associated with the evaluation submission, based on the analysis of PIDC records identified associated with similar semantic vectors, similar lexical vectors, or both, identified by querying PIDC datasets with evaluation term semantic vectors, evaluation term lexical vectors, or both (aspect 37).

In aspects, the invention provides the method of any one or more of aspects 1-37, wherein the memory component further comprises a collection of regulatory requirement datasets, each regulatory requirement dataset comprising one or more regulatory requirement vectors, each regulatory requirement vector being generated from one or more semantic terms associated with a regulatory requirement, wherein the method comprises the processor automatically querying regulatory requirement vectors with one or more evaluation submission lexical vectors, one or more evaluation submission semantic vectors, or both, and evaluating the similarity of the evaluation submission lexical vectors, evaluation submission semantic vectors, or both, to the regulatory requirement vectors based on cosine analysis, and evaluating the content of the associated regulatory requirement datasets with the evaluation submission to assess (a) errors or omissions in regulatory information in the evaluation submission, (b) regulatory status of one or more aspects of the evaluation submission-associated product, or (c) both (a) and (b) (aspect 38).

In aspects, the invention provides the method of any one or more of aspects 1-38, wherein the method comprises the processor automatically querying one or more evaluation submission semantic vectors generated from evaluation submission semantic tokens comprising one or more semantic terms identified as corresponding to evaluation submission product ingredients, evaluation submission product components, or both, against regulatory requirement vectors in the computer system memory that are generated from semantic terms corresponding to components, materials, or both registered on one or more designated product or designated materials list, such as in a material declaration standard, and evaluating whether a product associated with an evaluation submission contains a part, ingredient, or both, that is subject to a regulatory compliance requirement, a regulatory reporting requirement, or both (aspect 39).

In aspects, the invention provides the method of any one or more of aspects 1-39, wherein the method further comprises the processor automatically evaluating for any identified regulatory compliance requirement or regulatory reporting requirement and (1) determining whether the evaluation submission falls within an exception to the regulatory compliance requirement or regulatory reporting requirement by comparing records in the evaluation submission with records concerning relevant regulatory requirement exceptions, (2) determining whether there are possible preprogrammed actions contained in the memory component that can be implemented or recommended to avoid the regulatory compliance requirement or regulatory reporting requirement, or (3) performing both (1) and (2) (aspect 40).

In aspects, the invention provides the method of any one or more of aspects 1-40, wherein the method comprises the processor automatically recommending that the end user make a submission of information regarding the product associated with the evaluation submission comprising a reference to a regulatory submission associated with an identified product associated with a PIDC dataset, the dataset associated with a similar lexical vector, similar semantic vector, or both (aspect 41).

In aspects, the invention provides the method of any one or more of aspects 1-41, wherein the method further comprises (1) the processor automatically obtaining a regulatory submission template or identifying a proposed regulatory submission submitted with or contained in the evaluation submission, (2) automatically populating or amending one or more fields of the regulatory submission template or proposed regulatory submission based on information contained in one or more PIDC datasets associated with similar lexical vectors, similar semantic vectors, or both, and, (3) optionally automatically submitting a generated or amended regulatory submission to a regulatory authority (aspect 42).

In aspects, the invention provides the method of any one or more of aspects 1-42, wherein (1) the desired output comprises identifying one or more manufacturers of a product, component, or ingredient, that is/are related to the product associated with the evaluation submission, and meeting one or more criteria contained in the desired output, (2) the method comprises the processor automatically evaluating the content of one or more PIDC datasets associated with similar semantic vectors, similar lexical vectors, or both, to evaluate if records in the one or more PIDC datasets match the one or more criteria, and (3) recommending or facilitating a business transaction between the client product manufacturer associated with the evaluation submission and the product manufacturer associated with the one or more PIDC datasets that match the one or more criteria (aspect 43).

In aspects, the invention provides the method of any one or more of aspects 1-43, wherein the method comprises the processor automatically presenting, negotiating, and entering into one or more electronic contracts for services, product supply, component supply, ingredient supply, or a combination of any or all thereof between two or more entities (aspect 44).

In aspects, the invention provides the method of any one or more of aspects 1-44, wherein the computer system automatically applies confidential information protections to at least most of the data contained in PIDC records that are not associated with the client (submitter) product manufacturer, an affiliate thereof, or an entity in a supply chain with the client product manufacturer (aspect 45).

In aspects, the invention provides the method of any one or more of aspects 1-45, wherein the computer system automatically presents one or more questions, one or more prompts, or a combination thereof, that facilitate the collection of the evaluation submission and which, if answered, facilitate the identification of one or more product attributes and one or more manufacturer attributes (aspect 46).

In aspects, the invention provides the method of any one or more of aspects 1-46, wherein the method comprises (1) the processor automatically requesting and, if provided, receiving, end user feedback regarding (a) the interpretation of the evaluation submission, (b) the identification of evaluation submission semantic terms, identification of evaluation submission lexical terms, or both; (c) the determination of any hierarchy attributes of any terms; (d) the association of values with attributes; (e) the application of desired output; (f) the generation of semantic tokens, (g) the prioritization of queries; (h) the comparison of the evaluation submission with one or more PIDC records identified by association with similar lexical vectors, similar semantic vectors, or both; (i) the output recommendations or applications applied or proposed to be applied by the system by the system, or (j) any combination of (a)-(i); (2) the processor automatically adjusting one or more conditions of the computer system based on the feedback, and (3) the processor automatically reperforming or modifying one or more steps or outputs of the method based on the adjusted conditions (aspect 47).

In aspects, the invention provides the method of any one or more of aspects 1-47, wherein the method comprises the processor developing one or more machine learning protocols regarding (a) the interpretation of the evaluation submission, (b) the identification of evaluation submission semantic terms, evaluation submission lexical terms, or both; (c) the determination of any hierarchy attributes of any terms; (d) the association of values with attributes; (e) the application of desired output; (f) the generation of semantic tokens, (g) the prioritization of queries; (h) the comparison of the evaluation submission with one or more PIDC records identified by association with similar lexical vectors, similar semantic vectors, or both; (i) the output recommendations or applications applied or proposed to be applied by the system by the system, or (j) any combination of (a)-(i), the development of machine learning protocols comprising developing a machine learning model, conducting supervised learning, and the processor adjusting the machine learning model based on input received in the supervised learning process (aspect 48).

In aspects, the invention provides the method of any one or more of aspects 1-48, wherein the method comprises applying a machine learning model to one or more steps of the method (aspect 49).

In aspects, the invention provides the method of any one or more of aspects 1-49, wherein the memory component comprises a data repository designed to store semi-structured and unstructured data (aspect 50).

In aspects, the invention provides the method of any one or more of aspects 1-50, wherein the memory component comprises a graph database, a data lake, or a combination thereof (aspect 51).

In aspects, the invention provides the method of any one or more of aspects 1-51, wherein (1) the processor comprises an on-demand or automatically scalable cloud processing component and (2) end users access the computer system via an internet connection, such as a virtual wide area network (aspect 52)

In aspects, the invention provides the method of any one or more of aspects 1-52, wherein at least some PIDC datasets are generated on demand from semi-unstructured or unstructured data according to a schema-on-write protocol (aspect 53).

In aspects, the invention provides the method of any one or more of aspects 1-54, wherein conforming the evaluation submission to a hierarchy comprises applying a data tree-based protocol (aspect 54).

In aspects, the invention provides the method of any one or more of aspects 1-54, wherein the method comprises the processor periodically automatically evaluating whether changes have occurred in PIDC datasets associated with similar lexical vectors, similar semantic vectors, or both, and delivering an alert to the end user if a change meeting one or more predetermined monitoring standards has occurred (aspect 55).

In aspects, the invention provides the method of any one or more of aspects 1-55, wherein the system monitors changes in PIDC datasets continuously or regularly and the processor (1) automatically re-performs one or more aspects of the method whenever there is a change in one or more PIDC datasets that meet one or more dataset change standards and/or (2) alerts the end-user of the change in the PIDC datasets (aspect 56).

In aspects, the invention provides the method of any one or more of aspects 1-56, wherein the processor automatically routinely monitors changes in regulatory requirements and alerts the end user and/or changes one or more aspects of output based on any detected change in regulatory requirements that are applicable to the product associated with the evaluation submission (aspect 56).

In aspects, the invention provides the method of any one or more of aspects 1-57, wherein whenever the submitter (party making a submission to the system) makes a change to the evaluation submission, the processor automatically evaluates making changes to previously identified related PIDC datasets, changing the relationship between the evaluation submission and any previously identified related PIDC datasets, or both (aspect 58).

In aspects, the invention provides the method of any one or more of aspects 1-58, wherein the attribute identification protocol comprises comparing one or more system-identified terms to a plurality of indexes (aspect 59).

In aspects, the invention provides the method of any one or more of aspects 1-59, wherein the attribute identification protocol comprises prioritizing the comparison of system-identified terms to one or more selected attribute indexes, wherein the processor automatically selects the one or more selected attribute indexes based on the processor recognizing a domain-identifying semantic term in the evaluation submission, a recognized finished good-identifying semantic term in the evaluation submission, or both, and wherein the one or more selected indexes comprise a preprogrammed association with the domain-identifying semantic term, finished good-identifying semantic term, or both, as applicable (aspect 60).

In aspects, the invention provides the method of any one or more of aspects 1-60, wherein the attribute identification protocol comprises selecting one or more attribute indexes to use in characterizing system-identified terms based on a recognized domain-identifying semantic term in the evaluation submission, a recognized finished good-identifying semantic term in the evaluation submission, or both (aspect 61).

In aspects, the invention provides a computer system that comprises means for carrying out or that otherwise carries out the steps of the method of any one of aspects 1-61 (aspect 62).

In aspects, the invention provides a computer program comprising instructions encoded in physical, transferrable, and reproducible computer readable media, which, when executed by a computer, cause the computer to carry out the steps of any one of aspects 1-61 (aspect 63).

In the aspects, the invention provides a method carried out by a computer system comprising providing a computer system comprising (a) a processor component also referenced in this listing of exemplary aspects simply as a "processor",) and (b) a memory component, the memory component comprising a PIDC comprising PIDC product-related datasets (stored product-related datasets), each PIDC product-related dataset comprising (A) PIDC alphanumeric records contained in or derived from PIDC source data, each PIDC dataset relating to a manufactured product, a manufacturer of a manufactured product, or both, and (B) one or more PIDC lexical term vectors, a PIDC lexical term vector corresponding to an electronic PIDC lexical term token also contained in or associated with the PIDC dataset, each electronic PIDC lexical term token comprising a collection of PIDC lexical N-grams, each PIDC lexical N-gram having the same N-gram size and representing a fragment of (string within) a PIDC lexical term, wherein in a PIDC lexical term token corresponding to a PIDC lexical term that is longer than the N-gram size, the PIDC lexical term token comprises a series of overlapping lexical N-grams, the first overlapping lexical N-gram comprising the first alphanumeric character of the PIDC lexical term and all spatially related alphanumeric characters up to the N-gram size, and each other overlapping lexical N-gram corresponding to the lexical term beginning at the next successive character in a direction from the first alphanumeric character in the PIDC lexical term and containing at least one additional alphanumeric character in the PIDC lexical term, each PIDC lexical term used to generate PIDC lexical tokens being in conformity with system data harmonization standards prior to tokenization, the system data harmonization standards comprising standards for consistent treatment of symbols, punctuation, case, and spacing of digits in data (aspect 64).

In the aspects, the invention provides the method of aspect 64, wherein the PIDC lexical N-gram size is between 2-5 alphanumeric characters (aspect 65).

In the aspects, the invention provides the method of any one or both of aspect 64 or aspect 65, wherein the method further comprises, upon the computer system receiving an evaluation submission from an end user, (1) automatically, by operation of the processor, (a) determining if any part of the evaluation submission can include unharmonized data, unharmonized data being data comprising data that does not comply with the system data harmonization standards, and applying a data harmonization protocol to any such data that can comprise unharmonized data to generate a data harmonized dataset containing data that is consistent with data in the PIDC in respect of the data harmonization standards in terms of treatment of symbols, punctuation, case, and spacing of digits; (b) applying a term identification protocol to the data harmonized dataset to generate a term-identified evaluation dataset, the term identification protocol identifying (I) system-identified terms, each system-identified term comprising a collection of linked alphanumeric characters of a minimum size set off by term boundaries identified by reference to preprogrammed term boundary standards and (II) any present extraneous alphanumeric characters that are not part of any system-identified term; (c) characterizing system-identified terms in a term-identified evaluation submission dataset as evaluation submission lexical terms or evaluation submission semantic terms by applying an attribute identification protocol that comprises comparing uncharacterized system-identified terms against one or more specialized preprogrammed attribute indexes, each specialized preprogrammed attribute index comprising a plurality of curated manufactured product-related terms, product-manufacturer-related terms, or both, to characterize previously uncharacterized system-identified terms that correspond to system-recognized attributes as evaluation submission semantic terms and to otherwise characterize system-identified terms that do not correspond to system-recognized attributes as evaluation submission lexical terms, thereby generating a term-identified evaluation submission dataset, (d) applying a lexical term token generation protocol to evaluation submission lexical terms in the term-identified evaluation submission dataset to generate evaluation submission lexical term electronic tokens, each evaluation submission lexical electronic term token comprising a collection of N-grams of a selected size corresponding to (I) term fragment N-grams which consist of fragments of (strings within) evaluation submission lexical terms, (II) combinations of extraneous alphanumeric characters, (III) combinations of one or more extraneous alphanumeric characters and characters contained in evaluation submission lexical terms, or (IV) any combination of (I)-(III), and (e) applying a lexical term vector generation protocol on each corresponding evaluation submission lexical term electronic token to generate a corresponding evaluation submission lexical vector; (2) by automatic operation of the processor, performing a query of PIDC lexical vectors comprising (a) selecting an evaluation submission lexical vector and measuring the cosine distance between the evaluation submission lexical vector and each PIDC lexical vector, (b) identifying PIDC lexical vectors having a cosine distance that meets or exceeds a preprogrammed lexical vector similarity threshold as similar lexical vectors, and (c) repeating steps (a) and (b) with a plurality of evaluation submission lexical vectors to generate a collection of similar lexical vectors; (3) by automatic operation of the processor, comparing recognized terms, alphanumeric characters, records, or a combination thereof, contained in a PIDC dataset associated with a similar lexical vector identified by the query of step (2), to one or more evaluation submission lexical terms or evaluation submission extraneous alphanumeric characters associated with the evaluation submission lexical vector used to identify the similar lexical vector according to a lexical term comparison protocol to thereby (a) assess whether there is an error or omission in the one or more evaluation submission lexical terms, (b) identify a relationship or potential relationship between the one or more evaluation submission lexical terms and such similar lexical vector-associated datasets, (c) identify one or more product-related or manufacturer-related terms that are related to the one or more evaluation submission lexical terms, or (d) perform any combination of steps (a)-(c); and (4) by automatic operation of the processor, generating an updated evaluation submission by (a) correcting identified errors, correcting identified omissions, or both; (b) associating the updated evaluation submission with one or more PIDC datasets; (c) making a change in one or more aspects of the status of the product or supply of product parts or ingredients or recommending one or both thereof to the end user; or (d) performing any combination of steps (a)-(c) (aspect 66).

In aspects, the invention provides the method of any one or more of aspects 64-66, wherein the method further comprises any one or more of the characteristics described in any one or more of aspects 2-61 if such a characteristic further describes one or more elements of a method which do not conflict with one or more characteristics of the method described in aspects 64-66 (aspect 67).

In the aspects, the invention provides a method carried out by a computer system comprising providing a computer system comprising (a) a processor component (also referenced in this listing of exemplary aspects simply as a "processor",) and (b) a memory component, the memory component comprising a PIDC comprising PIDC product-related datasets (stored product-related datasets), each PIDC product-related dataset comprising (A) PIDC alphanumeric records contained in or derived from PIDC source data, each PIDC dataset relating to a manufactured product, a manufacturer of a manufactured product, or both and (B) one or more PIDC lexical term vectors, a PIDC lexical term vector corresponding to an electronic PIDC lexical term token also contained in or associated with the PIDC dataset, each electronic PIDC lexical term token comprising one or more PIDC lexical N-grams, each PIDC lexical N-gram having the same N-gram size, wherein one or more PIDC lexical N-grams in PIDC lexical N-gram tokens comprise one or more PIDC assembled lexical N-grams, wherein a PIDC assembled lexical N-gram comprises (i) a number of concatenated and spatially-related extraneous alphanumeric characters occurring in a PIDC dataset that meet or exceed the N-gram size, (ii) a collection of two or more extraneous and spatially-related alphanumeric characters that are less than the N-gram size in combination with one or more space filling characters, (iii) a combination of one or more extraneous alphanumeric characters and one or more characters contained in a spatially related lexical term, or (iv) a combination of any or all of (i)-(iii), each PIDC lexical term used to generate PIDC lexical tokens being in conformity with system data harmonization standards prior to tokenization, the system data harmonization standards comprising standards for consistent treatment of symbols, punctuation, case, and spacing of digits in data (aspect 68).

In the aspects, the invention provides the method of aspect 68, wherein the PIDC lexical N-gram size is between 2-5 alphanumeric characters (aspect 69).

In the aspects, the invention provides the method of any one or both of aspect 68 or aspect 69, wherein the method further comprises, upon the computer system receiving an evaluation submission from an end user, (1) automatically, by operation of the processor, (a) determining if any part of the evaluation submission can include unharmonized data, unharmonized data being data comprising data that does not comply with the system data harmonization standards, and applying a data harmonization protocol to any such data that can comprise unharmonized data to generate a data harmonized dataset containing data that is consistent with data in the PIDC in respect of the data harmonization standards in terms of treatment of symbols, punctuation, case, and spacing of digits; (b) applying a term identification protocol to the data harmonized dataset to generate a term-identified evaluation dataset, the term identification protocol identifying (I) system-identified terms, each system-identified term comprising a collection of linked alphanumeric characters of a minimum size set off by term boundaries identified by reference to preprogrammed term boundary standards and (II) any present extraneous alphanumeric characters that are not part of any system-identified term; (c) characterizing system-identified terms in a term-identified evaluation submission dataset as evaluation submission lexical terms or evaluation submission semantic terms by applying an attribute identification protocol that comprises comparing uncharacterized system-identified terms against one or more specialized preprogrammed attribute indexes, each specialized preprogrammed attribute index comprising a plurality of curated manufactured product-related terms, product-manufacturer-related terms, or both, to characterize previously uncharacterized system-identified terms that correspond to system-recognized attributes as evaluation submission semantic terms and to otherwise characterize system-identified terms that do not correspond to system-recognized attributes as evaluation submission lexical terms, thereby generating a term-identified evaluation submission dataset, (d) applying a lexical term token generation protocol to evaluation submission lexical terms in the term-identified evaluation submission dataset to generate evaluation submission lexical term electronic tokens, each evaluation submission lexical electronic term token comprising a collection of N-grams the N-gram size, the lexical term token generation protocol comprising (I) concatenating a collection of spatially related extraneous alphanumeric characters that meets or exceeds the N-gram size (e.g., lexical N-gram rule) to generate one or more assembled character N-grams and adding such assembled character N-grams to an evaluation submission lexical token, (II) concatenating a collection of two or more spatially related extraneous alphanumeric characters that does not meet or exceed the N-gram size and adding one or more space-filling characters to generate an assembled character N-gram and adding the assembled character N-gram to an evaluation submission lexical token, (III) combining one or more extraneous alphanumeric characters with characters from a spatially related lexical term to generate one or more assembled character N-gram(s) and adding such assembled character N-gram(s) to an evaluation submission lexical token, or (IV) performing any combination of (I)-(III), and (e) applying a lexical term vector generation protocol to each corresponding evaluation submission lexical term electronic token to generate a corresponding evaluation submission lexical vector; (2) by automatic operation of the processor, performing a query of PIDC lexical vectors comprising (a) selecting an evaluation submission lexical vector and measuring the cosine distance between the evaluation submission lexical vector and each PIDC lexical vector, (b) identifying PIDC lexical vectors having a cosine distance that meets or exceeds a preprogrammed lexical vector similarity threshold as similar lexical vectors, and (c) repeating steps (a) and (b) with a plurality of evaluation submission lexical vectors to generate a collection of similar lexical vectors; (3) by automatic operation of the processor, comparing recognized terms, alphanumeric characters, records, or a combination thereof, contained in a PIDC dataset associated with a similar lexical vector identified by the query of step (2), to one or more evaluation submission lexical terms or evaluation submission extraneous alphanumeric characters associated with the evaluation submission lexical vector used to identify the similar lexical vector according to a lexical term comparison protocol to thereby (a) assess whether there is an error or omission in the one or more evaluation submission lexical terms, (b) identify a relationship or potential relationship between the one or more evaluation submission lexical terms and such similar lexical vector-associated datasets, (c) identify one or more product-related or manufacturer-related terms that are related to the one or more evaluation submission lexical terms, or (d) perform any combination of steps (a)-(c); and (4) by automatic operation of the processor, generating an updated evaluation submission by (a) correcting identified errors, correcting identified omissions, or both; (b) associating the updated evaluation submission with one or more PIDC datasets; (c) making a change to one or more aspects of the status of the product, supply of product parts or ingredients, or recommending one or both thereof to the end user; or (d) performing any combination of steps (a)-(c) (aspect 70).

In the aspects, the invention provides the method of any one or more of aspects 68-70, wherein the PIDC lexical N-gram size is between 2-5 alphanumeric characters (aspect 71).

In aspects, the invention provides the method of any one or more of aspects 68-71, wherein the method further comprises any one or more of the characteristics described in any one or more of aspects 2-61 or 65-66 if such a characteristic further describes one or more elements of a method which do not conflict with one or more characteristics of the method described in aspects 68-71 (aspect 72).

In the aspects, the invention provides a method carried out by a computer system, such a computer system having the characteristics of the computer system(s) described in aspect 1, aspect 64, or aspect 68, wherein the method comprises, upon the computer system receiving an evaluation submission from an end user, (1) automatically, by operation of the processing component (processor), (a) determining if any part of the evaluation submission can include unharmonized data, unharmonized data being data comprising data that does not comply with the system data harmonization standards, and applying a data harmonization protocol to any such data that can comprise unharmonized data to generate a data harmonized dataset containing data that is consistent with data in the PIDC in respect of the data harmonization standards in terms of treatment of symbols, punctuation, case, and spacing of digits; (b) applying a term identification protocol to the data harmonized dataset to generate a term-identified evaluation dataset, the term identification protocol identifying (I) system-identified terms, each system-identified term comprising a collection of linked alphanumeric characters of a minimum size set off by term boundaries identified by reference to preprogrammed term boundary standards and (II) any present extraneous alphanumeric characters that are not part of any system-identified term; and (c) characterizing system-identified terms in a term-identified evaluation submission dataset as evaluation submission lexical terms or evaluation submission semantic terms by applying an attribute identification protocol that comprises comparing uncharacterized system-identified terms against one or more specialized preprogrammed attribute indexes, each specialized preprogrammed attribute index comprising a plurality of curated manufactured product-related terms, product-manufacturer-related terms, or both, to characterize previously uncharacterized system-identified terms that correspond to system-recognized attributes as evaluation submission semantic terms and to otherwise characterize system-identified terms that do not correspond to system-recognized attributes as evaluation submission lexical terms, thereby generating a term-identified evaluation submission dataset; (2) automatically, by operation of the processor, evaluate one or more system-identified terms by application of a preprogrammed element priority assessment protocol, the element priority assessment protocol associating each evaluated system-identified term with a priority score; (3) by automatic operation of the processor, performing one or more queries of PIDC datasets, wherein the first query of the PIDC dataset is performed using a search element comprising or derived from a system-identified term associated with a priority score that is (a) higher than a preprogrammed priority score threshold or (b) has the highest priority score calculated; and identifying PIDC datasets comprising one or more search element similar terms identified by the processor as having sufficient similarity as the search element according to one or more preprogrammed element similarity assessment standards; and (4) by automatic operation of the processor, comparing recognized terms, alphanumeric characters, records, or a combination thereof, contained in a PIDC dataset associated with a search element similar term identified by the query of step (3) to corresponding system-identified terms, extraneous alphanumeric characters, records, or a combination thereof in the evaluation submission to (a) assess whether there is an error or omission in the one or more evaluation submission terms or records, (b) identify a relationship or potential relationship between evaluation submission and one or more PIDC datasets identified in the query of step (3), (c) identify one or more product-related or manufacturer-related terms that are related to the system identified term in or used to generate the search element, or (d) perform any combination of steps (a)-(c) (aspect 73).

In the aspects, the invention provides the method of aspect 73, wherein the element priority assessment protocol comprises applying a positive priority score factor to evaluation submission lexical terms that increases the priority score of lexical search terms (aspect 74).

In the aspects, the invention provides the method of one or both of aspect 73 or aspect 74, wherein the element priority assessment protocol comprises applying a positive priority score factor to evaluation submission lexical terms that (a) are above a preprogrammed size, (b) occur only once or at a frequency below a preprogrammed level in the evaluation submission or a discrete part of the evaluation submission (e.g., a dataset, a dataset generated from a particular document, and the like), (c) are spatially located at the start of a dataset or document in the evaluation submission source data, or (d) any combination of (a)-(c) (aspect 75).

In the aspects, the invention provides the method of any one or more of aspects 73-75, wherein the element priority assessment protocol comprises applying a positive priority score factor to evaluation submission semantic terms identified in one or more indexes associated with attributes that typically result in more efficient queries, such as a finished good index, a domain index, or a combination thereof (aspect 76).

In the aspects, the invention provides the method of any one or more of aspects 73-76, wherein the method comprises obtaining a desired output from the end user and the element priority assessment protocol comprises applying a positive priority score factor to system-identified terms associated with the desired output (aspect 77).

In the aspects, the invention provides the method of any one or more of aspects 73-77, wherein the method comprises determining the hierarchy of evaluation submission semantic terms by comparison of a collection of evaluation submission semantic terms against one or more preprogrammed system dataset schemas and applying a positive priority score factor to evaluation submission semantic terms associated with a higher hierarchy in one or more system dataset schemas (aspect 78).

In the aspects, the invention provides the method of any one or more of aspects 73-78, wherein the method comprises performing two or more queries of PIDC datasets, each successive query being performed with a search element comprising or derived from a system-identified term that (a) has a priority score higher than a preprogrammed priority score threshold or (b) has the highest priority score calculated of any system-identified term that has not already acted as a basis for a query (aspect 79).

In the aspects, the invention provides the method of any one or more of aspects 73-79, wherein the method comprises evaluating identified PIDC datasets against a preprogrammed query quality standard and stopping queries once a sufficient number of PIDC datasets are identified to meet or exceed the preprogrammed query quality standard (aspect 80).

In aspects, the invention provides the method of any one or more of aspects 73-80, wherein the method further comprises any one or more of the characteristics described in any one or more of aspects 2-61, 65-66, or 69-71 if such a characteristic further describes one or more elements of a method which do not conflict with one or more characteristics of the method described in aspects 73-80 (aspect 81).

In the aspects, the invention provides a method carried out by a computer system, such a computer system having the characteristics of the computer system(s) described in aspect 1, aspect 64, or aspect 68, wherein the method comprises, upon the computer system receiving an evaluation submission from an end user, (1) automatically, by operation of the processor component (processor) (a) determining if any part of the evaluation submission can include unharmonized data, unharmonized data being data comprising data that does not comply with the system data harmonization standards, and applying a data harmonization protocol to any such data that can comprise unharmonized data to generate a data harmonized dataset containing data that is consistent with data in the PIDC in respect of the data harmonization standards in terms of treatment of symbols, punctuation, case, and spacing of digits; (b) applying a term identification protocol to the data harmonized dataset to generate a term-identified evaluation dataset, the term identification protocol identifying (I) system-identified terms, each system-identified term comprising a collection of linked alphanumeric characters of a minimum size set off by term boundaries identified by reference to preprogrammed term boundary standards and (II) any present extraneous alphanumeric characters that are not part of any system-identified term; and (c) characterizing system-identified terms in a term-identified evaluation submission dataset as evaluation submission lexical terms or evaluation submission semantic terms by applying an attribute identification protocol that comprises comparing uncharacterized system-identified terms against one or more specialized preprogrammed attribute indexes, each specialized preprogrammed attribute index comprising a plurality of curated manufactured product-related terms, product-manufacturer-related terms, or both, to characterize previously uncharacterized system-identified terms that correspond to system-recognized attributes as evaluation submission semantic terms and to otherwise characterize system-identified terms that do not correspond to system-recognized attributes as evaluation submission lexical terms, thereby generating a term-identified evaluation submission dataset; (2) by automatic operation of the processor recognizing if there is an association or expected association between an evaluation submission semantic term and another system-identified term or extraneous alphanumeric character to identify one or more evaluation submission element sets in the evaluation submission; (3) by automatic operation of the processor, performing one or more queries of PIDC datasets, wherein the first query of the PIDC dataset is performed using a search element comprising or derived from one or more evaluation submission element sets to identify PIDC datasets associated with a similar element set or search element; and (4) by automatic operation of the processor, comparing recognized terms, alphanumeric characters, records, or a combination thereof, contained in a PIDC dataset associated with a combination of elements identified by the query of step (3) to corresponding system-identified terms, extraneous alphanumeric characters, records, or a combination thereof in the evaluation submission to (a) assess whether there is an error or omission in the one or more evaluation submission terms or records, (b) identify a relationship or potential relationship between evaluation submission and one or more PIDC datasets identified in the query of step (3), (c) identify one or more product-related or manufacturer-related terms that are related to the system identified term in or used to generate the search element, or (d) perform any combination of steps (a)-(c) (aspect 82).

In the aspects, the invention provides the method of aspect 82, wherein the method comprises (1) the processor automatically evaluating generating a putative element set comprising an evaluation submission semantic term and one or more other system-identified terms, one or more extraneous alphanumeric characters, or both, which are spatially related or otherwise associated with the evaluation submission semantic term; (2) comparing the putative element set against one or more system record schemas or system dataset schemas contained in the memory component to determine if the similarity of the putative element set and the one or more system dataset schemas meets or exceeds a preprogrammed similarity threshold; and (3) identifying putative element sets that meet or exceed the preprogrammed similar threshold as element sets (aspect 83).

In the aspects, the invention provides the method of any one or both of aspect 82 and aspect 83, wherein the element set comprises one or more expected attribute-value pairs (aspect 84).

In the aspects, the invention provides the method of one or more of aspects 82-84, wherein the element set comprises a collection of semantic terms relating to a system-recognized category of semantic terms, such as manufacturer identity, product identity, or regulatory status identity (aspect 85).

In the aspects, the invention provides the method of any one or more of aspects 82-85, wherein the method comprises determining the hierarchical status of two or more semantic terms by comparison of the semantic terms against one or more system dataset schemas and performing the query based on a search element that comprises the hierarchical status of the two or more semantic terms (aspect 86).

In aspects, the invention provides the method of any one or more of aspects 82-86, wherein the method further comprises any one or more of the characteristics described in any one or more of aspects 2-61, 65-66, 69-71, or 74-80 if such a characteristic further describes one or more elements of a method which do not conflict with one or more characteristics of the method described in aspects 82-86 (aspect 87).

In the aspects, the invention provides a method carried out by a computer system, such a computer system comprising the characteristics of computer system(s) described in aspect 1, aspect 64, and aspect 68, wherein the method comprises, upon the computer system receiving an evaluation submission from an end user, (1) automatically, by operation of the processor component (processor), (a) determining if any part of the evaluation submission can include unharmonized data, unharmonized data being data comprising data that does not comply with the system data harmonization standards, and applying a data harmonization protocol to any such data that can comprise unharmonized data to generate a data harmonized dataset containing data that is consistent with data in the PIDC in respect of the data harmonization standards in terms of treatment of symbols, punctuation, case, and spacing of digits; (b) applying a term identification protocol to the data harmonized dataset to generate a term-identified evaluation dataset, the term identification protocol identifying (I) system-identified terms, each system-identified term comprising a collection of linked alphanumeric characters of a minimum size set off by term boundaries identified by reference to preprogrammed term boundary standards and (II) any present extraneous alphanumeric characters that are not part of any system-identified term; and (c) characterizing system-identified terms in a term-identified evaluation submission dataset as evaluation submission lexical terms or evaluation submission semantic terms by applying an attribute identification protocol that comprises comparing uncharacterized system-identified terms against one or more specialized preprogrammed attribute indexes, each specialized preprogrammed attribute index comprising a plurality of curated manufactured product-related terms, product-manufacturer-related terms, or both, to characterize previously uncharacterized system-identified terms that correspond to system-recognized attributes as evaluation submission semantic terms and to otherwise characterize system-identified terms that do not correspond to system-recognized attributes as evaluation submission lexical terms, thereby generating a term-identified evaluation submission dataset; (2) by automatic operation of the processor, selecting one or more search elements in or derived from the evaluation submission and performing one or more queries of a PIDC to identify one or more PIDC datasets comprising dataset elements that the processor determines are sufficiently similar to the one or more search elements to be identified as related PIDC datasets; (3) by automatic operation of the processor generating a modified evaluation dataset from the evaluation dataset by (a) one generating one or more putative hierarchical element relationships by generating a combination of an evaluation submission semantic term and one or more other system-identified terms, one or more extraneous alphanumeric characters, or both, which are spatially related or otherwise associated with the evaluation submission semantic term; (b) comparing the putative element set against one or more system dataset schemas contained in the memory component to determine if the similarity of the putative and the one hierarchical element relationship and or more system dataset schemas meets or exceeds a preprogrammed similarity threshold; and (c) identifying a putative hierarchical element relationships that meet or exceed the preprogrammed similar threshold as an evaluation submission hierarchical element relationship; (4) by automatic operation of the processor, performing one or more queries of PIDC datasets, wherein the first query of the PIDC dataset is performed using a search element comprising or derived from one or more evaluation submission element sets to identify PIDC datasets associated with a similar element set or search element; and (5) by automatic operation of the processor, comparing one or more system recognized PIDC hierarchical relationships between elements of a related PIDC dataset to an evaluation submission hierarchical element relationship to determine if the PIDC hierarchical element relationship and the evaluation submission hierarchical element relationship meet or exceed a similar threshold to identify one or more similar hierarchy PIDC datasets; and (6) by automatic operation of the processor comparing records of any similar hierarchy PIDC datasets to the elements of the evaluation submission to (a) assess whether there is an error or omission in the one or more evaluation submission terms or records, (b) identify a relationship or potential relationship between evaluation submission and one or more similar hierarchy PIDC datasets, (c) identify one or more product-related or manufacturer-related terms that are related to a system identified term associated with an evaluation submission hierarchical relationship, or (d) perform any combination of steps (a)-(c) (aspect 88).

In aspects, the invention provides the method of aspect 88, wherein the method further comprises any one or more of the characteristics described in any one or more of aspects 2-61, 65-66, 69-71, 74-80, or 83-86 if such a characteristic further describes one or more elements of a method which do not conflict with one or more characteristics of the method described in aspect 88 (aspect 89).

In the aspects, the invention provides a method carried out by a computer system, wherein the method comprises, (1) providing a computer system comprising (a) a processor component (also referenced in this listing of exemplary aspects simply as a "processor",) and (b) a memory component, the memory component comprising a product information data collection ("PIDC") comprising stored product-related datasets, each stored product-related dataset comprising (A) PIDC alphanumeric records contained in or derived from PIDC source data, each PIDC alphanumeric record relating to a manufactured product, a manufacturer of a manufactured product, or both, and comprising product status/risk information, manufacturer status/risk information, or both and (B) a collection of PIDC semantic term vectors, comprising vectors having been generated from and corresponding to an electronic semantic term token, each electronic semantic term token comprising one or more system-identified semantic terms identified as corresponding to one or more product attributes, manufacturer attributes, product status/risk information, manufacture status/risk information, or a combination thereof, contained in the PIDC source data, each electronic semantic term token generated by a semantic token generation protocol; (2) automatically, by operation of the processor, upon the computer system receiving an evaluation submission from an end user, (a) determining if any part of the evaluation submission can include unharmonized data, unharmonized data being data comprising data that does not comply with the system data harmonization standards, and applying a data harmonization protocol to any such data that can comprise unharmonized data to generate a data harmonized dataset containing data that is consistent with data in the PIDC in respect of the data harmonization standards in terms of treatment of symbols, punctuation, case, and spacing of digits; (b) applying a term identification protocol to the data harmonized dataset to generate a term-identified evaluation dataset, the term identification protocol identifying (I) system-identified terms, each system-identified term comprising a collection of linked alphanumeric characters of a minimum size set off by term boundaries identified by reference to preprogrammed term boundary standards and (II) any present extraneous alphanumeric characters that are not part of any system-identified term; and (c) characterizing system-identified terms in a term-identified evaluation submission dataset as evaluation submission lexical terms or evaluation submission semantic terms by applying an attribute identification protocol that comprises comparing uncharacterized system-identified terms against one or more specialized preprogrammed attribute indexes, each specialized preprogrammed attribute index comprising a plurality of curated manufactured product-related terms, product-manufacturer-related terms, or both, to characterize previously uncharacterized system-identified terms that correspond to system-recognized attributes as evaluation submission semantic terms and to otherwise characterize system-identified terms that do not correspond to system-recognized attributes as evaluation submission lexical terms, thereby generating a term-identified evaluation submission dataset; (3) by automatic operation of the processor, performing a query of PIDC semantic vectors comprising (a) selecting an evaluation submission semantic vector and measuring the cosine distance between the evaluation submission semantic vector and each PIDC semantic vector, (b) identifying any PIDC semantic vectors having a cosine distance that meets or exceeds a preprogrammed semantic vector similarity threshold as similar semantic vectors, and (c) repeating steps (a) and (b) with a plurality of evaluation submission semantic vectors to generate a collection of similar semantic vectors; and (4) by automatic operation of the processor, (a) evaluating any records, terms, or other elements contained in one or more PIDC datasets identified in step (3) and that the computer system identifies as being associated with product risk/status information, manufacturer risk/status information, or both, to assess whether the risk associated with the product reflected in the evaluation submission meets a preprogrammed risk threshold and (b) if the processor determines that the evaluation submission meets or exceeds the risk threshold, (c) reporting the risk to the end user or automatically performing one or more actions to reduce or eliminate the risk (aspect 90).

In the aspects, the invention provides, the method of aspect 90, wherein the risk is associated with the regulatory status of the evaluation submission product and the method comprises automatically generating a regulatory authority submission associated with the evaluation product for submission to a regulatory authority (aspect 91).

In the aspects, the invention provides the method of aspect 90 or aspect 91, wherein the method comprises automatically submitting the generated regulatory authority submission to a regulatory authority (aspect 92).

In the aspects, the invention provides the method of any one or more of aspects 90-92, wherein the risk is associated with the reputation of one or more parts/components of the evaluation submission product, one or more ingredients of the evaluation submission product, or one or more product manufactures in the client product manufacturer's supply chain the method comprises the processor automatically reporting alternative supply options to the end user (aspect 93).

In aspects, the invention provides the method of any one or more of aspects 90-93, wherein the method further comprises any one or more of the characteristics described in any one or more of aspects 2-61, 65-66, 69-71, 74-80, or 83-86 if such a characteristic further describes one or more elements of a method which do not conflict with one or more characteristics of the method described in aspects 90-93 (aspect 94).

In the aspects, the invention provides a system for preparing regulatory authority submissions comprising (a) a processor function, (b) input/output system, and (c) a physical transferrable and reproducible computer readable media/medium ("PTRCRM") comprising memory comprising (I) an independent entity product information data repository ("IESPIDR") comprising at least 1,000 supplier product-related records ("SPRRs") originating from and associating with at least 100 product supplier entities that are independent of each other, (II) a regulatory information data repository ("RIDR") comprising product-related regulatory requirements ("PRRRs") for one or more regulatory authorities and regulatory regimes; and (III) computer-executable instructions ("CEIs") that when executed by operation of the processor function cause the processor to (A) receive a input from a user including (1) information concerning any user-associated entity ("UAE") and (2) one or more product information element records ("PIERs") comprising attributes and associated values describing properties of a product sold or sought by the UAE, its parts, or ingredients, and that correspond to the types of attributes and values in PRRR(s); (B) clean, harmonize, and format information in input; (C) recognize the information in input; and (D) expand the information by applying synonyms, truncations, lemmas, or a combination thereof to one or more PIERs to generate a query ready dataset ("QRD"); (E) query the IESPIDR based on the QRD to identify PRRs comprising data matching PIER(s) in the input at a level to be considered relevant by the system ("hits"); (F) compare hits with input; and (G) add one or more data set features ("DSFs") in hits to input to prepare an enriched client information data set ("ECIDS"); (H) query the RIDR with information comprising data in the ECIDS to identify regulatory requirements ("RRs") in the RIDR applicable to the ECIDS; and (I) prepare a regulatory authority submission ("RAS") based on applying the identified RRs to the ECIDS (aspect 95).

In the aspects, the invention provides the system of aspect 95, wherein (a) the system receives user deliverable input comprising whether to (i) transmit the RAS to the user or user designee or (ii) submit the RAS to a regulatory authority ("RA") on behalf of the user-associated entity and (b) the system relays a prepared RAS to the user or submits the RAS to a RA based on the deliverable input (aspect 96).

In the aspects, the invention provides the system of any one or both of aspect 95 or aspect 96, wherein the system comprises an electronic contract module that presents, negotiates, and executes legally binding electronic contracts comprising an electronic contract transferring title of the RAS to an owner or operator of the system and providing a reversion of ownership or license to the user-associated entity after the RAS is submitted to a RA by the system (aspect 97).

In the aspects, the invention provides the system of any one or more of aspects 95-97, according to any of the preceding aspects, wherein at least 20% of the SPRRs in the IESPIDR are multi-level data sets comprising supplier, finished good, component, and ingredient records, which are analyzed by the system in identifying hits (aspect 98).

In the aspects, the invention provides the system of any one or more of aspects 95-98, wherein the RIDR comprises at least 100 PRRRs based on ingredients and associated amounts ("points of concern"), and the system compares the ECIDS with the RIDR PRRRs based on ingredient data and amount data contained in each (aspect 99).

In the aspects, the invention provides the system of any one or more of aspects 95-99, wherein the system comprises a confidential information module ("CIM") that identifies confidential information in the IESPIDR records and redacts confidential information, shields it from user access, or a combination thereof (aspect 100).

In the aspects, the invention provides the system of any one or more of aspects 95-100, wherein the system performs an analysis specialized for one regulatory regime, one regulatory authority, or one regulatory regime of one regulatory authority (aspect 101).

In the aspects, the invention provides the system of any one or more of aspects 95-101, wherein the comparison of DSFs or PIERs input with SPRRs in the IESPIDR, PRRRs in the RIDR, or both is made based on search of or reference to specialized corpus/corpora, semantic network, schema, models, or rules comprising product-related terms contained in the memory of the PTRCRM (aspect 102).

In the aspects, the invention provides the system of any one or more of aspects 95-102, wherein the CEI further comprises rules, schema, or algorithms for recognition of unrecognized data based on reference to product information related schemas, rules, semantic networks, corpus/corpora, or a combination of any thereof (aspect 103).

In the aspects, the invention provides the system of any one or more of aspects 95-103, wherein the system comprises an input module that receives both direct input and document input and the system processes both product-related image data and OCR-recognizable data in document records in the development of an input dataset that is used to generate a QRD (aspect 104).

In the aspects, the invention provides the system of any one or more of aspects 95-104, wherein the system adds or associates image data in input with image corresponding textual data, image related metadata, or both, prior to completion of the QRD and the system incorporates such corresponding textual data, image related data, or both in the QRD (aspect 105).

In the aspects, the invention provides the system of any one or more of aspects 95-105, wherein parts of the RIDR, parts of the IESPIDR, or both, are contained in a combination of two or more of (a) one or more structured relational databases, (b) one or more flexible relational databases, and (c) one or more graph databases (aspect 106).

In the aspects, the invention provides the system of any one or more of aspects 95-106, wherein the matching function comprises evaluating both one or more product defining qualities ("PDQs") and one or more non-PDQ product properties ("NPDQPPs") in input with PDQs and NPDQPPs in SPRRs (aspect 107).

In the aspects, the invention provides the system of any one or more of aspects 95-107, wherein operation of the system comprises application of one or more supervised or semi-supervised machine learning modules to one or more functional modules of the system (aspect 108).

In aspects, the invention provides the system of any one or more of aspects 95-108, wherein the system comprises means for carrying out or that otherwise carries out the steps of a method described in any one or more of aspects 1-61, 64-66, 68-71, 73-80, 82-86, 90-93, or 110 (aspect 109).

In the aspects, the invention provides a method for preparing regulatory authority submissions using a system comprising (a) a processor function, (b) input/output system, and (c) a physical transferrable and reproducible computer readable media/medium ("PTRCRM") comprising memory comprising (I) an independent entity product information data repository ("IESPIDR") comprising at least 1,000 supplier product-related records ("SPRRs") originating from and associating with at least 100 product supplier entities that are independent of each other, (II) a regulatory information data repository ("RIDR") comprising product-related regulatory requirements ("PRRRs") for one or more regulatory authorities and regulatory regimes; the method comprising the steps of: the processor (A) receiving a input from a user including (1) information concerning any user-associated entity ("UAE") and (2) one or more product information element records ("PIERs") comprising attributes and associated values describing properties of a product sold or sought by the UAE, its parts, or ingredients, and that correspond to the types of attributes and values in PRRR(s); (B) cleaning, harmonizing, and formatting information in input; (C) recognizing the information in input; and (D) expanding the information by applying synonyms, truncations, lemmas, or a combination thereof to one or more PIERs to generate a query ready dataset ("QRD"); (E) querying the IESPIDR based on the QRD to identify PRRs comprising data matching PIER(s) in the input at a level to be considered relevant by the system ("hits"); (F) comparing hits with input; and (G) adding one or more data set features ("DSFs") in hits to input to prepare an enriched client information data set ("ECIDS"); (H) querying the RIDR with information comprising data in the ECIDS to identify regulatory requirements ("RRs") in the RIDR applicable to the ECIDS; and (I) preparing a regulatory authority submission ("RAS") based on applying the identified RRs to the ECIDS (aspect 110).

In aspects, the invention provides the method of aspect 110, wherein the method further comprises any one or more of the characteristics described in any one or more of aspects 2-61, 65-66, 69-71, 74-80, 83-86, or 91-93 if such a characteristic further describes one or more elements of a method which do not conflict with one or more characteristics of the method described in aspect 110 (aspect 111).

In aspects, the invention provides a computer system that comprises means for carrying out or that otherwise carries out the steps of a method described in any one of aspects 64-66, 68-71, 73-80, 82-86, 88, 90-93, or 110 (aspect 112).

In aspects, the invention provides a computer program comprising instructions encoded in physical, transferrable, and reproducible computer readable media, which, when executed by a computer, cause the computer to carry out the steps of methods described in any one of aspects 64-66, 68-71, 73-80, 82-86, 88, 90-93, or 110 (aspect 113).

TECHNICAL EFFECTS

A skilled person will recognize that the systems and methods of the invention provided here afford several technical effects, solving several problems that have heretofore not been addressed or addressed in a similar or sufficient manner by known systems/methods, by use of the various technical features of this disclosure. Various technical effects are described elsewhere in this disclosure, and a few specific technical effects are highlighted/reinforced here. One exemplary technical effect of the invention is overcoming the problem of assessing the accuracy of Customer PRRs, ensuring Customer compliance with RRs, or both, based on generalized/industry knowledge, which is addressed herein by technical functions including providing/building an IESPIDR comprising searchable PRRs, developing a CI DS comprising a CPIS and interpreting its content and structure (e.g., based on specialized corpora, SN, or specialized rules/algorithms focused on structure content of PRR-related records), expanding such a DS to build a QRD, and querying the IESPIDR to identify matching SPRRs to identify likely gaps/errors or to impute corrections/additions to the CPIS to generate an ECPIS, which can be the basis of further action(s) (e.g., generation of an RA submission).

In particular, the system and the method according to the invention query an independent entity product information data repository (IESPIDR), which includes data originating from a vast number of sources, in the form of supplier product-related records (SPRRs), to identify PRRs comprising data which match product information in product information element records (PIERs) received from a given user (also referred to as "hits" herein). Based on this query, one or more data set features (DSFs) in the identified hits are added to the user provided input. The result is an enriched client information dataset (ECIDS). Since the added dataset features originate from the IESPIDR, experience and knowledge from previous similar regulatory processes are applied, and the resulting ECIDS is therefore more likely to fulfil regulatory requirements than the original dataset. Accordingly, the dataset is improved. Furthermore, since this is obtained by means of an independent entity, the problems related to BOMs described above are overcome.

Thus, element(s) of technical features include the application of data cleaning, data blending, DS expansion (e.g., through stemming/lemmatization), synonym generation, keyword generation, and metadata application. Physical components, such as a multi-processor, typically massively parallel, distributed processing System are employed along with advanced data recognition methods (e.g., NLP, specialized corpora, SN, etc.), in aspects DOS enhanced over System performance by application of MLM(s).

SOTI/MOTI also address the problem of quickly and effectively generating more accurate and/or more efficient regulatory authority submissions relating to complex products, comprising multiple ingredients, multiple components, or both, typically from multiple sources. By use of SOTI/MOTI querying IESPIDR records to determine accuracy of Customer Input and using improved DS(s) derived from such analyses to prepare regulatory authority submissions that can be submitted to regulatory authorities or relayed to the Customer/third parties.

SOTI/MOTI also address the problem of keeping Product records up to date in a changing complex supplier landscape, by regularly monitoring an IESPIDR, Customer DS, RIDR, etc., and updating the Customer of changes that lead to suggested or required action, such as removing a product form the market, updating a regulatory submission, or changing suppliers based on changes in supplied Product conditions and/or Customer policies/practices.

The problem of maintaining SI in such Systems is addressed through SI identification, tagging, use of firewalls, use of limited access subsystems/components, and use of access levels determined via AM. The problem of generating an RA submission based on access to such IE SPRRs comprising SI is addressed by, e.g., use of ECMs for transferring RAS ownership to Broker/Owner, involving technical elements of e-contracting, data matching/formatting, secure transfer, etc., and back-licensing or back-transferring the RAS to Customer.

What is claimed is:

1. A method carried out by a computer system comprising providing a computer system comprising: (1) a processor component and (2) a memory component, the memory component comprising a product information data collection ("PIDC") comprising stored product-related datasets, each stored product-related dataset comprising (a) PIDC alphanumeric records contained in or derived from PIDC source data, each PIDC alphanumeric record relating to a manufactured product, a manufacturer of a manufactured product, or both; (b) a collection of PIDC semantic term vectors, each PIDC semantic term vector generated from and corresponding to an electronic semantic term token, each electronic semantic term token comprising one or more system-identified semantic terms identified as corresponding to one or more product attributes, manufacturer attributes, or both, contained in the PIDC source data, each electronic semantic term token generated by a semantic term token generation protocol; and (c) a collection of PIDC lexical term vectors, each PIDC lexical term vector generated from and corresponding to an electronic PIDC lexical term token, each electronic PIDC lexical term token comprising a collection of PIDC lexical N-grams, each PIDC lexical N-gram formed corresponding to (I) one or more PIDC term fragment N-grams comprising a string contained in a PIDC lexical term, wherein a PIDC lexical term is a system-identified term contained in the PIDC source data not associated with a system-recognized attribute, (II) a collection of PIDC assembled character N-grams comprising combinations of one or more spatially related extraneous alphanumeric characters not associated with any system-identified term, combinations of extraneous alphanumeric characters and characters in term fragment N-grams, or both, or (III) a combination of one or more PIDC term fragment N-grams and one or more PIDC assembled character N-grams, each PIDC lexical term token generated by a lexical term token generation protocol; each system-identified semantic term and extraneous character used to generate PIDC lexical term tokens and each PIDC semantic term used to generate electronic semantic term tokens being in conformity with system data harmonization standards prior to tokenization, the system data harmonization standards comprising standards for consistent treatment of symbols, punctuation, case, and spacing of digits in data.

2. The method of claim 1, wherein the method further comprises, upon the computer system receiving an evaluation submission from an end user:

(1) automatically, by operation of the processor component, (a) determining if any part of the evaluation submission can include unharmonized data, unharmonized data being data comprising data that does not comply with the system data harmonization standards, and applying a data harmonization protocol to any such data that can comprise unharmonized data to generate a data harmonized dataset containing data that is consistent with data in the PIDC with respect to the data harmonization standards in terms of treatment of symbols, punctuation, case, and spacing of digits; (b) applying a term identification protocol to the data harmonized dataset to generate a term-identified evaluation dataset, the term identification protocol identifying (I) system-identified terms, each system-identified term comprising a collection of linked alphanumeric characters of a minimum size set off by term boundaries identified by reference to preprogrammed term boundary standards and (II) any present extraneous alphanumeric characters that are not part of any system-identified term; (c) characterizing system-identified terms in a term-identified evaluation submission dataset as evaluation submission lexical terms or evaluation submission semantic terms by applying an attribute identification protocol that comprises comparing uncharacterized system-identified terms against one or more specialized preprogrammed attribute indexes, each specialized preprogrammed attribute index comprising a plurality of curated manufactured product-related terms, product-manufacturer-related terms, or both, to characterize previously uncharacterized system-identified terms that correspond to system-recognized attributes as evaluation submission semantic terms and to otherwise characterize system-identified terms that do not correspond to system-recognized attributes as evaluation submission lexical terms, thereby generating a term-identified evaluation submission dataset, (d) applying a semantic term token generation protocol to the term-identified evaluation submission dataset to generate evaluation submission semantic term electronic tokens, each evaluation submission semantic term electronic token comprising one or more evaluation submission semantic terms, (e) applying a semantic term vector generation protocol on each corresponding evaluation submission semantic term electronic token to generate evaluation submission semantic term vectors; (f) applying the lexical term token generation protocol to evaluation submission lexical terms in the term-identified evaluation submission dataset to generate evaluation submission lexical term electronic token, each evaluation submission lexical term electronic token comprising a collection of N-grams of a selected size corresponding to (I) term fragment N-grams which consist of fragments of (strings within) evaluation submission lexical terms, (II) combinations of extraneous alphanumeric characters, (III) combinations of one or more of the extraneous alphanumeric characters and characters contained in evaluation submission lexical terms, or (IV) any combination of (I)-(III), and (g) applying a lexical term vector generation protocol on each corresponding evaluation submission lexical term electronic token to generate a corresponding evaluation submission lexical vector;

(2) by automatic operation of the processor component, performing a query of PIDC lexical vectors comprising (a) selecting an evaluation submission lexical vector and measuring the cosine distance between the evaluation submission lexical vector and each PIDC lexical vector, (b) identifying PIDC lexical vectors having a cosine distance that meets or exceeds a preprogrammed lexical vector similarity threshold as similar lexical vectors, and (c) repeating steps (a) and (b) with a plurality of evaluation submission lexical vectors to generate a collection of similar lexical vectors;

(3) by automatic operation of the processor component, comparing recognized terms, alphanumeric characters, records, or a combination thereof, contained in a PIDC dataset associated with a similar lexical vector identified by the query of step (2), to one or more evaluation submission lexical terms or evaluation submission extraneous alphanumeric characters associated with the evaluation submission lexical vector used to identify the similar lexical vector according to a lexical term comparison protocol to thereby (a) assess whether there is an error or omission in the one or more evaluation submission lexical terms, (b) identify a relationship or potential relationship between the one or more evaluation submission lexical terms and one or more similar lexical vector-associated datasets, (c) identify one or more product-related or manufacturer-related terms that are related to the one or more evaluation submission lexical terms, or (d) perform any combination of steps (3)(a)-(3)(c);

(4) by automatic operation of the processor component, performing a query of PIDC semantic vectors comprising (a) selecting an evaluation submission semantic vector and measuring the cosine distance between the evaluation submission semantic vector and each PIDC semantic vector, (b) identifying any PIDC semantic vectors having a cosine distance that meets or exceeds a preprogrammed semantic vector similarity threshold as similar semantic vectors, and (c) repeating steps (4)(a) and (4)(b) with a plurality of evaluation submission semantic vectors to generate a collection of similar semantic vectors;

(5) by automatic operation of the processor component, performing a semantic comparison of terms contained in PIDC datasets that are associated with the similar semantic vectors generated by the query of step (4) to one or more evaluation submission semantic terms associated with the evaluation submission semantic vector that identified the similar semantic vectors according to a semantic term comparison protocol so as to (a) determine if there is a risk of an error or omission in the evaluation submission, (b) assess whether a change in one or more aspects of the status of a product, the supply of product parts or ingredients, or both, which the computer system determines is likely to reduce a supply risk issue, improve a supply chain, or both, (c) determine if there is a relationship or potential relationship between an aspect of the product described in the evaluation submission and an aspect of a product in the PIDC dataset, or (d) perform any combination of steps (5)(a)-(5)(c); and (6) by automatic operation of the processor component, generating an updated evaluation submission by (a) correcting identified errors, correcting identified omissions, or both; (b) associating the updated evaluation submission with one or more PIDC datasets; (c) making a change in one or more aspects of the status of the product or supply of product parts or ingredients or recommending one or both thereof to the end user; or (d) performing any combination of steps (6)(a)-(6)(c).

3. The method of claim 2, wherein the lexical term token generation protocol comprises generating a series of overlapping lexical N-grams from one or more lexical terms and adding the series to an evaluation submission lexical vector, the series of overlapping N-grams comprising a first N-gram of the series being a string starting at the first alphanumeric digit of the evaluation submission lexical term and containing adjacent characters in the evaluation submission lexical term in a direction up to the character corresponding to the N-gram size, each successive N-gram if present starting at each successive digit of the evaluation submission lexical term and including adjacent alphanumeric characters in the same direction, the final N-gram of the series starting at the last alphanumeric element of the evaluation submission lexical term that provides an N-gram of the term having the N-gram size.

4. The method of claim 3, wherein the lexical term token generation protocol comprises (1) concatenating adjacent extraneous alphanumeric characters to generate one or more assembled character N-grams and adding such assembled character N-grams to an evaluation submission lexical token, (2) adding one or more space-filling characters to any collection of adjacent extraneous alphanumeric characters that are less than the N-gram size to generate one or more assembled character N-grams and adding such assembled character N-grams to an evaluation submission lexical token, (3) combining extraneous alphanumeric characters with characters from an adjacent lexical term to generate one or more assembled character N-grams and adding such assembled character N-grams to an evaluation submission lexical token, or (4) performing any combination of (a)-(c).

5. The method of claim 4, wherein (1) the PIDC lexical N-grams and evaluation submission lexical N-grams contain the same number of characters and (2) the size of the PIDC lexical N-grams and the evaluation submission lexical N-grams is 2-5 characters.

6. The method of claim 2, wherein the method comprises the processor component automatically (1) evaluating the validity of one or more evaluation submission lexical terms by application of a lexical term validity protocol that comprises (a) determining (I) degree of repetition of the evaluation submission lexical term in an evaluation submission, (II) the placement of the evaluation submission lexical term in relation to a semantic term, (III) the degree of similarity of PIDC lexical terms in datasets identified in queries of the PIDC performed with evaluation submission lexical vectors, evaluation submission semantic vectors, or both, (IV) the number of similar PIDC lexical terms in datasets identified in queries of the PIDC performed with evaluation submission lexical vectors, evaluation submission semantic vectors, or both, or (V) any combination of (I)-(IV), (2) measuring an impact on the assessment of lexical term validity arising from any one or more determinations made in step (1) by comparing the one or more determinations to one or more preprogrammed validity assessment standards, (3) determining if the overall assessment of validity for each evaluated evaluation submission lexical terms; (4) identifying any invalid evaluation submission lexical terms; and (5) performing one or more steps of the method or re-performing one or more steps of the method only using evaluation submission lexical terms that the computer system determines to be valid.

7. The method of claim 6, wherein for a data item corresponding to one or more system-identified terms in a PIDC dataset, an evaluation submission, or both; a PIDC dataset; or the overall evaluation submission (1) the processor component automatically assigns a credibility score to the data item based on the inclusion of one or more system-identified terms in the data item, the credibility score being determined by a credibility score generation protocol that evaluates (a) an identified source of the system-identified term, wherein the computer system associates the identified source with a credibility score or credibility score factor, (b) the inclusion of the system-identified term in an attribute index in the system wherein the computer system associates the attribute in the index with a credibility score or credibility score factor, (c) the number of terms in the evaluation submission that are contained in one or more attribute indices of the computer system, (d) the degree of matching between two or more system-identified terms in the data item to a preprogrammed dataset schema of the system, (e) system reputation data associated with a product, manufacturer, or both, contained in one or more PIDC datasets associated with similar lexical vectors, similar semantic vectors, or both; (f) the number of similar PIDC datasets identified by querying PIDC datasets with the evaluation submission lexical vectors, evaluation submission semantic vectors, or both, (g) the degree of similarity of PIDC datasets identified by querying PIDC datasets with the evaluation submission lexical vectors, evaluation submission semantic vectors, or both, or (h) any combination of (a)-(g), and (2) upon determining the credibility score the computer system automatically (a) reporting the credibility score to the end user, (b) using the credibility score in determining whether to modify an evaluation submission, or (c) performing both steps (2)(a) and (2)(b).

8. The method of claim 2, wherein the method comprises (1) the end user submitting unstructured data to the computer system; (2) the computer system, upon detecting submission of the unstructured data in the evaluation submission, automatically identifying alphanumeric content contained in the unstructured data and including such alphanumeric content as part of the evaluation submission; (3) the computer system identifying one or more groups of one or more system-identified terms in the unstructured data; (4) the computer system automatically evaluating the similarity of each group of system-identified terms to one or more system record schemas or one or more system dataset schemas; and (5) if the computer system determines that a group of system-identified terms is sufficiently similar to a part of a system data record schema or system dataset schema, (a) assigning a hierarchical status to the system-identified terms, (b) modifying the evaluation submission by adding information reflecting the hierarchical status of the system-identified terms; and (c) factoring such hierarchical information into the performance of one or more queries, one or more dataset comparisons, or both.

9. The method of claim 2, wherein the method comprises the computer system automatically applying a prioritization score to one or more evaluation submission semantic vectors, one or more evaluation submission lexical vectors, or both, and prioritizing querying the PIDC with a semantic vector with a higher prioritization score, a lexical vector with a higher prioritization score, or both, and evaluating PIDC datasets identified with such queries before performing other queries of PIDC datasets with other semantic vectors or lexical vectors.

10. The method of claim 9, wherein the method comprises determining the hierarchical status of a semantic term and increasing the prioritization score of a semantic term associated with a higher level in a hierarchy.

11. The method of claim 2, wherein the method comprises the processor component analyzing the data harmonized dataset for the presence of undesirable duplicate characters or undesirable duplicate system-identified terms according to preprogrammed data deduplication standards and removing any identified undesirable duplicate characters or identified undesirable system-identified terms according to a data deduplication protocol to generate a deduplicated dataset and subjecting the deduplicated dataset to further processing to generate semantic vectors and lexical vectors therefrom.

12. The method of claim 1, wherein the PIDC source data is derived from at least two distinct data collections, the two distinct data collections comprising (1) a data collection derived from a private collection of manufactured product and associated product-manufacturer data submissions made by data submitters, each data submitter not being affiliated with a system owner and most of the product manufacturers associated with data submitters not being affiliated with or in a supply chain with the product manufacturer associated with the evaluation submission and (2) at least one publicly accessible data collection comprising manufactured-product-related records, product-manufacturer-related records, or both.

13. The method of claim 2, wherein the method comprises the processor component automatically (1) comparing evaluation submission semantic terms to one or more related term indexes, system dataset schemas, or both, to identify two or more evaluation submission semantic terms that fall within a preprogrammed semantic term category; (2) generating an evaluation submission multiple semantic N-gram token comprising the two or more evaluation submission semantic terms that fall with the semantic term category; (3) generating an evaluation submission multiple semantic N-gram vector from the token generated in step (2); and (4) performing a query of PIDC semantic records with an evaluation submission multiple semantic N-gram vector.

14. The method of claim 13, wherein (1) PIDC datasets comprise identified PIDC multiple N-gram semantic vectors corresponding to a collection of two or more semantic terms in a semantic term category in a PIDC dataset and (2) the method comprises the processor component (a) automatically prioritizing performing a query of PIDC multiple N-gram semantic vectors with one or more evaluation submission multiple N-gram vectors, (b) automatically according greater weight to similar vectors that are PIDC multiple N-gram semantic vectors identified by querying with an evaluation submission multiple N-gram semantic vector, or (c) automatically performing both step (a) and step (b).

15. A computer system that comprises means for carrying out or that otherwise carries out the steps of the method of claim 1.

16. A computer system that comprises means for carrying out or that otherwise carries out the steps of the method of claim 2.

17. A computer system that comprises means for carrying out or that otherwise carries out the steps of the method of claim 3.

18. A computer system that comprises means for carrying out or that otherwise carries out the steps of the method of claim 4.

19. A computer system that comprises means for carrying out or that otherwise carries out the steps of the method of claim 6.

20. A computer system that comprises means for carrying out or that otherwise carries out the steps of the method of claim 12.

\* \* \* \* \*